(12) United States Patent
Nakayama et al.

(10) Patent No.: US 7,528,091 B2
(45) Date of Patent: May 5, 2009

(54) MAGNESIUM-CONTAINING CARRIER COMPONENT AND APPLICATION TO OLEFIN POLYMERIZATION

(75) Inventors: Yasushi Nakayama, Sodegaura (JP); Hideki Bando, Sodegaura (JP); Yoshiho Sonobe, Sodegaura (JP); Makoto Mitani, Sodegaura (JP); Terunori Fujita, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 117 days.

(21) Appl. No.: 11/822,012

(22) Filed: Jun. 29, 2007

(65) Prior Publication Data
US 2008/0015401 A1    Jan. 17, 2008

Related U.S. Application Data

(62) Division of application No. 10/526,906, filed on Oct. 13, 2005, now Pat. No. 7,253,132.

(30) Foreign Application Priority Data

Oct. 23, 2002 (JP) .............. 2002-308352
Sep. 12, 2003 (JP) .............. 2003-320805

(51) Int. Cl.
C08F 4/02 (2006.01)
C08F 4/602 (2006.01)

(52) U.S. Cl. ............... 502/115; 502/103; 526/124.2; 526/124.9; 526/161

(58) Field of Classification Search ........... 502/103, 502/115; 526/124.2, 124.9, 161
See application file for complete search history.

(56) References Cited

U.S. PATENT DOCUMENTS 4,250,285 A    2/1981 Kashiwa et al.
4,542,199 A    9/1985 Kaminsky et al.
4,814,313 A    3/1989 Murata et al.
5,091,353 A    2/1992 Kioka et al.
5,623,033 A    4/1997 Kioka et al.

FOREIGN PATENT DOCUMENTS

| | | |
|---|---|---|
| EP | 0 069 951 A1 | 1/1983 |
| EP | 0 273 695 A1 | 7/1988 |
| EP | 0 358 264 A2 | 3/1990 |
| EP | 0 435 514 A2 | 7/1991 |
| JP | 58-19309 A | 2/1983 |
| JP | 4-211405 A | 8/1992 |
| JP | 7-330821 A | 12/1995 |
| JP | 10-279618 A | 10/1998 |
| JP | 2000-191718 A | 7/2000 |

*Primary Examiner*—Caixia Lu
(74) *Attorney, Agent, or Firm*—Birch, Stewart, Kolasch & Birch, LLP

(57) ABSTRACT

Solid fine particles which contain a magnesium atom, an aluminum atom and a $C_{1-20}$ alkoxy group simultaneously, are insoluble in a hydrocarbon solvent, and have an average particle diameter of 3 to 80 μm, and an olefin polymerization catalyst containing the solid fine particles and a transition metal compound in the groups 3 to 11 in the periodic table, exhibit a very high olefin polymerization activity without combination with an expensive organoaluminum oxy compound or organoboron compound and maintains a high activity in polymerization for a long time, and an olefin polymer excellent in powdery properties can be produced by using the olefin polymerization catalyst. The transition metal compound in the groups 3 to 11 in the periodic table includes a transition metal compound having a ligand containing two or more atoms selected from a boron atom, a nitrogen atom, an oxygen atom, a phosphorus atom and a sulfur atom.

5 Claims, 3 Drawing Sheets

MAGNESIUM-CONTAINING CARRIER COMPONENT AND APPLICATION TO OLEFIN POLYMERIZATION

Figure 1:
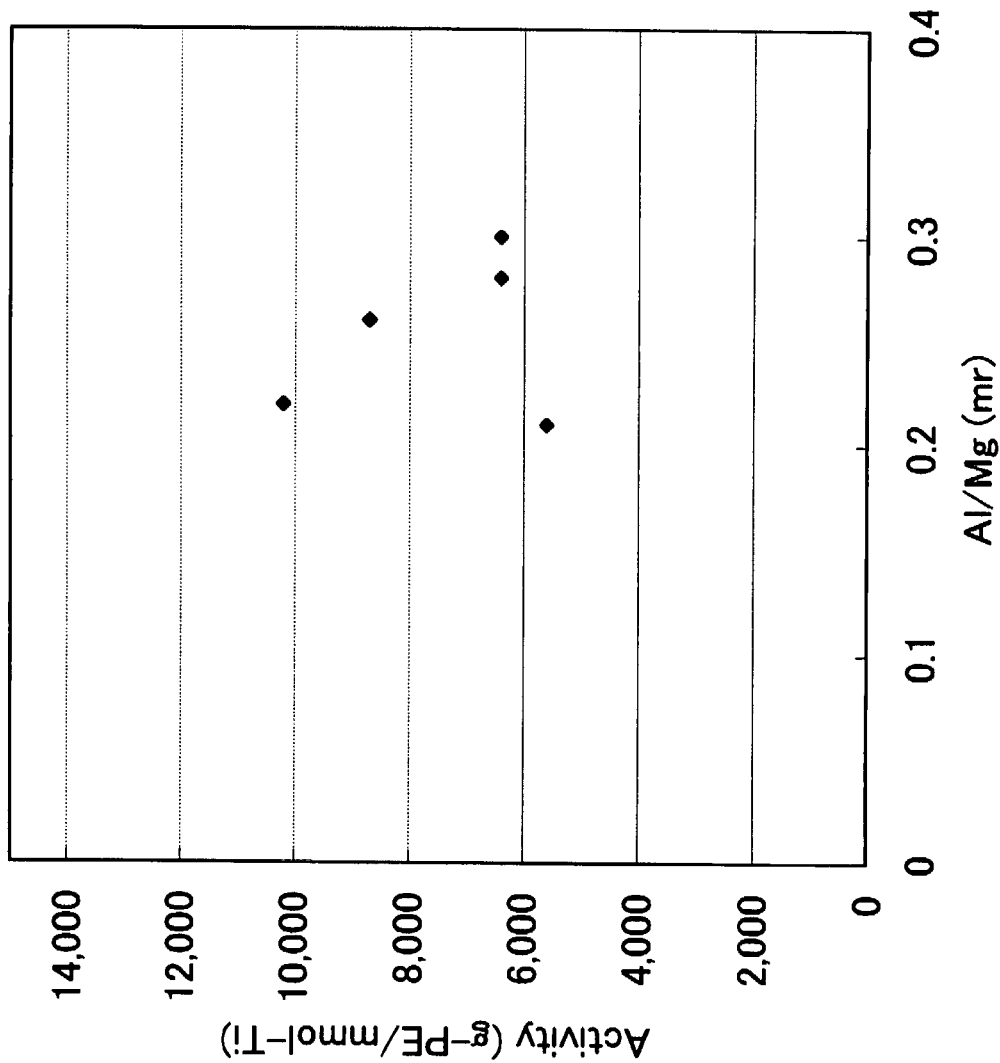
Figure 2:
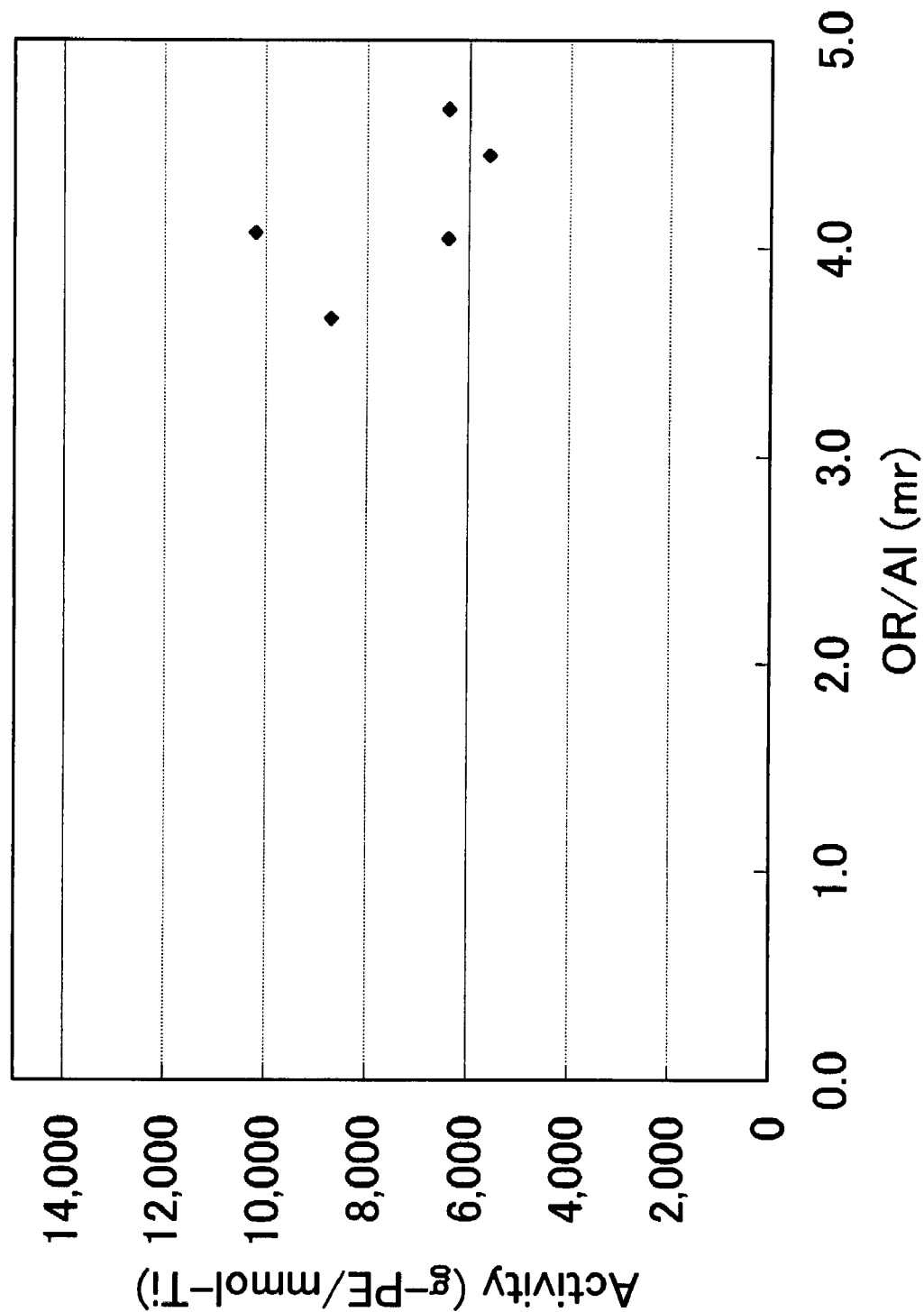
Figure 3:
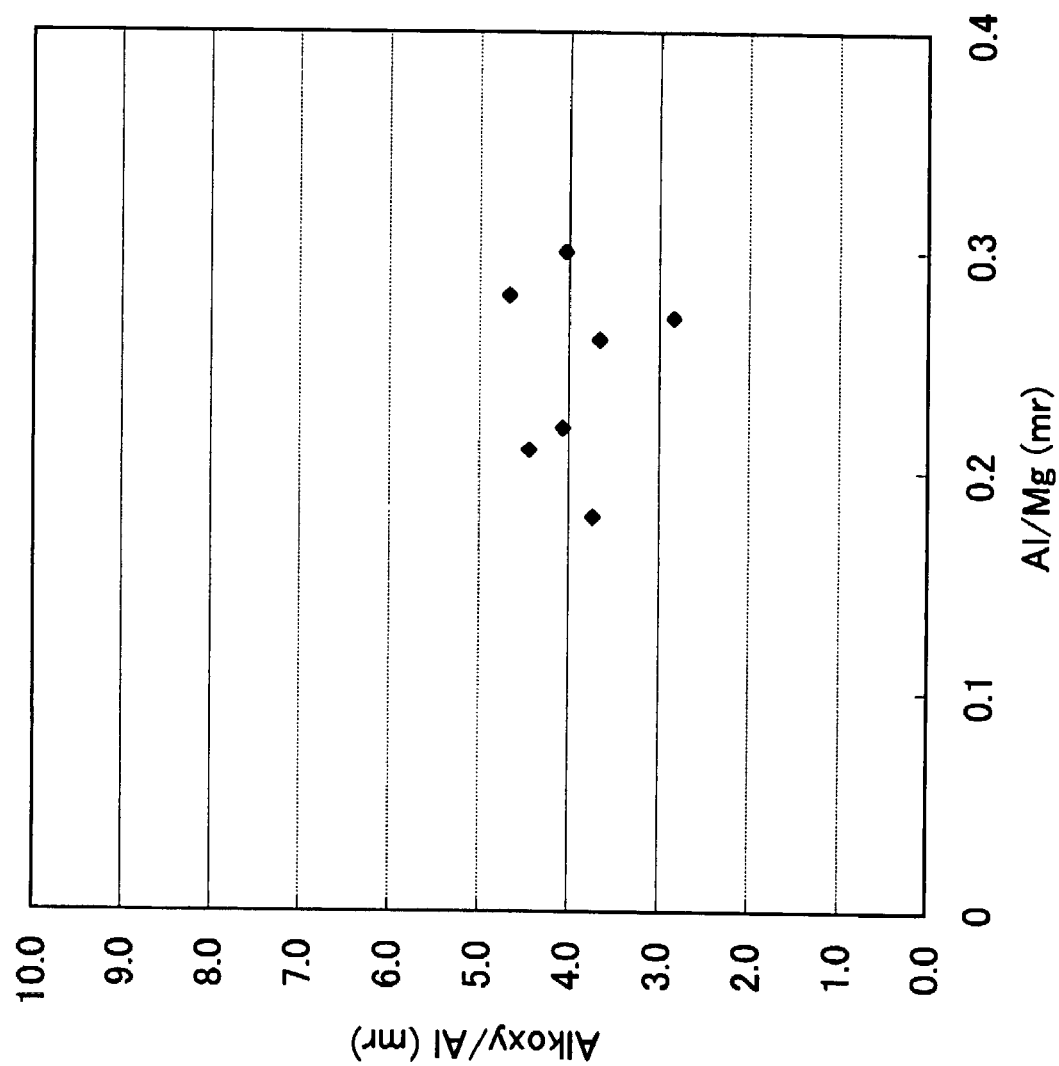

This application is a Divisional of application Ser. No. 10/526,906 filed on Oct.13, 2005, now U.S. Pat. No. 7,253,132 and for which priority is claimed under 35 U.S.C. § 120; and this application claims priority of Application Nos. 2002-308352 and 2003-320805 filed in Japan on Oct. 23, 2002 and Sep. 12, 2003 under 35 U.S.C. § 119; the entire contents of all are hereby incorporated by reference.

TECHNICAL FIELD

The present invention relates to an olefin polymerization catalyst and a process for producing an olefin polymer by using the olefin polymerization catalyst and in particular to an olefin polymerization catalyst not containing an organoaluminum oxy compound or an organoboron compound used conventionally as an olefin polymerization catalyst component, a process for producing an olefin polymer by using the olefin polymerization catalyst, and polyolefins excellent in powdery properties obtained by this process.

BACKGROUND ART

There is known a method of polymerizing an olefin wherein a metallocene compound having a group having conjugated π electrons particularly cyclopentadiene and its derivative as a ligand is used as a catalyst to be combined with an organoaluminum oxy compound or an organoboron compound. For example, JP-A 58-19309 discloses a method of polymerizing an olefin wherein bicyclopentadienyl zirconium dichloride and methyl aluminoxane are used as a catalyst. Recently, a system wherein olefin polymerization proceeds without using combination with an organoaluminum oxy compound or an organoboron compound is also disclosed. For example, JP-A 4-211405 discloses a method of polymerizing an olefin by using a combination of a zirconium metallocene compound and a solid carrier obtained by contacting magnesium chloride and an active hydrogen-free electron donor with active hydrogen-containing electron donor. Further, JP-A 7-330821 discloses a method of polymerizing an olefin by using a combination of a titanium metallocene compound and a solid component obtained by reacting a magnesium compound such as magnesium halide with an organoaluminum compound.

However, a majority of known methods including the method of JP-A 58-19309 suffer from a problem that the metallocene compound when used without combination with an expensive organoaluminum oxy compound or organoboron compound cannot exhibit a high olefin polymerization activity. Even if the metallocene compound exhibits a high olefin polymerization activity by combination with an expensive organoaluminum oxy compound or organoboron compound, the duration of the activity was often short. Further, the bulk density of a formed polymer after polymerization is low to make handling difficult, and when such catalysts are applied to a gaseous phase or liquid phase polymerization method, the resulting polymer adheres to a polymerizer wall thus deteriorating heat transfer to make cooling difficult and to permit formation of polymer agglomerates, and thus there are many problems to be solved in process in order to use such catalysts in producing polyolefin in an industrial scale.

In recently disclosed methods of permitting olefin polymerization to proceed without combination with an organoaluminum oxy compound or an organoboron compound, on one hand, there still remain many features to be improved from an economical point of view and from the viewpoint of large-scale production. In JP-A 4-211405 supra, for example, dibutyl magnesium which is expensive and unstable in the air should be used as a starting material in order to regulate the particle diameter of magnesium chloride as a carrier, and in JP-A 7-330821 supra, expensive and unstable diethoxy magnesium is used as a carrier. It is hardly said that these known techniques not using combination with an organoaluminum oxy compound or an organoboron compound are satisfactory in respect of the polymerization activity, the powdery properties of a formed polymer, and molecular weight characteristics such as molecular-weight distribution etc.

DISCLOSURE OF INVENTION

The present invention was made in view of the technical background described above, and the object of the present invention is to provide a polymerization catalyst exhibiting a high olefin polymerization activity without combination with an expensive organoaluminum oxy compound or organoboron compound and maintaining a high activity in polymerization for a long time, as well as a process for producing olefin polymers excellent in powdery properties by using the catalyst. This object is achieved by using an olefin polymerization catalyst containing solid fine particles prepared by a specific method, which contain a magnesium atom, an aluminum atom and a $C_{1-20}$ alkoxy group simultaneously, satisfy the requirements (i) the molar ratio of magnesium atom to aluminum atom (Mg/Al) is in the range of $1.0<(Mg/Al) \leqq 300.0$, (ii) the molar ratio of alkoxy group to aluminum atom (OR/Al) is in the range of $0.5<(OR/Al)<2.0$, and (iii) the average particle diameter is in the range of 3 to 80 μm, and are insoluble in a hydrocarbon solvent.

BEST MODE FOR CARRYING OUT THE INVENTION

The present invention relates to 1) a carrier component containing magnesium, 2) an olefin polymerization catalyst containing the carrier component, 3) a method of polymerizing an olefin by using the olefin polymerization catalyst, and 4) polyolefin obtained by this polymerization method. Hereinafter, the means to solve the problem in each item is described in detail.

Carrier Component Containing Magnesium

The carrier component containing magnesium in the present invention (hereinafter abbreviated sometimes to "carrier") is characterized by containing a magnesium atom, an aluminum atom and a $C_{1-20}$ alkoxy group simultaneously, being insoluble in a hydrocarbon solvent, and having an average particle diameter of 3 to 80 μm. The molar ratio of magnesium atom to aluminum atom (Mg/Al) in the carrier component is in the range of $1.0<Mg/Al \leqq 300.0$, and the molar ratio of alkoxy group to aluminum atom (OR/Al) is $0.05<OR/Al<2.0$.

The phrase "being insoluble in a hydrocarbon solvent" means that a soluble part of magnesium atoms is 0.5 weight % or less under stirring in at least one solvent selected from hexane, decane and toluene for 1 minute to 1 hour under atmospheric pressure in the temperature range of 0° C. to the inherent boiling point of the solvent, and also that soluble parts of aluminum atoms and alkoxy groups are each 1 weight % or less under stirring in at least one solvent selected from hexane, decane and toluene for 1 minute to 1 hour under atmospheric pressure at room temperature.

The carrier component of the present invention may contain other metal atoms and other organic groups than magnesium, aluminum and an alkoxy group, but is preferably free of a transition metal atom in the group 4, such as titanium, zirconium and hafnium. For example, when a titanium atom is contained in the carrier component of the present invention, an olefin polymer derived from compound (A) described later, that is, a transition metal compound in the groups 3 to 11 in the periodic table, having a ligand containing two or more atoms selected from a boron atom, a nitrogen atom, an oxygen atom, a phosphorus atom and a sulfur atom, and an olefin polymer derived from a titanium atom contained therein, are simultaneously formed, and thus the primary structure of the resulting polymer is hardly controlled. For the reason described above, it is preferable that the carrier component of the present invention is free of a transition metal atom in the group 4 and simultaneously does substantially not exhibit an olefin polymerization activity in combination with optionally used component (C) described later.

The total amount of a magnesium atom, an aluminum atom and a $C_{1-20}$ alkoxy group contained in the carrier component of the present invention is usually in the range of 10 to 90 weight %, preferably in the range of 15 to 60 weight %, particularly preferably 20 to 40 weight %, from the viewpoint of the polyolefin polymerization activity of a carrier component-containing polymerization catalyst described later and the powdery properties of polyolefin obtained as a result of polymerization. The largest component other than the magnesium atom, aluminum atom and $C_{1-20}$ alkoxy group contained in the carrier component is a halogen atom. When the halogen atom is a chlorine atom, the amount of chlorine atom in the carrier component ranges from about 20 weight % at the minimum to about 80 weight % at the maximum. In addition, an alcohol corresponding to the $C_{1-20}$ alkoxy group or a remaining organic solvent etc. used at the time of preparing the carrier component may be contained in the carrier component.

The $C_{1-20}$ alkoxy group in the carrier component of the present invention is a group derived from a $C_{1-20}$ alcohol used as a starting component at the time of preparing the carrier component as described later. The $C_{1-20}$ alkoxy group includes a methoxy group, ethoxy group, n-propoxy group, i-propoxy group, n-butoxy group, i-butoxy group, t-butoxy group, n-pentoxy group, i-amyloxy group, n-hexoxy group, n-heptoxy group, 2-ethylhexoxy group, n-octoxy group, dodecoxy group, octadecyloxy group, oleyloxy group, benzyloxy group, phenylethoxy group, cumyloxy group, i-propylbenzyloxy group etc., a halogen-containing alkoxy group such as trichloromethoxy group, trichloroethoxy group, trichlorohexoxy group etc., and a lower alkyl-containing phenoxy group such as phenoxy group, cresoxy group, ethylphenoxy group, nonylphenoxy group, cumylphenoxy group, naphthoxy group etc., among which a methoxy group, ethoxy group, propoxy group, butoxy group, pentoxy group, i-amyloxy group, hexoxy group, heptoxy group, 2-ethylhexoxy group, octoxy group, dodecoxy group etc. are preferable.

The molar ratio of magnesium atom to aluminum atom (Mg/Al) in the carrier component of the present invention is usually in the range of $1.0<Mg/Al\leq300.0$, preferably $30.0<Mg/Al\leq250.0$, more preferably $30.0<Mg/Al\leq200.0$, still more preferably $35.0<Mg/Al\leq200.0$, further more preferably $40.0<Mg/Al\leq150.0$, from the viewpoint of olefin polymerization activity and the powdery properties of formed polyolefin. The molar ratio of alkoxy group to aluminum atom (OR/Al) is usually in the range of $0.05<OR/Al<2.0$, preferably $0.1\leq OR/Al<1.8$, more preferably $0.2<OR/Al<1.0$, in further increasing the olefin polymerization activity.

When the carrier component of the present invention having an average particle diameter of 3 to 80 μm, preferably 3 to 50 μm, is used as an olefin polymerization catalyst described later, the polymerization activity is improved while the bulk density of formed polyolefin can be increased. In the carrier component of the present invention, a parameter which is important similarly to the parameter of average particle diameter is crystallite size determined by X-ray diffraction analysis of magnesium halide constituting the carrier component. This crystallite size is highly correlated with the polymerization activity, and a carrier component having a small crystallite size is considered necessary to achieve a high polymerization activity. However, when the crystallite size is extremely small, the polymerization activity is high, but deterioration of the particle morphology of the catalyst component is estimated. Accordingly, the crystallite size in the present invention is usually 3 to 80 (Å), preferably 10 to 75 (Å), more preferably 12 to 70 (Å), still more preferably 15 to 60 (Å), further more preferably 20 to 55 (Å).

The carrier component of the present invention is obtained by contacting a magnesium halide with a $C_{1-20}$ alcohol (hereinafter, this contact is referred to sometimes as "first contact") and then contacting the product with an organo aluminum compound represented by the following general formula (Z) (AlRnX3-n) (hereinafter, this contact is referred to sometimes as "second contact"), but the method of preparing the carrier component of the present invention is not limited to this preparation method.

As the magnesium halide, magnesium chloride and magnesium bromide are preferably used. As the magnesium halide, a commercial product may be used as it is, or the magnesium halide may be prepared separately from alkyl magnesium and the magnesium halide thus prepared can also be used without isolation.

The $C_{1-20}$ alcohol includes alcohols corresponding to the above-mentioned $C_{1-20}$ alkoxy groups, and examples thereof include methanol, ethanol, n-propanol, i-propanol, n-butanol, i-butanol, t-butanol, n-pentanol, i-amyl alcohol, n-hexanol, n-heptanol, 2-ethyl hexanol, n-octanol, dodecanol, octadecyl alcohol, oleyl alcohol, benzyl alcohol, phenyl ethanol, cumyl alcohol, i-propylbenzyl alcohol etc., a halogen-containing alcohol such as trichloromethanol, trichloroethanol, trichlorohexanol etc., and phenol or lower alkyl-containing phenol such as cresol, ethyl phenol, nonyl phenol, cumyl phenol, naphthol etc., among which methanol, ethanol, propanol, butanol, pentanol, i-amyl alcohol, hexanol, heptanol, 2-ethyl hexanol, octanol and dodecanol are preferable.

The magnesium halide may be contacted with the $C_{1-20}$ alcohol in the presence of a solvent. The solvent includes aliphatic hydrocarbons such as hexane, heptane, octane, decane, dodecane and kerosene; alicyclic hydrocarbons such as cyclopentane, cyclohexane, methylcyclopentane etc.; aromatic hydrocarbons such as benzene, toluene, xylene etc.; halogenated hydrocarbons such as ethylene dichloride, chlorobenzene, dichloromethane etc., or mixtures thereof.

Contact is carried out usually under heating. In heating, a temperature up to the boiling point of the solvent used can be arbitrarily selected. The contact time is varied depending on contact temperature, and for example, under conditions where n-decane is used as solvent and the heating temperature is 130° C., there appears a phenomenon where the reaction mixture is made uniform by contact for about 4 hours, which is indicative of completion of contact. Contact is carried out usually by using a unit facilitating contact under stirring etc.

When the contact is initiated, the system is usually heterogeneous, but as the contact proceeds, the reaction mixture is made gradually uniform and finally liquefied. Regardless of the degree of liquefaction, the carrier component of the present invention is useful as a component of the olefin polymerization catalyst, but is prepared preferably via a process involving complete liquefaction, from the viewpoint of the olefin polymerization activity and the powdery properties of the formed polyolefin.

The thus prepared contact product of the magnesium halide and $C_{1-20}$ alcohol (hereinafter referred to sometimes as "first contact product) may be used without distilling the solvent away or after removal of the solvent etc. used at the time of contact. Usually, the product is subjected to the subsequent step without distilling the solvent away.

The first contact product obtained by the above method is then contacted (=second contact) with an organoaluminum compound represented by the following general formula (Z):

$$AlR_nX_{3-n} \qquad (Z)$$

In the general formula (Z), R represents a $C_{1-20}$ hydrocarbon group, specifically a methyl group, ethyl group, propyl group, butyl group, hexyl group, octyl group and decyl group. X represents a halogen atom such as a chlorine atom, bromine atom etc. or a hydrogen atom. n is an integer of 1 to 3, preferably 2 or 3. When there are a plurality of Rs, the Rs may be the same or different, and when there are a plurality of Xs, the Xs may be the same or different. Specifically, the following compounds are used as the organoaluminum compound. The organoaluminum compound meeting such requirements includes trialkyl aluminum such as trimethyl aluminum, triethyl aluminum, triisopropyl aluminum, triisobutyl aluminum, trioctyl aluminum, tri-2-ethylhexyl aluminum etc.; alkenyl aluminum such as isoprenyl aluminum etc.; dialkylaluminum halide such as dimethyl aluminum chloride, diethyl aluminum chloride, diisopropyl aluminum chloride, diisobutyl aluminum chloride, dimethyl aluminum bromide etc.; alkyl aluminum sesquihalide such as methyl aluminum sesquichloride, ethyl aluminum sesquichloride, isopropyl aluminum sesquichloride, butyl aluminum sesquichloride, ethyl aluminum sesquibromide etc.; alkyl aluminum dihalide such as methyl aluminum dichloride, ethyl aluminum dichloride, isopropyl aluminum dichloride, ethyl aluminum dibromide etc.; and alkyl aluminum hydride such as diethyl aluminum hydride, diisobutyl aluminum hydride etc., among which trimethyl aluminum, triethyl aluminum, triisobutyl aluminum, trihexyl aluminum, trioctyl aluminum, diethyl aluminum chloride, ethyl aluminum sesquichloride, ethyl aluminum dichloride and diisobutyl aluminum hydride are preferable.

The contact method for the second contact is not particularly limited, but usually the second contact is carried out by a method of adding the organoaluminum compound represented by the general formula (Z) to the first contact product under stirring. In this step, the first contact product may have been diluted with a solvent, and as the solvent, a hydrocarbon not having active hydrogen can be used without particular limitation, but usually the second contact can be carried out efficiently by using, as the solvent in the second contact, the solvent used in the first contact without distilling it away. The organoaluminum compound added to the first contact product may be used after dilution with a solvent, or may be added without dilution with a solvent, but usually the organoaluminum compound is used in a form diluted with an aliphatic saturated hydrocarbon such as n-decane and n-hexane or an aromatic hydrocarbon solvent such as toluene and xylene. When the organoaluminum compound is added, the compound is added to the first contact product usually over 5 minutes to 5 hours. When cooling performance in the catalytic system is sufficient, it can be added for a short time, and when the performance is insufficient, it is added preferably for a long time. The organoaluminum compound may be added all at once or several times in divided portions. When added in divided portions, the organoaluminum compounds in divided portions may be the same or different, and the temperature of the first contact product upon divided addition may be the same or different.

The organoaluminum compound represented by the general formula (Z) is used such that the molar ratio of the organoaluminum compound in the second contact to the magnesium atom in the first contact product is usually 0.1 to 50, preferably 0.5 to 30, more preferably 1.0 to 20, still more preferably 1.5 to 15, further still more preferably 2.0 to 10.

In the method of preparing the carrier by the second contact, a particularly preferable mode of the second contact is described below.

In contacting the first contact product with the organoaluminum compound represented by the general formula (Z) above, it is preferable that, for example, a hydrocarbon dilution of the magnesium compound is contacted with a hydrocarbon dilution of the organoaluminum compound so that both the dilutions are reacted. Usually, the molar ratio of the organoaluminum compound to the magnesium compound is varied depending on its type and contact conditions, but is preferably 2 to 10. The shape and size of the solid product is varied depending on its forming conditions. To obtain a solid product having a regulated shape and particle diameter, it is preferably to avoid rapid formation, and for example, when the magnesium compound and the organoaluminum compound, both in a liquid form, are contacted and mixed with each other to form a solid product by mutual reaction, it is preferable that the two are contacted and mixed at a low temperature so as to prevent rapid formation of solids, followed by increasing the temperature to form a solid product gradually. According to this method, it is easy to regulate the particle diameter of the solid product, and a granular or spherical solid product having a narrow particle size distribution can be easily obtained.

A polymer obtained by slurry polymerization or gaseous phase polymerization using the thus obtained granular or spherical carrier component excellent in particle size distribution is granular or spherical, has narrow particle-size distribution and high bulk density, and is excellent in flowability.

The carrier component described above is not only useful as a constitutional component of the olefin polymerization catalyst described later but is also utilizable as a catalyst for many organic synthesis reactions by virtue of the functions of Lewis acid contained in the carrier component.

Olefin Polymerization Catalyst Containing the Carrier Component

The olefin polymerization catalyst of the present invention contains the carrier component described above. The polymerization catalyst includes an olefin polymerization catalyst comprising:

(A) a transition metal compound in the groups 3 to 11, having a ligand containing two or more atoms selected from a boron atom, a nitrogen atom, an oxygen atom, a phosphorus atom and a sulfur atom, (B) the carrier component described above, and if necessary (C) a specific organometallic compound.

The transition metal compound (A) in the groups 3 to 11, having a ligand containing two or more atoms selected from a boron atom, a nitrogen atom, an oxygen atom, a phosphorus atom and a sulfur atom may be carried (and is carried more preferably from the viewpoint of the powdery properties of a formed olefin polymer) on the carrier component (B).

The transition metal compound (A) in the groups 3 to 11, having a ligand containing two or more atoms selected from a boron atom, a nitrogen atom, an oxygen atom, a phosphorus atom and a sulfur atom, used in the present invention, includes for example compounds (a-1) to (a-27) described below. These transition metal compounds may be used alone or as a mixture of two or more thereof.

Compound (a-1)

As the component (A) in the present invention, compound (a-1) represented by the following general formulae (I) to (III) can be used.

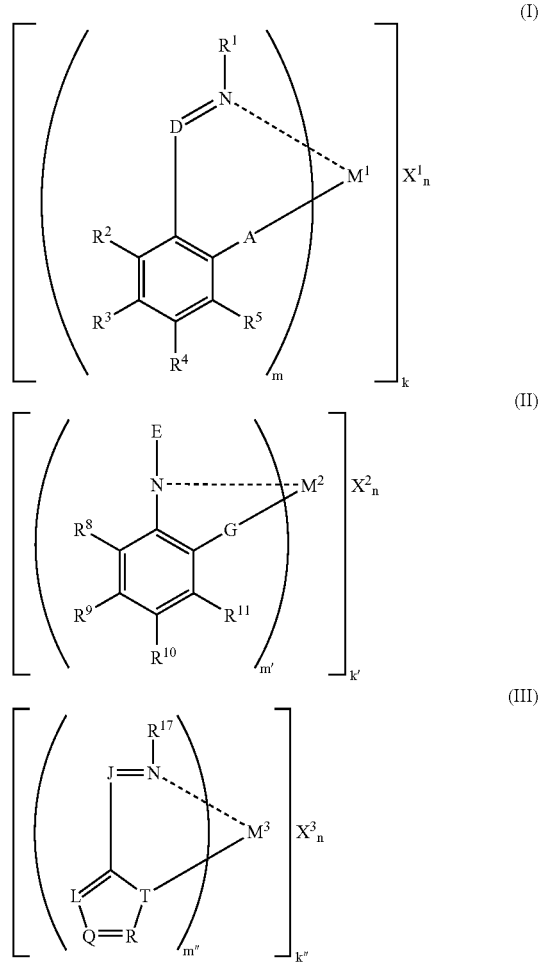

wherein $N\ldots M^1$, $N\ldots M^2$ and $N\ldots M^3$ generally show that the two elements are coordinated, but in the present invention, they may or may not be coordinated.

$M^1$ in formula (I), $M^2$ in formula (II) and $M^3$ in formula (II) may be the same or different and each represent a transition metal atom selected from the groups 3 to 11 in the periodic table (the group 3 also containing lanthanoids), preferably a transition metal atom in the groups 3 to 6 and 8 to 10, more preferably a transition metal atom in the group 4, 5 or 6, still more preferably a metal atom in the group 4 or 5. Examples thereof include scandium, titanium, zirconium, hafnium, vanadium, niobium, tantalum, cobalt, rhodium, yttrium, chromium, molybdenum, tungsten, manganese, rhenium, iron, ruthenium, nickel, palladium etc., preferably scandium, titanium, zirconium, hafnium, vanadium, niobium, tantalum, iron, cobalt, rhodium, nickel, palladium etc., more preferably titanium, zirconium, hafnium, vanadium, niobium, tantalum, chromium, molybdenum etc., still more preferably titanium, zirconium, hafnium, vanadium, niobium, tantalum etc.

m in formula (I), m' in formula (II) and m'' in formula (III) may be the same or different and each represent an integer of 1 to 6, preferably an integer of 1 to 4, more preferably an integer of 1 to 3, still more preferably an integer of 1 to 2.

k in formula (I), k' in formula (II) and k'' in formula (III) may be the same or different and each represent an integer of 1 to 6, preferably an integer of 1 to 4, more preferably an integer of 1 to 3, still more preferably an integer of 1 to 2.

In formula (I), A represents an oxygen atom, a sulfur atom or a substituent $—R^6$-containing nitrogen atom ($—N(R^6)—$), preferably an oxygen atom or a nitrogen atom.

In formula (I), D represents a nitrogen atom, a phosphorus atom or a substituent $—R^7$-containing carbon atom, preferably substituent $—R^7$-containing carbon atom.

In formula (I), $R^1$ to $R^7$ may be the same or different and each represent a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group or a tin-containing group, and two or more of these groups may be bound to one another to form a ring.

In formula (II), G represents an oxygen atom, a sulfur atom or a substituent $—R^{12}$-containing nitrogen atom ($—N(R^{12})—$), preferably an oxygen atom.

In formula (II), E represents N-binding $—R^{13}$ and $—R^{14}$, or $=C(R^{15})R^{16}$.

In formula (II), $R^8$ to $R^{16}$ may be the same or different and each represent a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group or a tin-containing group, and two or more of these groups may be bound to one another to form a ring.

In formula (III), J represents a nitrogen atom, a phosphorus atom or a substituent $—R^{18}$-containing carbon atom ($—C(R^{18})=$), preferably a substituent $—R^{18}$-containing carbon atom.

In formula (III), T represents a nitrogen atom or a phosphorus atom, preferably a nitrogen atom.

In formula (III), L represents a nitrogen atom, a phosphorus atom or a substituent $—R^{19}$-containing carbon atom ($—C(R^{19})=$), preferably a substituent $—R^{19}$-containing carbon atom.

In formula (III), Q represents a nitrogen atom, a phosphorus atom or a substituent $—R^{20}$-containing carbon atom ($—C(R^{20})=$) preferably a substituent $—R^{20}$-containing carbon atom.

In formula (III), R represents a nitrogen atom, a phosphorus atom or a substituent $—R^{21}$-containing carbon atom ($—C(R^{21})=$), preferably a substituent $—R^{21}$-containing carbon atom.

In formula (III), $R^{17}$ to $R^{21}$ may be the same or different and each represent a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group or a tin-containing group, and two or more of these groups may be bound to one another to form a ring.

When m in formula (I) is 2 or more, $R^1$s, $R^2$, $R^3$s, $R^4$s, $R^5$s, $R^6$s or $R^7$s may be the same or different. When m is 2 or more, two groups out of the groups represented by $R^1$ to $R^7$ may be bound to each other.

When m' in formula (II) is 2 or more, $R^8$s, $R^9$s, $R^{10}$s, $R^{11}$s, $R^{12}$s, $R^{13}$s, $R^{14}$s, $R^{15}$s or $R^{16}$s may be the same or different. When p is 2 or more, two groups out of the groups represented by $R^8$ to $R^{16}$ may be bound to each other.

When m" in formula (III) is 2 or more, $R^{17}$s, $R^{18}$s, $R^{19}$s, $R^{20}$s or $R^{21}$s may be the same or different. When r is 2 or more, two groups out of the groups represented by $R^{17}$ to $R^{21}$ may be bound to each other.

The halogen atom represented by $R^1$ to $R^7$ in formula (I), $R^8$ to $R^{16}$ in formula (II) and $R^{17}$ to $R^{21}$ in formula (III) includes fluorine, chlorine, bromine and iodine.

Specific examples of the hydrocarbon group represented by $R^1$ to $R^7$ in formula (I), $R^8$ to $R^{16}$ in formula (II) and $R^{17}$ to $R^{21}$ in formula (III) include a $C_{1-30}$, preferably $C_{1-20}$, linear or branched alkyl group such as methyl, ethyl, n-propyl, isopropyl, n-butyl, isobutyl, sec-butyl, tert-butyl, neopentyl, n-hexyl etc.;

a $C_{2-30}$, preferably $C_{2-20}$, linear or branched alkenyl group such as vinyl, allyl, isopropenyl etc.;

a $C_{2-30}$, preferably $C_{2-20}$, linear or branched alkynyl group such as ethynyl, propargyl etc.;

a $C_{3-30}$, preferably $C_{3-20}$, saturated cyclic hydrocarbon group such as cyclopropyl, cyclobutyl, cyclopentyl, cyclohexyl, adamanthyl etc.;

a $C_{5-30}$ unsaturated cyclic hydrocarbon group such as cyclopentadienyl, indenyl, fluorenyl etc.;

a $C_{6-30}$, preferably $C_{6-20}$, aryl group such as phenyl, benzyl, naphthyl, biphenylyl, terphenylyl, phenanthryl, anthryl etc.; and an alkyl-substituted aryl group such as methylphenyl, isopropylphenyl, t-butylphenyl, dimethylphenyl, diisopropylphenyl, di-t-butylphenyl, trimethylphenyl, triisopropylphenyl, tri-t-butylphenyl etc.

The hydrocarbon group may be the one whose hydrogen atom is replaced by a halogen, and examples thereof include a $C_{1-30}$, preferably $C_{1-20}$, halogenated hydrocarbon group such as trifluoromethyl, pentafluorophenyl, chlorophenyl etc.

The hydrocarbon group may be substituted with other hydrocarbon groups, and examples thereof include an alkyl group substituted with an aryl group such as benzyl, cumyl etc.

The hydrocarbon group may be substituted with a heterocyclic compound residue; an oxygen-containing group such as an alkoxy group, aryloxy group, ester group, ether group, acyl group, carboxyl group, carbonate group, hydroxy group, peroxy group, carboxylic anhydride group etc.; a nitrogen-containing group such as an amino group, imino group, amide group, imido group, hydrazino group, hydrazono group, nitro group, nitroso group, cyano group, isocyano group, cyanate group, amidino group, diazo group, a group whose amino group is converted into an ammonium salt, etc.; a boron-containing group such as a borane diyl group, borane triyl group, diboranyl group etc.; a sulfur-containing group such as a mercapto group, thioester group, dithioester group, alkylthio group, arylthio group, thioacyl group, thioether group, thiocyanate group, isothiocyanate group, sulfone ester group, sulfonamide group, thiocarboxyl group, dithiocarboxyl group, sulfo group, sulfonyl group, sulfinyl group, sulphenyl group etc.; a phosphorus-containing group such as a phosphide group, phosphoryl group, thiophosphoryl group, phosphate group etc.; and a silicon-containing group, a germanium-containing group or a tin-containing group.

As described above, the hydrocarbon group may be substituted with an oxygen-containing group, a nitrogen-containing group, a boron-containing group, a sulfur-containing group, a phosphorus-containing group, a silicon-containing group, a germanium-containing group, a tin-containing group etc., and in this case, it is desired that an atomic group characterizing a substituent group such as an oxygen-containing group does not bind directly to a carbon atom in N or D in formula (I), a carbon atom in E in formula (II), and a carbon atom in J, L, Q, T or R in formula (III).

Particularly preferable among these are a $C_{1-30}$, preferably $C_{1-20}$, linear or branched alkyl group such as methyl, ethyl, n-propyl, isopropyl, n-butyl, isobutyl, sec-butyl, t-butyl, neopentyl, n-hexyl etc.; a $C_{6-30}$, preferably $C_{6-20}$, aryl group such as phenyl, naphthyl, biphenylyl, terphenylyl, phenanthryl, anthryl etc.; and a substituted aryl group substituted with 1 to 5 substituent atoms or groups such as a halogen atom, a $C_{1-30}$, preferably $C_{1-20}$, alkyl group or alkoxy group, a $C_{6-30}$, preferably $C_{6-20}$, aryl group or aryloxy group.

Two or more groups of $R^1$ to $R^7$, preferably adjacent groups, may be bound to each other to form a ring; two or more groups of $R^8$ to $R^{16}$, preferably adjacent groups, may be bound to each other to form a ring; two or more groups of $R^{17}$ to $R^{21}$, preferably adjacent groups, may be bound to each other to form a ring. The ring includes, for example, condensed-ring groups such as a benzene ring, naphthalene ring, acenaphthene ring, indene ring etc., wherein a hydrogen atom on the condensed ring may be replaced by an alkyl group such as methyl, ethyl, propyl or butyl.

The oxygen-containing group represented by $R^1$ to $R^7$ in formula (I), $R^8$ to $R^{16}$ in formula (II) and $R^{17}$ to $R^{21}$ in formula (III) is a group containing 1 to 5 oxygen atoms, and does not include a heterocyclic compound residue described later. The oxygen-containing group does not include a group containing a nitrogen atom, a sulfur atom, a phosphorus atom, a halogen atom or a silicon atom having an oxygen atom bound directly thereto. Examples of the oxygen-containing group include, for example, an alkoxy group, aryloxy group, ester group, ether group, acyl group, carboxyl group, carbonate group, hydroxy group, peroxy group, carboxylic anhydride group etc., among which an alkoxy group, aryloxy group, acetoxy group, carbonyl group, hydroxy group etc. are preferable. When the oxygen-containing group contains carbon atoms, it is desired that the number of carbon atoms is in the range of 1 to 30, preferably 1 to 20.

The nitrogen-containing group represented by $R^1$ to $R^7$ in formula (I), $R^8$ to $R^{16}$ in formula (II) and $R^{17}$ to $R^{21}$ in formula (III) is a group containing 1 to 5 nitrogen atoms, and does not include a heterocyclic compound residue described later. Examples of the nitrogen-containing group include, for example, an amino group, imino group, amide group, imido group, hydrazino group, hydrazono group, nitro group, nitroso group, cyano group, isocyano group, cyanate group, amidino group, diazo group, a group whose amino group is converted into an ammonium salt, etc., preferably an amino group, imino group, amide group, imido group, nitro group, cyano group etc. When the nitrogen-containing group contains carbon atoms, it is desired that the number of carbon atoms is 1 to 30, preferably 1 to 20.

The boron-containing group represented by $R^1$ to $R^7$ in formula (I), $R^8$ to $R^{16}$ in formula (II) and $R^{17}$ to $R^{21}$ in formula (III) is a group containing 1 to 5 boron atoms, and does not include a heterocyclic compound residue described later. Examples of the boron-containing group include, for example, boron-containing groups such as a borane diyl group, borane triyl group, diboranyl group etc., preferably a boryl group substituted with one or two of $C_{1-30}$, preferably $C_{1-20}$, hydrocarbon groups or a borate group substituted with one to three of the hydrocarbon groups. When the group is substituted with two or more hydrocarbon groups, the hydrocarbon groups may be the same or different.

The sulfur-containing group represented by $R^1$ to $R^7$ in formula (I), $R^8$ to $R^{16}$ in formula (II) and $R^{17}$ to $R^{21}$ in formula (III) is a group containing 1 to 5 sulfur atoms, and does not include a heterocyclic compound residue described later. Examples of the sulfur-containing group include, for example, a mercapto group, thioester group, dithioester group, alkylthio group, arylthio group, thioacyl group, thioether group, thiocyanate group, isothiocyanate group, sulfone ester group, sulfonamide group, thiocarboxyl group, dithiocarboxyl group, sulfo group, sulfonyl group, sulfinyl group, sulphenyl group, sulfonate group and sulfinate group, among which a sulfonate group, sulfinate group, alkylthio group and arylthio group are preferable. When the sulfur-containing group contains carbon groups, it is desired that the number of carbon atoms is in the range of 1 to 30, preferably 1 to 20.

The phosphorus-containing group represented by $R^1$ to $R^7$ in formula (I), $R^8$ to $R^{16}$ in formula (II) and $R^{17}$ to $R^{21}$ in formula (III) is a group containing 1 to 5 phosphorus atoms, and does not include a heterocyclic compound residue described later. Examples of the phosphorus-containing group include, for example, a phosphino group, phosphoryl group, phosphothioyl group, phosphono group etc.

The heterocyclic compound residue represented by $R^1$ to $R^7$ in formula (I), $R^8$ to $R^{16}$ in formula (II) and $R^{17}$ to $R^{21}$ in formula (III) is a cyclic group containing 1 to 5 heteroatoms, and the heteroatom includes O, N, S, P and B. The cycle includes, for example, a 4- to 7-membered monocycle and multi-cycle, preferably a 5- to 6-membered monocycle and multi-cycle. Specifically, mention is made of for example a nitrogen-containing compound residue such as pyrrole, pyridine, pyrimidine, quinoline, triazine etc.; an oxygen-containing compound residue such as furan, pyran etc.; and a sulfur-containing compound residue such as thiophene etc., and these groups may be further substituted with a substituent group such as a $C_{1-30}$, preferably $C_{1-20}$, alkyl group or a $C_{1-30}$, preferably $C_{1-20}$, alkoxy group.

The silicon-containing group represented by $R^1$ to $R^7$ in formula (I), $R^8$ to $R^{16}$ in formula (II) and $R^{17}$ to $R^{21}$ in formula (III) is a group containing 1 to 5 silicon atoms, and examples thereof include a silyl group such as a hydrocarbon-substituted silyl group and a siloxy group such as a hydrocarbon-substituted siloxy group. Specific examples include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl, dimethyl(pentafluorophenyl)silyl etc. Among these, methylsilyl, dimethylsilyl, trimethylsilyl, ethylsilyl, diethylsilyl, triethylsilyl, dimethylphenylsilyl, triphenylsilyl etc. are preferable, and trimethylsilyl, triethylsilyl, triphenylsilyl, dimethylphenylsilyl etc. are particularly preferable. The hydrocarbon-substituted siloxy group is specifically trimethylsiloxy etc. When the silicon-containing group contains carbon atoms, it is desired that the number of carbon atoms is in the range of 1 to 30, preferably 1 to 20.

The germanium-containing group and tin-containing group represented by $R^1$ to $R^7$ in formula (I), $R^8$ to $R^{16}$ in formula (II) and $R^{17}$ to $R^{21}$ in formula (III) include groups wherein in the silicon-containing group, silicon is replaced by germanium or tin.

Examples of $R^1$ to $R^7$ in formula (I), $R^8$ to $R^{16}$ in formula (II) and $R^{17}$ to $R^{21}$ in formula (III) described above are described in more detail.

Preferable examples of the oxygen-containing group include an alkoxy group such as methoxy, ethoxy, n-propoxy, isopropoxy, n-butoxy, isobutoxy, tert-butoxy etc., an aryloxy group such as phenoxy, 2,6-dimethylphenoxy, 2,4,6-trimethylphenoxy etc., an acyl group such as formyl, acetyl, benzoyl, p-chlorobenzoyl, p-methoxybenzoyl etc., and an ester group such as acetyloxy, benzoyloxy, methoxycarbonyl, phenoxycarbonyl, p-chlorophenoxycarbonyl etc.

Preferable examples of the nitrogen-containing group include an alkylamino group such as methylamino, dimethylamino, diethylamino, dipropylamino, dibutylamino, dicyclohexylamino etc., an arylamino group or alkylarylamino group such as phenylamino, diphenylamino, ditolylamino, dinaphthylamino, methylphenylamino etc., an imino group such as methylimino, ethylimino, propylimino, butylimino, phenylimino etc., an amide group such as acetamide, N-methylacetamide, N-methylbenzamide etc., and an imido group such as acetimido, benzimido etc.

Preferable examples of the sulfur-containing group include an alkylthio group such as methylthio, ethylthio etc., an arylthio group such as phenylthio, methylphenylthio, naphthylthio etc., a thioester group such as acetylthio, benzoylthio, methylthiocarbonyl, phenylthiocarbonyl etc., a sulfone ester group such as methyl sulfonate, ethyl sulfonate, phenyl sulfonate etc., and a sulfonamide group such as phenylsulfonamide, N-methylsulfonamide, N-methyl-p-toluenesulfonamide etc.

The sulfonate group includes methyl sulfonate, trifluoromethane sulfonate, phenyl sulfonate, benzyl sulfonate, p-toluene sulfonate, trimethyl benzene sulfonate, triisobutyl benzene sulfonate, p-chlorobenzene sulfonate, pentafluorobenzene sulfonate etc., and the sulfinate group includes methyl sulfinate, phenyl sulfinate, benzyl sulfinate, p-toluene sulfinate, trimethyl benzene sulfinate, pentafluorobenzene sulfinate etc.

The phosphorus-containing group includes a phosphino group such as dimethyl phosphino, diphenyl phosphino etc., a phosphoryl group such as methyl phosphoryl, isopropylphosphoryl, phenylphosphoryl etc., a phosphothioyl group such as methylphosphothioyl, isopropylphosphothioyl, phenylphosphothioyl etc., a phosphono group for example a phosphate group and a phosphoric acid group such as dimethyl phosphate, diisopropyl phosphate, diphenyl phosphate etc.

In formula (I), n is a number satisfying the valence of $M^1$, and is specifically an integer of 0 to 5, preferably 0 to 4, more preferably 0 to 3.

In formula (II), q is a number satisfying the valence of $M^2$, and is specifically an integer of 0 to 5, preferably 0 to 4, more preferably 0 to 3.

In formula (III), r is a number satisfying the valence of $M^3$, and is specifically an integer of 0 to 5, preferably 0 to 4, more preferably 0 to 3.

When $X^1$ in formula (I) is an atom or a group other than oxygen atom, n is preferably an integer of 1 to 4, more preferably 1 to 3.

When $X^2$ in formula (II) is an atom or a group other than oxygen atom, q is preferably an integer of 1 to 4, more preferably 1 to 3.

When $X^3$ in formula (III) is an atom or a group other than oxygen atom, r is preferably an integer of 1 to 4, more preferably 1 to 3.

In formula (I), $X^1$ represents an atom or a group selected arbitrarily from a hydrogen atom, a halogen atom, an oxygen atom, a hydrocarbon group, an oxygen-containing group, a nitrogen-containing group, a boron-containing group, a sulfur-containing group, a phosphorus-containing group, a halogen-containing group, a heterocyclic compound residue, a silicon-containing group, an aluminum-containing group, a germanium-containing group and a tin-containing group.

In formula (II), $X^2$ represents an atom or a group selected arbitrarily from a hydrogen atom, a halogen atom, an oxygen atom, a hydrocarbon group, an oxygen-containing group, a nitrogen-containing group, a boron-containing group, a sulfur-containing group, a phosphorus-containing group, a halogen-containing group, a heterocyclic compound residue, a silicon-containing group, an aluminum-containing group, a germanium-containing group and a tin-containing group.

In formula (III), $X^3$ represents an atom or a group selected arbitrarily from a hydrogen atom, a halogen atom, an oxygen atom, a hydrocarbon group, an oxygen-containing group, a nitrogen-containing group, a boron-containing group, a sulfur-containing group, a phosphorus-containing group, a halogen-containing group, a heterocyclic compound residue, a silicon-containing group, an aluminum-containing group, a germanium-containing group and a tin-containing group.

When n in formula (I) is 2 or more, a plurality of groups represented by $X^1$ may be the same or different; when n in formula (II) is 2 or more, a plurality of groups represented by $X^2$ may be the same or different; and when n in formula (III) is 2 or more, a plurality of groups represented by $X^3$ may be the same or different.

When n in formula (I) is 2 or more, a plurality of groups represented by $X^1$ may be bound to one another to form a ring; when n in formula (II) is 2 or more, a plurality of groups represented by $X^2$ may be bound to one another to form a ring; and when n in formula (III) is 2 or more, a plurality of groups represented by $X^3$ may be bound to one another to form a ring.

The halogen atom represented by $X^1$ in formula (I), $X^2$ in formula (II) and $X^3$ in formula (III) includes fluorine, chlorine, bromine and iodine.

The hydrocarbon group represented by $X^1$ in formula (I), $X^2$ in formula (II) and $X^3$ in formula (III) includes the same groups as illustrated for $R^1$ to $R^7$ in formula (I). Examples thereof include an alkyl group such as methyl, ethyl, propyl, butyl, hexyl, octyl, nonyl, dodecyl, eicosyl etc.; a $C_{3-30}$ cycloalkyl group such as cyclopentyl, cyclohexyl, norbornyl, adamantyl etc.; an alkenyl group such as vinyl, propenyl, cyclohexenyl etc.; an arylalkyl group such as benzyl, phenylethyl, phenylpropyl etc.; and an aryl group such as phenyl, tolyl, dimethylphenyl, trimethylphenyl, ethylphenyl, propylphenyl, biphenylyl, naphthyl, methylnaphthyl, anthryl, phenanthryl etc. The hydrocarbon group includes a halogenated hydrocarbon, specifically a $C_{1-20}$ hydrocarbon group wherein at least one hydrogen atom is replaced by a halogen. Among these, the $C_{1-20}$ hydrocarbon group is preferable.

The oxygen-containing group represented by $X^1$ in formula (I), $X^2$ in formula (II) and $X^3$ in formula (III) includes the same groups as illustrated for $R^1$ to $R^{21}$ described above, and examples thereof include a hydroxy group; an alkoxy group such as methoxy, ethoxy, propoxy, butoxy etc.; an aryloxy group such as phenoxy, methylphenoxy, dimethylphenoxy, naphthoxy etc.; an arylalkoxy group such as phenylmethoxy, phenylethoxy etc.; an acetoxy group; a carbonyl group etc.

The nitrogen-containing group represented by $X^1$ in formula (I), $X^2$ in formula (II) and $X^3$ in formula (III) includes the same groups as illustrated for $R^1$ to $R^{21}$ described above, and examples thereof include an amino group; an alkylamino group such as methylamino, dimethylamino, diethylamino, dipropylamino, dibutylamino, dicyclohexylamino etc; and an arylamino group or an alkylarylamino group such as phenylamino, diphenylamino, ditolylamino, dinaphthylamino, methylphenylamino etc.

Specifically, the boron-containing group represented by $X^1$ in formula (I), $X^2$ in formula (II) and $X^3$ in formula (III) includes $BR_4$ wherein R is hydrogen, an alkyl group, an optionally substituted aryl group, a halogen atom etc.

The sulfur-containing group represented by $X^1$ in formula (I), $X^2$ in formula (II) and $X^3$ in formula (III) includes the same groups as illustrated for $R^1$ to $R^{21}$ described above, and examples thereof include a sulfonate group such as methyl sulfonate, trifluoromethane sulfonate, phenyl sulfonate, benzyl sulfonate, p-toluene sulfonate, trimethylbenzene sulfonate, triisobutylbenzene sulfonate, p-chlorobenzene sulfonate, pentafluorobenzene sulfonate etc.; a sulfinate group such as methyl sulfinate, phenyl sulfinate, benzyl sulfinate, p-toluene sulfinate, trimethylbenzene sulfinate, pentafluorobenzene sulfinate etc.; an alkylthio group; and an arylthio group.

The phosphorus-containing group represented by $X^1$ in formula (I), $X^2$ in formula (II) and $X^3$ in formula (III) includes, for example, a trialkylphosphine group such as trimethylphosphine, tributylphosphine, tricyclohexylphosphine etc.; a triarylphosphine group such as triphenylphosphine, tritolylphosphine etc.; a phosphite group (phosphide group) such as methylphosphite, ethylphosphite, phenylphosphite etc.; a phosphonic acid group; and a phosphinic acid group.

Specifically, the halogen-containing group represented by $X^1$ in formula (I), $X^2$ in formula (II) and $X^3$ in formula (III) includes a fluorine-containing group such as $PF_6$, $BF_4$ etc., a chlorine-containing group such as $ClO_4$, $SbCl_6$ etc., and an iodine-containing group such as $IO_4$ etc.

The heterocyclic compound residue represented by $X^1$ in formula (I), $X^2$ in formula (II) and $X^3$ in formula (III) includes the same groups as illustrated for $R^1$ to $R^{21}$ described above.

Specifically, the silicon-containing group represented by $X^1$ in formula (I), $X^2$ in formula (II) and $X^3$ in formula (III) includes the same groups as illustrated for $R^1$ to $R^{21}$ described above, and examples thereof include a hydrocarbon-substituted silyl group such as phenylsilyl, diphenylsilyl, trimethylsilyl, triethylsilyl, tripropylsilyl, tricyclohexylsilyl, triphenylsilyl, methyldiphenylsilyl, tritolylsilyl, trinaphthylsilyl etc.; a hydrocarbon-substituted silylether group such as trimethylsilylether; a silicon-substituted alkyl group such as trimethylsilylmethyl etc.; and a silicon-substituted aryl group such as trimethylsilylphenyl etc.

Specifically, the aluminum-containing group represented by $X^1$ in formula (I), $X^2$ in formula (II) and $X^3$ in formula (III) includes $AlR_4$ wherein R represents hydrogen, an alkyl group, an optionally substituted aryl group, a halogen atom etc.

Specifically, the germanium-containing group represented by $X^1$ in formula (I), $X^2$ in formula (II) and $X^3$ in formula (III) includes the same groups as illustrated for $R^1$ to $R^{21}$ described above.

Specifically, the tin-containing group represented by $X^1$ in formula (I), $X^2$ in formula (II) and $X^3$ in formula (III) includes the same groups as illustrated for $R^1$ to $R^{21}$ described above.

Specific examples of the transition metal compound represented by the general formula (I), (II) or (III) above are described below.

In the following examples, M is a transition metal atom, and preferable examples are Sc(III), Ti(III), Ti(IV), Zr(III), Zr(IV), Hf(IV), V(III), V(IV), V(V), Nb(V), Ta(V), Fe(II), Fe(III), Co(II), Co(III), Rh(II), Rh(III), Rh(IV), Cr(III), Ni(II) and Pd(II). Among these metal atoms, Ti(IV), Zr(IV), Hf(IV), V(III), V(IV), V(V), Nb(V) and Ta(V) are preferable, and particularly Ti(IV), Zr(IV) and Hf(IV) are preferable.

In the following examples, X represents for example a halogen such as Cl, Br etc., an oxygen atom or an alkyl group such as methyl etc. When there are a plurality of Xs, the Xs may be the same or different.

n is determined by the valence of the metal M. For example, when two monoanion species bind to the metal, n is 0 for divalent metal, n is 1 for trivalent metal, n is 2 for tetravalent metal, and n is 3 for pentavalent metal; for example, n is 1 for a metal V(III), n is 2 for Ti(IV), Zr(IV) or V(IV) and n is 3 for V(V); for example, when one kind of monoanion species binds to the metal and simultaneously one oxygen atom bind via a double bond to the metal, n is 0 for trivalent metal, n is 1 for tetravalent metal, and n is 2 for pentavalent metal; for example, n is 0 for a metal V(III), n is 1 for Ti(IV), Zr(IV) or V(IV), and n is 2 for V(V); for example, when two monoanion species bind to the metal and simultaneously one oxygen atom binds via a double bond to the metal, n is 0 for tetravalent metal and n is 1 for pentavalent metal; for example, n is O for a metal Ti(IV), Zr(IV) or V(IV) and n is 1 for V(V); for example, when one kind of monoanion species binds to the metal and simultaneously one atom binds via a single bond to the metal, n is 0 for divalent metal, n is 1 for trivalent metal, n is 2 for tetravalent metal and n is 3 for pentavalent metal; for example, n is 1 for a metal V(III), n is 2 for Ti(IV), Zr(IV) or V(IV), and n is 3 for V(V).

Specific examples of the transition metal compound represented by the general formula (I), (II) or (III) are shown below.

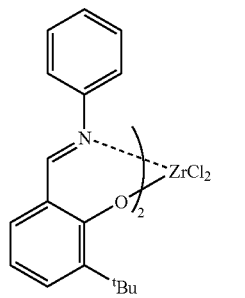
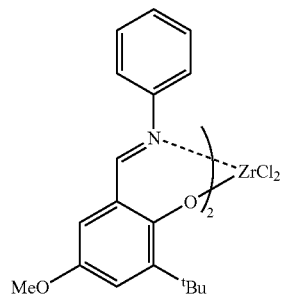
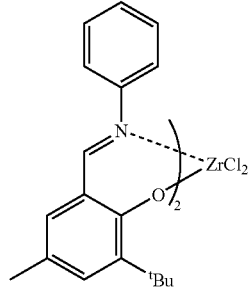
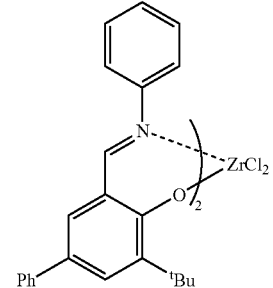
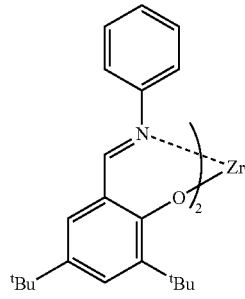
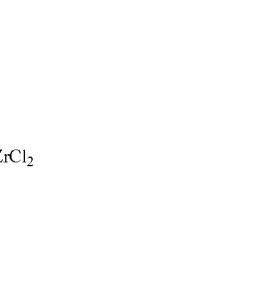

-continued

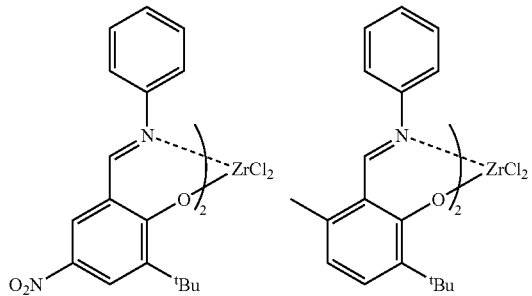
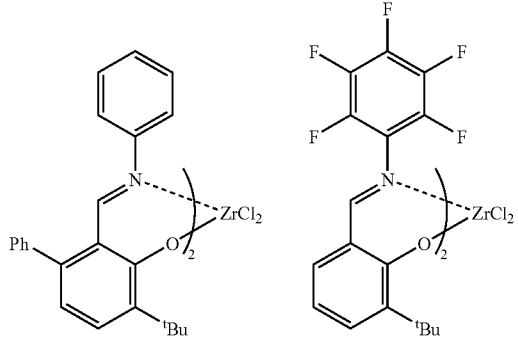
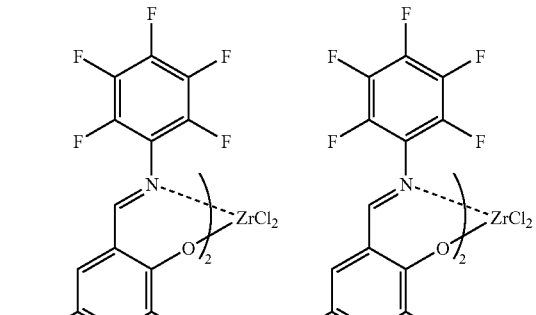
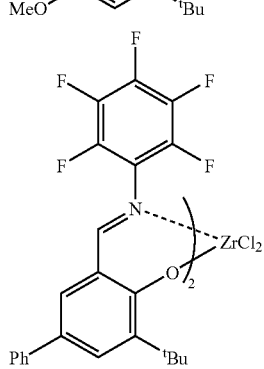
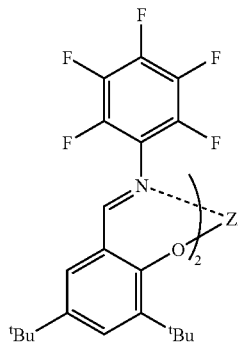

-continued
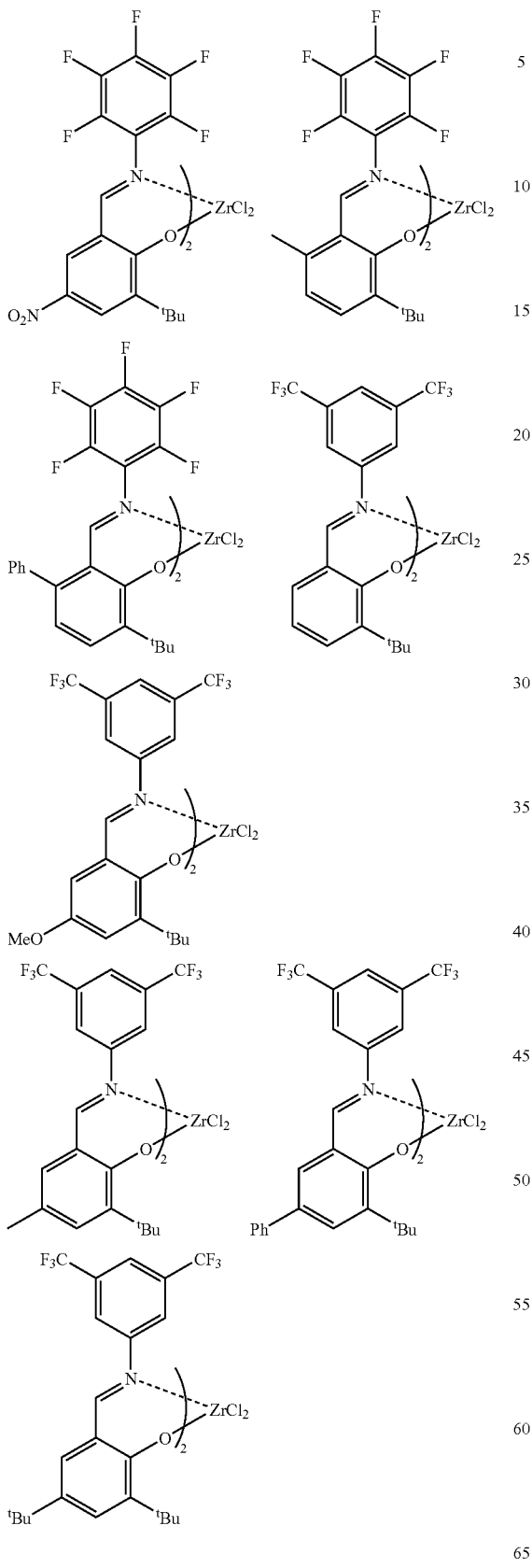
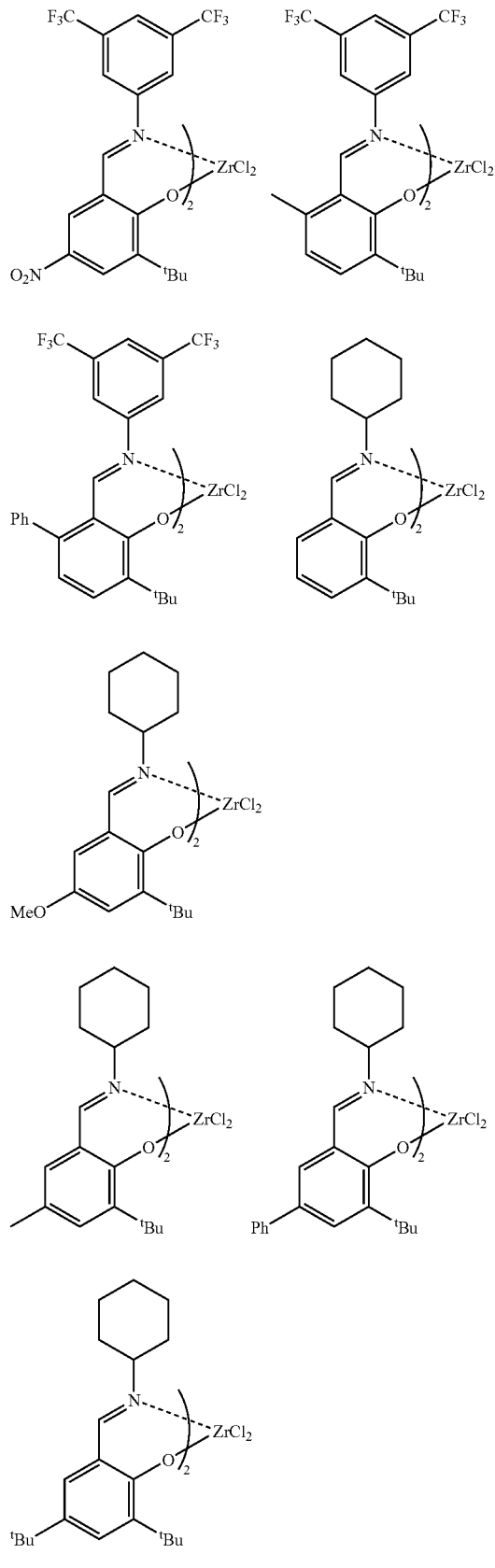

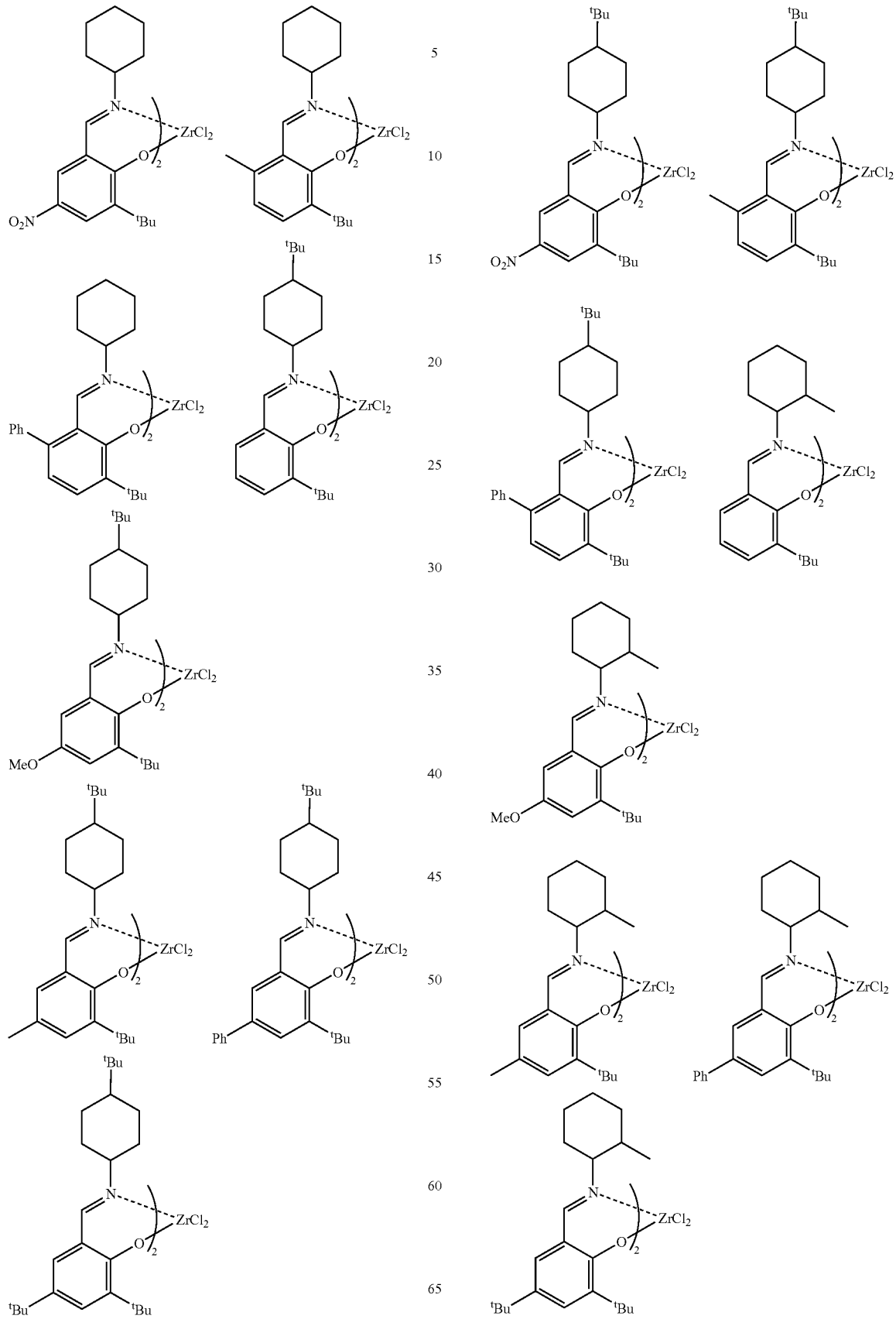

-continued
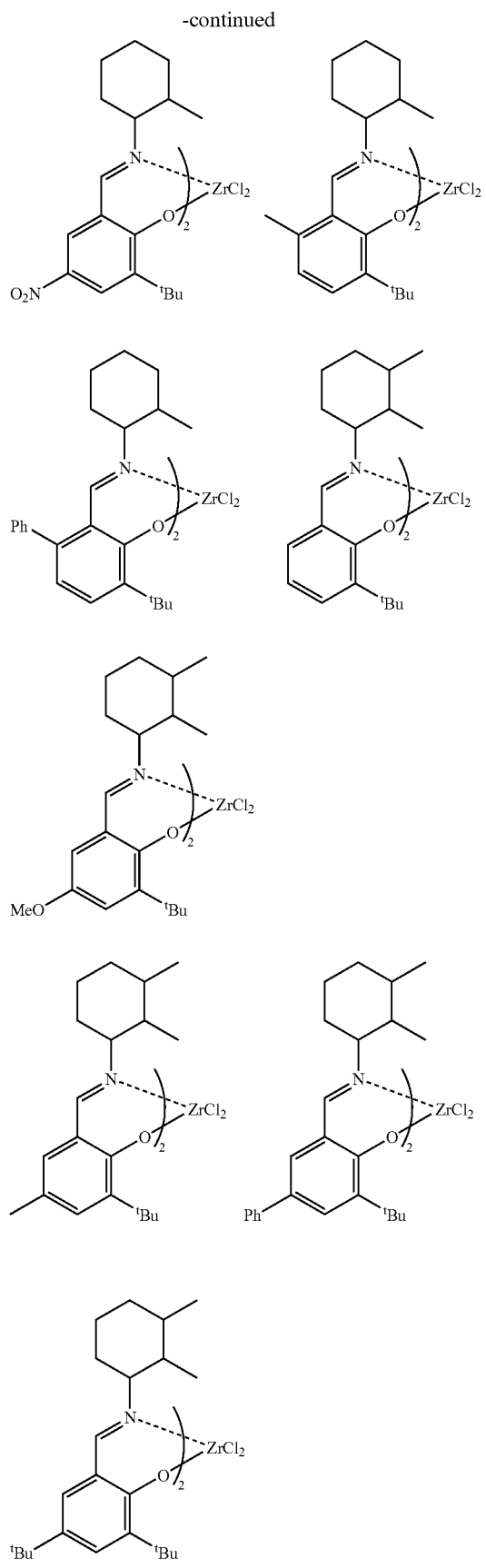
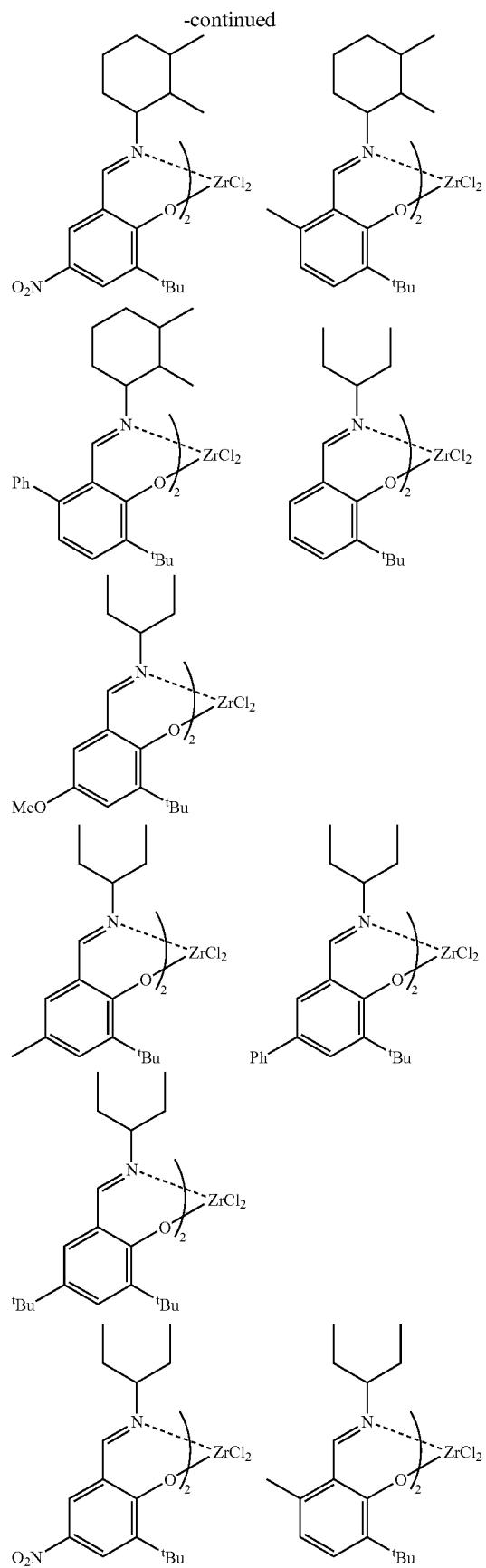

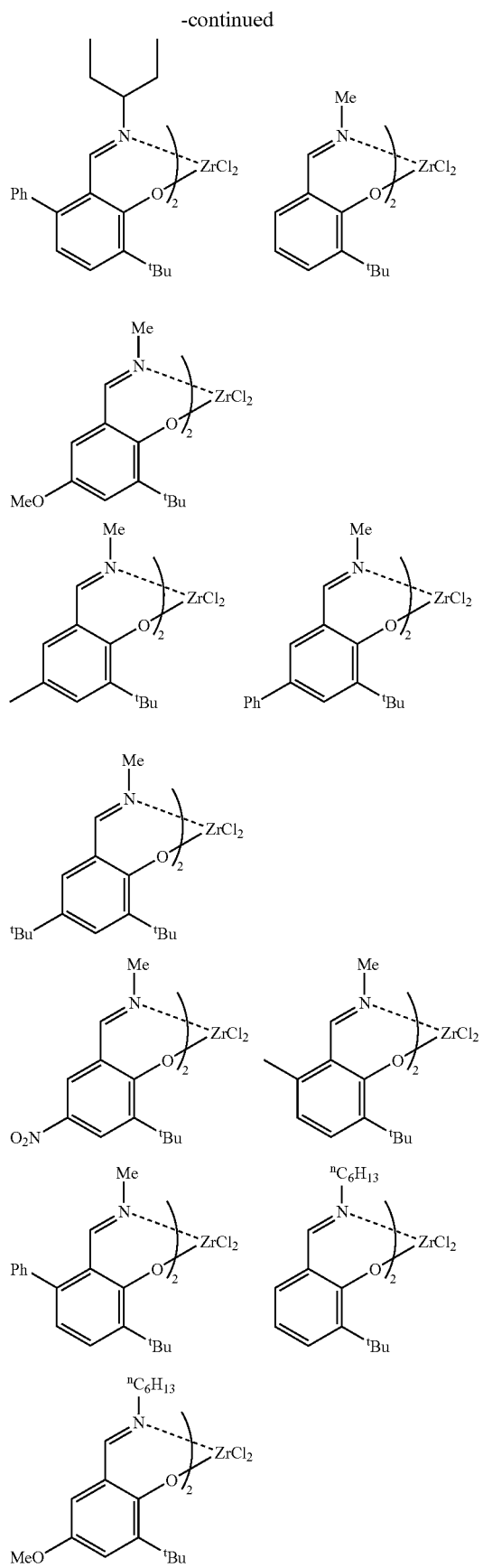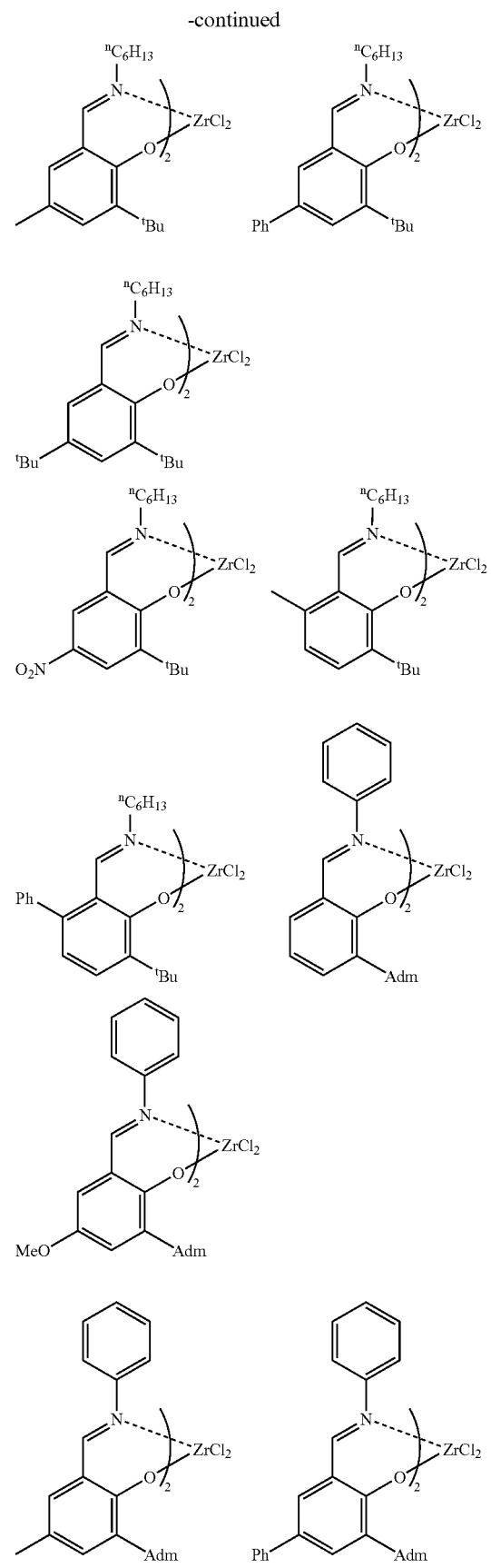

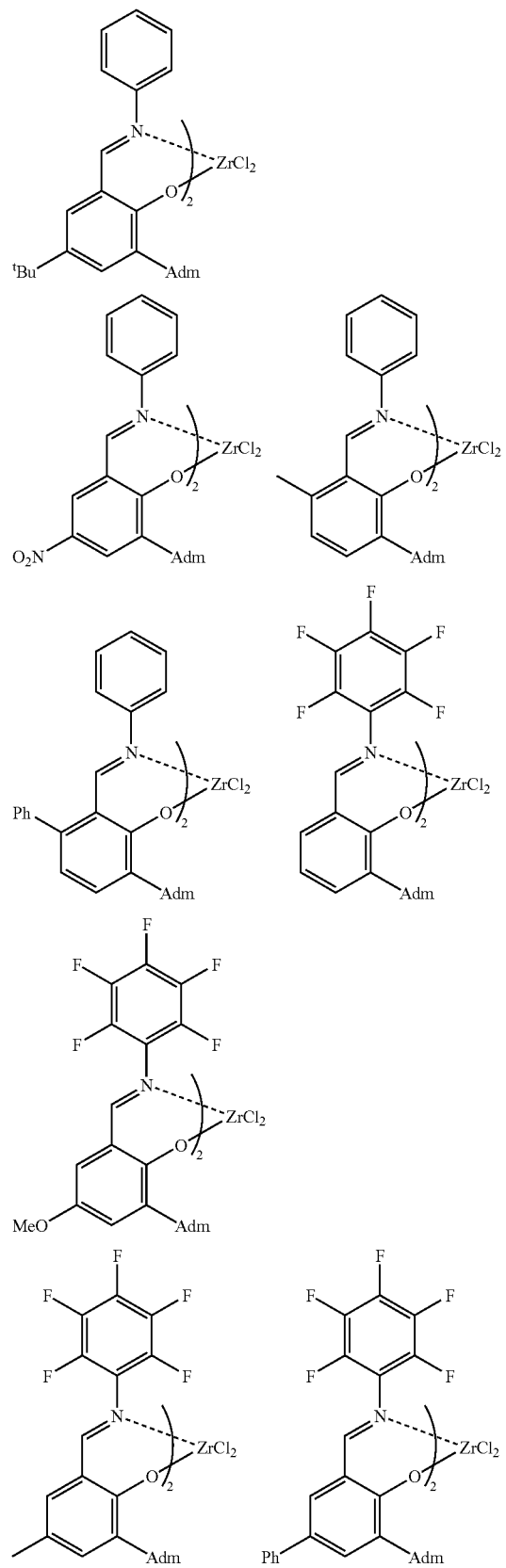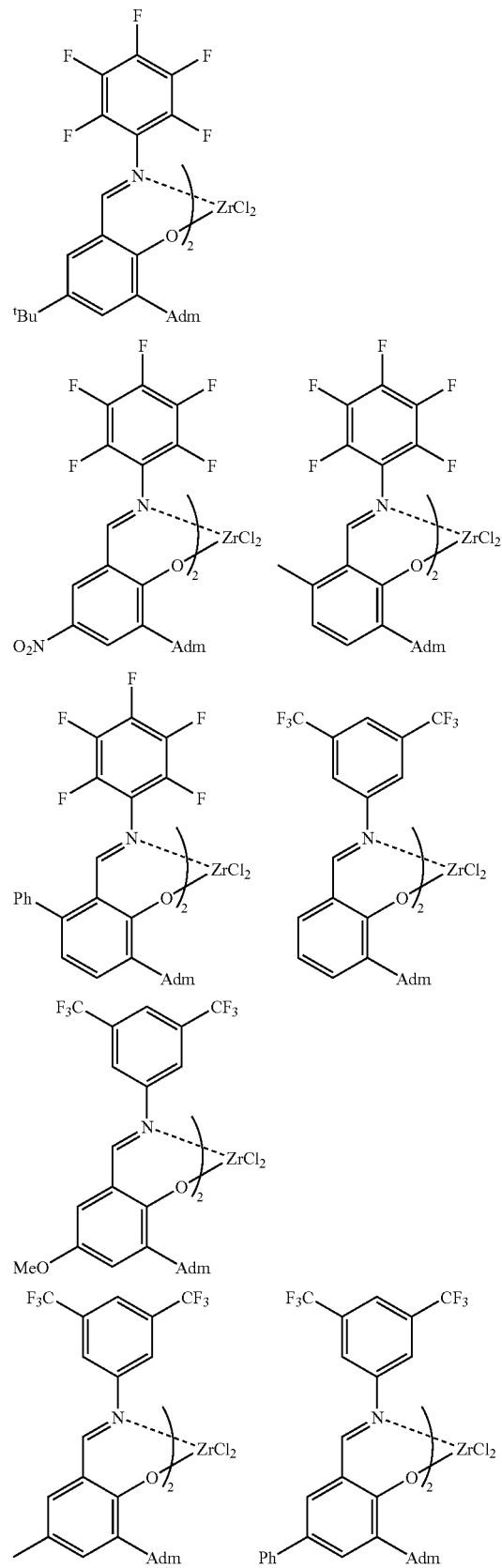

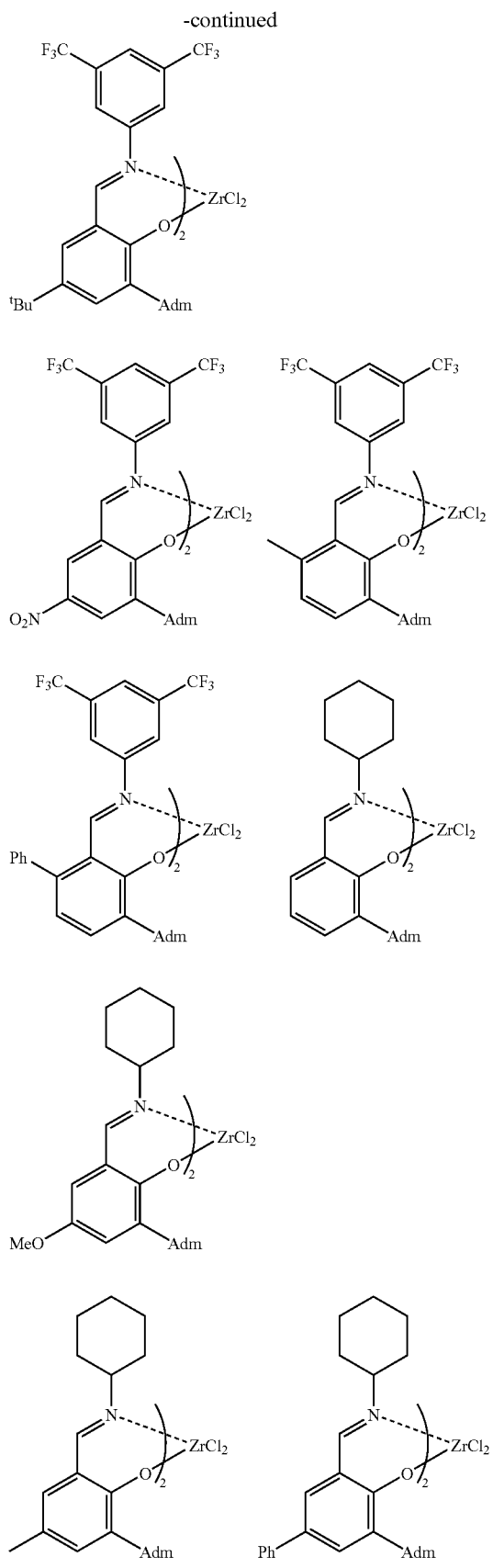
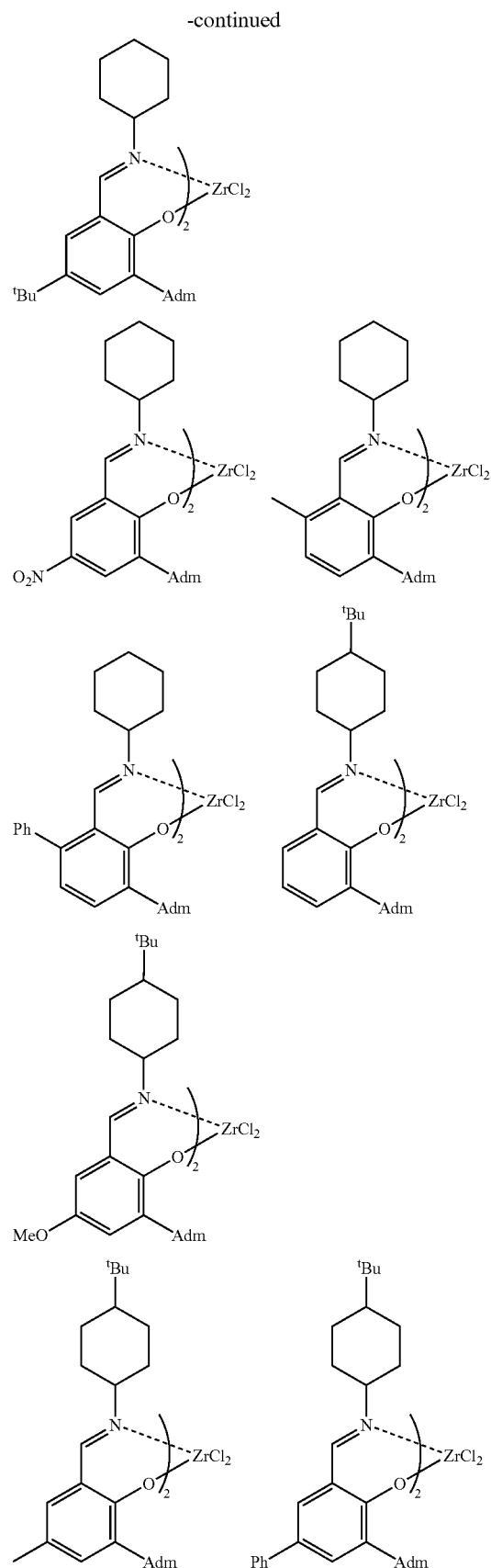

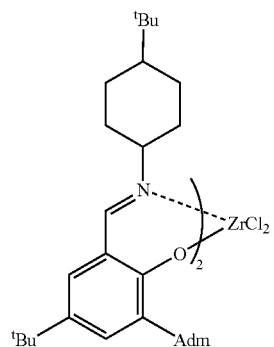
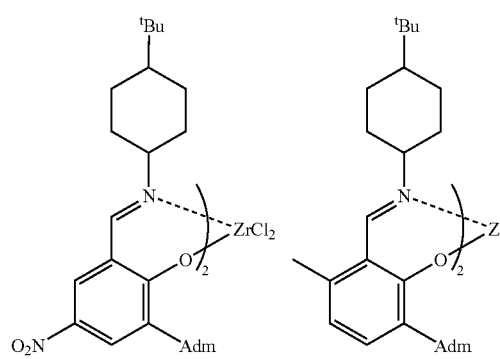
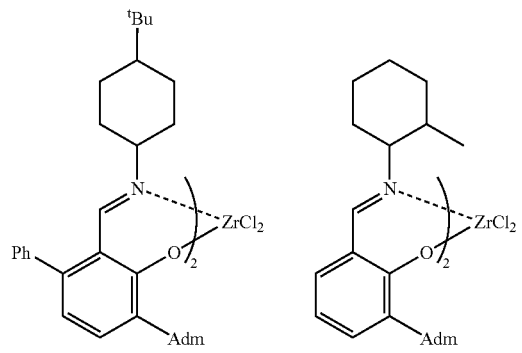
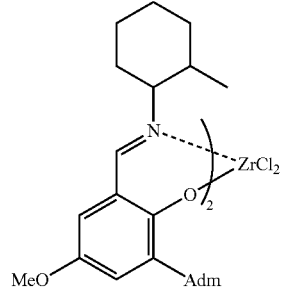
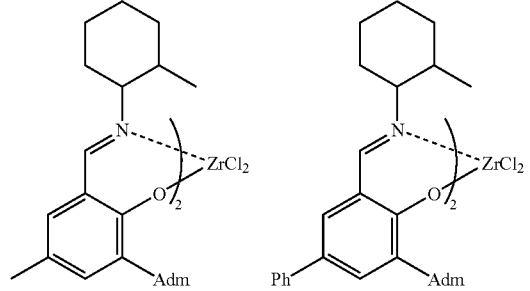
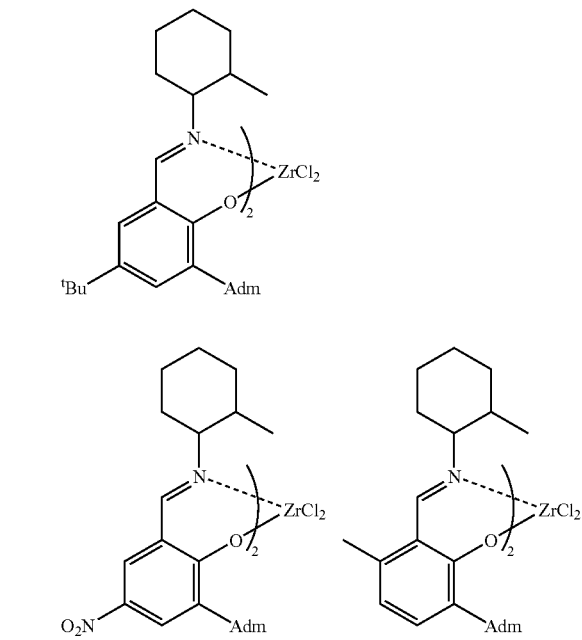
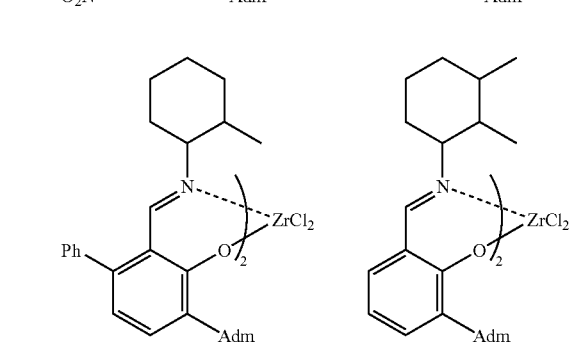
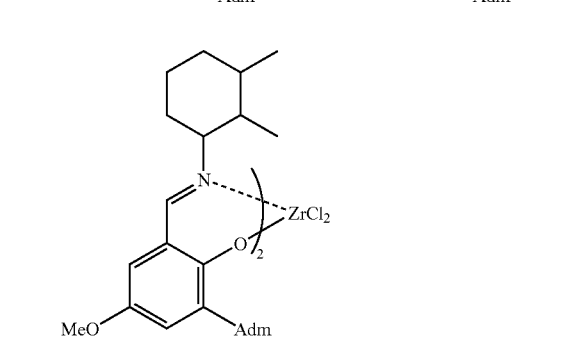
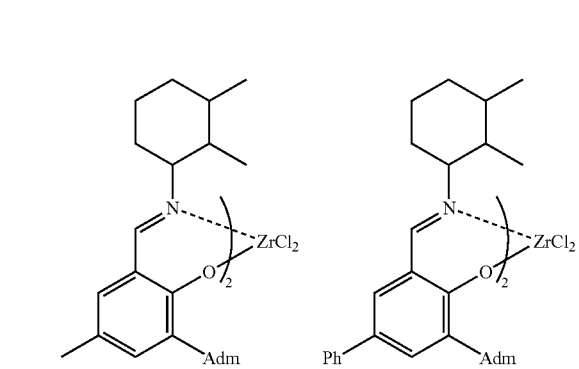

-continued
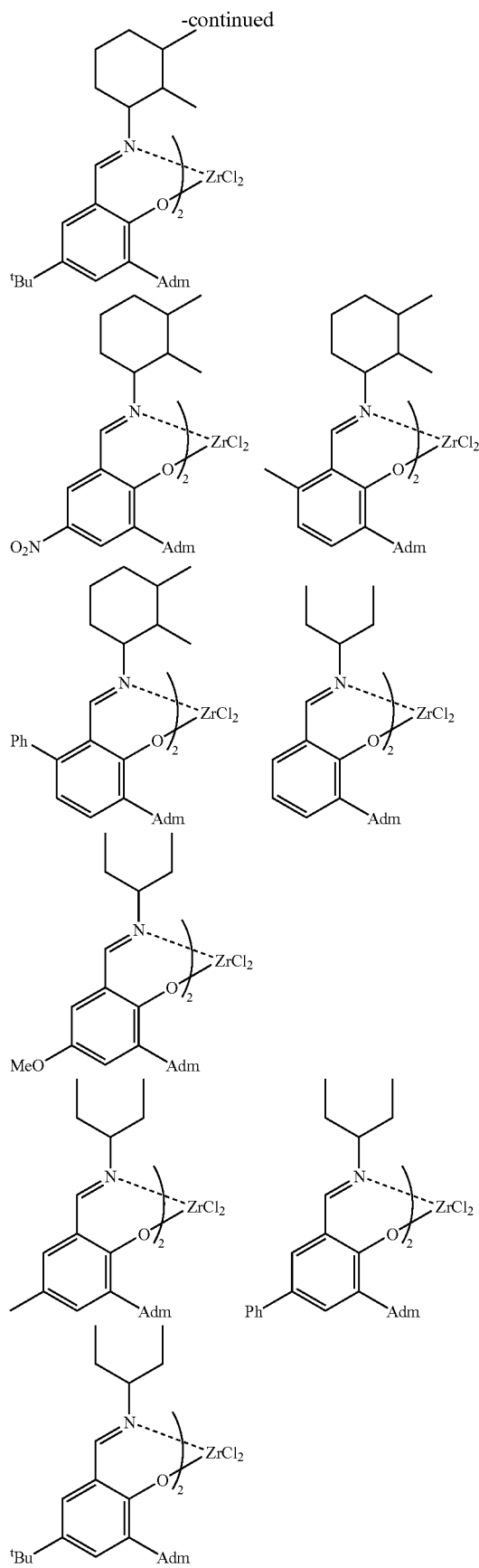
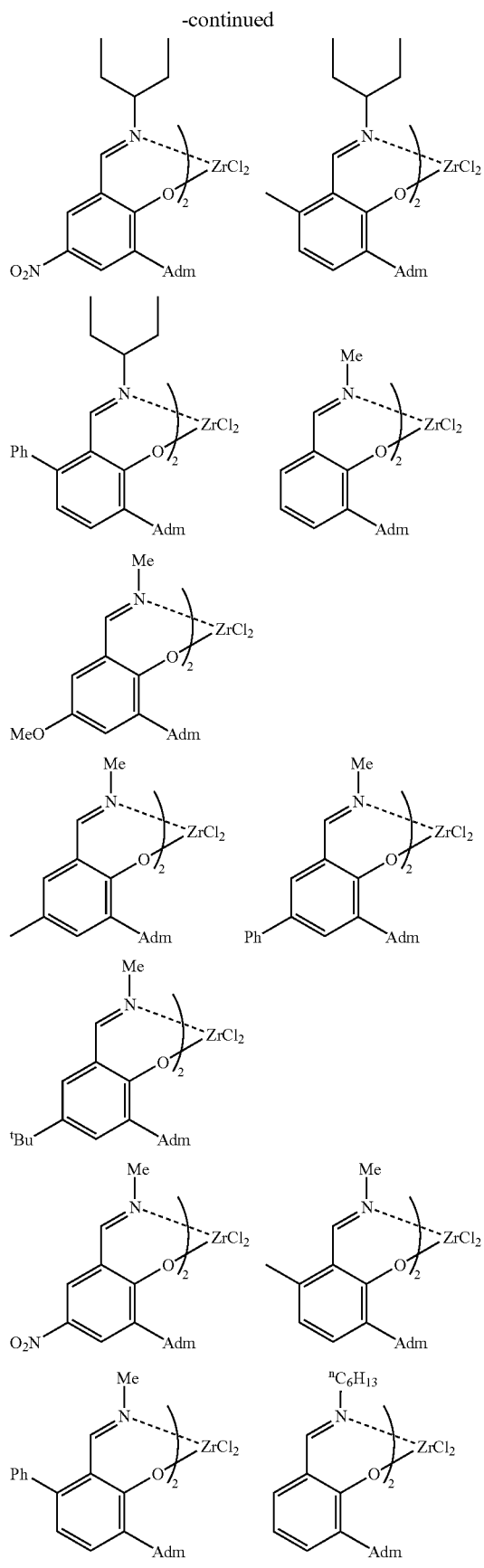

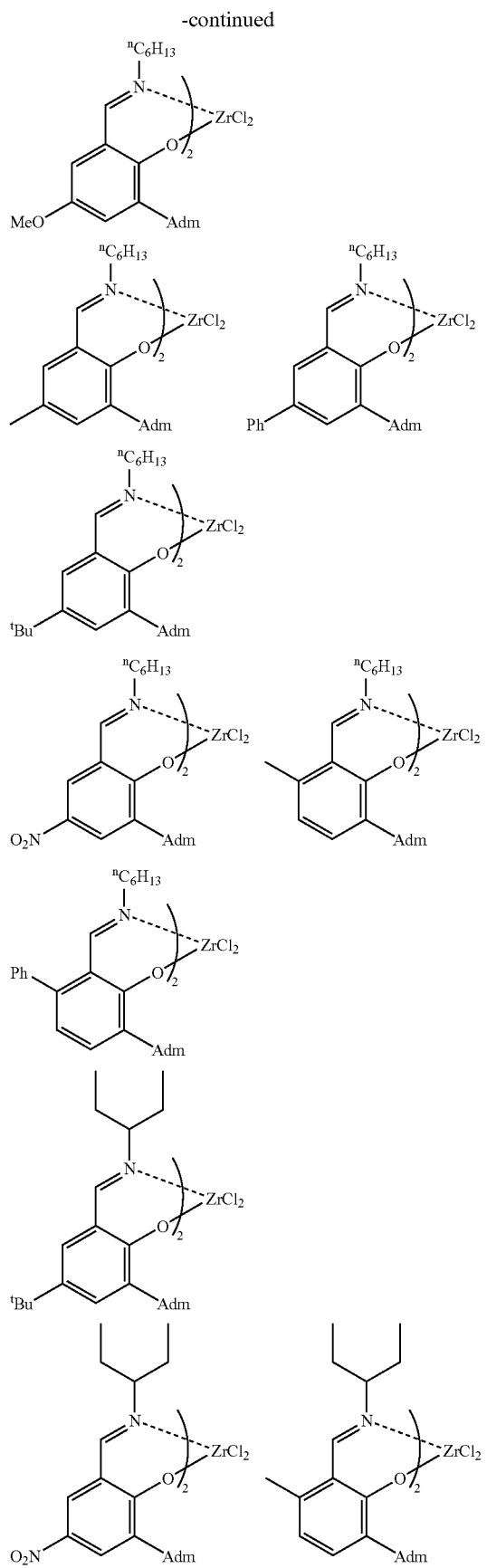
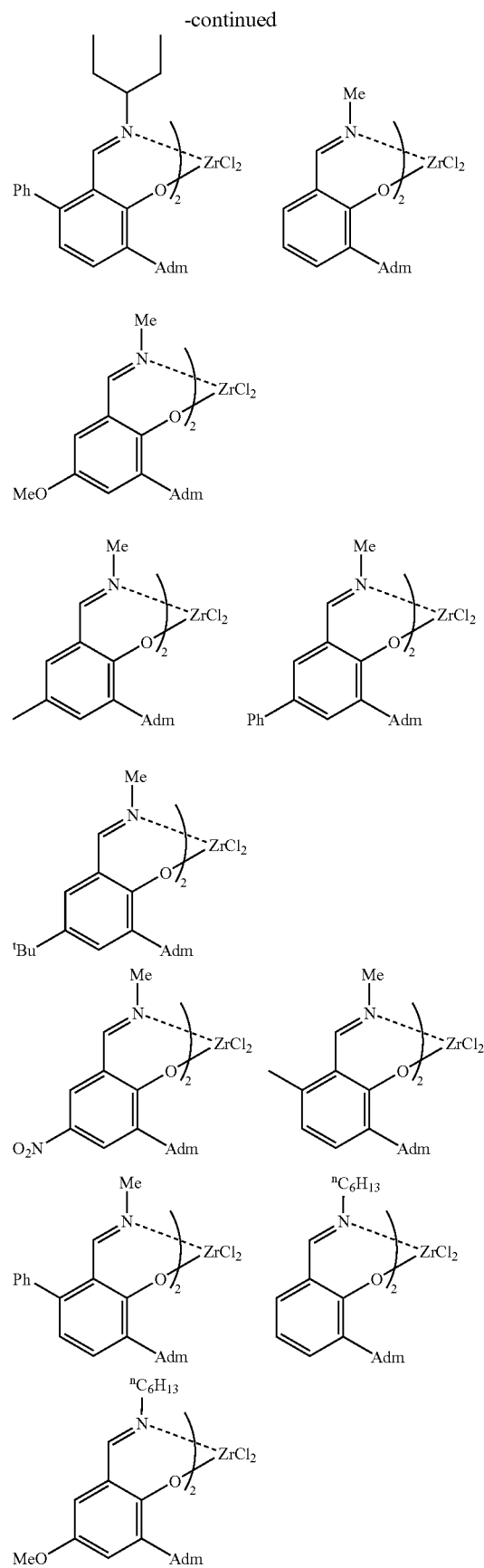

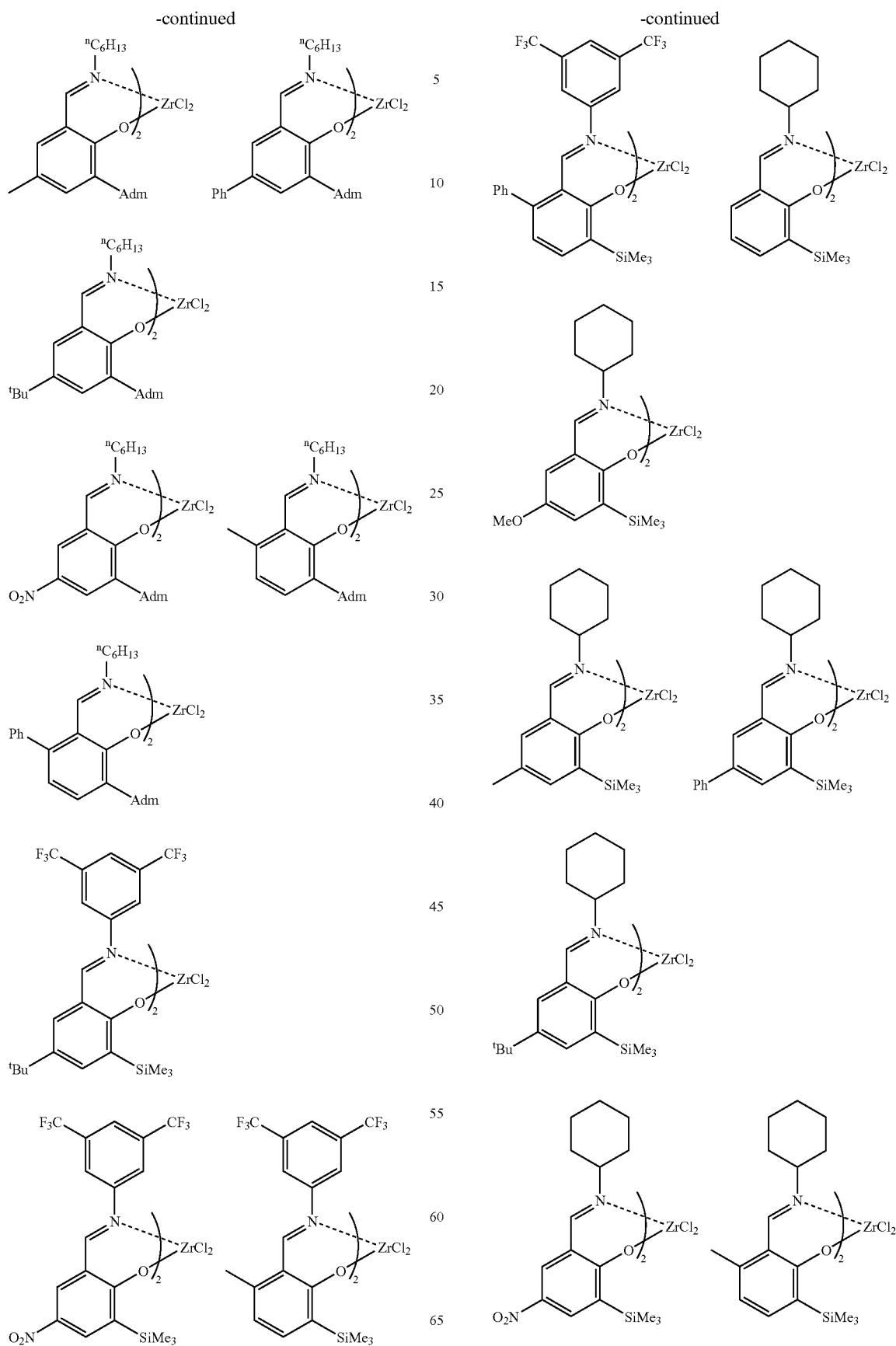

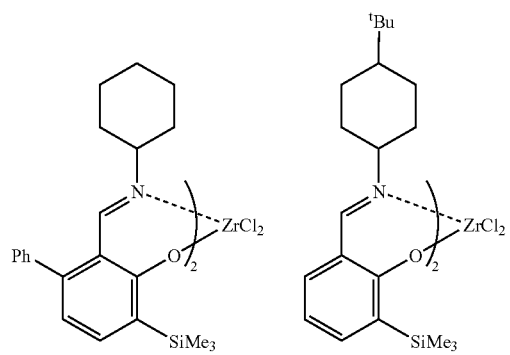
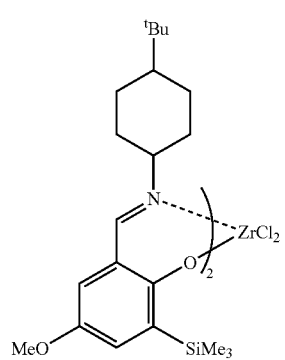
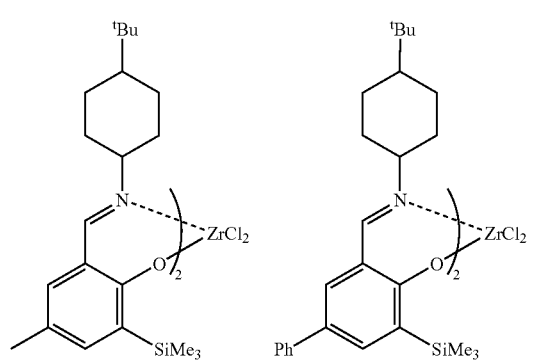
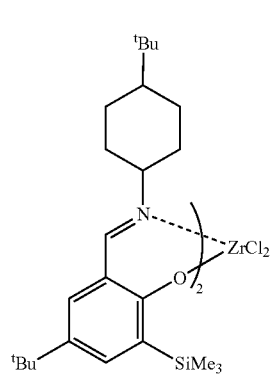
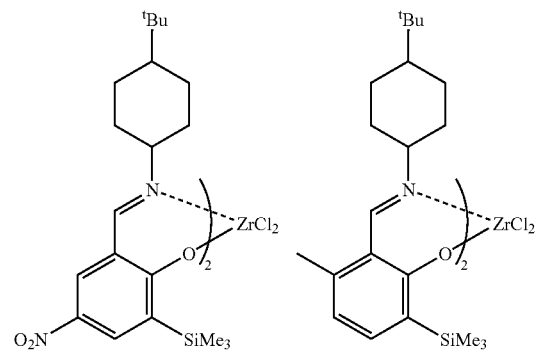
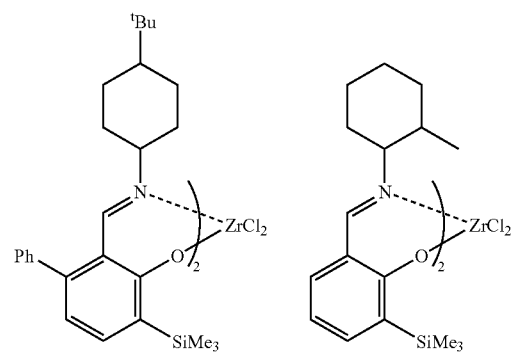
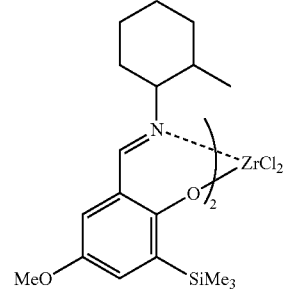
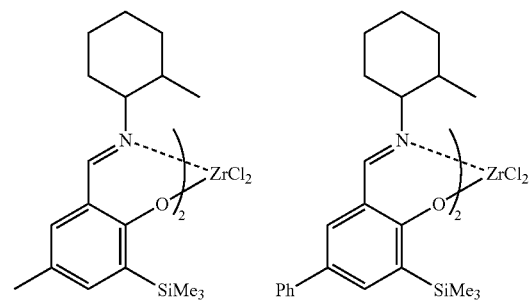
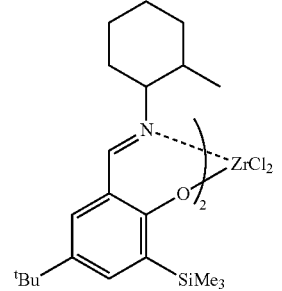

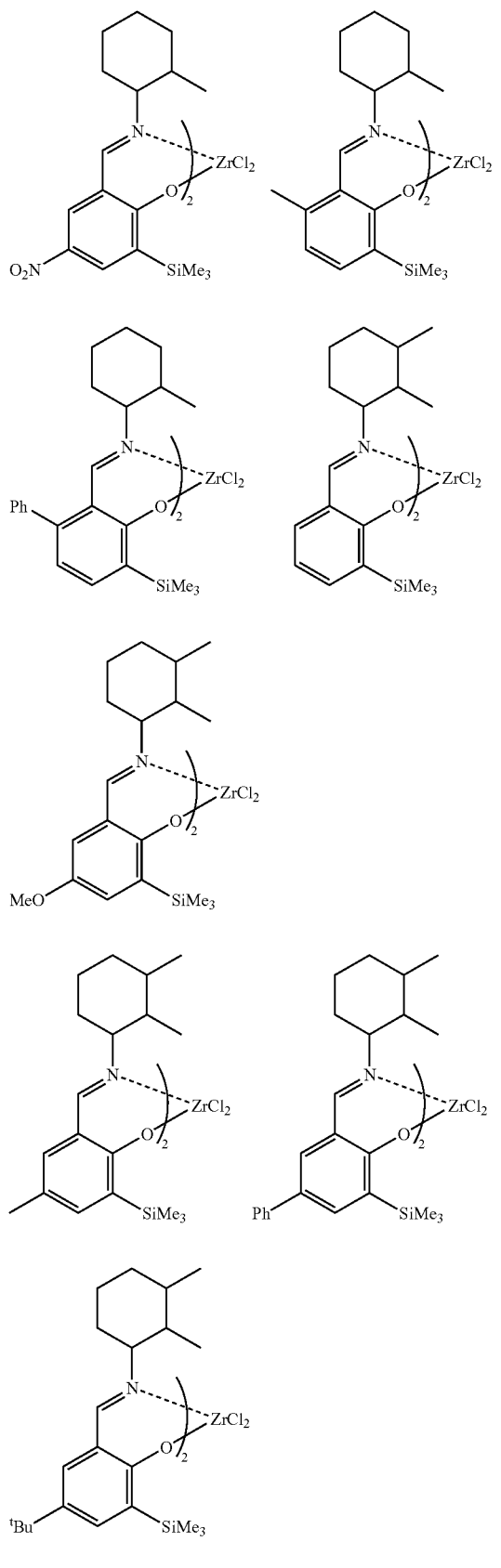
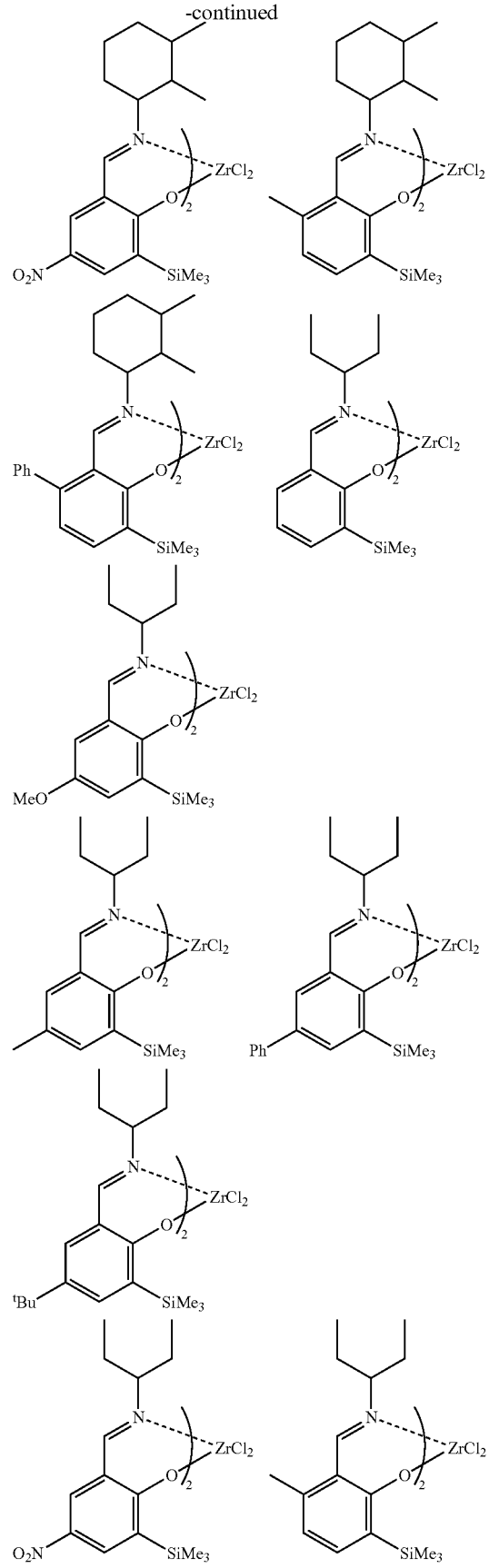

-continued
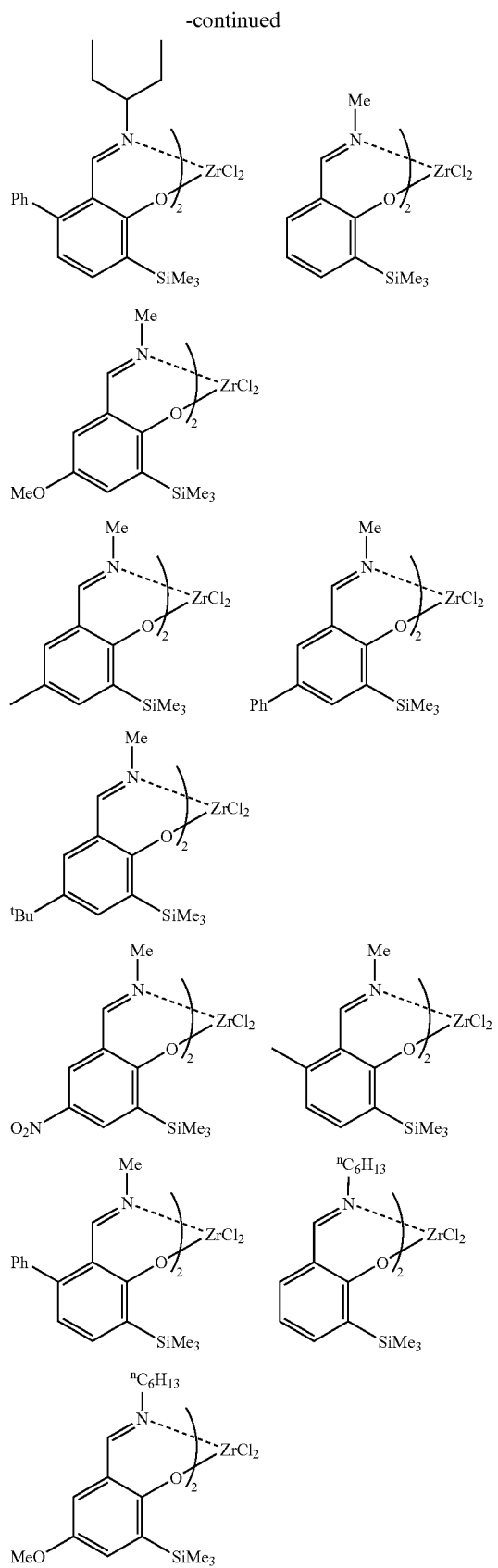
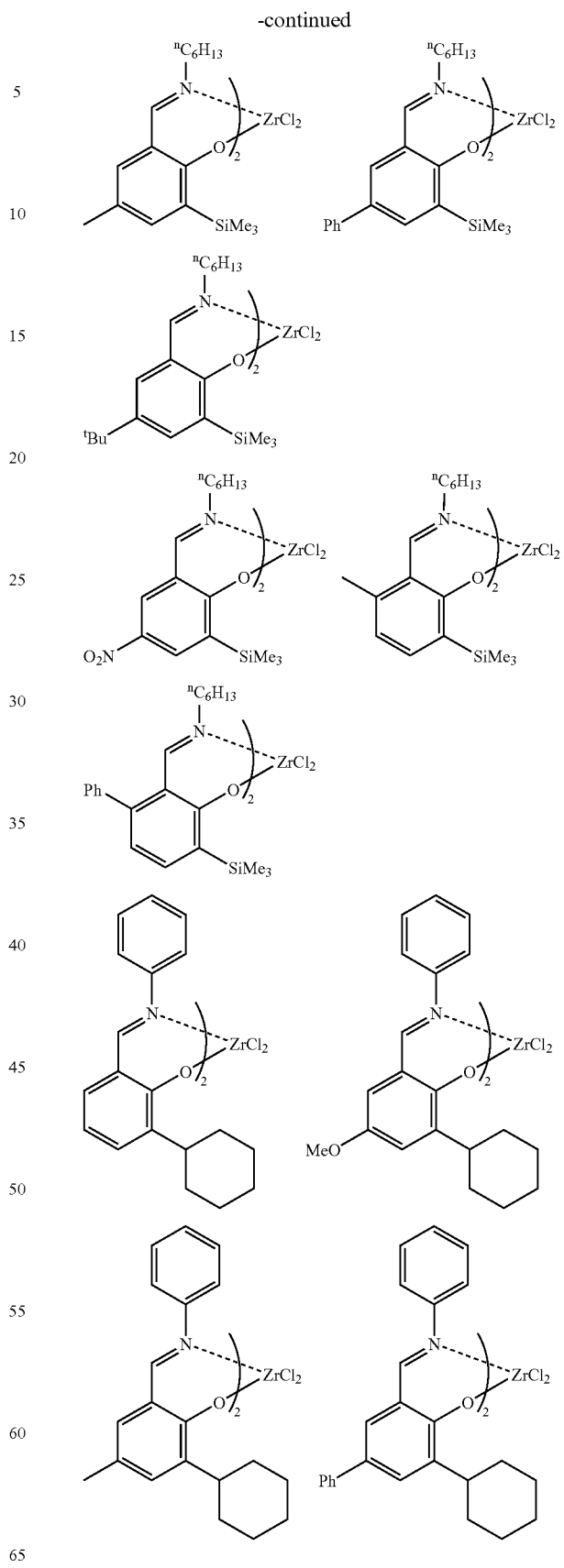

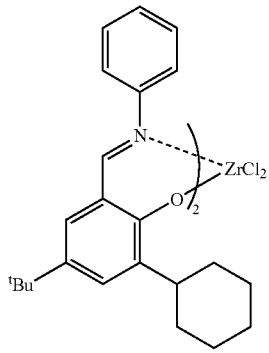
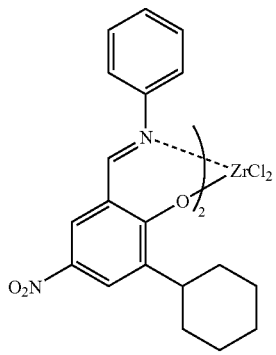
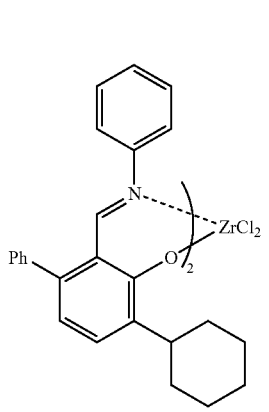
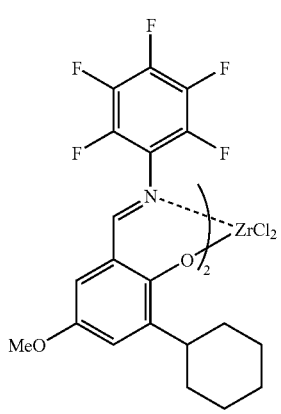
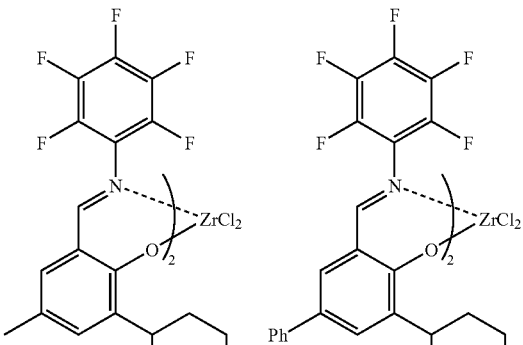
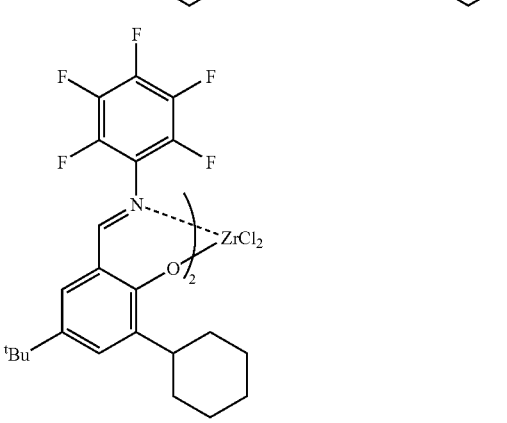
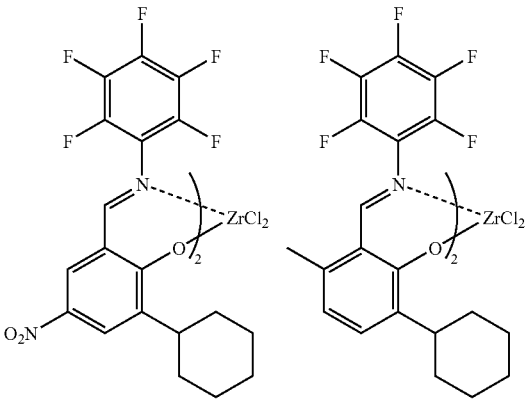
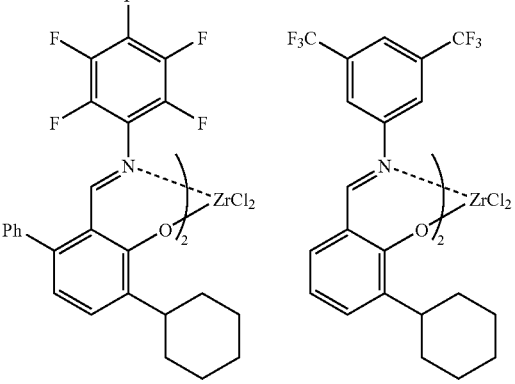

-continued
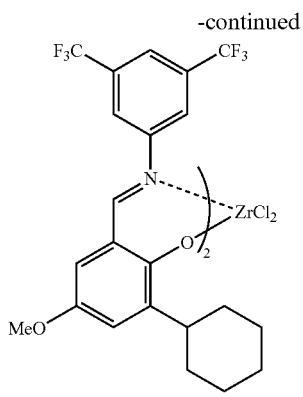
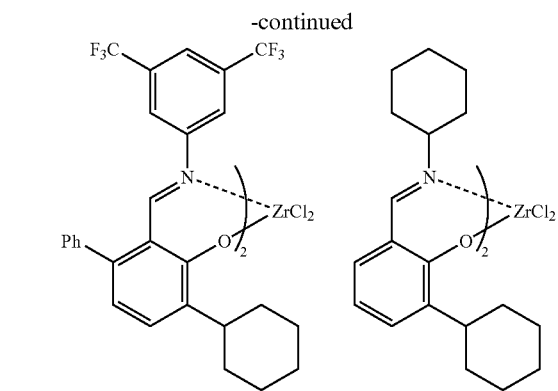
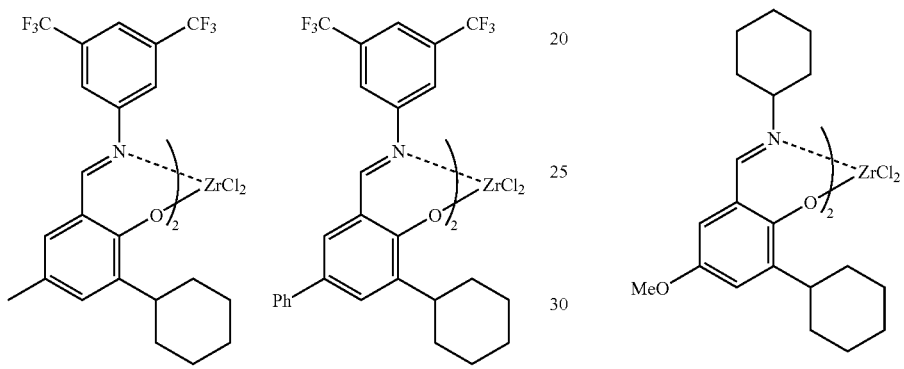
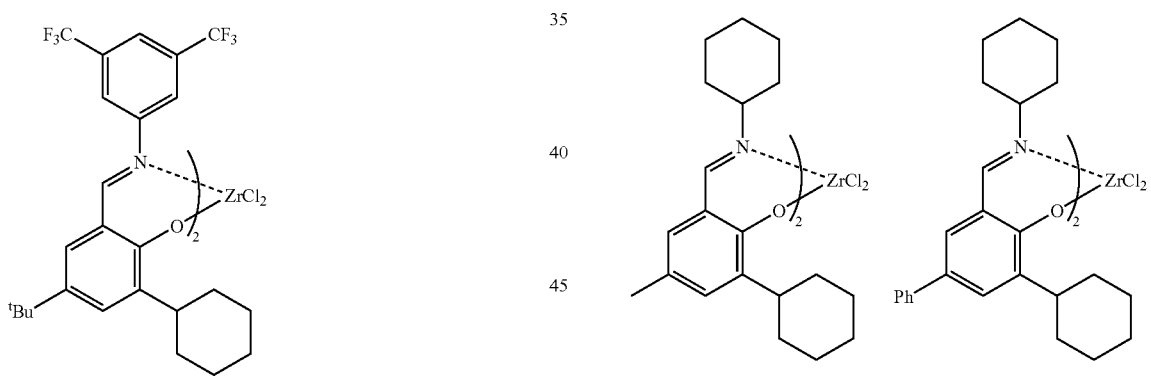
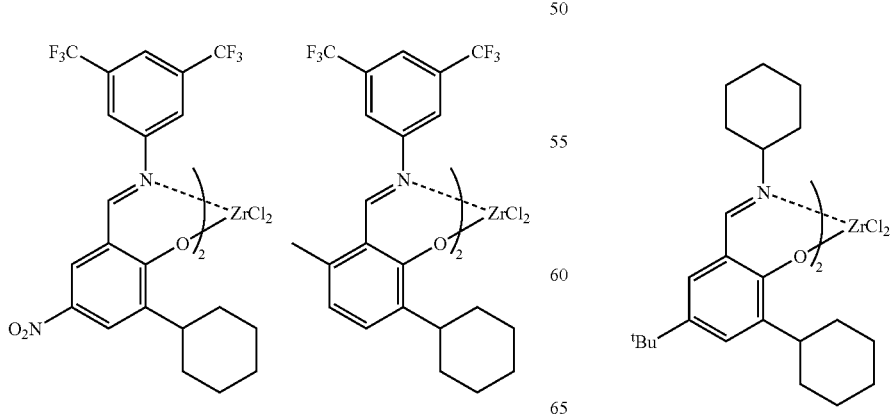

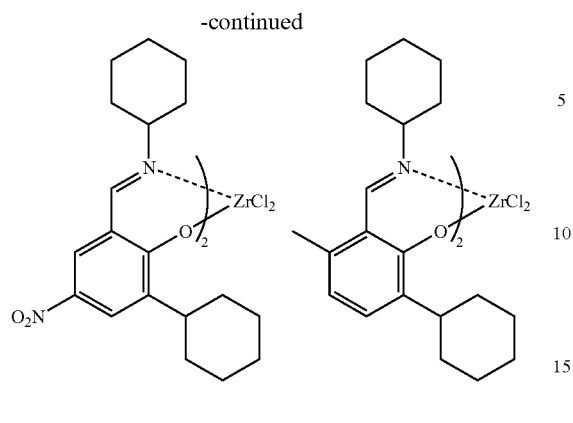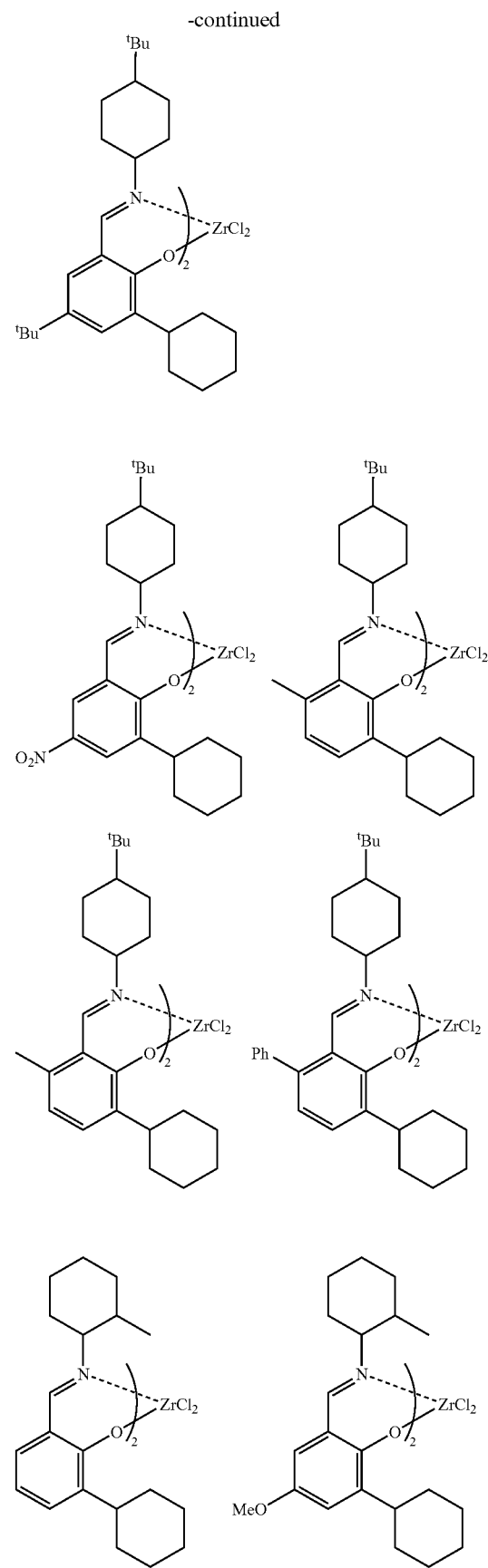

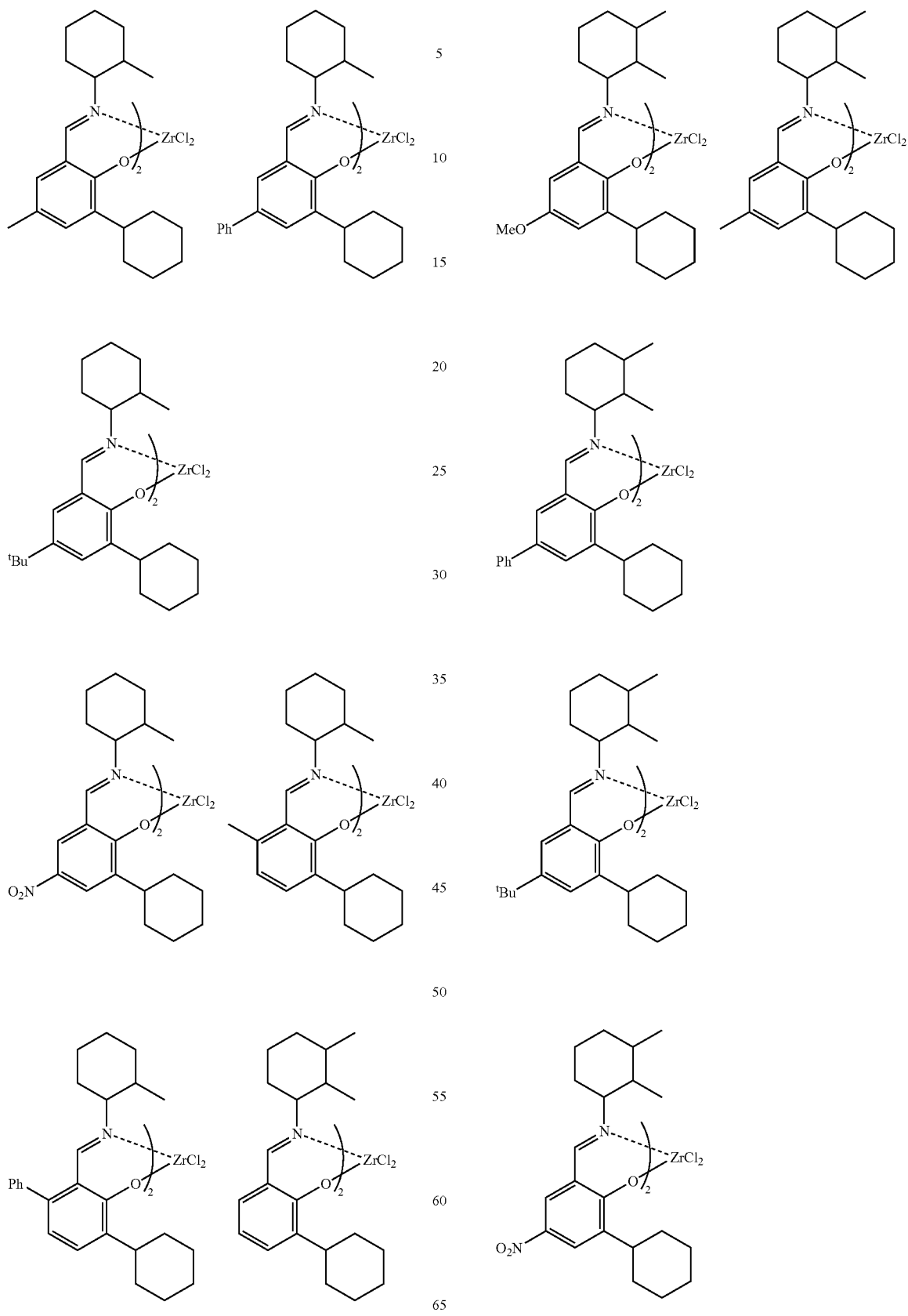

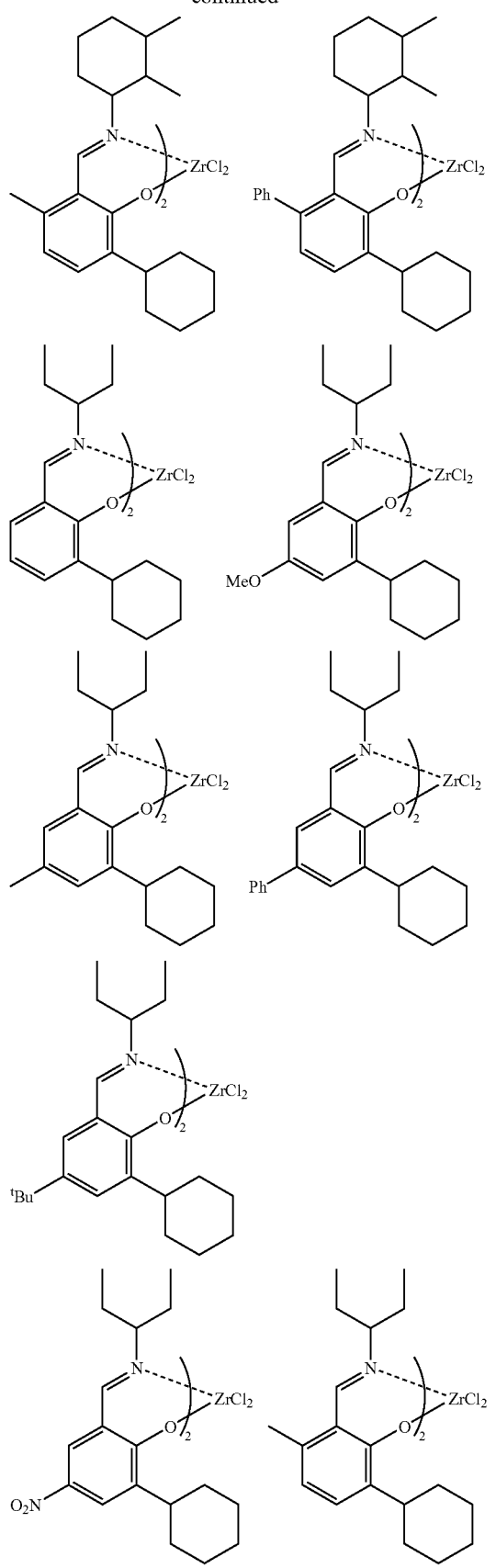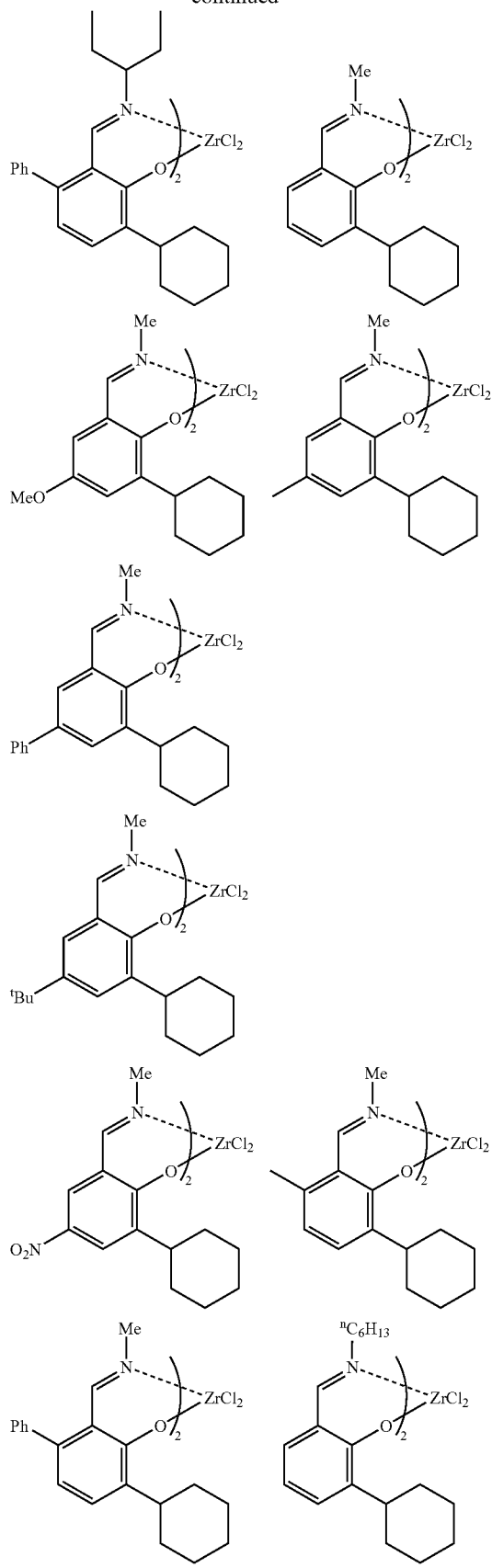

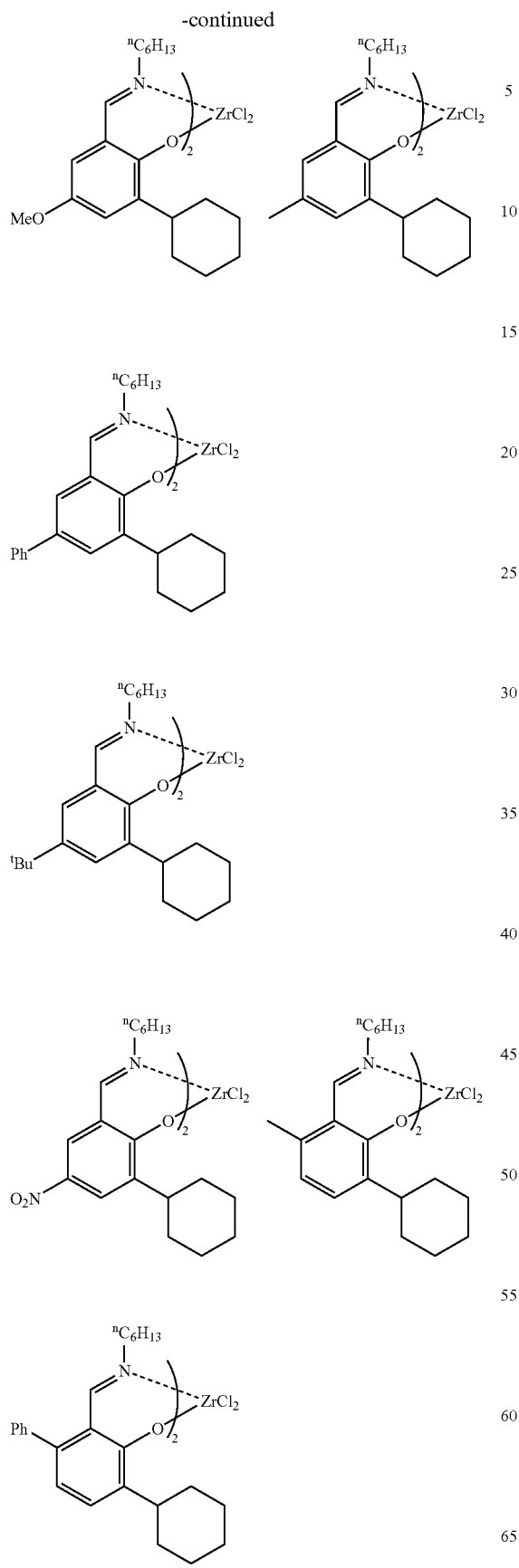
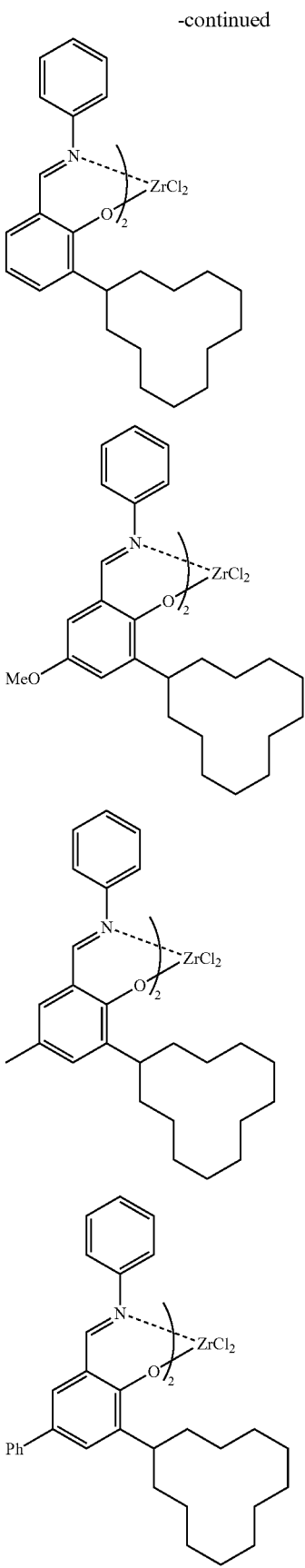

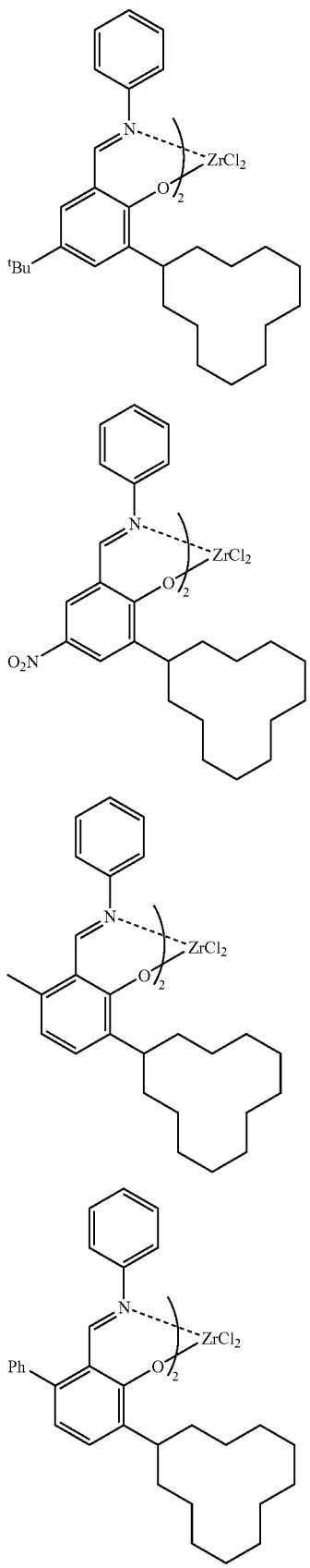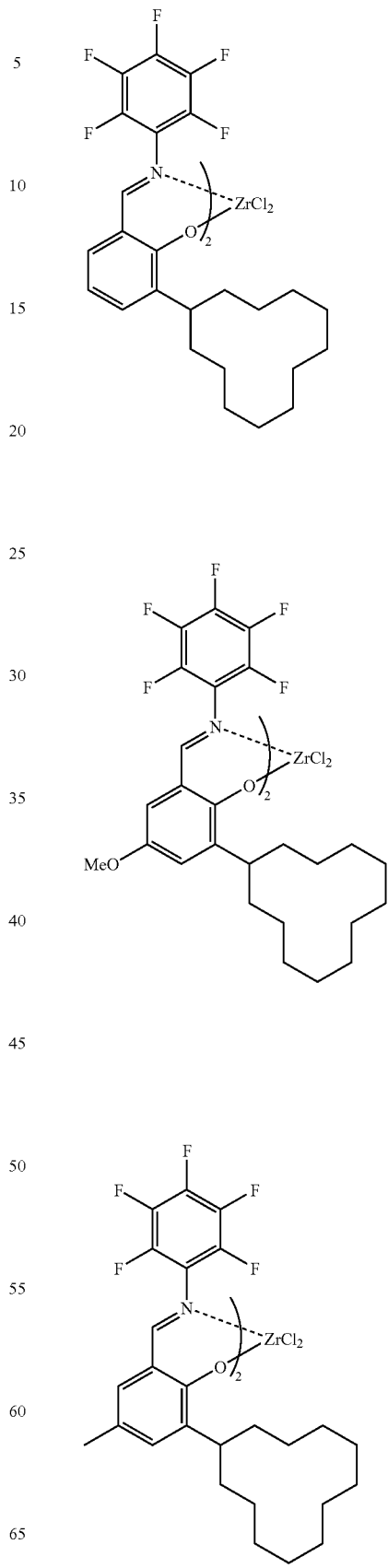

-continued
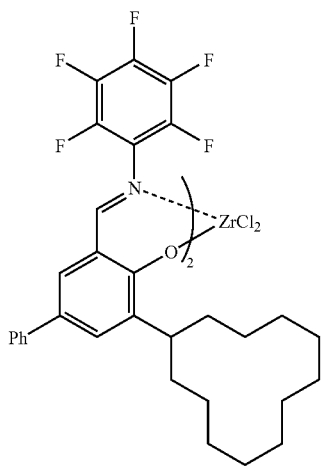
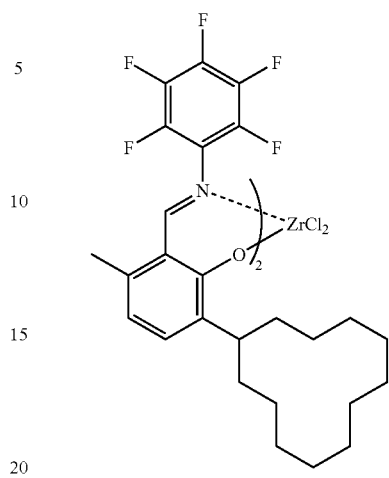
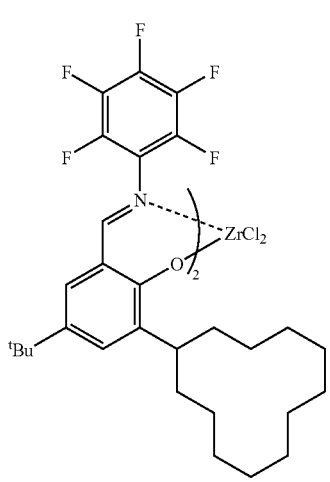
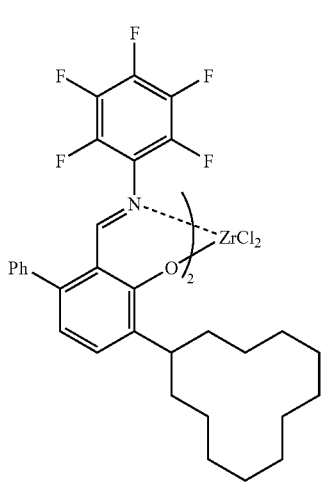
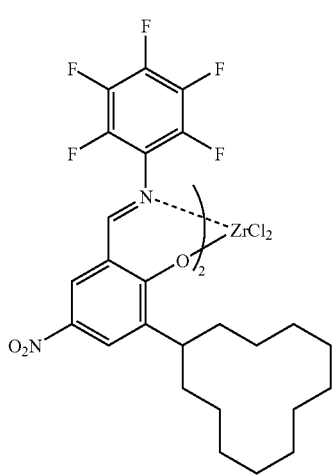
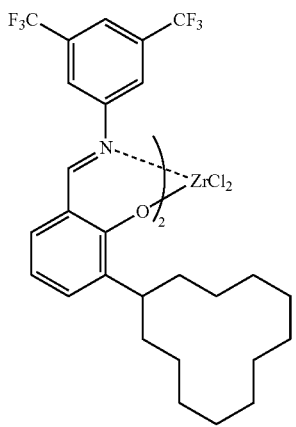

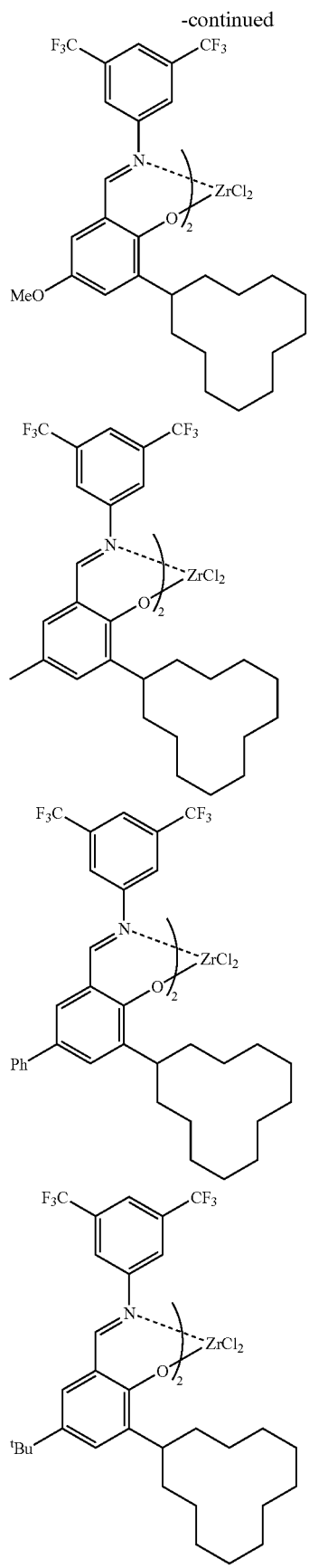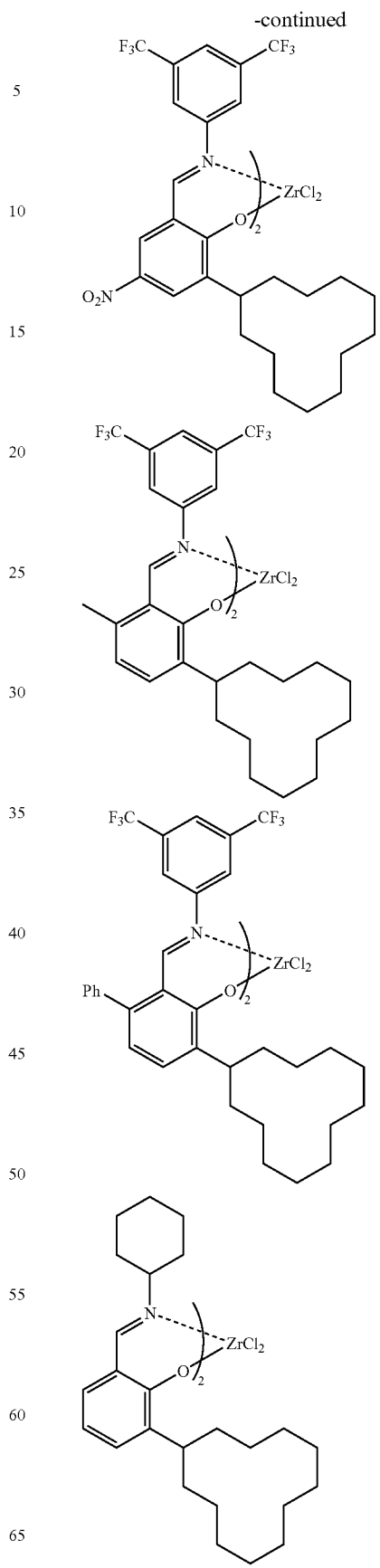

-continued
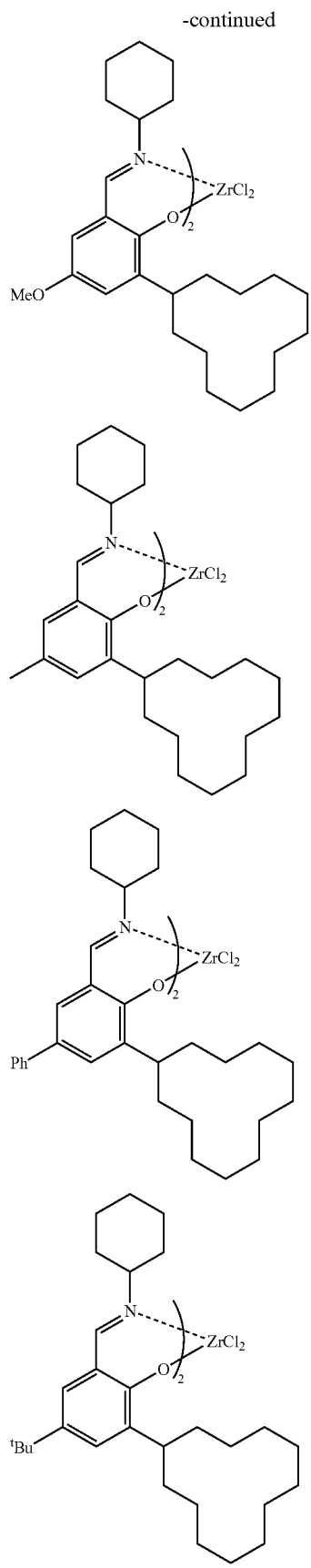
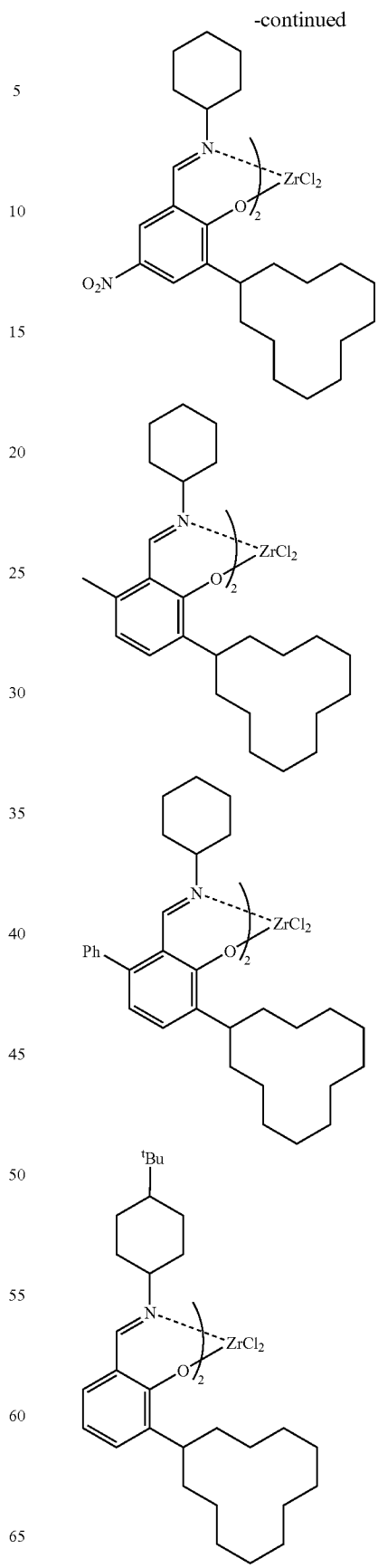

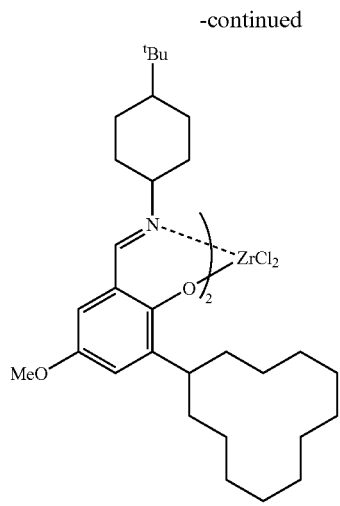
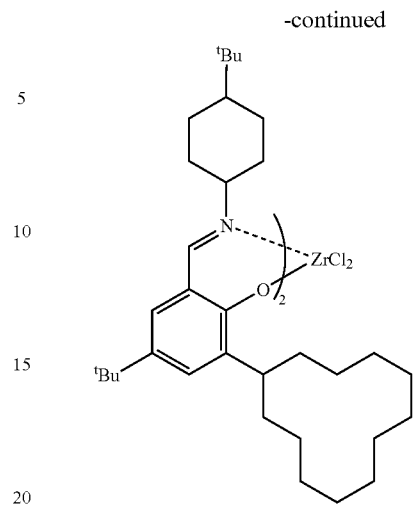
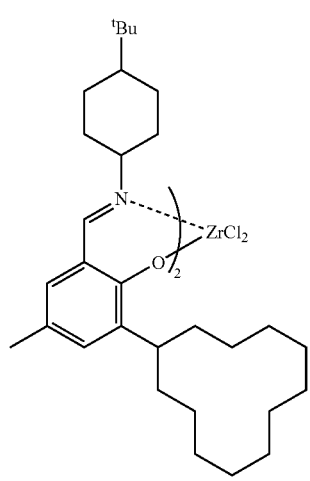
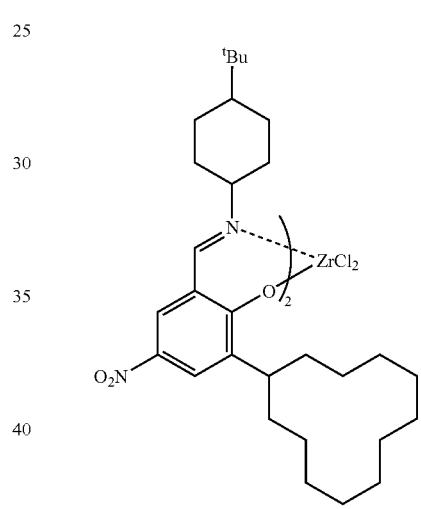
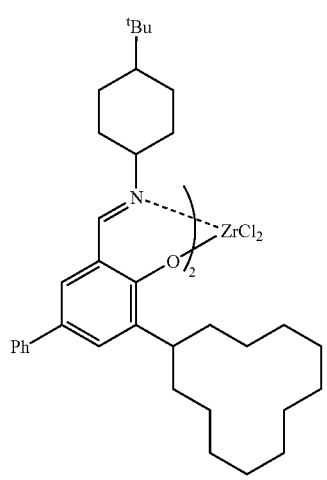

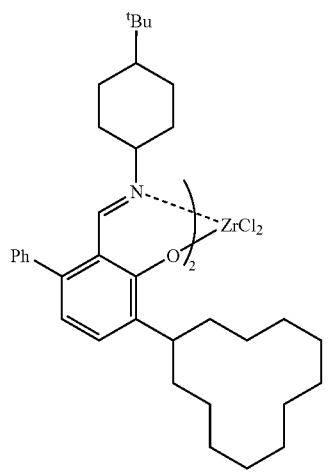
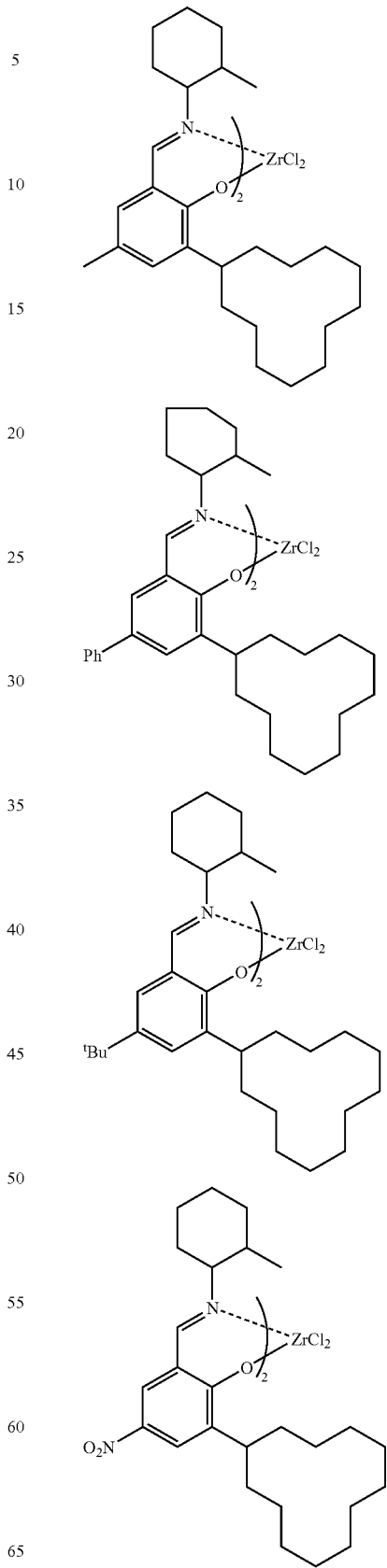

-continued
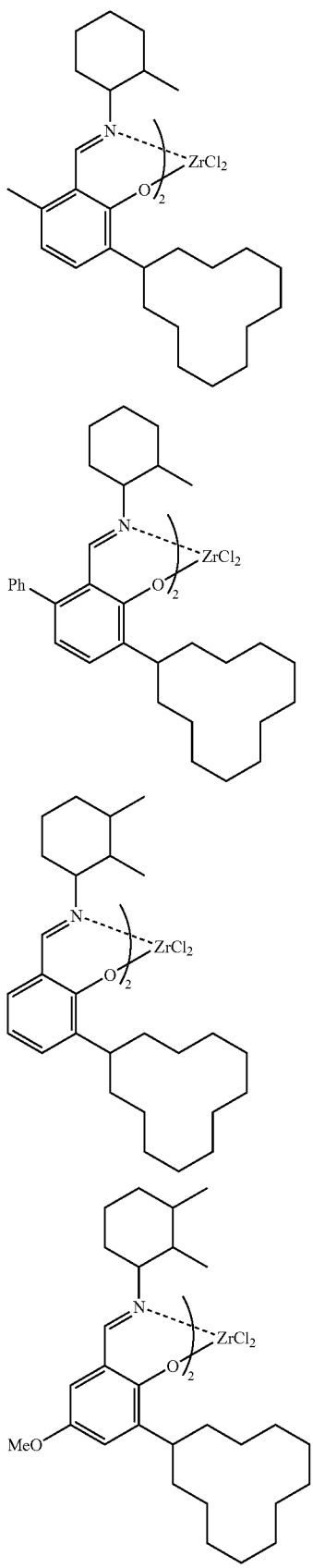
-continued
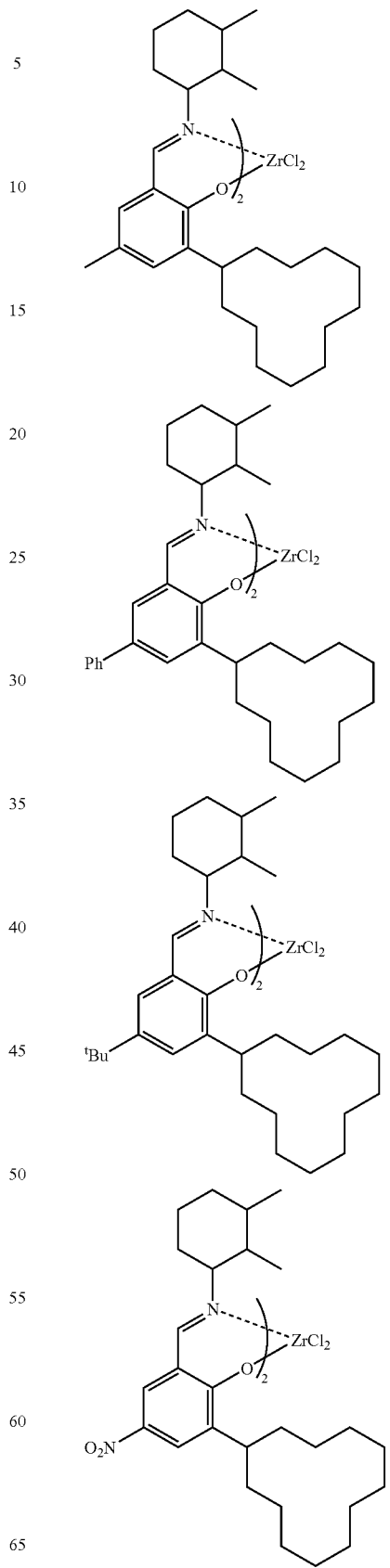

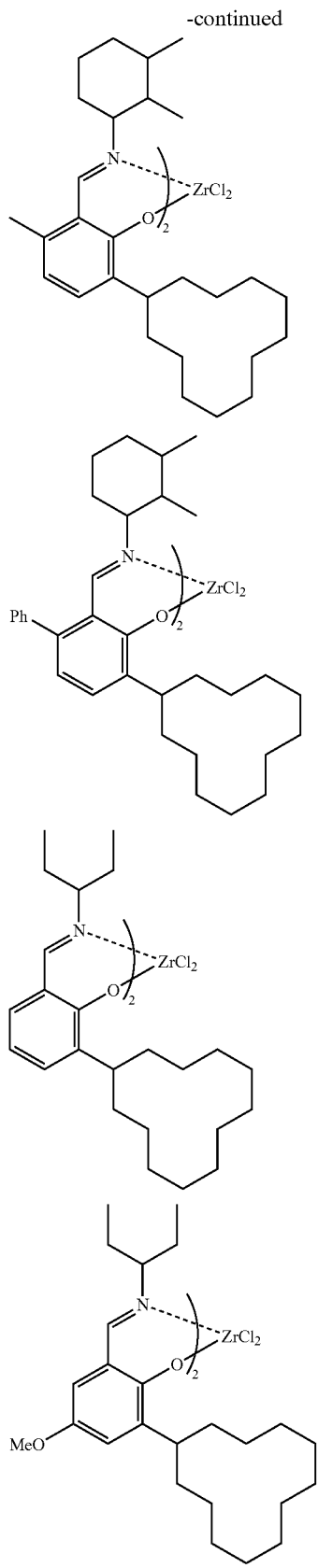
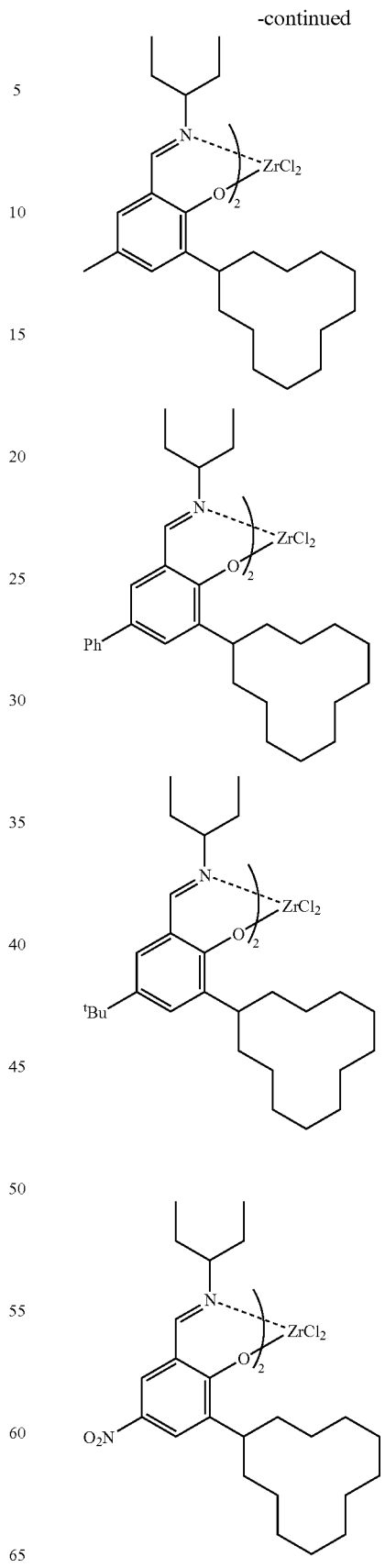

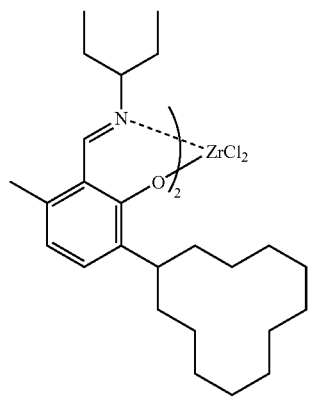
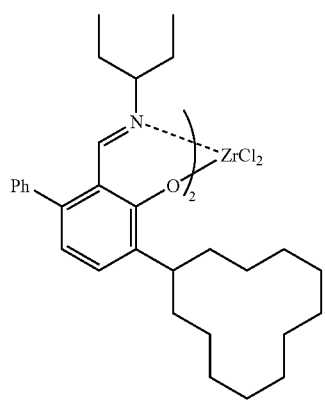
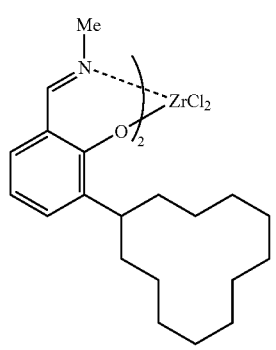
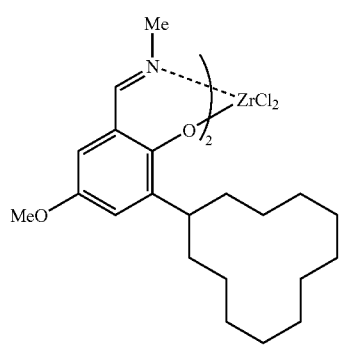
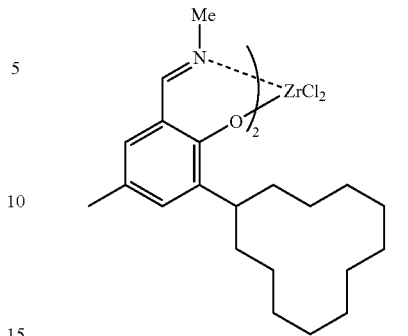
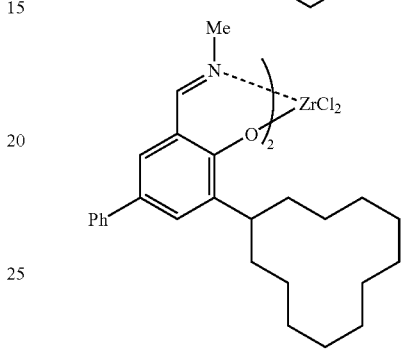
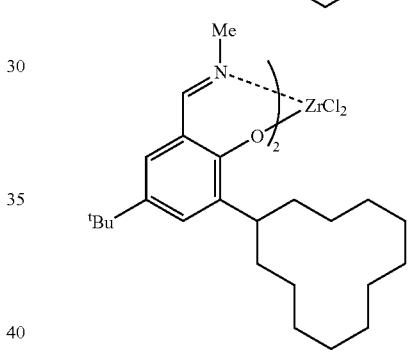
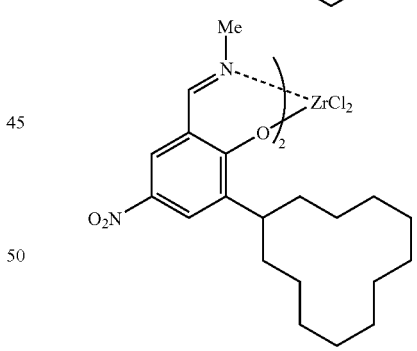
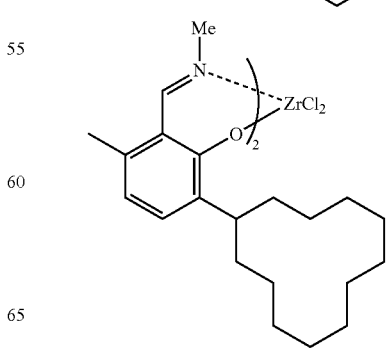

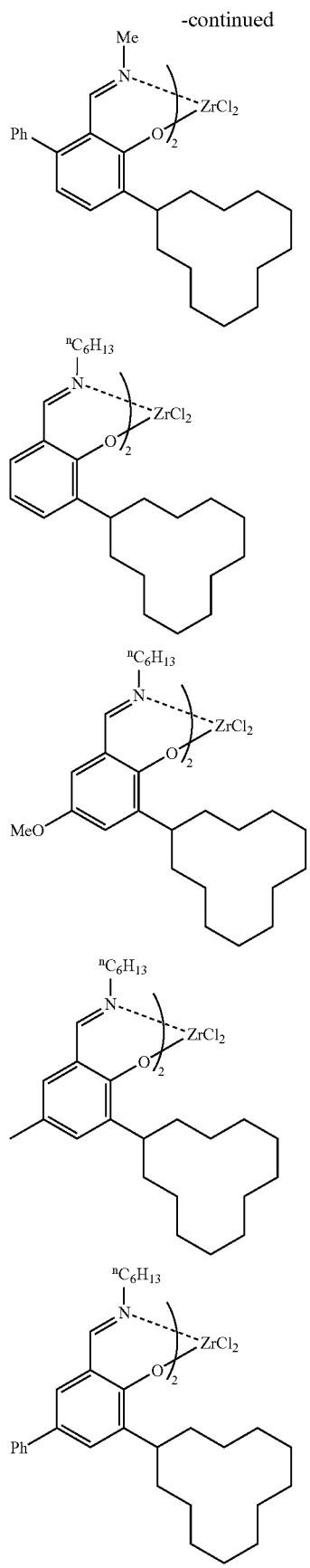
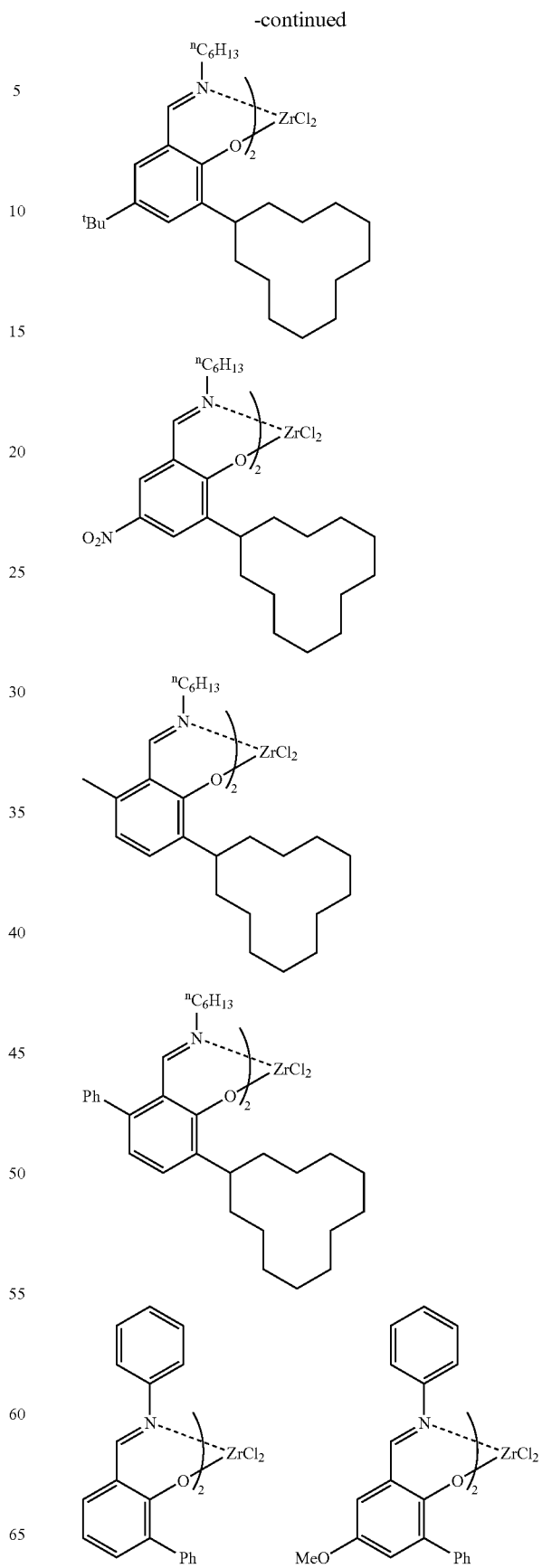

-continued
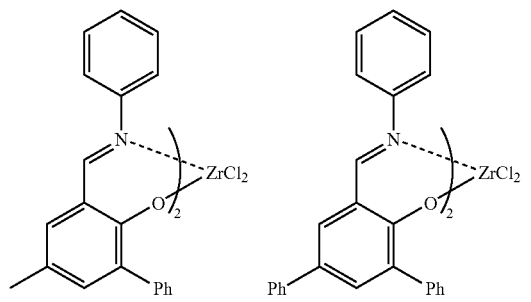
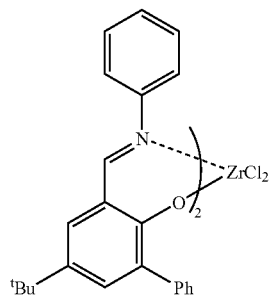
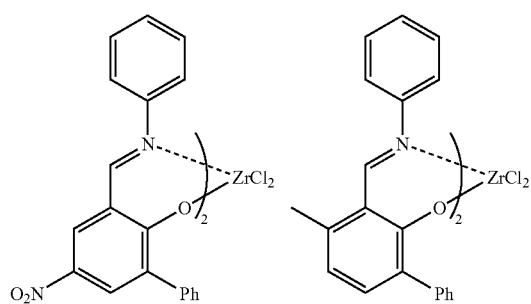
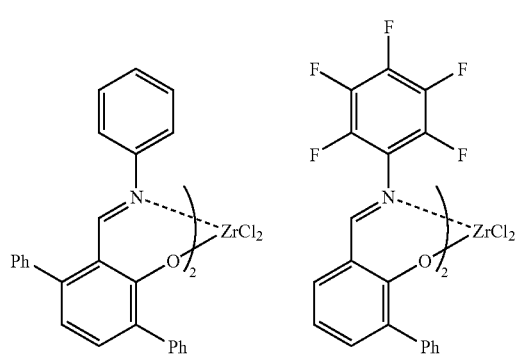
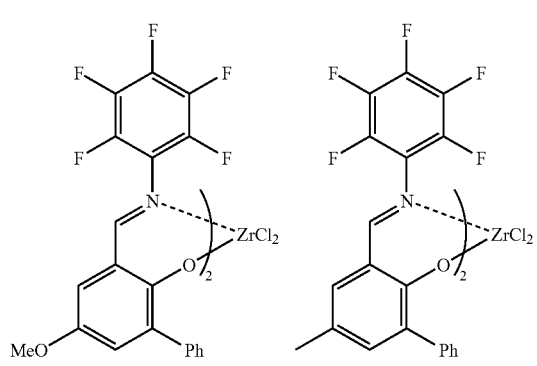
-continued
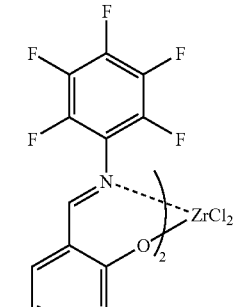
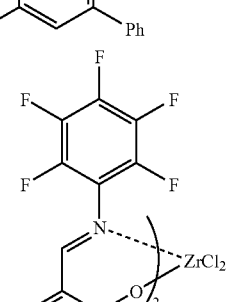
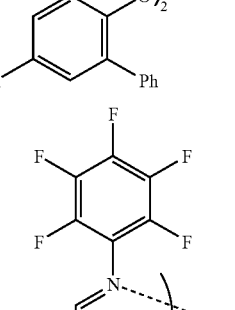
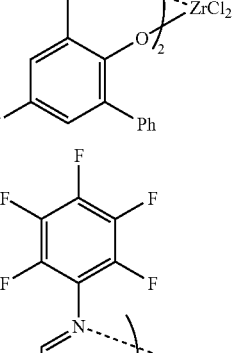
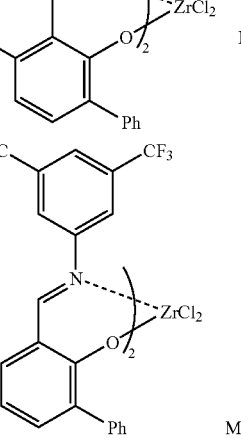
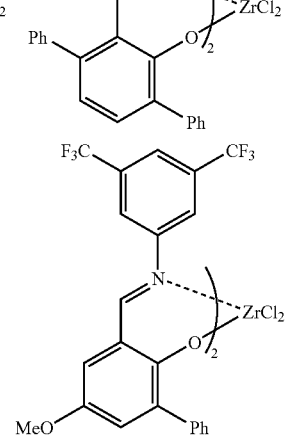

-continued
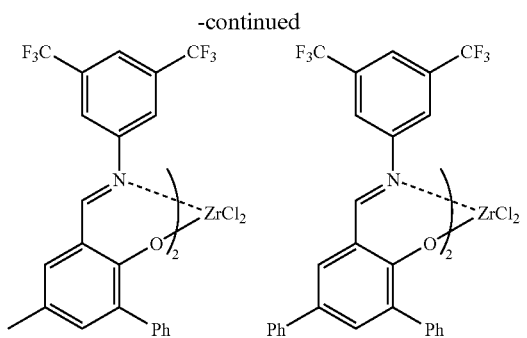
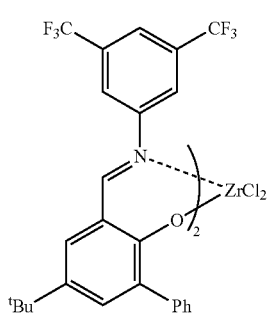
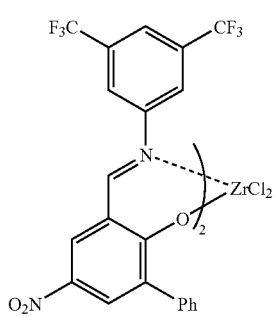
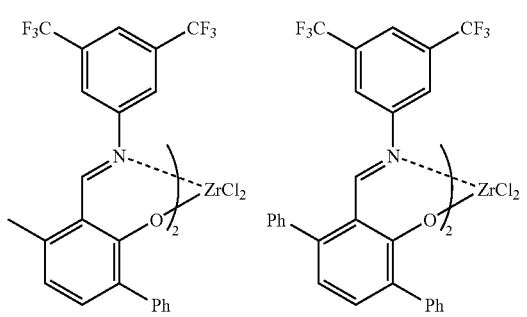
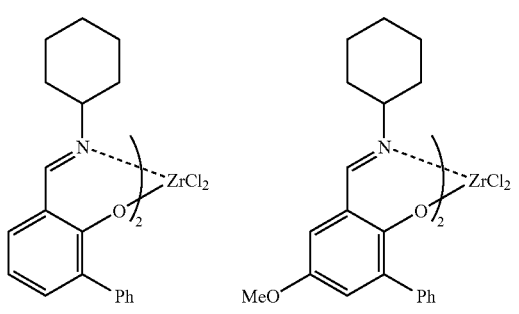
-continued
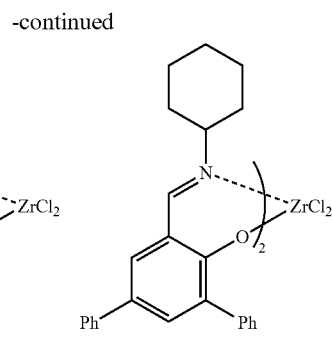
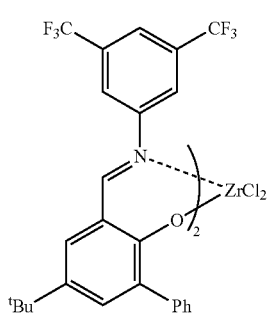
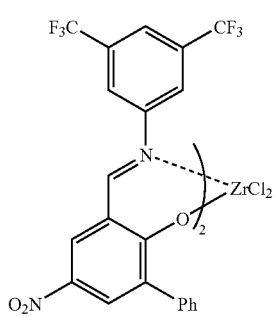
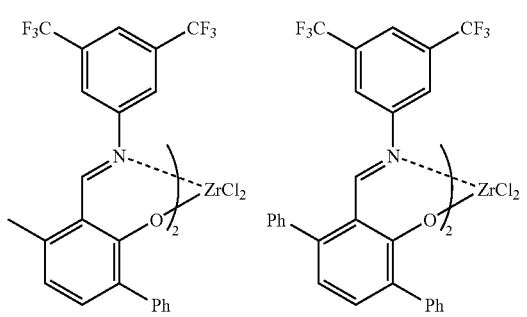
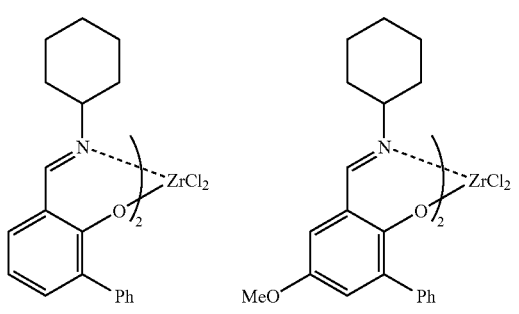

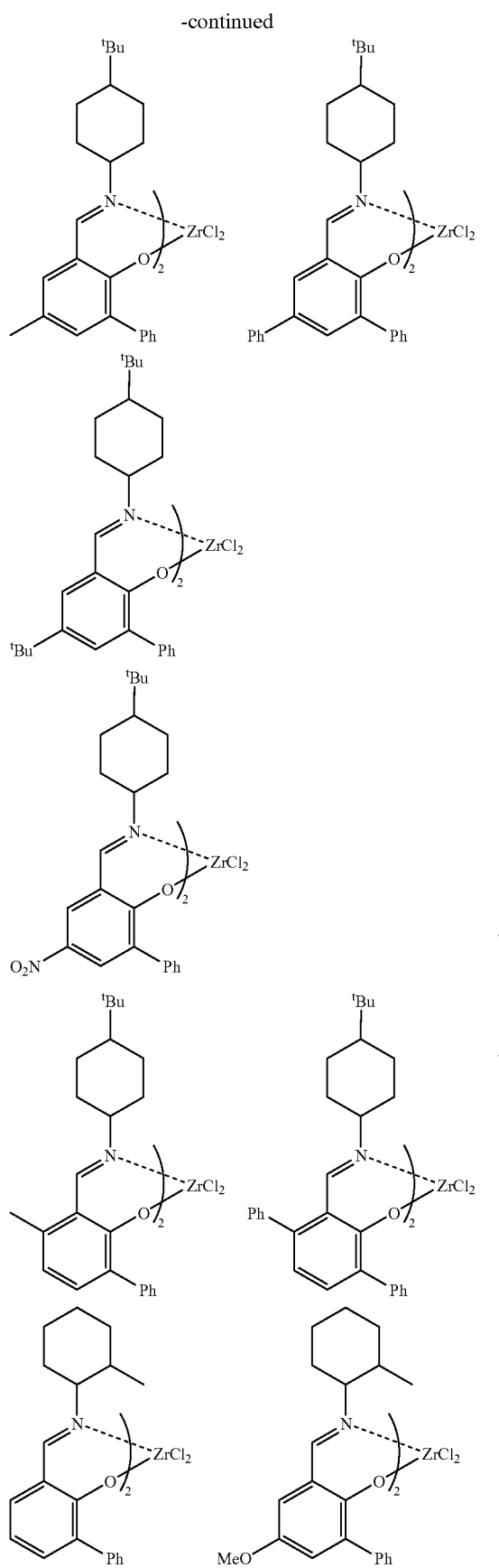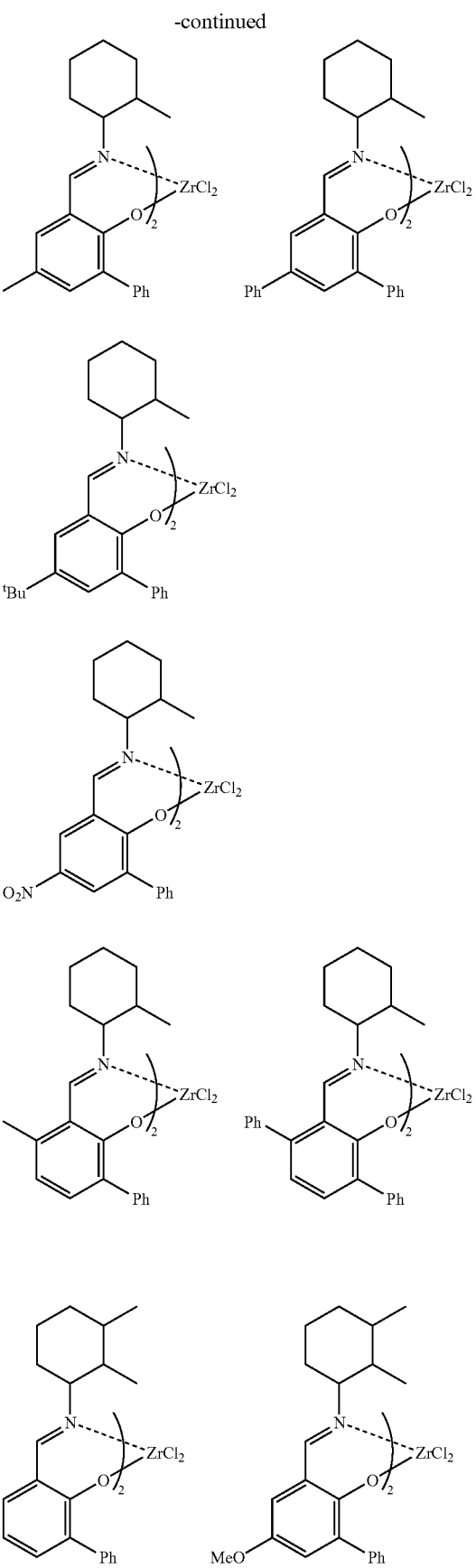

-continued
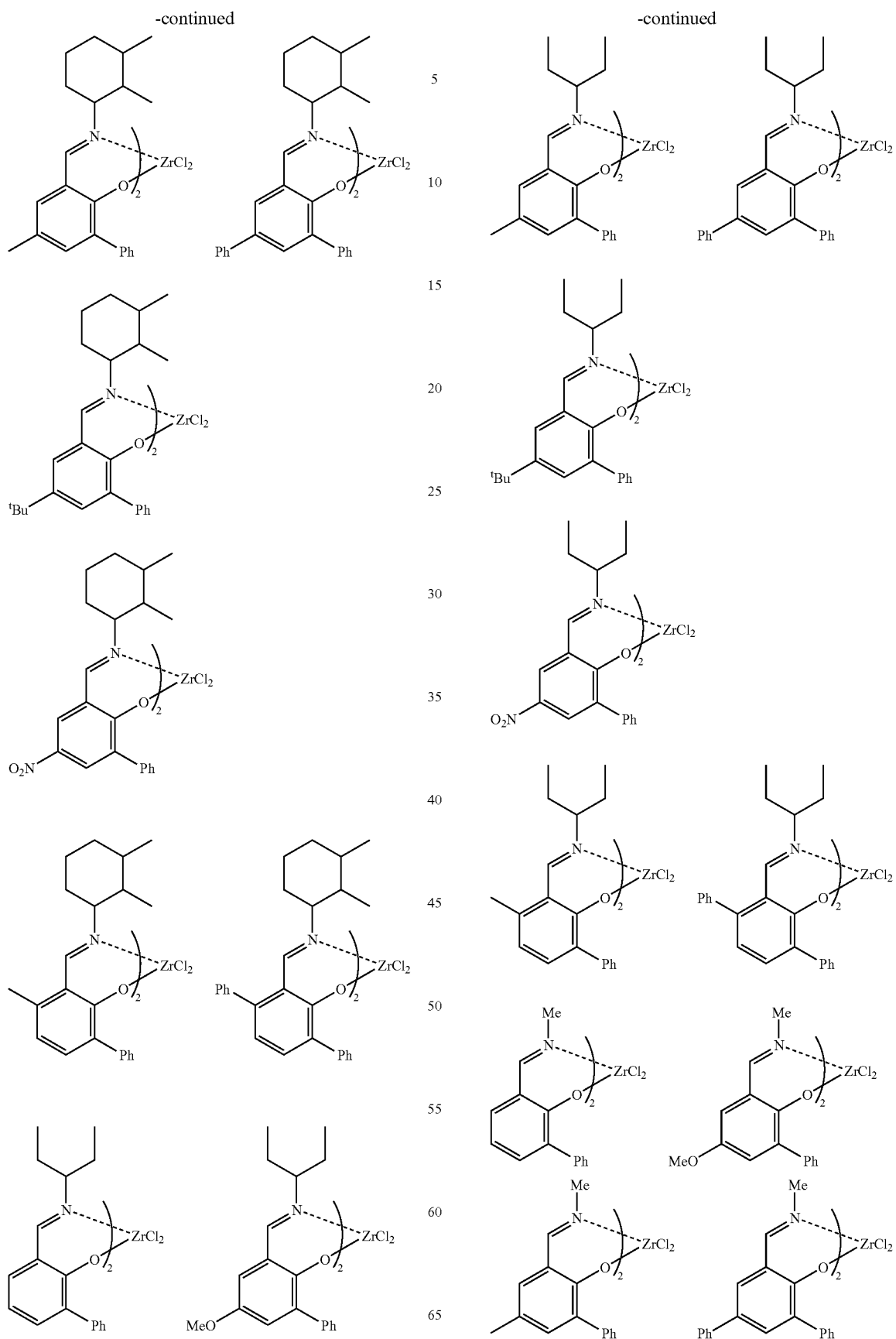

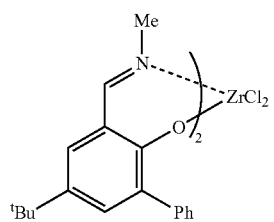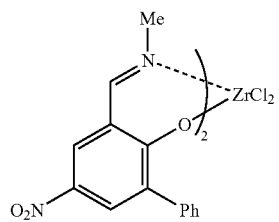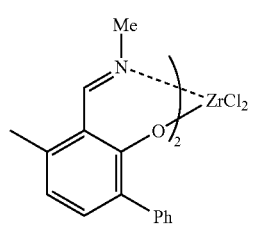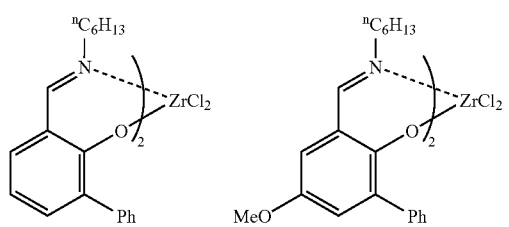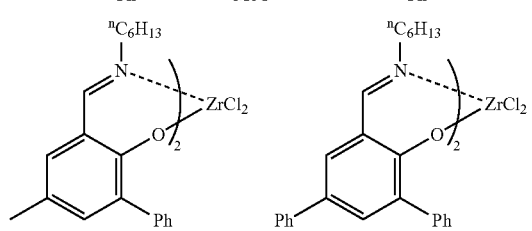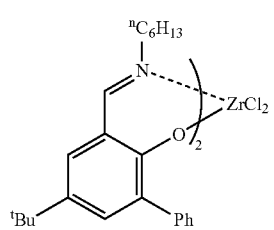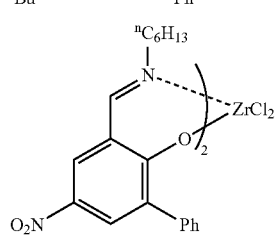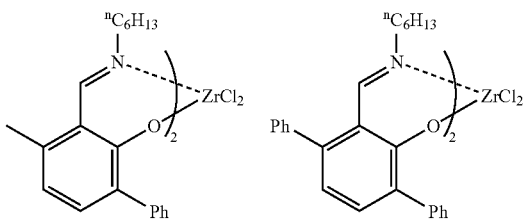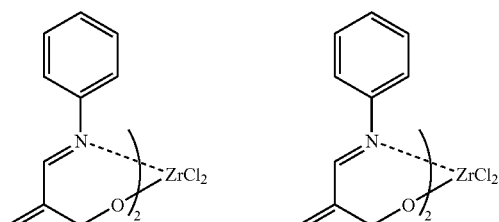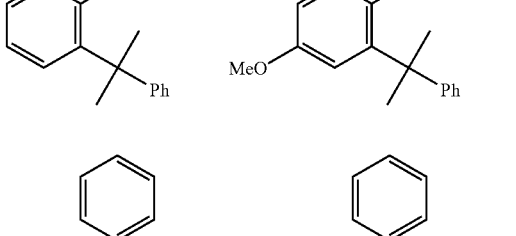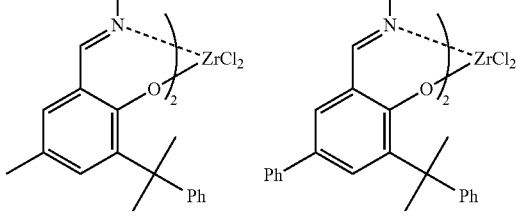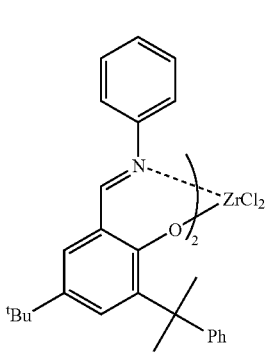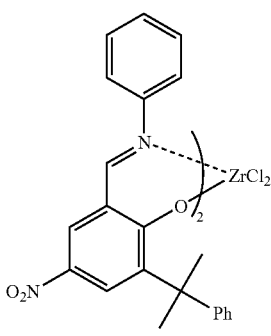

-continued
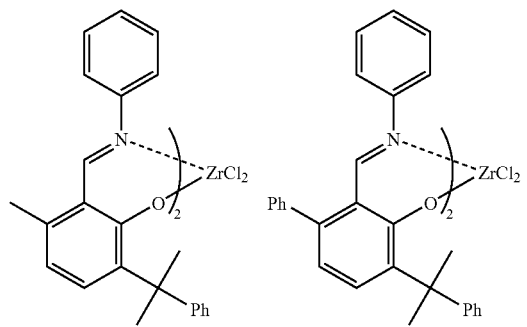
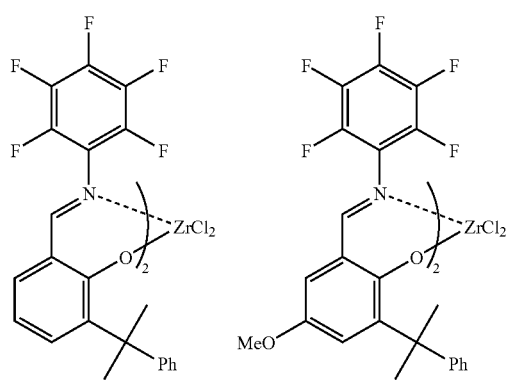
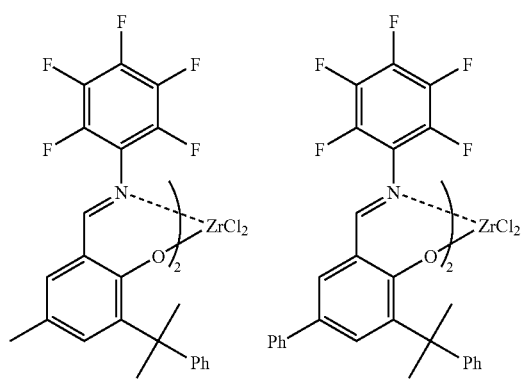
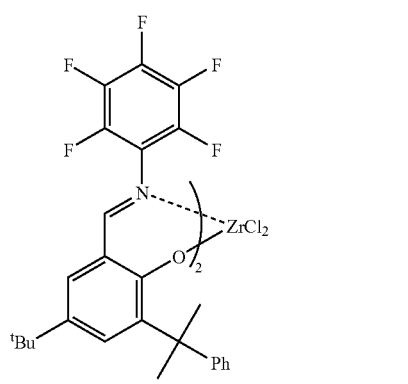
-continued
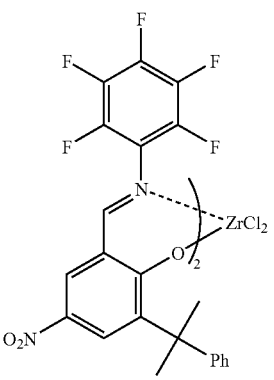
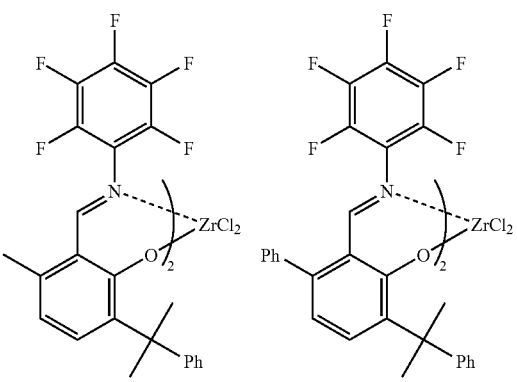
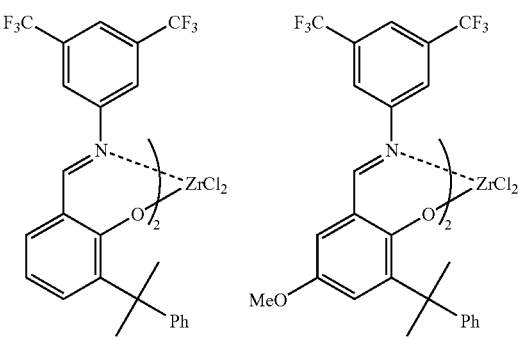
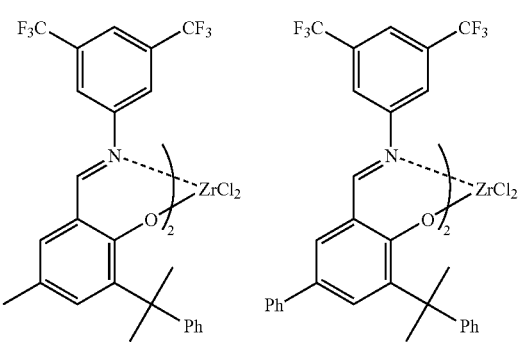

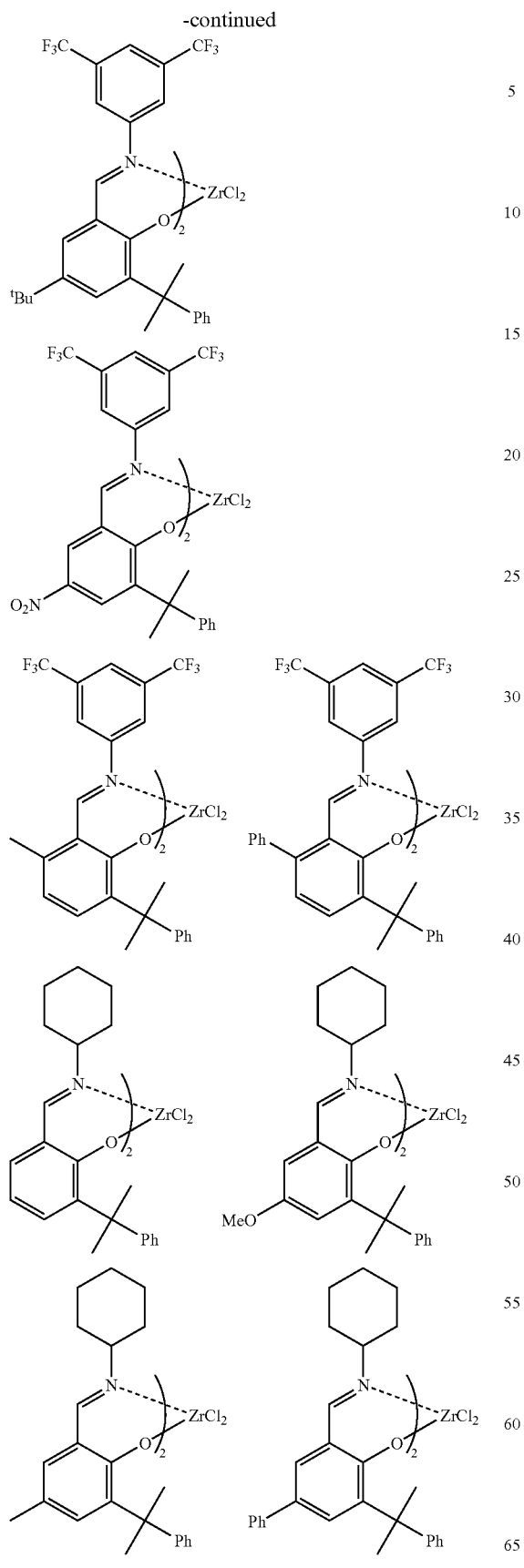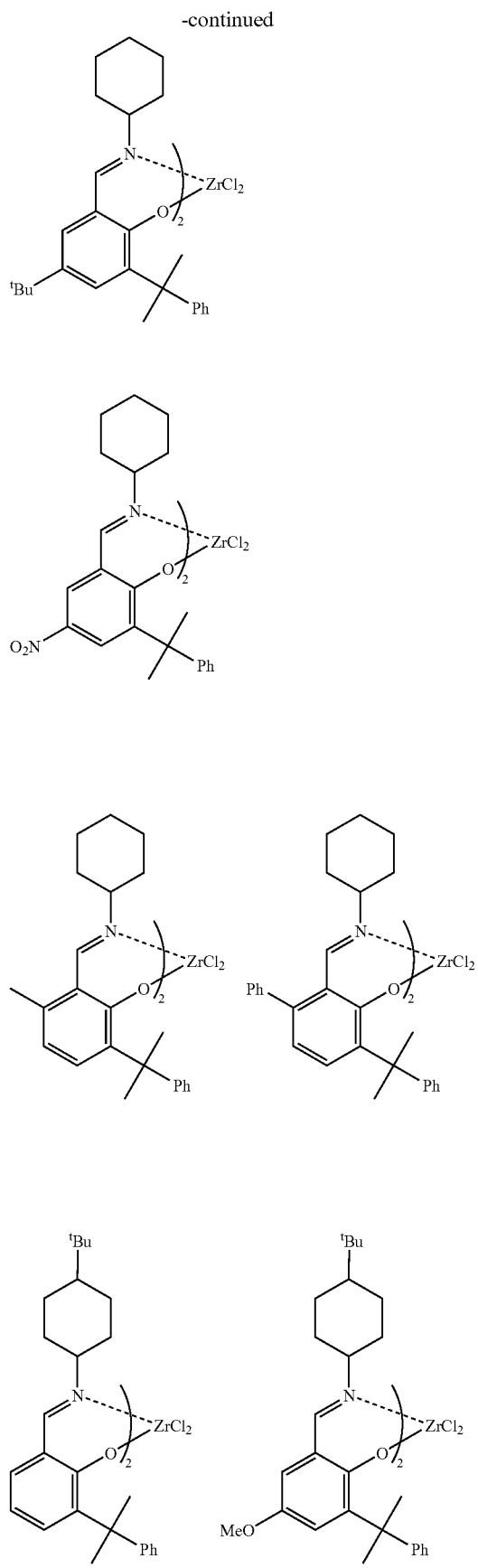

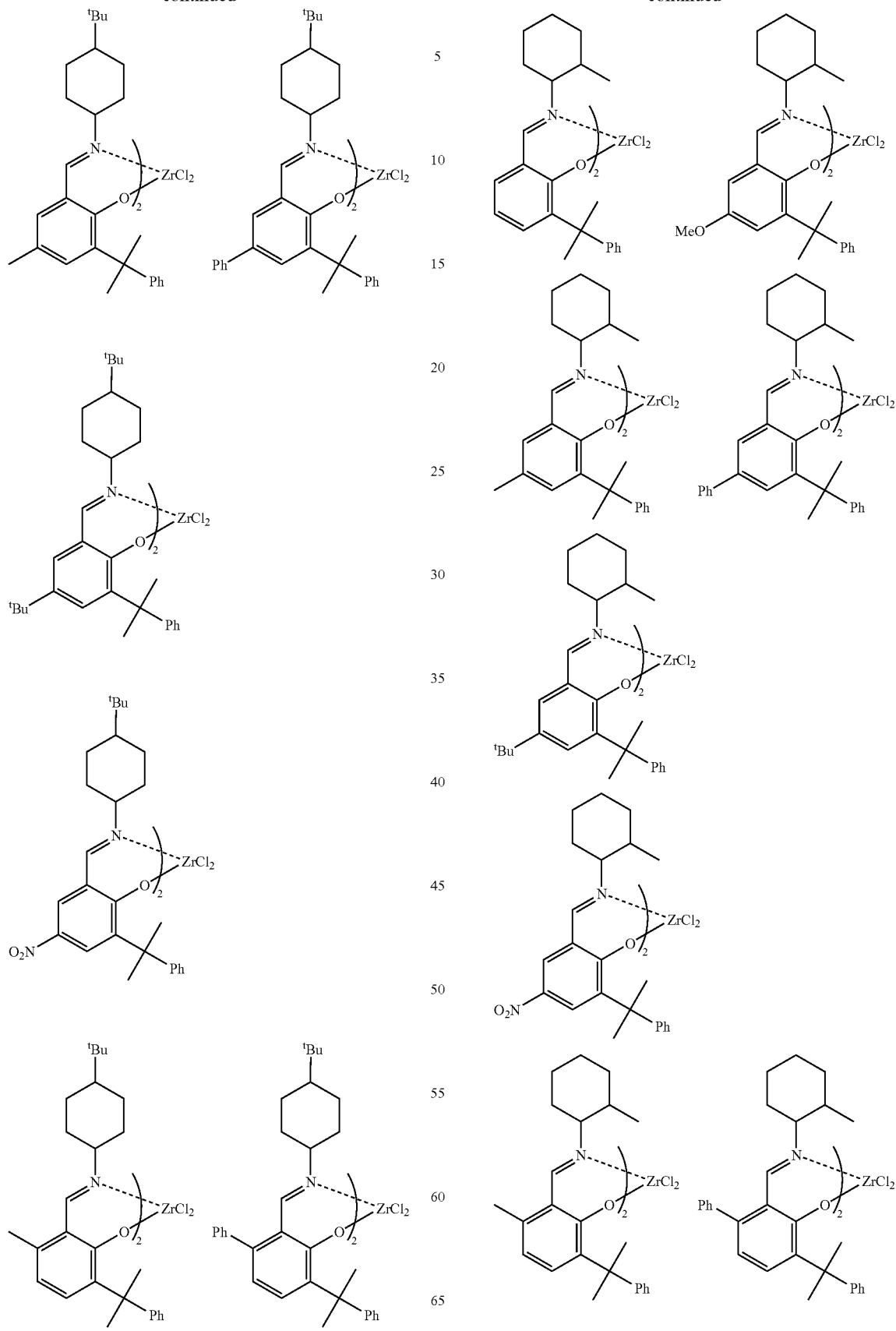

-continued
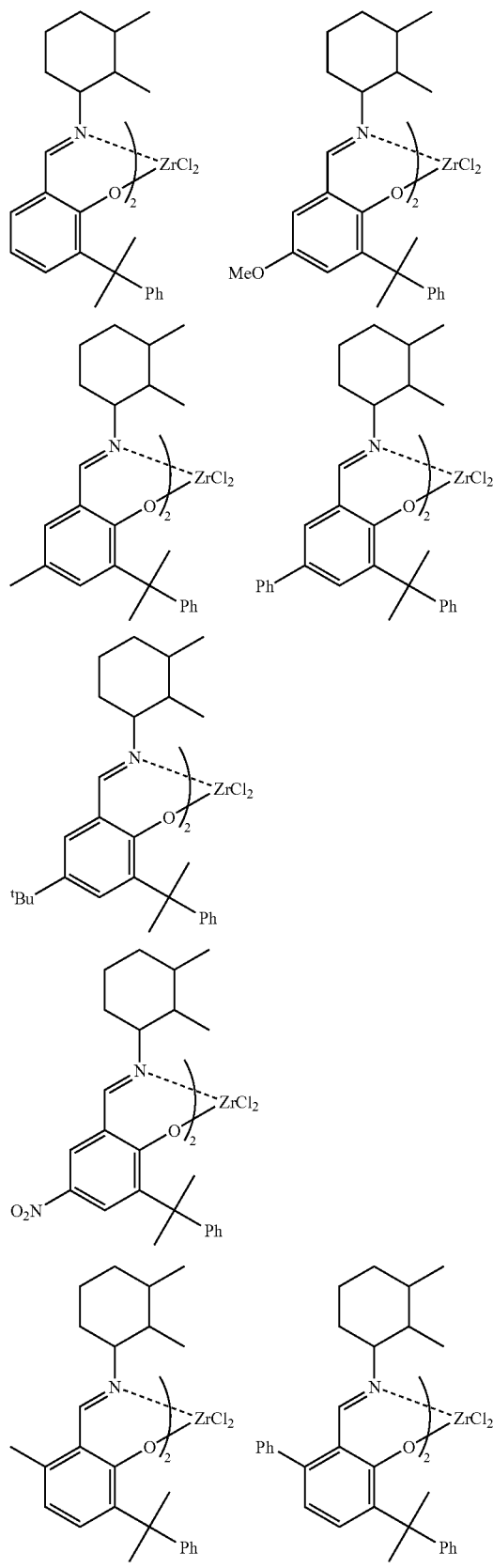
-continued
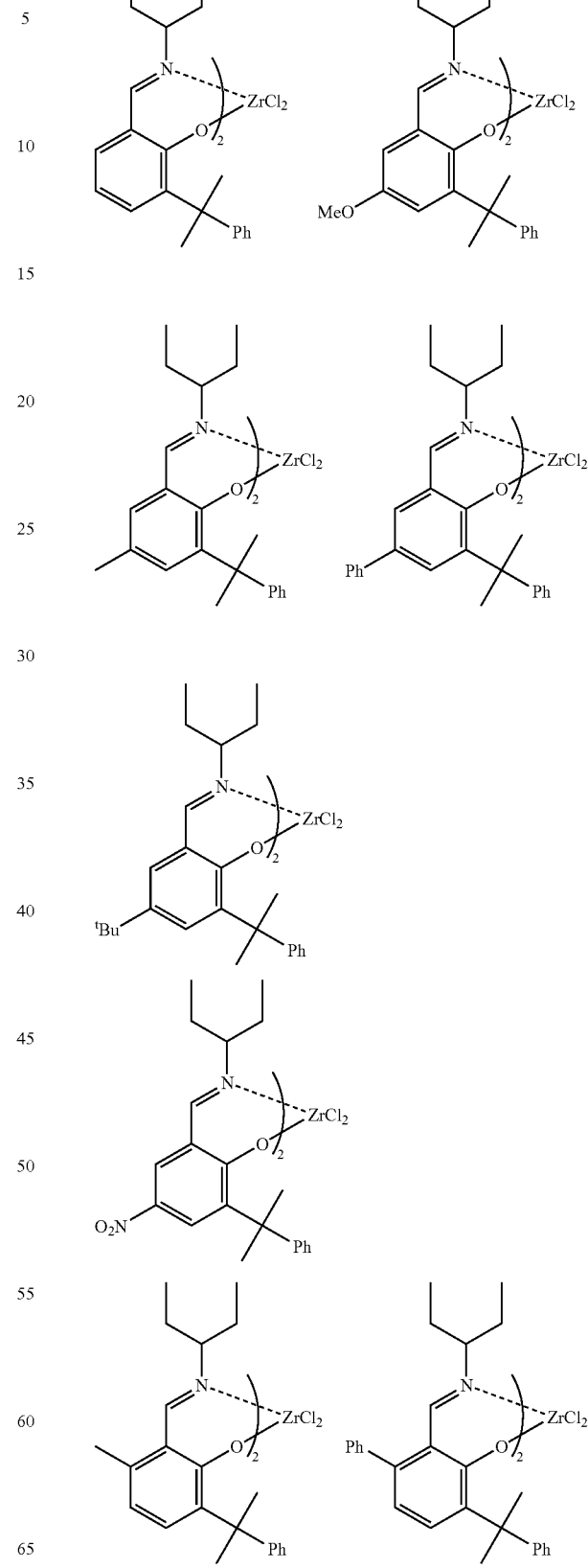

-continued
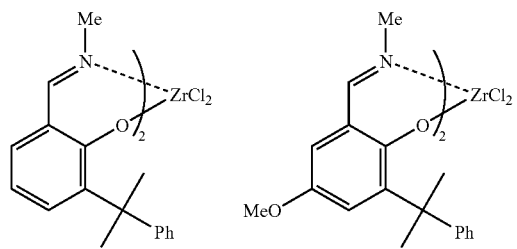
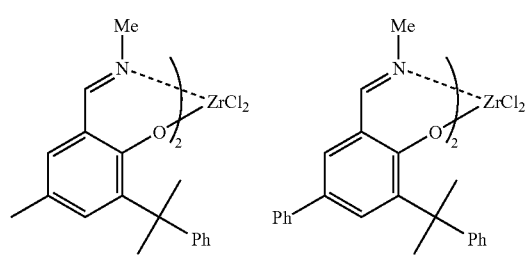
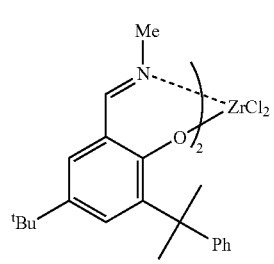
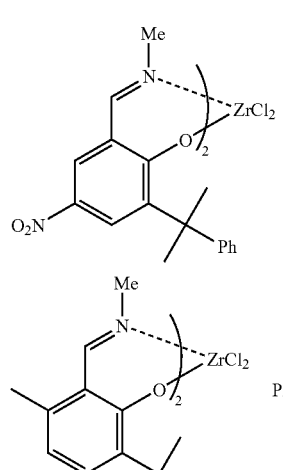
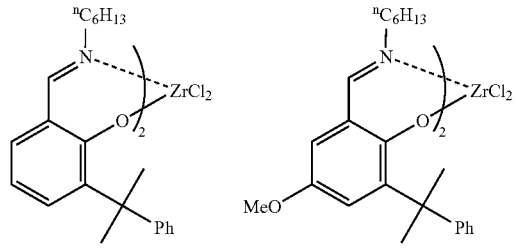
-continued
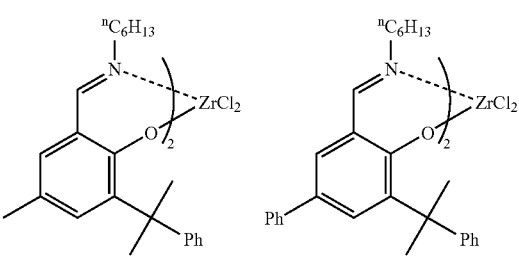

-continued
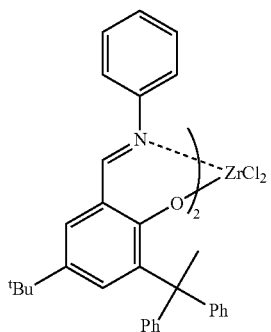
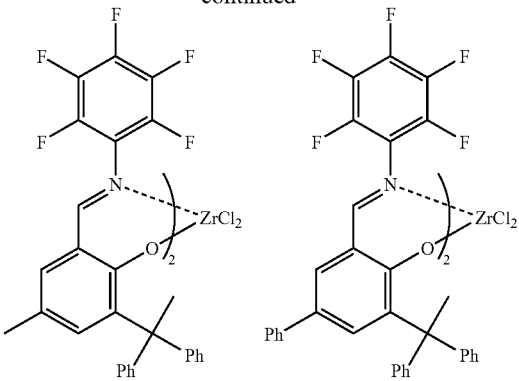
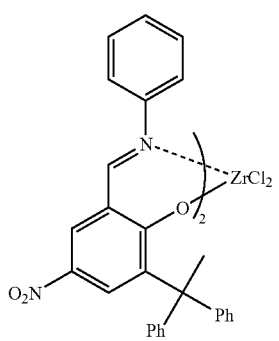
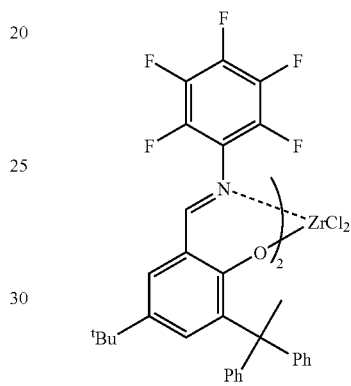
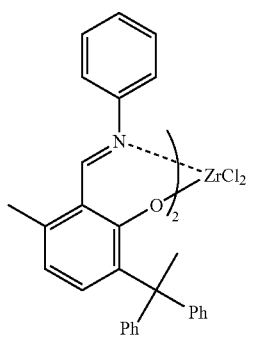
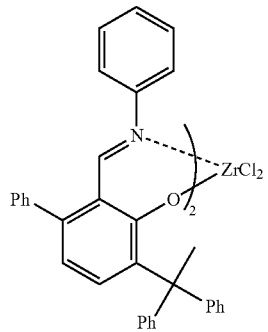
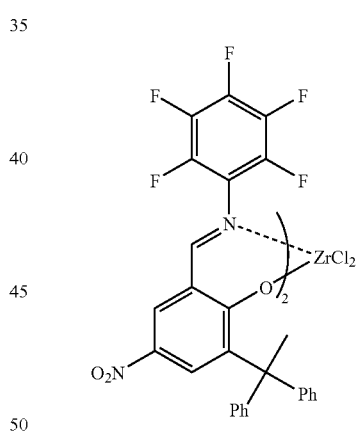
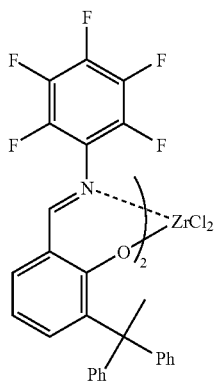
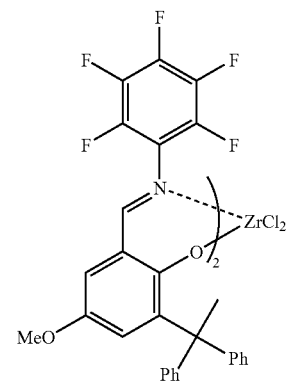
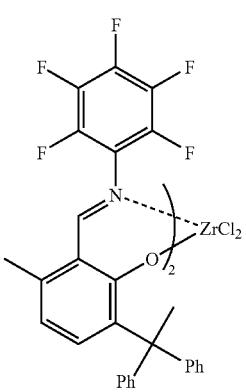
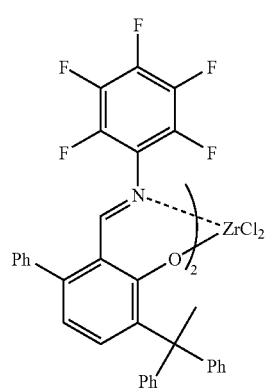

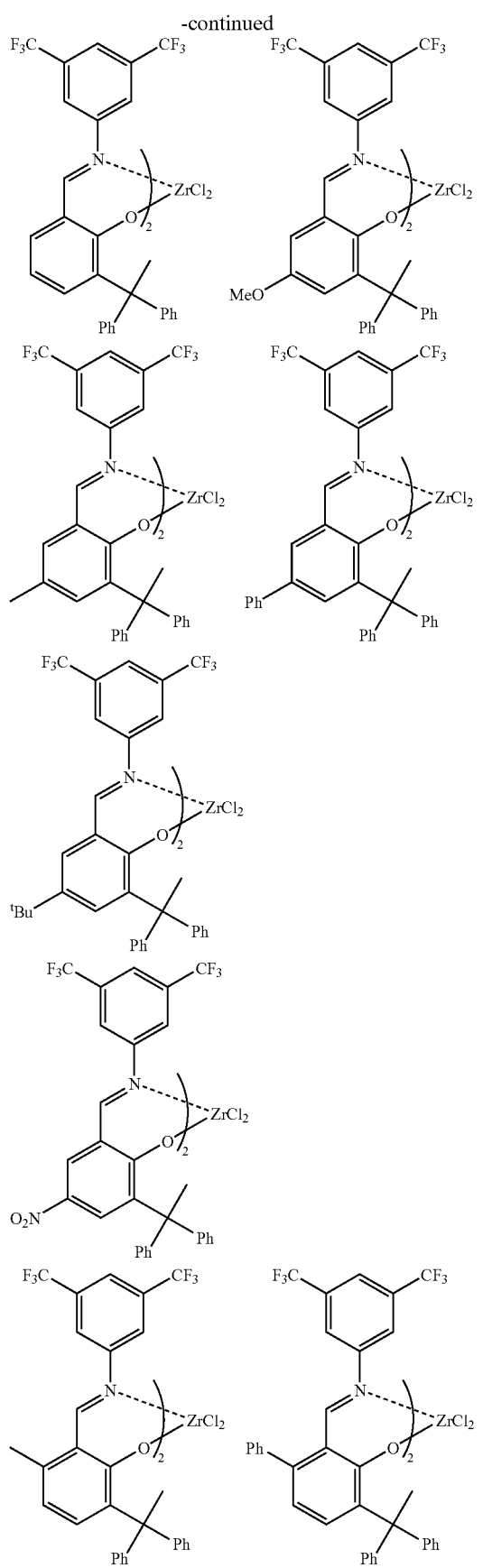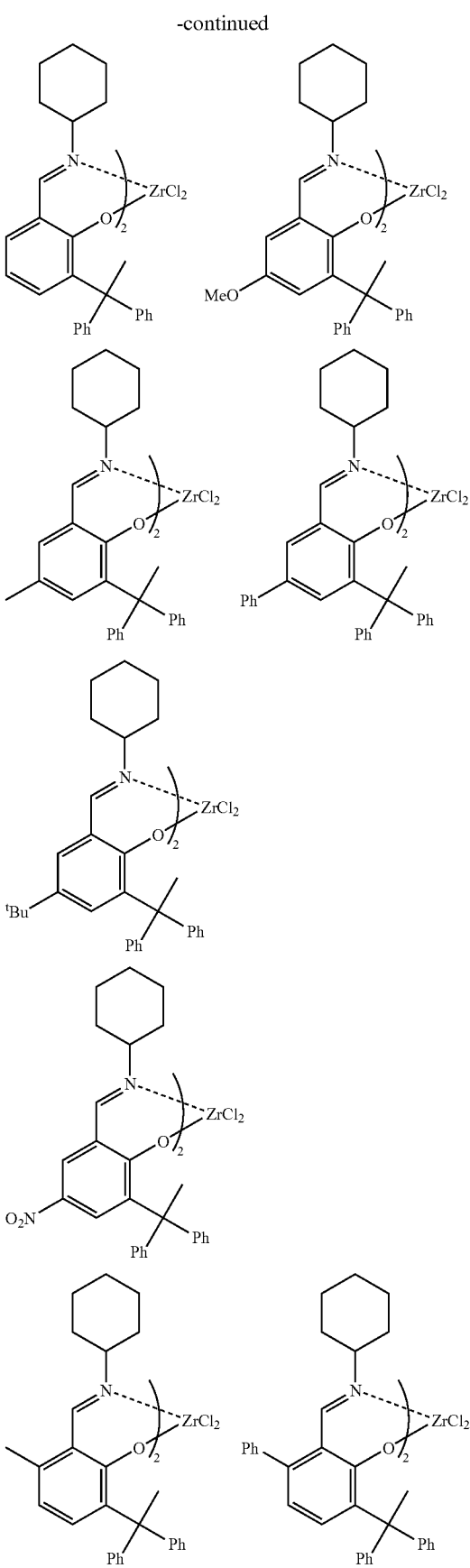

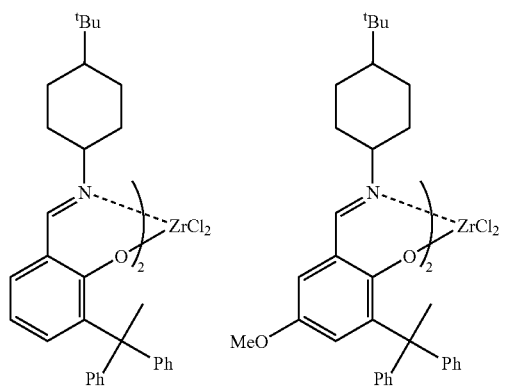
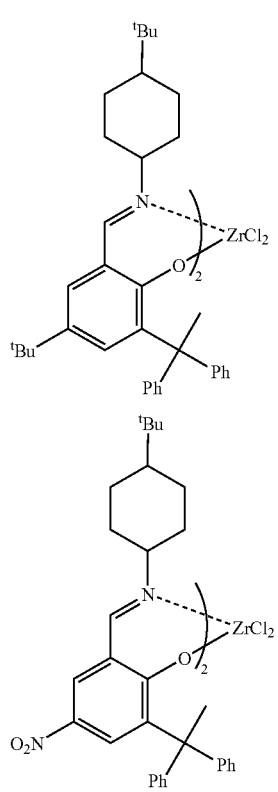
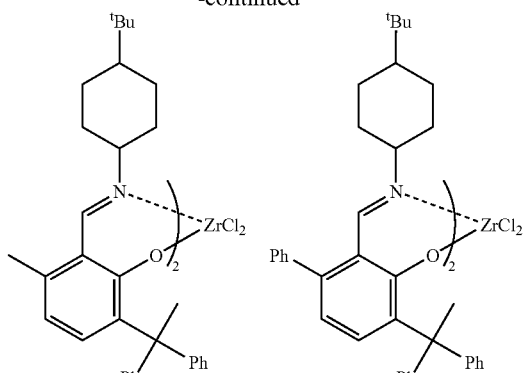
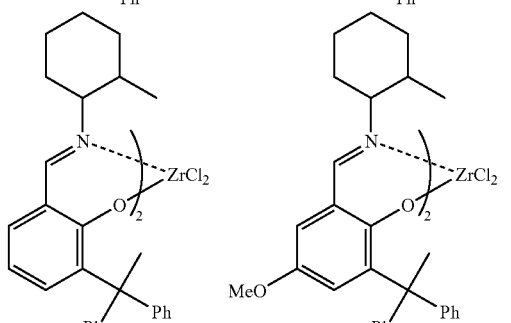
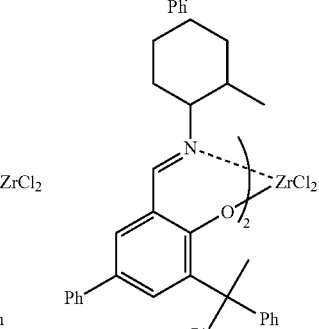
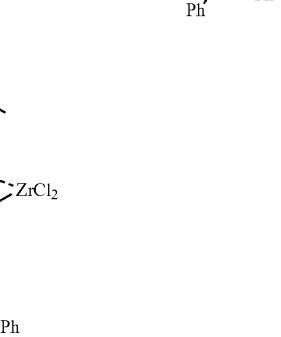
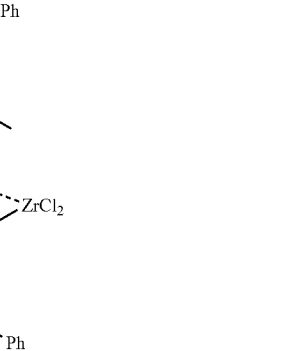

-continued
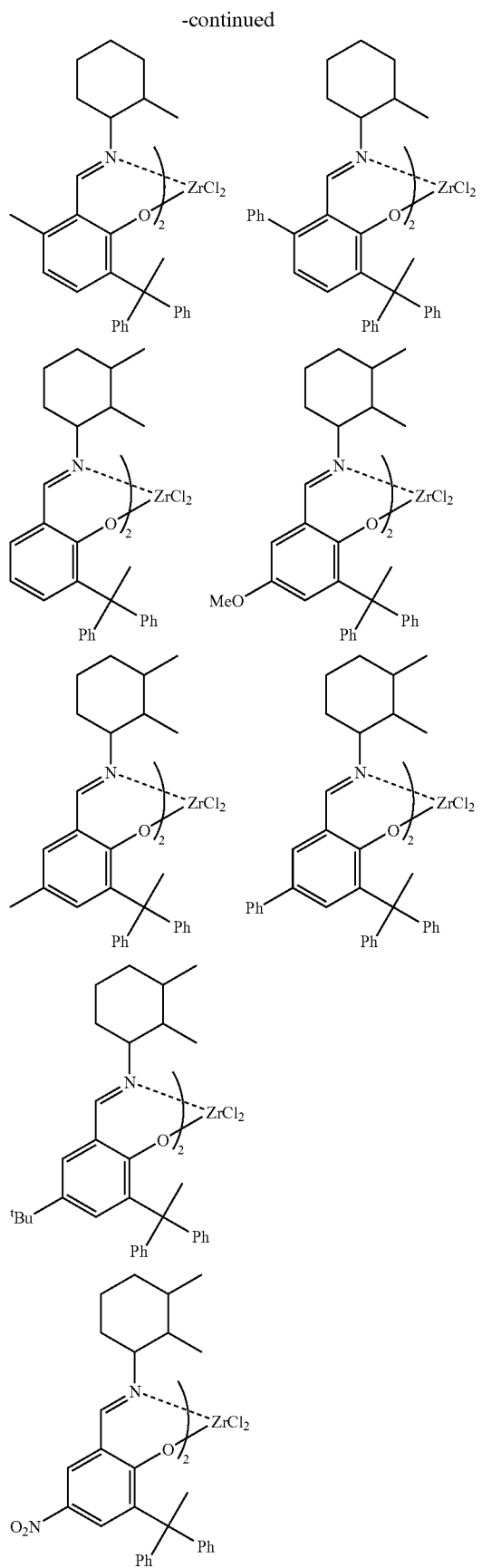
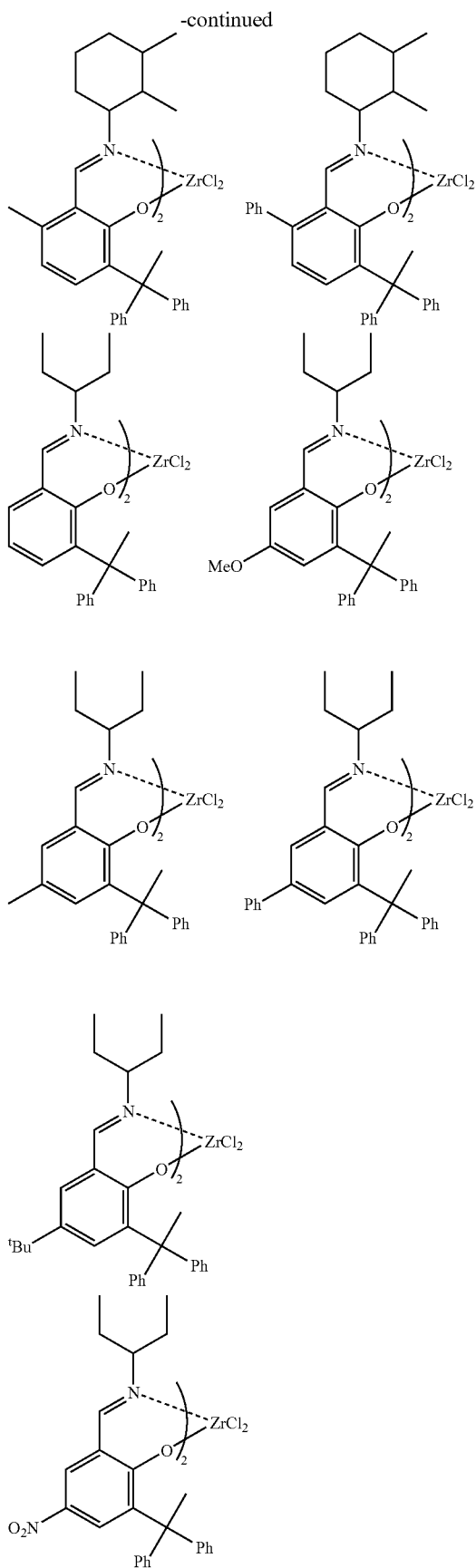

-continued

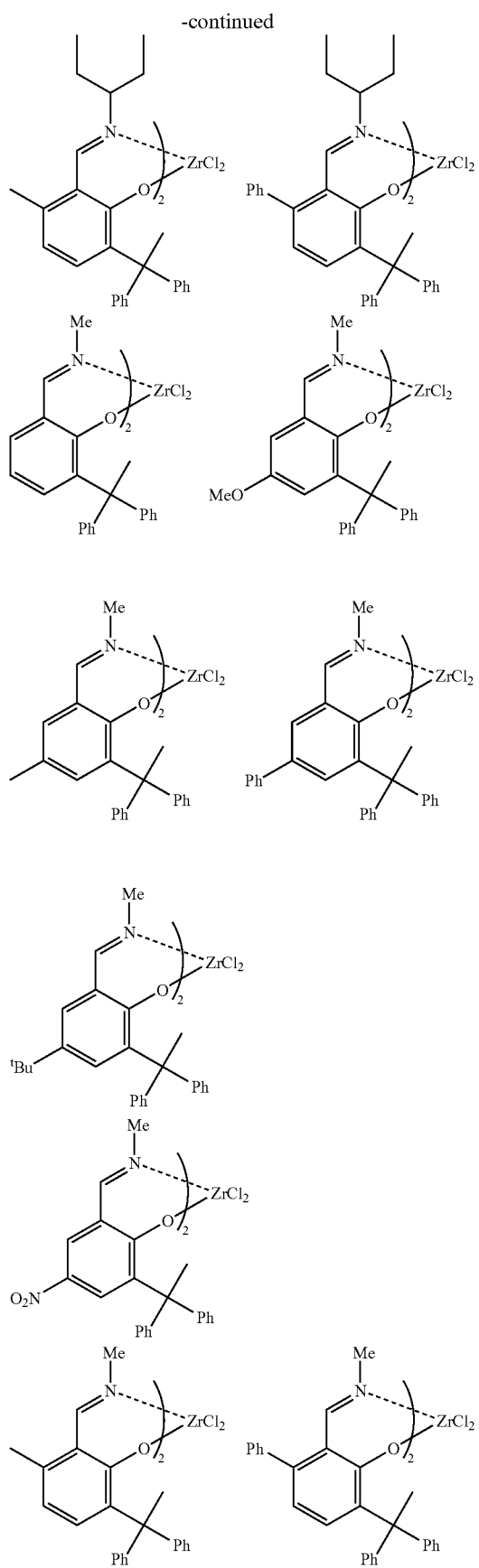

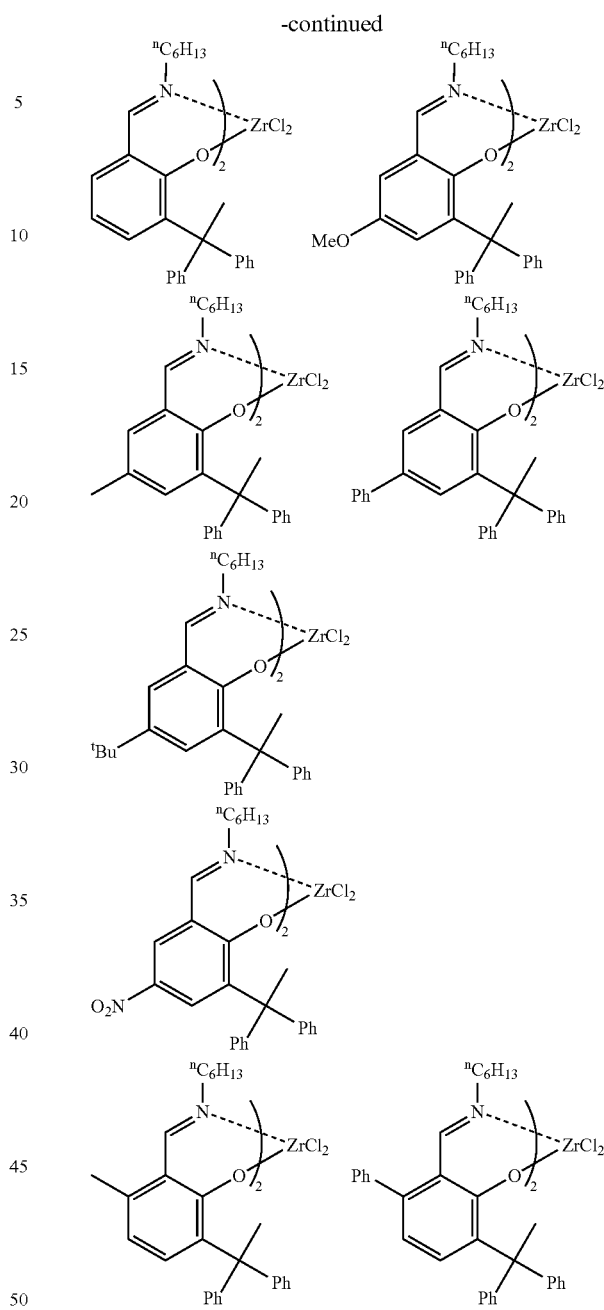

In the above-illustrated compounds, $^t$Bu indicates a t-butyl group, OMe indicates a methoxy group, Ph indicates a phenyl group, Me indicates a methyl group, and Adm indicates an adamanthyl group.

The transition metal compounds in the present invention can also be exemplified by those derivatives of the above compounds wherein zirconium was replaced by a metal selected from the groups 4 and 5 in the periodic table, such as titanium, hafnium, vanadium etc.

Compound (a-2)

As the component (A) in the present invention, compound (a-2) represented by the following general formula (IVa) can be used.

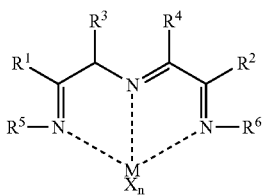

(IVa)

In formula (IVa), M is a transition metal atom selected from the groups 3 to 7 in the periodic table, preferably a transition metal atom selected from the groups 4 and 5. Specifically, M is titanium, zirconium, hafnium, vanadium, niobium or tantalum, preferably titanium, zirconium or vanadium.

In formula (IVa), $R^1$ to $R^6$ may be the same or different and each represent a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group or a tin-containing group, and two or more of these groups may be bound to each other to form a ring such as an aromatic ring, an aliphatic ring, or a hydrocarbon ring containing a heteroatom such as a nitrogen atom, a sulfur atom and an oxygen atom. Each of $R^5$ and $R^6$ is preferably a hydrocarbon group, more preferably an aryl group substituted with an alkyl group.

The halogen atom and hydrocarbon group represented by $R^1$ to $R^6$ in formula (IVa) include the same halogen atoms and hydrocarbon groups as illustrated for $R^1$ to $R^7$ in the formula (I) above.

The hydrocarbon group represented by $R^1$ to $R^6$ in formula (IVa) may be substituted with an oxygen-containing group, a nitrogen-containing group, a boron-containing group, a sulfur-containing group, a phosphorus-containing group, a silicon-containing group, a germanium-containing group, a tin-containing group etc., wherein an atomic group characterizing the substituent group such as the oxygen-containing group is desirably not directly bound to N in formula (IVa).

The hydrocarbon group is particularly a $C_{1-30}$, preferably $C_{1-20}$, linear or branched alkyl group such as methyl, ethyl, n-propyl, isopropyl, n-butyl, isobutyl, sec-butyl, t-butyl, neopentyl, n-hexyl etc.; a $C_{6-30}$, preferably $C_{6-20}$, aryl group such as phenyl, naphthyl, biphenylyl, terphenylyl, phenanthryl, anthryl etc.; and a substituted aryl group substituted with 1 to 5 substituent atoms or groups such as a halogen atom, a $C_{1-30}$, preferably $C_{1-20}$, alkyl group or alkoxy group, a $C_{6-30}$, preferably $C_{6-20}$, aryl group or aryloxy group.

In formula (IVa), two or more groups of $R^1$ to $R^6$, preferably adjacent groups, may be bound to each other to form an aromatic ring, an aliphatic ring, or a hydrocarbon ring containing a nitrogen atom, a sulfur atom, an oxygen atom etc., and these rings may further have a substituent group, and particularly $R^3$ and $R^4$ are preferably bound to each other to form an aromatic ring.

The oxygen-containing group, nitrogen-containing group, boron-containing group, sulfur-containing group, phosphorus-containing group, heterocyclic compound residue, silicon-containing group, germanium-containing group and tin-containing group represented by $R^1$ to $R^6$ in formula (IVa) include the same groups as illustrated for $R^1$ to $R^7$ in the formula (I) above.

More specific groups of $R^1$ to $R^6$ in formula (IVa) include the more specific groups illustrated as $R^1$ to $R^7$ in the formula (I) above.

In formula (IVa), n is a number satisfying the valence of M, and is specifically an integer of 1 to 5, preferably 1 to 4, more preferably 1 to 3.

In formula (IVa), X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group.

The halogen atom, hydrocarbon group, oxygen-containing group, sulfur-containing group, nitrogen-containing group, boron-containing group, aluminum-containing group, phosphorus-containing group, halogen-containing group, heterocyclic compound residue, silicon-containing group, germanium-containing group and tin-containing group represented by X in formula (IVa) include the same atoms or groups as illustrated for $X^1$ in the formula (I) above.

The hydrocarbon group is preferably a $C_{1-20}$ group.

When n is 2 or more, a plurality of groups represented by Xs may be the same or different, and a plurality of groups represented by Xs may be bound to one another to form a ring.

Compound (a-2) represented by the general formula (IVa) above is preferably a compound represented by the following general formula (IVa'):

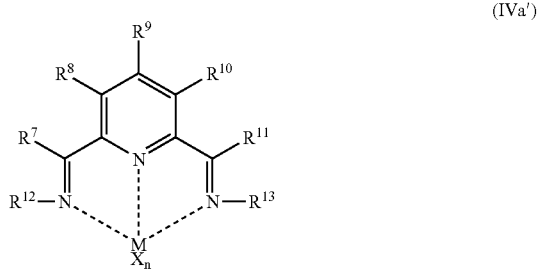

(IVa')

In formula (IVa'), M is a transition metal atom selected from the groups 4 and 5 in the periodic table, and specifically M is titanium, zirconium, vanadium, niobium or tantalum.

In formula (IVa'), $R^7$ to $R^{13}$ may be the same or different and each represent a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group or a tin-containing group, and two or more of these groups may be bound to each other to form a ring. Each of $R^{12}$ and $R^{13}$ is preferably a hydrocarbon group, more preferably an aryl group substituted with an o-alkyl group.

The halogen atom and hydrocarbon group represented by $R^7$ to $R^{13}$ in formula (IVa') include the same atoms and groups as illustrated for $R^1$ to $R^7$ in the general formula (I) above.

The hydrocarbon group may be substituted with an oxygen-containing group, a nitrogen-containing group, a boron-containing group, a sulfur-containing group, a phosphorus-containing group, a silicon-containing group, a germanium-containing group, a tin-containing group etc., wherein an atomic group characterizing the substituent group such as the oxygen-containing group is desirably not directly bound to N in formula (IVa').

The oxygen-containing group, nitrogen-containing group, boron-containing group, sulfur-containing group, phosphorus-containing group, heterocyclic compound residue, silicon-containing group, germanium-containing group and tin-containing group represented by $R^7$ to $R^{13}$ in formula (IVa') include the same groups as illustrated for $R^1$ to $R^7$ in the general formula (I) above.

More specific groups of $R^7$ to $R^{13}$ in formula (IVa') include the more specific groups illustrated above as those of $R^1$ to $R^7$ in the formula (I) above.

In formula (IVa'), n is a number satisfying the valence of M, and is specifically an integer of 1 to 5, preferably 1 to 4, more preferably 1 to 3.

In formula (IVa'), X represents a hydrogen atom, a halogen atom, a hydrocarbon group, an oxygen-containing group, a sulfur-containing group, a nitrogen-containing group, a boron-containing group, a phosphorus-containing group, a halogen-containing group, a heterocyclic compound residue, an aluminum-containing group, a silicon-containing group, a germanium-containing group or a tin-containing group.

The halogen atom, hydrocarbon group, oxygen-containing group, sulfur-containing group, nitrogen-containing group, boron-containing group, aluminum-containing group, phosphorus-containing group, halogen-containing group, heterocyclic compound residue, silicon-containing group, germanium-containing group and tin-containing group represented by X in formula (IVa') include the same atoms or groups as illustrated for $X^1$ in the formula (I) above.

When n is 2 or more, a plurality of groups represented by Xs may be the same or different, and a plurality of groups represented by Xs may be bound to one another to form a ring.

Specific examples of the compounds represented by the general formula (IVa) above are shown below.

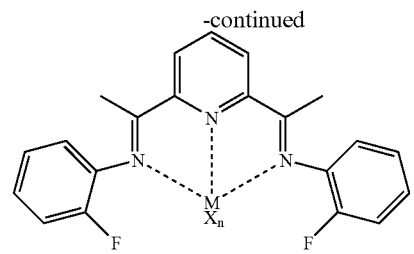

-continued

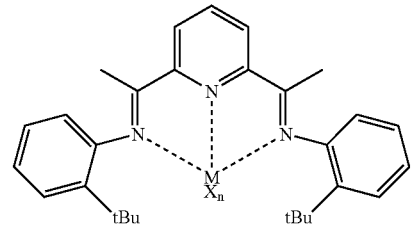

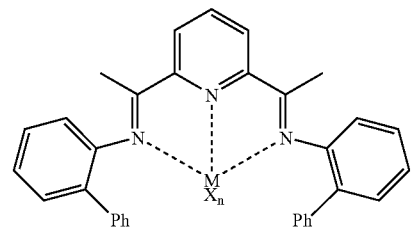

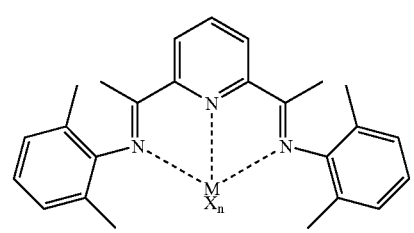

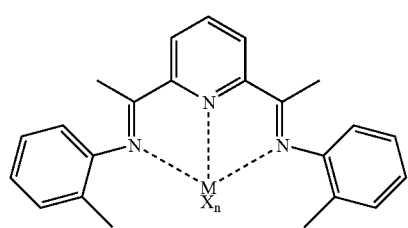

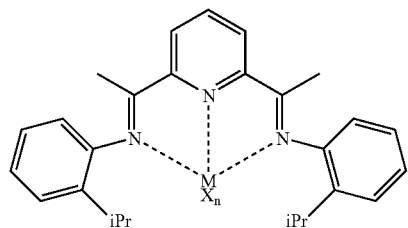

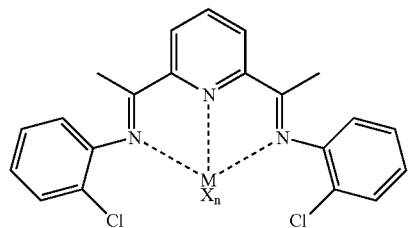

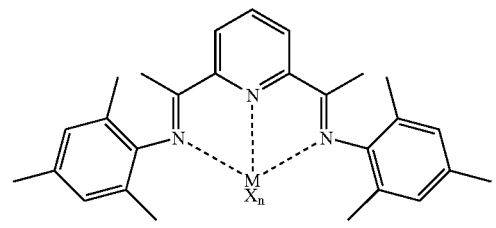

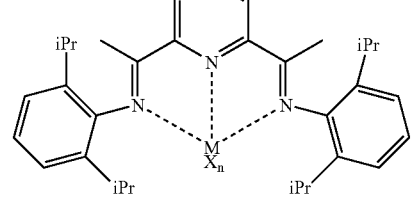

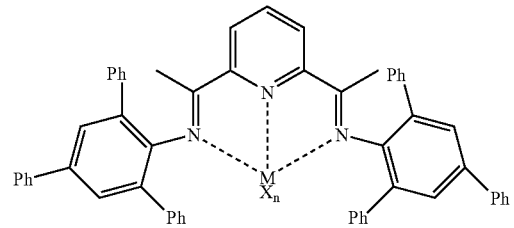

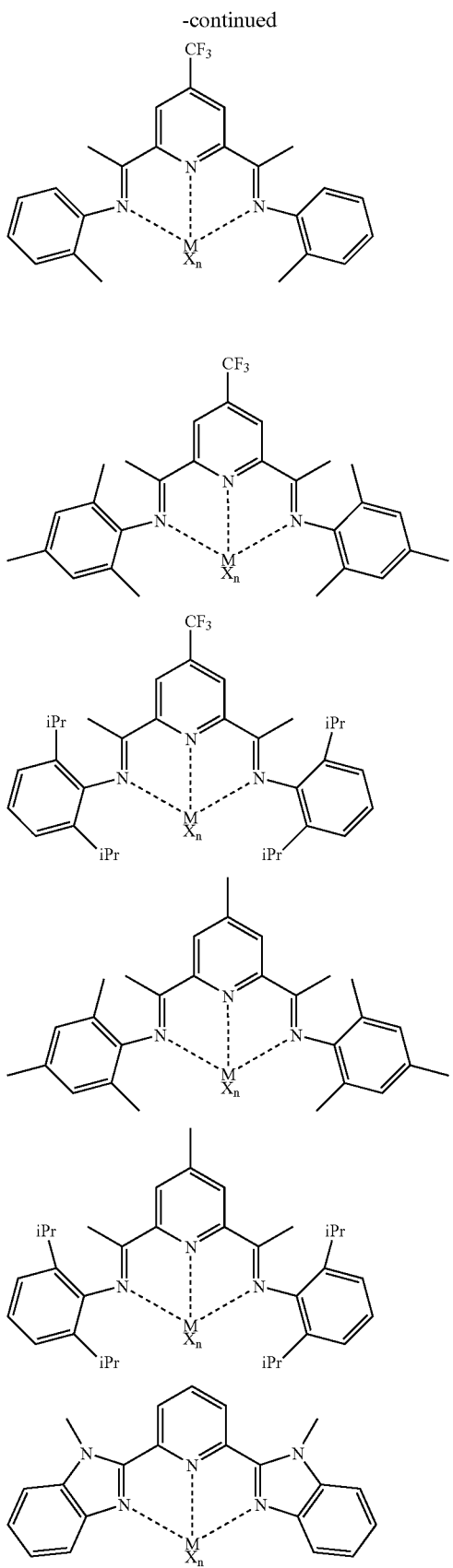

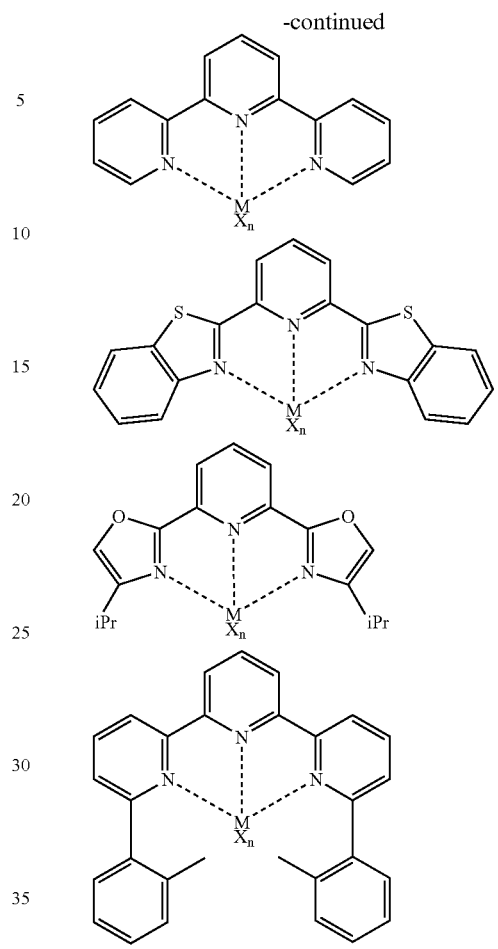

In the above-illustrated compounds, iPr indicates an isopropyl group, tBu indicates a t-butyl group, and Ph indicates a phenyl group.

Compound (a-3)

As the component (A) in the present invention, compound (a-3) represented by the following general formula (IVb) can be used.

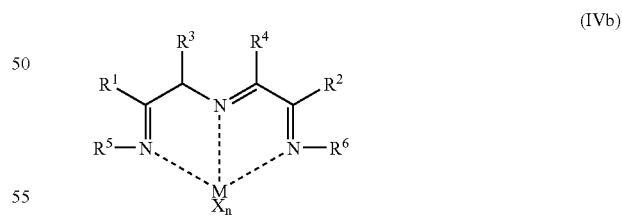

(IVb)

In formula (IVb), M is a transition metal atom selected from the groups 8 to 11 in the periodic table, preferably a transition metal atom selected form the group 8 and 9. Specifically, M is iron, ruthenium, osmium, cobalt, rhodium, iridium, nickel, palladium, copper etc., preferably iron, ruthenium, cobalt, rhodium etc., more preferably iron or cobalt.

In formula (IVb), $R^1$ to $R^6$ may be the same or different and each represent a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group or a tin-containing group, and two or more of these groups may be bound to each other to form a ring such as an aromatic ring, an aliphatic ring, or a hydrocarbon ring containing a heteroatom such as a nitrogen atom, a sulfur atom and an oxygen atom. Each of $R^5$ and $R^6$ is preferably a hydrocarbon group, more preferably an aryl group substituted with an alkyl group.

The halogen atom and hydrocarbon group represented by $R^1$ to $R^6$ in formula (IVb) include the same halogen atoms and hydrocarbon groups as illustrated for $R^1$ to $R^7$ in the formula (I) above.

The hydrocarbon group represented by $R^1$ to $R^6$ in formula (IVb) may be substituted with an oxygen-containing group, a nitrogen-containing group, a boron-containing group, a sulfur-containing group, a phosphorus-containing group, a silicon-containing group, a germanium-containing group, a tin-containing group etc., wherein an atomic group characterizing the substituent group such as the oxygen-containing group is desirably not directly bound to N in formula (IVb).

The hydrocarbon group is particularly a $C_{1-30}$, preferably $C_{1-20}$, linear or branched alkyl group such as methyl, ethyl, n-propyl, isopropyl, n-butyl, isobutyl, sec-butyl, t-butyl, neopentyl, n-hexyl etc.; a $C_{6-30}$, preferably $C_{6-20}$, aryl group such as phenyl, naphthyl, biphenylyl, terphenylyl, phenanthryl, anthryl etc.; and a substituted aryl group substituted with 1 to 5 substituent atoms or groups such as a halogen atom, a $C_{1-30}$, preferably $C_{1-20}$, alkyl group or alkoxy group, a $C_{6-30}$, preferably $C_{6-20}$, aryl group or aryloxy group.

In formula (IVb), two or more groups of $R^1$ to $R^6$, preferably adjacent groups, may be bound to each other to form an aromatic ring, an aliphatic ring, or a hydrocarbon ring containing a nitrogen atom, a sulfur atom, an oxygen atom etc., and these rings may further have a substituent group, and particularly $R^3$ and $R^4$ are preferably bound to each other to form an aromatic ring.

The oxygen-containing group, nitrogen-containing group, boron-containing group, sulfur-containing group, phosphorus-containing group, heterocyclic compound residue, silicon-containing group, germanium-containing group and tin-containing group represented by $R^1$ to $R^6$ in formula (IVb) include the same groups as illustrated for $R^1$ to $R^7$ in the formula (I) above.

More specific groups of $R^1$ to $R^6$ in formula (IVb) include the more specific groups illustrated above as those of $R^1$ to $R^7$ in the formula (I) above.

In formula (IVb), n is a number satisfying the valence of M, and is specifically an integer of 1 to 5, preferably 1 to 4, more preferably 1 to 3.

In formula (IVb), X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group.

The halogen atom, hydrocarbon group, oxygen-containing group, sulfur-containing group, nitrogen-containing group, boron-containing group, aluminum-containing group, phosphorus-containing group, halogen-containing group, heterocyclic compound residue, silicon-containing group, germanium-containing group and tin-containing group represented by X in formula (IVb) include the same atoms or groups as illustrated for $X^1$ in the formula (I) above.

The hydrocarbon group is preferably a $C_{1-20}$ group.

When n is 2 or more, a plurality of groups represented by Xs may be the same or different, and a plurality of groups represented by Xs may be bound to one another to form a ring.

Compound (a-3) represented by the general formula (IVb) above is preferably a compound represented by the following general formula (IVb'):

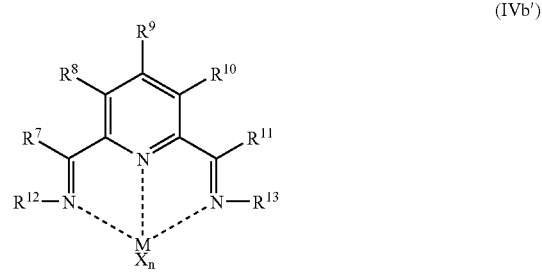

(IVb')

In formula (IVb'), M is a transition metal atom selected from the groups 8 and 9 in the periodic table, and specifically M is iron or cobalt.

In formula (IVb'), $R^7$ to $R^{13}$ may be the same or different and each represent a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group or a tin-containing group, and two or more of these groups may be bound to each other to form a ring. Each of $R^{12}$ and $R^{13}$ is preferably a hydrocarbon group, more preferably an aryl group substituted with an o-alkyl group.

The halogen atom and hydrocarbon group represented by $R^7$ to $R^{13}$ in formula (IVb') include the same atoms and groups as illustrated for $R^1$ to $R^7$ in the general formula (I) above.

The hydrocarbon group may be substituted with an oxygen-containing group, a nitrogen-containing group, a boron-containing group, a sulfur-containing group, a phosphorus-containing group, a silicon-containing group, a germanium-containing group, a tin-containing group etc., wherein an atomic group characterizing the substituent group such as the oxygen-containing group is desirably not directly bound to N in formula (IVb').

The oxygen-containing group, nitrogen-containing group, boron-containing group, sulfur-containing group, phosphorus-containing group, heterocyclic compound residue, silicon-containing group, germanium-containing group and tin-containing group represented by $R^7$ to $R^{13}$ in formula (IVb') include the same groups as illustrated for $R^1$ to $R^7$ in the general formula (I) above.

More specific groups of $R^7$ to $R^{13}$ in formula (IVb') include the more specific groups illustrated above as those of $R^1$ to $R^7$ in the formula (I) above.

In formula (IVb'), n is a number satisfying the valence of M, and is specifically an integer of 1 to 5, preferably 1 to 4, more preferably 1 to 3.

In formula (IVb'), X represents a hydrogen atom, a halogen atom, a hydrocarbon group, an oxygen-containing group, a sulfur-containing group, a nitrogen-containing group, a boron-containing group, a phosphorus-containing group, a halogen-containing group, a heterocyclic compound residue, an aluminum-containing group, a silicon-containing group, a germanium-containing group or a tin-containing group.

The halogen atom, hydrocarbon group, oxygen-containing group, sulfur-containing group, nitrogen-containing group, boron-containing group, aluminum-containing group, phosphorus-containing group, halogen-containing group, heterocyclic compound residue, silicon-containing group, germanium-containing group and tin-containing group represented by X in formula (IVb') include the same atoms or groups as illustrated for $X^1$ in the formula (I) above.

When n is 2 or more, a plurality of groups represented by Xs may be the same or different, and a plurality of groups represented by Xs may be bound to one another to form a ring.

Specific examples of the compounds represented by the general formula (IVb) above are shown below.

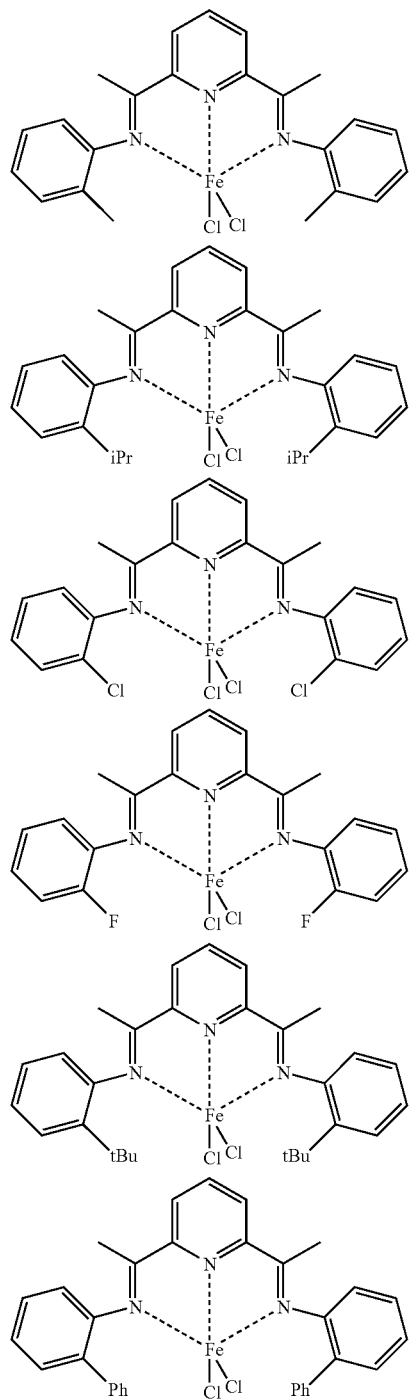

-continued

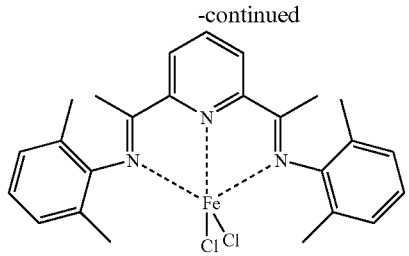

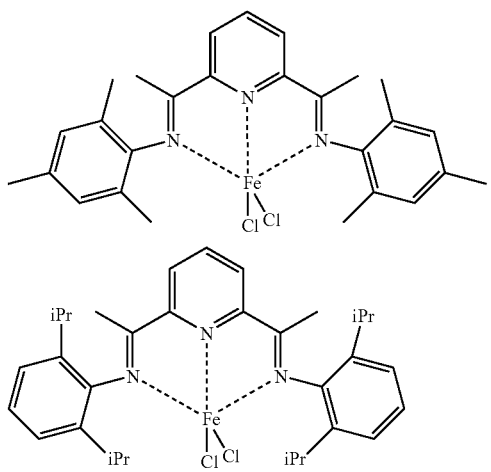

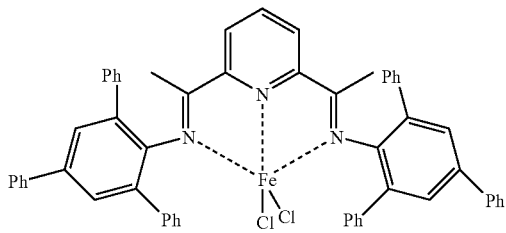

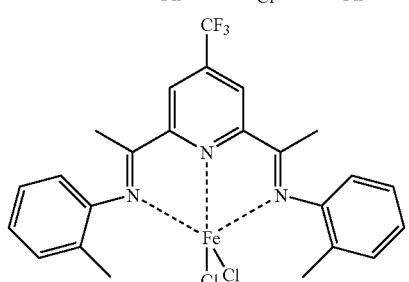

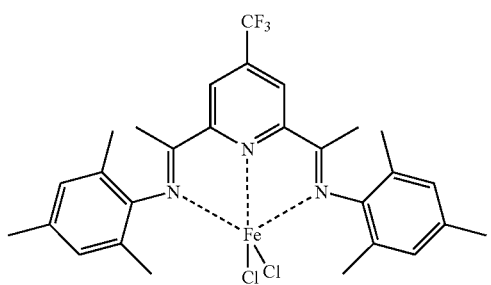

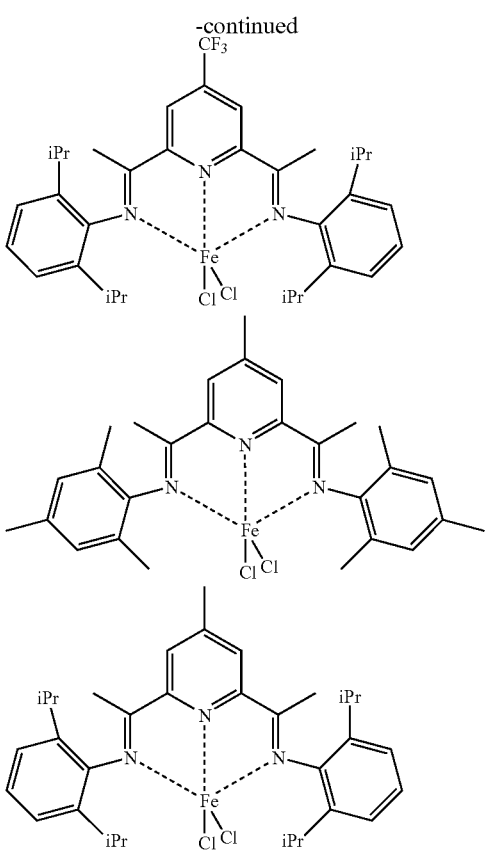

In the above-illustrated compounds, iPr indicates an isopropyl group, tBu indicates a t-butyl group, and Ph indicates a phenyl group.

In the present invention, transition metal compounds wherein in the compounds described above, iron was replaced by a non-iron metal such as rhodium and cobalt selected from the groups 8 to 11 in the periodic table can also be mentioned.

Compound (a-4)

As the component (A) in the present invention, compound (a-4) represented by the following general formula (IVc) can be used.

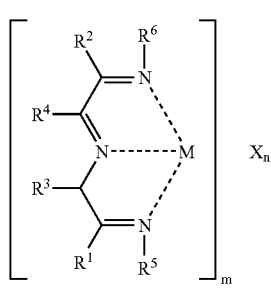

(IVc)

In formula (IVc), M is a transition metal atom selected from the groups 3 to 11 in the periodic table, preferably a transition metal atom selected from the groups 4 and 5 and the groups 8 and 9. Specifically, M is titanium, zirconium, hafnium, vanadium, niobium, tantalum, iron, rhenium, osmium, cobalt, rhodium, iridium, nickel, palladium, copper etc., preferably titanium, zirconium, vanadium, niobium, tantalum, iron, rhenium, cobalt, rhodium etc., more preferably titanium, zirconium, vanadium, iron or cobalt.

In formula (IVc), m is an integer of 1 to 6, preferably an integer of 1 to 4, more preferably an integer of 1 to 3, still more preferably an integer of 1 to 2.

In formula (IVc), $R^1$ to $R^6$ may be the same or different and each represent a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group or a tin-containing group, and two or more of these groups may be bound to each other to form a ring such as an aromatic ring, an aliphatic ring, or a hydrocarbon ring containing a heteroatom such as a nitrogen atom, a sulfur atom and an oxygen atom. Each of $R^5$ and $R^6$ is preferably a hydrocarbon group, more preferably an aryl group substituted with an alkyl group.

The halogen atom and hydrocarbon group represented by $R^1$ to $R^6$ in formula (IVc) include the same halogen atoms and hydrocarbon groups as illustrated for $R^1$ to $R^7$ in the formula (I) above.

The hydrocarbon group represented by $R^1$ to $R^6$ in formula (IVc) may be substituted with an oxygen-containing group, a nitrogen-containing group, a boron-containing group, a sulfur-containing group, a phosphorus-containing group, a silicon-containing group, a germanium-containing group, a tin-containing group etc., wherein an atomic group characterizing the substituent group such as the oxygen-containing group is desirably not directly bound to N in formula (IVc).

The hydrocarbon group is particularly a $C_{1-30}$, preferably $C_{1-20}$, linear or branched alkyl group such as methyl, ethyl, n-propyl, isopropyl, n-butyl, isobutyl, sec-butyl, t-butyl, neopentyl, n-hexyl etc.; a $C_{6-30}$, preferably $C_{6-20}$, aryl group such as phenyl, naphthyl, biphenylyl, terphenylyl, phenanthryl, anthryl etc.; and a substituted aryl group substituted with 1 to 5 substituent atoms or groups such as a halogen atom, a $C_{1-30}$, preferably $C_{1-20}$, alkyl group or alkoxy group, a $C_{6-30}$, preferably $C_{6-20}$, aryl group or aryloxy group.

In formula (IVc), two or more groups of $R^1$ to $R^6$, preferably adjacent groups, may be bound to each other to form an aromatic ring, an aliphatic ring, or a hydrocarbon ring containing a nitrogen atom, a sulfur atom, an oxygen atom etc., and these rings may further have a substituent group, and particularly $R^3$ and $R^4$ are preferably bound to each other to form an aromatic ring.

The oxygen-containing group, nitrogen-containing group, boron-containing group, sulfur-containing group, phosphorus-containing group, heterocyclic compound residue, silicon-containing group, germanium-containing group and tin-containing group represented by $R^1$ to $R^6$ in formula (IVc) include the same groups as illustrated for $R^1$ to $R^7$ in the formula (I) above.

More specific groups of $R^1$ to $R^6$ in formula (IVc) include the more specific groups illustrated above as those of $R^1$ to $R^7$ in the formula (I) above.

In formula (IVc), n is a number satisfying the valence of M, and is specifically an integer of 1 to 5, preferably 1 to 4, more preferably 1 to 3.

When n is 1, X is an oxygen atom, and when n is 2 or more, at least one of Xs is an oxygen atom, and other Xs represent a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group.

The halogen atom, hydrocarbon group, oxygen-containing group, sulfur-containing group, nitrogen-containing group, boron-containing group, aluminum-containing group, phosphorus-containing group, halogen-containing group, heterocyclic compound residue, silicon-containing group, germanium-containing group and tin-containing group represented by X in formula (IVc) include the same atoms or groups as illustrated for $X^1$ in the formula (I) above.

The hydrocarbon group is preferably a $C_{1-20}$ group.

When n is 2 or more, a plurality of groups represented by Xs may be the same or different, and a plurality of groups represented by Xs may be bound to one another to form a ring.

Compound (a-4) represented by the general formula (IVc) above is preferably a compound represented by the following general formula (IVc'):

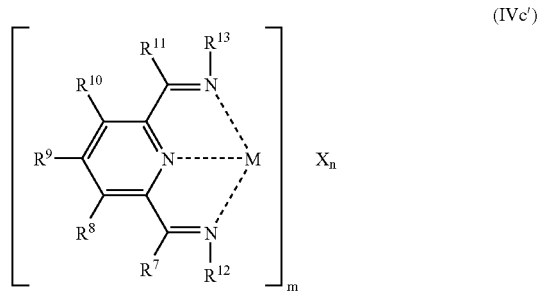

In formula (IVc'), M is a transition metal atom selected from the groups 4 and 5 and the groups 8 and 9 in the periodic table, and specifically M is titanium, zirconium, vanadium, niobium, tantalum, iron or cobalt.

In formula (IVc'), m is an integer of 1 to 6, preferably an integer of 1 to 4, more preferably an integer of 1 to 3, still more preferably an integer of 1 to 2.

In formula (IVc'), $R^7$ to $R^{13}$ may be the same or different and each represent a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group or a tin-containing group, and two or more of these groups may be bound to each other to form a ring. Each of $R^{12}$ and $R^{13}$ is preferably a hydrocarbon group, more preferably an aryl group substituted with an o-alkyl group.

The halogen atom and hydrocarbon group represented by $R^7$ to $R^{13}$ in formula (IVc') include the same atoms and groups as illustrated for $R^1$ to $R^7$ in the general formula (I) above.

The hydrocarbon group may be substituted with an oxygen-containing group, a nitrogen-containing group, a boron-containing group, a sulfur-containing group, a phosphorus-containing group, a silicon-containing group, a germanium-containing group, a tin-containing group etc., wherein an atomic group characterizing the substituent group such as the oxygen-containing group is desirably not directly bound to N in formula (IVc').

The oxygen-containing group, nitrogen-containing group, boron-containing group, sulfur-containing group, phosphorus-containing group, heterocyclic compound residue, silicon-containing group, germanium-containing group and tin-containing group represented by $R^7$ to $R^{13}$ in formula (IVc') include the same groups as illustrated for $R^1$ to $R^7$ in the general formula (I) above.

More specific groups of $R^7$ to $R^3$ in formula (IVc') include the more specific groups illustrated above as those of $R^1$ to $R^7$ in the formula (I) above.

In formula (IVc'), n is a number satisfying the valence of M, and is specifically an integer of 1 to 5, preferably 1 to 4, more preferably 1 to 3.

When n is 1, X is an oxygen atom, and when n is 2 or more, at least one of Xs is an oxygen atom, and other Xs represent a hydrogen atom, a halogen atom, an oxygen atom, a hydrocarbon group, an oxygen-containing group, a sulfur-containing group, a nitrogen-containing group, a boron-containing group, a phosphorus-containing group, a halogen-containing group, a heterocyclic compound residue, an aluminum-containing group, a silicon-containing group, a germanium-containing group or a tin-containing group.

The halogen atom, hydrocarbon group, oxygen-containing group, sulfur-containing group, nitrogen-containing group, boron-containing group, aluminum-containing group, phosphorus-containing group, halogen-containing group, heterocyclic compound residue, silicon-containing group, germanium-containing group and tin-containing group represented by X in formula (IVc') include the same atoms or groups as illustrated for $X^1$ in the formula (I) above.

When n is 2 or more, a plurality of groups represented by Xs may be the same or different, and a plurality of groups represented by Xs may be bound to one another to form a ring.

Compound (a-5)

As the component (A) in the present invention, compound (a-5) represented by the following general formula (V) can be used.

In formula (V), M is a transition metal atom selected from the groups 3 to 6 in the periodic table, preferably the group 4 atom, and specifically M is titanium, zirconium or hafnium.

In formula (V), R and R" may be the same or different and each represent a hydrogen atom, a $C_{1-50}$ hydrocarbon group, a $C_{1-50}$ halogenated hydrocarbon group, an organic silyl group, or a substituent group having at least one atom selected from nitrogen, oxygen, phosphorus, sulfur and silicon, preferably a hydrocarbon group.

The $C_{1-50}$ hydrocarbon group and $C_{1-50}$ halogenated hydrocarbon group represented by R and R' in formula (V) include, for example, the hydrocarbon group and halogenated hydrocarbon group illustrated as $R^1$ to $R^7$ in the general formula (I) above; the organic silyl group represented by R and R' includes, for example, the silicon-containing group illustrated as $R^1$ to $R^7$ in the general formula (I) above; and the substituent group having at least one atom selected from nitrogen, oxygen, phosphorus, sulfur and silicon represented by R and R' includes, for example, the nitrogen-, oxygen-, phosphorus-, sulfur- or silicon-containing residue out of the nitrogen-containing group, oxygen-containing group, sulfur-containing group and heterocyclic compound residue illustrated as $R^1$ to $R^7$ in the general formula (I) above.

In formula (V), n is a number satisfying the valence of M, and is specifically an integer of 1 to 5, preferably 1 to 4, more preferably 1 to 3.

In formula (V), Xs may be the same or different and each represent a hydrogen atom, a halogen atom, an oxygen atom, a $C_{1-20}$ hydrocarbon group, a $C_{1-20}$ halogenated hydrocarbon group, an oxygen-containing group, a sulfur-containing group, a silicon-containing group or a nitrogen-containing group, and Xs may be bound to each other to form a ring.

The halogen atom, $C_{1-20}$ hydrocarbon group, $C_{1-20}$ halogenated hydrocarbon group, oxygen-containing group, sulfur-containing group, silicon-containing group and nitrogen-containing group represented by X in formula (V) include, for example, the halogen atom, hydrocarbon group, halogenated hydrocarbon group, oxygen-containing group, sulfur-containing group, silicon-containing group and nitrogen-containing group illustrated as $R^1$ to $R^7$ in the general formula (I) above.

Specific examples of the compounds represented by the general formula (V) above are shown below.

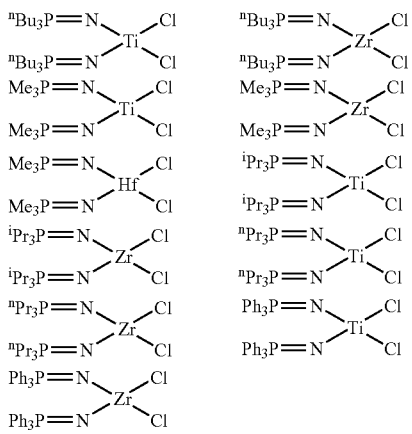

In the above-illustrated compounds, $^n$Bu indicates an n-butyl group, Me indicates a methyl group, $^i$Pr indicates an isopropyl group, and Ph indicates a phenyl group.

Compound (a-6)

As the component (A) in the present invention, compound (a-6) represented by the following general formula (VI) can be used.

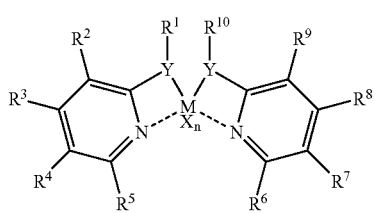

(VI)

In formula (VI), M is a transition metal atom selected from the groups 4 and 5 in the periodic table, and specifically Mistitanium, zirconium, hafnium, vanadium, niobium or tantalum.

In formula (VI), $R^1$ to $R^{10}$ may be the same or different and each represent a hydrogen atom, a $C_{1-50}$ hydrocarbon group, a $C_{1-50}$ halogenated hydrocarbon group, an organic silyl group, or a hydrocarbon group substituted with a substituent group containing at least one atom selected from nitrogen, oxygen, phosphorus, sulfur and silicon, and preferably represent hydrogen or a hydrocarbon group. The groups represented by $R^1$ to $R^{10}$ may be bound to each other to form a ring.

The $C_{1-50}$ hydrocarbon group and $C_{1-50}$ halogenated hydrocarbon group represented by $R^1$ to $R^{10}$ in formula (VI) include, for example, the hydrocarbon group and halogenated hydrocarbon group illustrated as $R^1$ to $R^7$ in the general formula (I) above; the organic silyl group represented by $R^1$ to $R^{10}$ includes, for example, the silicon-containing group illustrated as $R^1$ to $R^7$ in the general formula (I) above; and the hydrocarbon group substituted with a substituent group containing at least one atom selected from nitrogen, oxygen, phosphorus, sulfur and silicon, represented by $R^1$ to $R^{10}$, includes, for example, the nitrogen-, oxygen-, phosphorus-, sulfur- or silicon-containing residue out of the nitrogen-containing group, oxygen-containing group, sulfur-containing group and heterocyclic compound residue illustrated as $R^1$ to $R^7$ in the general formula (I) above.

In formula (VI), n is a number satisfying the valence of M, and is specifically an integer of 1 to 5, preferably 1 to 4, more preferably 1 to 3.

In formula (VI), X represent a hydrogen atom, a halogen atom, an oxygen atom, a $C_{1-20}$ hydrocarbon group, $C_{1-20}$ halogenated hydrocarbon group, an oxygen-containing group, a sulfur-containing group, a silicon-containing group or a nitrogen-containing group, preferably a halogen atom. When n is 2 or more, a plurality of groups represented by Xs may be the same or different.

The halogen atom, $C_{1-20}$ hydrocarbon group, $C_{1-20}$ halogenated hydrocarbon group, oxygen-containing group, sulfur-containing group, silicon-containing group and nitrogen-containing group represented by X in formula (VI) include, for example, the halogen atom, hydrocarbon group, halogenated hydrocarbon group, oxygen-containing group, sulfur-containing group, silicon-containing group and nitrogen-containing group illustrated as $R^1$ to $R^7$ in the general formula (I) above.

In formula (VI), Y represents an atom selected from the groups 15 and 16 in the periodic table. Specifically, Y represents a nitrogen, phosphorus, arsenic, antimony, oxygen or sulfur atom, preferably a nitrogen or oxygen atom.

Specific examples of the compounds represented by the general formula (VI) above are shown below.

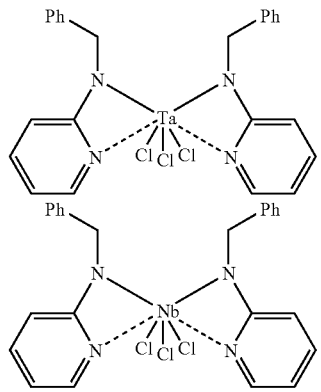

-continued

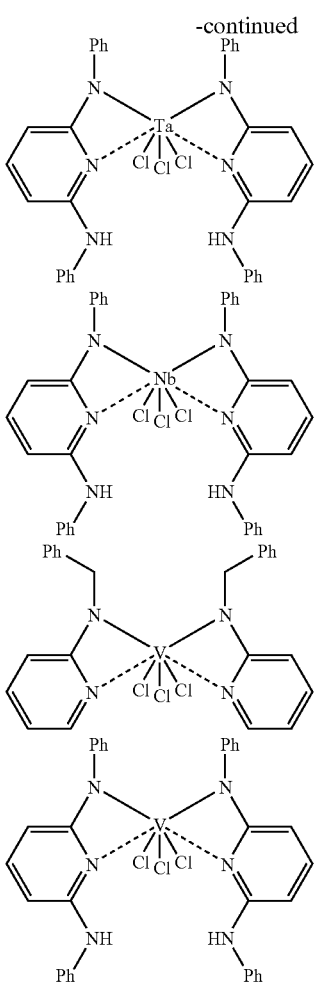

In the above-illustrated compounds, Ph indicates a phenyl group.

Compound (a-7)

As the component (A) in the present invention, compound (a-7) represented by the following general formula (VII) or (VIII) can be used.

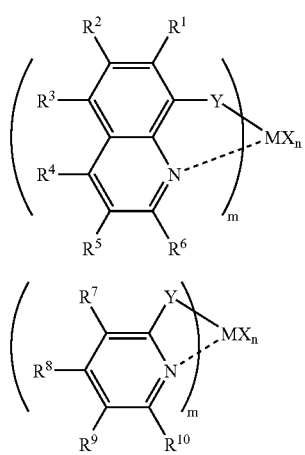

In formula (VII) or (VIII), M is a transition metal atom selected from the groups 4 and 5 in the periodic table, and specifically M is titanium, zirconium, hafnium, vanadium, niobium or tantalum.

$R^1$ to $R^6$ in formula (VII) and $R^7$ to $R^{10}$ in formula (VIII) may be the same or different and each represent hydrogen, a $C_{1-50}$ hydrocarbon group, a C1 to 50 halogenated hydrocarbon group, an organic silyl group, or a hydrocarbon group substituted with a substituent group containing at least one atom selected from nitrogen, oxygen, phosphorus, sulfur and silicon, and preferably represent hydrogen or a hydrocarbon group. At least two groups out of the groups represented by $R^1$ to $R^6$ in formula (VII) and $R^7$ to $R^{10}$ in formula (VIII) may be bound to each other to form a ring.

The $C_{1-50}$ hydrocarbon group and $C_{1-50}$ halogenated hydrocarbon group represented by $R^1$ to $R^6$ in formula (VII) and $R^7$ to $R^{10}$ in formula (VIII) include, for example, the hydrocarbon group and halogenated hydrocarbon group illustrated as $R^1$ to $R^7$ in the general formula (I) above; the organic silyl group represented by $R^1$ to $R^6$ in formula (VII) and $R^7$ to $R^{10}$ in formula (VIII) includes, for example, the silicon-containing group illustrated as $R^1$ to $R^7$ in the general formula (I) above; and the hydrocarbon group substituted with a substituent group containing at least one atom selected from nitrogen, oxygen, phosphorus, sulfur and silicon, represented by $R^1$ to $R^6$ in formula (VII) and $R^7$ to $R^{10}$ in formula (VIII), includes, for example, a hydrocarbon group substituted with the nitrogen-, oxygen-, phosphorus-, sulfur- or silicon-containing residue out of the nitrogen-containing group, oxygen-containing group, sulfur-containing group and heterocyclic compound residue illustrated as $R^1$ to $R^7$ in the general formula (I) above.

In formulae (VII) and (VIII), m is an integer of 1 to 6, preferably an integer of 1 to 4, more preferably an integer of 1 to 2.

In formulae (VII) and (VIII), n is a number satisfying the valence of M, and is specifically an integer of 1 to 5, preferably 1 to 4, more preferably 1 to 3.

In formulae (VII) and (VIII), X represent a hydrogen atom, a halogen atom, an oxygen atom, a $C_{1-20}$ hydrocarbon group, a $C_{1-20}$ halogenated hydrocarbon group, an oxygen-containing group, a sulfur-containing group, a silicon-containing group or a nitrogen-containing group, preferably a halogen atom. When n is 2 or more, a plurality of groups represented by Xs may be the same or different.

The halogen atom, $C_{1-20}$ hydrocarbon group, $C_{1-20}$ halogenated hydrocarbon group, oxygen-containing group, sulfur-containing group, silicon-containing group and nitrogen-containing group represented by X in formulae (VII) and (VIII) include, for example, the halogen atom, hydrocarbon group, halogenated hydrocarbon group, oxygen-containing group, sulfur-containing group, silicon-containing group and nitrogen-containing group illustrated as $R^1$ to $R^7$ in the general formula (I) above.

In formulae (VII) and (VIII), Y represents the group 15 or 16 atom in the periodic table, preferably the group 15 atom. Specifically, Y represents nitrogen, phosphorus, arsenic, antimony, oxygen or sulfur, preferably an oxygen atom.

Specific examples of the compounds represented by the general formula (VII) or (VIII) above are shown below.

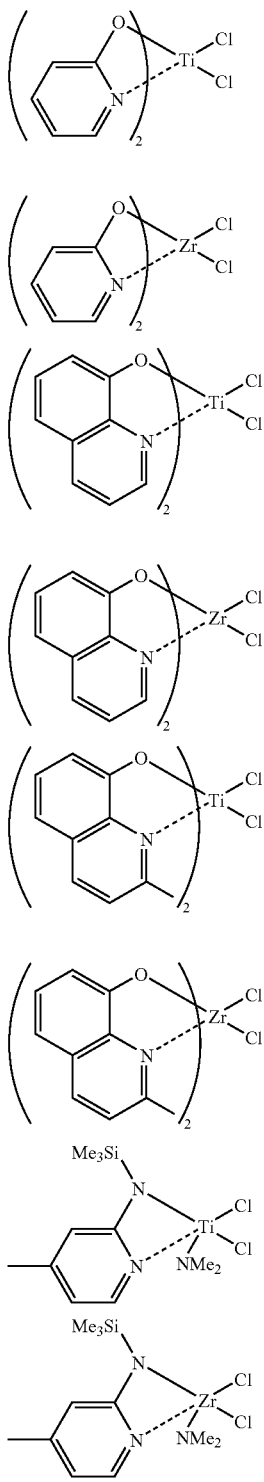

In the above-illustrated compounds, Me indicates a methyl group.

Compound (a-8)

As the component (A) in the present invention, compound (a-8) represented by the following general formula (IX) can be used.

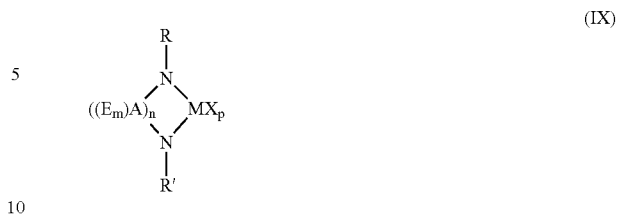

In formula (IX), M is a transition metal atom selected from the groups 3 to 6 in the periodic table, preferably the group 4 transition metal. Specifically, M is scandium, yttrium, titanium, zirconium, hafnium, vanadium, niobium, tantalum, chromium, molybdenum or tungsten, preferably titanium, zirconium or hafnium.

In formula (IX), R and R' may be the same or different and each represent a hydrogen atom, a $C_{1-50}$ hydrocarbon group, a $C_{1-50}$ halogenated hydrocarbon group, an organic silyl group, or a substituent group having at least one atom selected from nitrogen, oxygen, phosphorus, sulfur and silicon, preferably a hydrocarbon group.

The $C_{1-50}$ hydrocarbon group and $C_{1-50}$ halogenated hydrocarbon group represented by R and R' in formula (IX) include, for example, the hydrocarbon group and halogenated hydrocarbon group illustrated as $R^1$ to $R^7$ in the general formula (I) above; the organic silyl group represented by R and R' includes, for example, the silicon-containing groups illustrated as $R^1$ to $R^7$ in the general formula (I) above; and the substituent group having at least one atom selected from nitrogen, oxygen, phosphorus, sulfur and silicon represented by R and R' includes, for example, the nitrogen-, oxygen-, phosphorus-, sulfur- or silicon-containing residue out of the nitrogen-containing group, oxygen-containing group, sulfur-containing group and heterocyclic compound residue illustrated as $R^1$ to $R^7$ in the general formula (I) above.

In formula (IX), m is an integer of 0 to 2, preferably 2.

In formula (IX), n is an integer of 1 to 5, preferably an integer of 1 to 3.

In formula (IX), A represents an atom selected from the groups 13 to 16 in the periodic table, preferably the group 14 atom in the periodic table. Specifically, A is boron, carbon, nitrogen, oxygen, silicon, phosphorus, sulfur, germanium or tin, preferably carbon or silicon. When n is 2 or more, a plurality of As may be the same or different.

In formula (IX), E is a substituent group having at least one kind of atom selected from carbon, hydrogen, oxygen, halogen, nitrogen, sulfur, phosphorus, boron and silicon, and E is preferably hydrogen or a carbon atom. When a plurality of groups are represented by Es, a plurality of groups represented by Es may be the same or different, and two or more groups represented by Es may be bound to each other to form a ring.

The substituent group having at least one kind of atom selected from carbon, hydrogen, oxygen, halogen, nitrogen, sulfur, phosphorus, boron and silicon, represented by E in formula (IX), includes the halogen atom, hydrocarbon group, oxygen-containing group, nitrogen-containing group, boron-containing group, sulfur-containing group, phosphorus-containing group, heterocyclic compound residue and silicon-containing group illustrated as $R^1$ to $R^7$ in the general formula (I) above.

In formula (IX), p is an integer of 0 to 4, preferably 2.

In formula (IX), X represents a hydrogen atom, a halogen atom, an oxygen atom, a $C_{1-20}$ hydrocarbon group, a $C_{1-20}$ halogenated hydrocarbon group, an oxygen-containing group, a sulfur-containing group, a silicon-containing group or a nitrogen-containing group. When p is 2 or more, a plurality of groups represented by Xs may be the same or different.

The halogen atom, $C_{1-20}$ hydrocarbon group, $C_{1-20}$ halogenated hydrocarbon group, oxygen-containing group, sulfur-containing group, silicon-containing group and nitrogen-containing group represented by X in formula (IX) includes, for example, the halogen atom, hydrocarbon group, halogenated hydrocarbon group, oxygen-containing group, sulfur-containing group, silicon-containing group and nitrogen-containing group illustrated as $R^1$ to $R^7$ in the general formula (I) above.

Specific examples of the compounds represented by the general formula (IX) above are shown below:

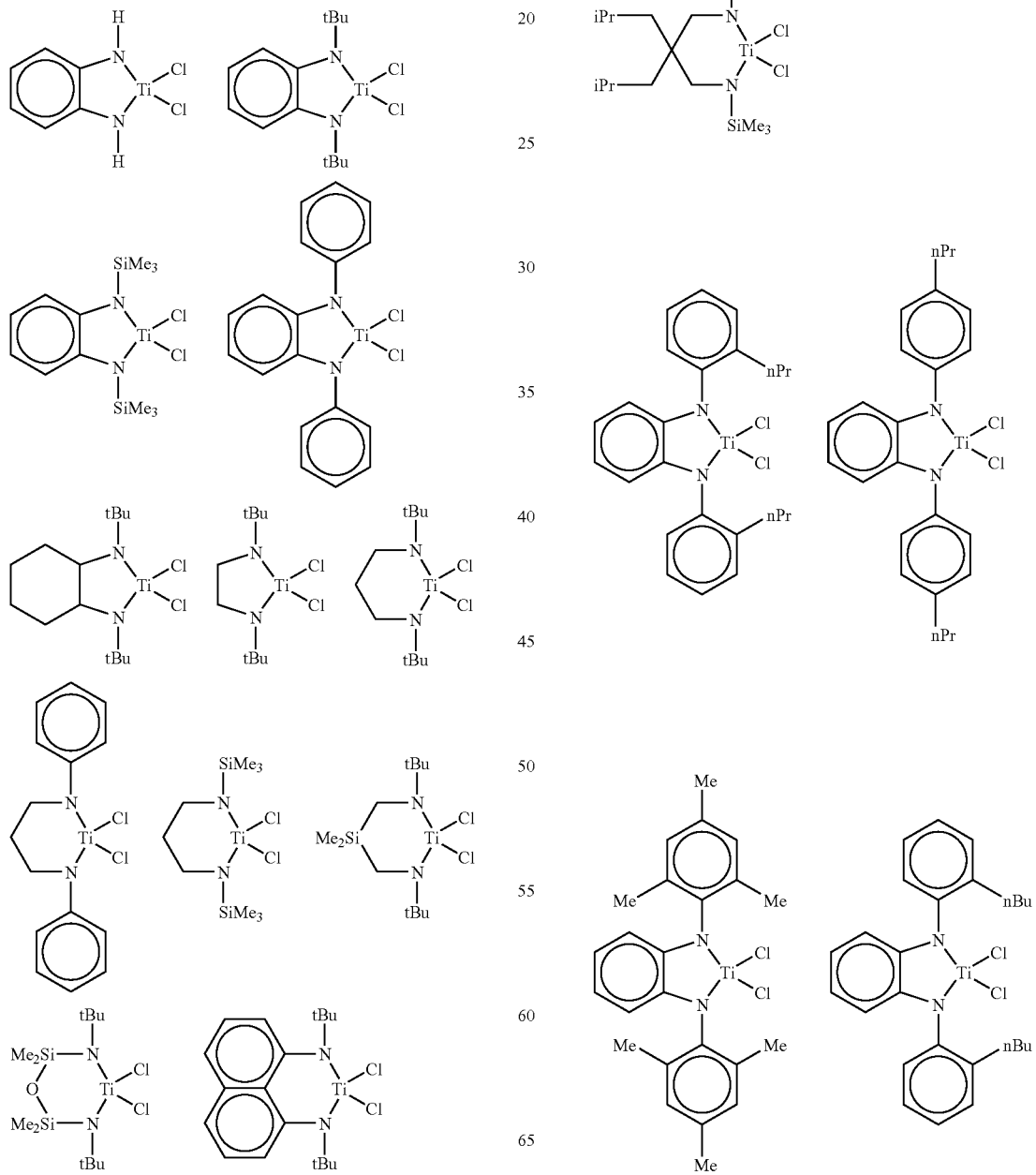

-continued

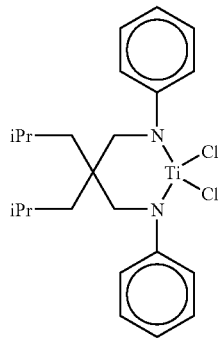

-continued
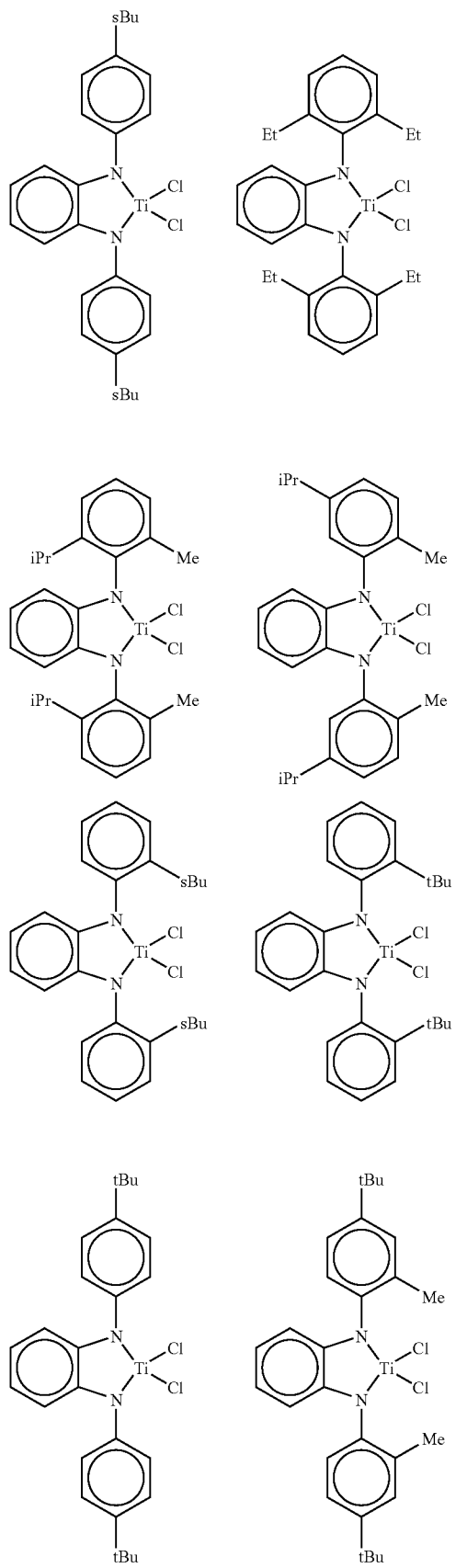
-continued
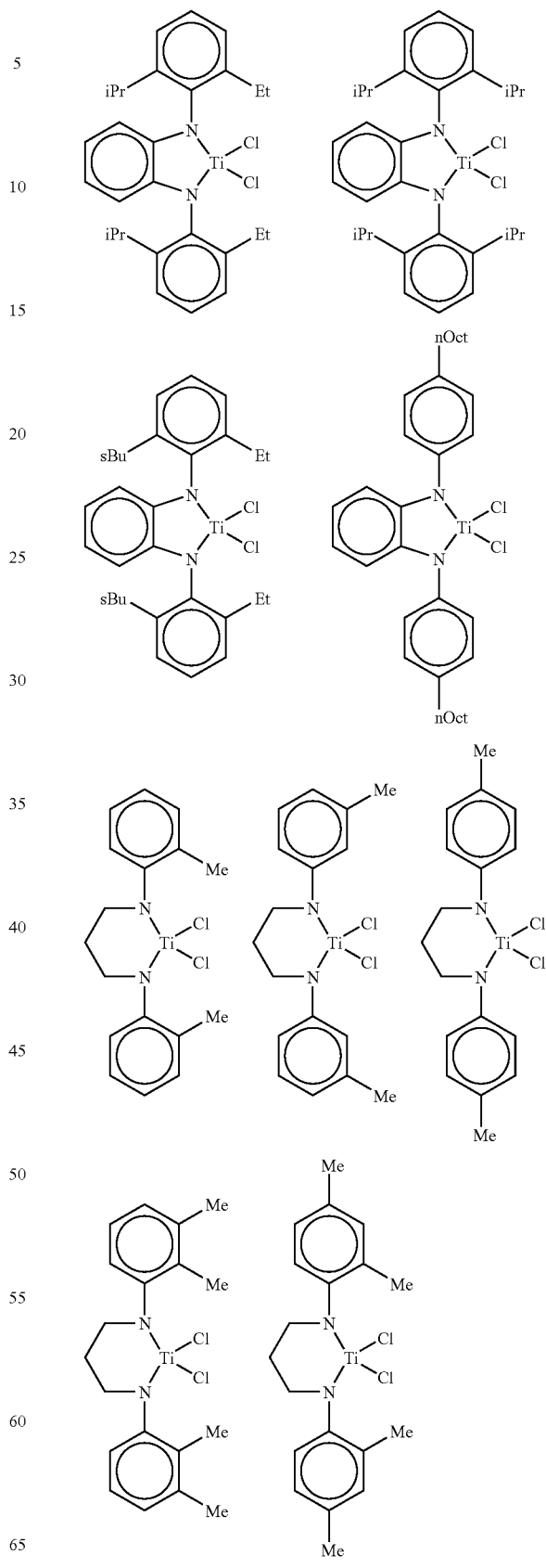

-continued
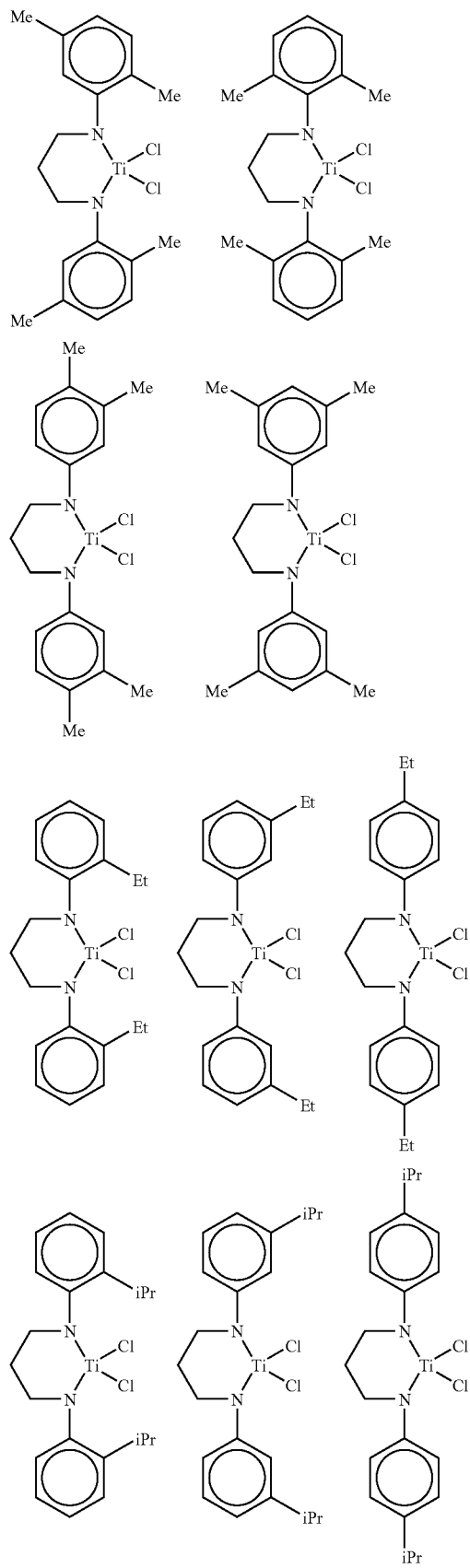
-continued
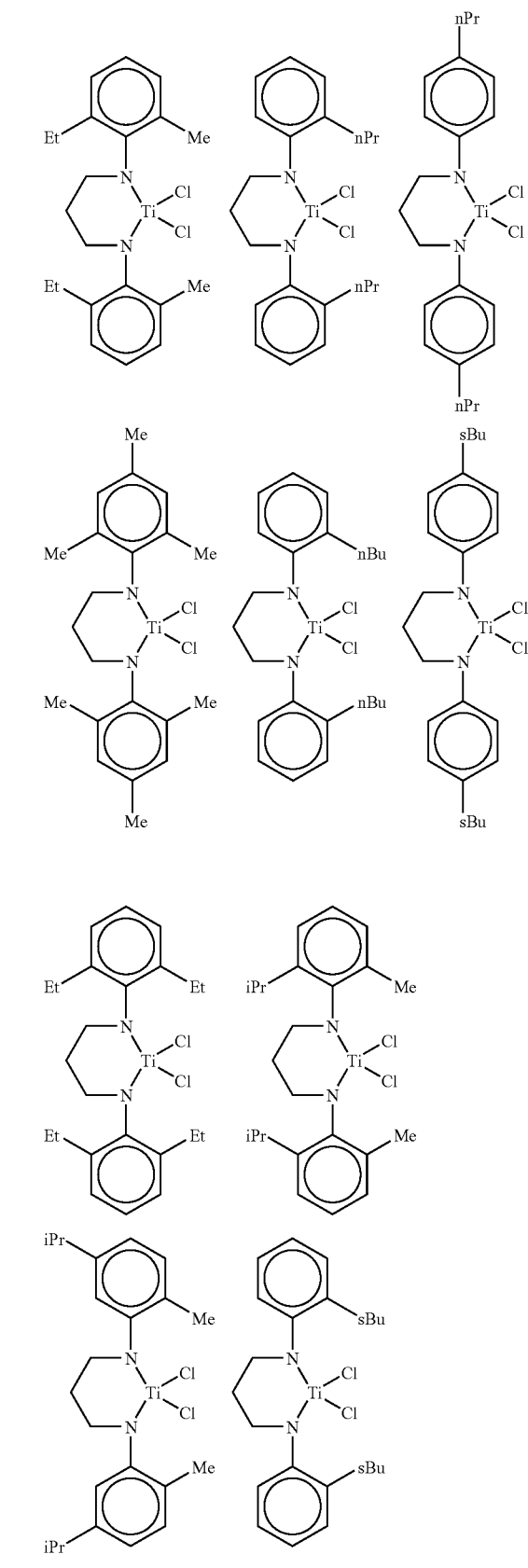

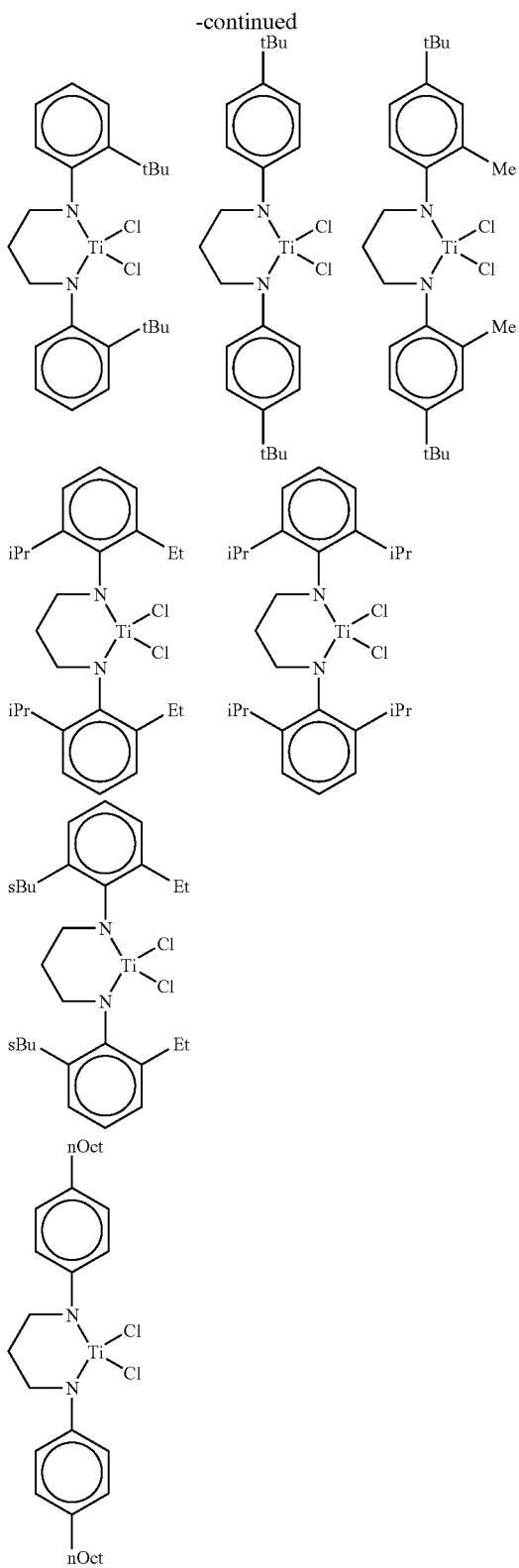

Compound (a-9)

As the component (A) in the present invention, compound (a-9) represented by the following general formula (X) can be used.

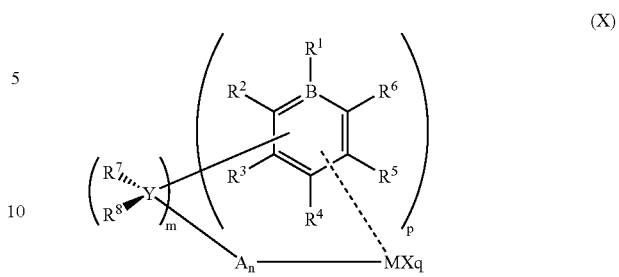

In formula (X), M is a transition metal atom selected from the groups 3 to 11 in the periodic table, preferably a transition metal atom selected from the groups 3 to 6 in the periodic table, more preferably a transition metal atom selected from the group 4 in the periodic table. Specifically, M is scandium, yttrium, titanium, zirconium, hafnium, vanadium, niobium, tantalum, chromium, molybdenum or tungsten, preferably titanium, zirconium or hafnium.

In formula (X), A represents an atom selected from the groups 14 to 16 in the periodic table, preferably an atom selected from the groups 15 and 16. Specifically, A is preferably $NR^9$, $PR^{10}$, O or S.

In formula (X), m is an integer of 0 to 3, n is an integer of 0 or 1, p is an integer of 1 to 3, and q is a number satisfying the valence of M, and when m is 0, n is 0, and p is preferably 2.

In formula (X), $R^1$ to $R^{10}$ may be the same or different and each represent a hydrogen atom, a halogen atom, a $C_{1-20}$ hydrocarbon group, a $C_{1-20}$ halogenated hydrocarbon group, an oxygen-containing group, a sulfur-containing group, a silicon-containing group or a nitrogen-containing group, and two or more of these groups may be bound to each other to form a ring.

The halogen atom, $C_{1-20}$ hydrocarbon group, $C_{1-20}$ halogenated hydrocarbon group, oxygen-containing group, sulfur-containing group, silicon-containing group and nitrogen-containing group represented by $R^1$ to $R^{10}$ in formula (X) include, for example, the halogen atom, hydrocarbon group, halogenated hydrocarbon group, oxygen-containing group, sulfur-containing group, silicon-containing group and nitrogen-containing group illustrated as $R^1$ to $R^7$ in the general formula (I) above.

In formula (X), X represents a hydrogen atom, a halogen atom, an oxygen atom, a $C_{1-20}$ hydrocarbon group, a $C_{1-20}$ halogenated hydrocarbon group, an oxygen-containing group, a sulfur-containing group, a silicon-containing group or a nitrogen-containing group. Note that when q is 2 or more, a plurality of groups represented by Xs may be the same or different.

The halogen atom, $C_{1-20}$ hydrocarbon group, $C_{1-20}$ halogenated hydrocarbon group, oxygen-containing group, sulfur-containing group, silicon-containing group and nitrogen-containing group represented by X in formula (X) include, for example, the halogen atom, hydrocarbon group, halogenated hydrocarbon group, oxygen-containing group, sulfur-containing group, silicon-containing group and nitrogen-containing group illustrated as $R^1$ to $R^7$ in the general formula (I) above.

When m in formula (X) is 1 to 3, Y is a group for bridging a borate benzene ring with A, and represents carbon, silicon or germanium.

Examples of compounds represented by the general formula (X) are shown below.

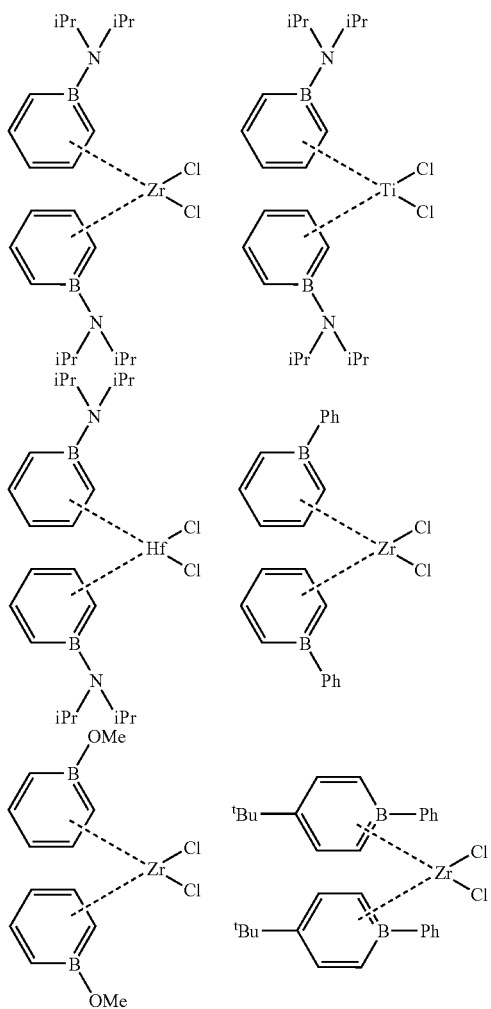

In the above-illustrated compounds, $^i$Pr indicates an isopropyl group, $^t$Bu indicates a tert-butyl group, and Ph indicates a phenyl group.

Compound (a-10)

As the component (A) in the present invention, compound (a-10) represented by the following general formula (XIa) can be used.

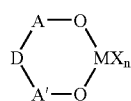

(XIa)

In formula (XIa), M is a transition metal atom selected from the groups 3 to 11 in the periodic table, preferably a transition metal atom in the groups 3 to 6 in the periodic table, more preferably a transition metal atom in the groups 4 and 5 in the periodic table, still more preferably a transition metal atom in the group 4 in the periodic table. Specifically, M is scandium, yttrium, titanium, zirconium, hafnium, vanadium, niobium, tantalum, chromium, molybdenum or tungsten, preferably titanium, zirconium or hafnium.

In formula (XIa), A and A' may be the same or different and each represent a $C_{1-50}$ hydrocarbon group, a $C_{1-50}$ halogenated hydrocarbon group, a hydrocarbon group having an oxygen-containing group, a sulfur-containing group or a silicon-containing group, or a halogenated hydrocarbon group having an oxygen-containing group, a sulfur-containing group or a silicon-containing group, preferably a hydrocarbon, more preferably an aryl group substituted with an alkyl group.

The $C_{1-50}$ hydrocarbon group and $C_{1-50}$ halogenated hydrocarbon group represented by A and A' in formula (XIa) include, for example, the hydrocarbon group and halogenated hydrocarbon group illustrated as $R^1$ to $R^7$ in the general formula (I) above; the hydrocarbon group having an oxygen-containing group, a sulfur-containing group or a silicon-containing group, represented by A and A' includes, for example, the hydrocarbon group having an oxygen-containing group, a sulfur-containing group or a silicon-containing group illustrated as $R^1$ to $R^7$ in the general formula (I) above; and the halogenated hydrocarbon group having an oxygen-containing group, a sulfur-containing group or a silicon-containing group represented by A and A' includes, for example, the halogenated hydrocarbon group having an oxygen-containing group, a sulfur-containing group or a silicon-containing group illustrated as $R^1$ to $R^7$ in the general formula (I) above.

In formula (XIa), D may be present or absent, and when D is present, it is a linking group for bridging A to A', and when D is absent, A and A' are bound to each other via —O-M-O— only.

D in formula (XIa) is specifically a single bond, a $C_{1-20}$ hydrocarbon group, a $C_{1-20}$ halogenated hydrocarbon, an oxygen atom, a sulfur atom or a group represented by $R^1R^2Z$. $R^1$ and $R^2$ may be the same or different and each represent a $C_{1-20}$ hydrocarbon group or a $C_{1-20}$ hydrocarbon group containing at least one heteroatom, and may be bound to each other to form a ring, and Z represents a carbon atom, a nitrogen atom, a sulfur atom, a phosphorus atom or a silicon atom.

In formula (XIa), n is a number satisfying the valence of M, and is specifically an integer of 1 to 5, preferably 1 to 4, more preferably 1 to 3.

In formula (XIa), X represents a hydrogen atom, a halogen atom, a $C_{1-20}$ hydrocarbon group, a $C_{1-20}$ halogenated hydrocarbon group, an oxygen-containing group, a sulfur-containing group, a silicon-containing group or a nitrogen-containing group, and when n is 2 or more, a plurality of groups represented by Xs may be the same or different, and a plurality of groups represented by Xs may be bound to each other to form a ring.

The halogen atom, $C_{1-20}$ hydrocarbon group, $C_{1-20}$ halogenated hydrocarbon group, oxygen-containing group, sulfur-containing group, silicon-containing group and nitrogen-containing group represented by X in formula (XIa) include, for example, the halogen atom, hydrocarbon group, halogenated hydrocarbon group, oxygen-containing group, sulfur-containing group, silicon-containing group and nitrogen-containing group illustrated as $R^1$ to $R^7$ in the general formula (I) above.

Examples of compounds represented by the general formula (XIa) are shown below.

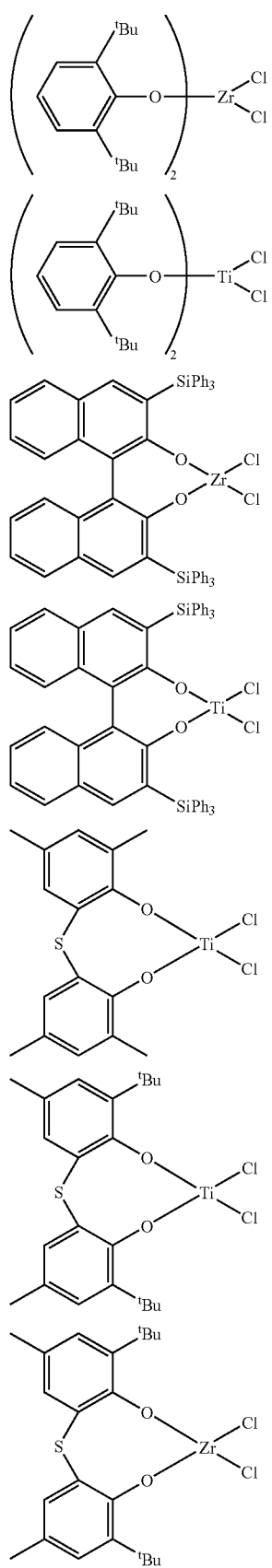
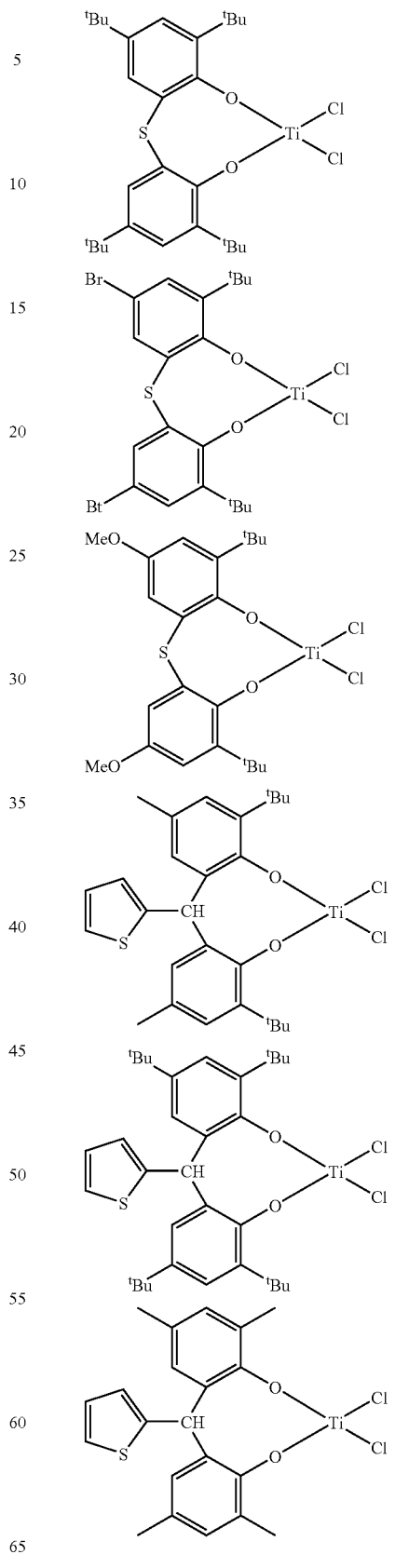

-continued

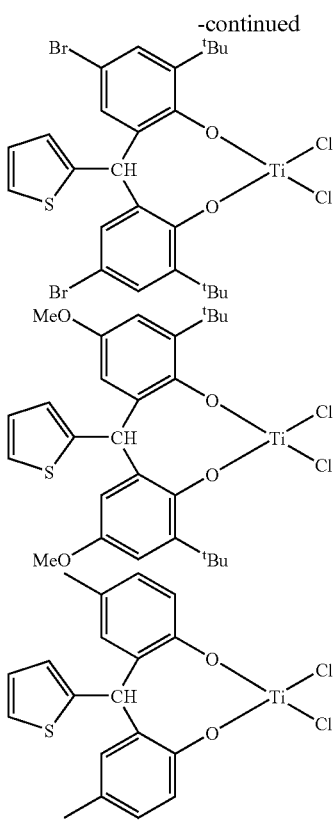

In the above-illustrated compounds, $^tBu$ indicates a t-butyl group, and Me indicates a methyl group.

Compound (a-11)

As the component (A) in the present invention, compound (a-11) represented by the following general formula (XIb) can be used.

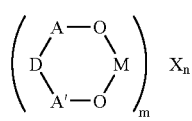 (XIb)

In formula (XIb), M represents a transition metal atom selected from the groups 3 toll in the periodic table, preferably a transition metal atom in the groups 3 to 6 in the periodic table, more preferably a transition metal atom in the groups 4 and 5 in the periodic table, still more preferably a transition metal atom in the group 4 in the periodic table. Specifically, M is scandium, yttrium, titanium, zirconium, hafnium, vanadium, niobium, tantalum, chromium, molybdenum or tungsten, more preferably titanium, zirconium or hafnium.

In formula (XIb), m is an integer of 1 to 6, preferably an integer of 1 to 4, more preferably an integer of 1 to 3, still more preferably an integer of 1 to 2.

In formula (XIb), A and A' may be the same or different and each represent a $C_{1-50}$ hydrocarbon group, a $C_{1-50}$ halogenated hydrocarbon group, a hydrocarbon group containing an oxygen-containing group, a sulfur-containing group or a silicon-containing group, or a halogenated group containing an oxygen-containing group, a sulfur-containing group or a silicon-containing group, preferably a hydrocarbon group, more preferably an aryl group substituted with an alkyl group.

The $C_{1-50}$ hydrocarbon group and $C_{1-50}$ halogenated hydrocarbon group represented by A and A' in formula (XIb) includes, for example, the hydrocarbon group and halogenated hydrocarbon group illustrated as $R^1$ to $R^7$ in the general formula (I) above; the hydrocarbon group containing an oxygen-containing group, a sulfur-containing group or a silicon-containing group represented by A and A' includes, for example, the hydrocarbon group containing an oxygen-containing group, a sulfur-containing group or a silicon-containing group illustrated as $R^1$ to $R^7$ in the general formula (I) above; and the halogenated hydrocarbon group containing an oxygen-containing group, a sulfur-containing group or a silicon-containing group represented by A and A' includes, for example, the halogenated hydrocarbon group containing an oxygen-containing group, a sulfur-containing group or a silicon-containing group illustrated as $R^1$ to $R^7$ in the general formula (I) above.

In formula (XIb), D may be present or absent, and when D is present, it is a linking group for bridging A to A', and when D is absent, A and A' are bound to each other via —O-M-O— only. D is specifically a single bond, a $C_{1-20}$ hydrocarbon group, a $C_{1-20}$ halogenated hydrocarbon, an oxygen atom, a sulfur atom or a group represented by $R^1R^2Z$. $R^1$ and $R^2$ may be the same or different and each represent a $C_{1-20}$ hydrocarbon group or a $C_{1-20}$ hydrocarbon group containing at least one heteroatom, and may be bound to each other to form a ring, and Z represents a carbon atom, a nitrogen atom, a sulfur atom, a phosphorus atom or a silicon atom.

In formula (XIb), n is a number satisfying the valence of M, and is specifically an integer of 1 to 5, preferably 1 to 4, more preferably 1 to 3.

When n in formula (XIb) is 1, X is an oxygen atom, and when n is 2 or more, at least one of Xs is an oxygen atom, and other Xs represent a hydrogen atom, a halogen atom, an oxygen atom, a $C_{1-20}$ hydrocarbon group, a $C_{1-20}$ halogenated hydrocarbon group, an oxygen-containing group, a sulfur-containing group, a silicon-containing group or a nitrogen-containing group, and when there are a plurality of groups represented by Xs, a plurality of groups represented by Xs may be the same or different, and a plurality of groups represented by Xs may be bound to each other to form a ring.

The halogen atom, $C_{1-20}$ hydrocarbon group, $C_{1-20}$ halogenated hydrocarbon group, oxygen-containing group, sulfur-containing group, silicon-containing group and nitrogen-containing group represented by X in formula (XIb) include, for example, the halogen atom, hydrocarbon group, halogenated hydrocarbon group, oxygen-containing group, sulfur-containing group, silicon-containing group and nitrogen-containing group illustrated as $R^1$ to $R^7$ in the general formula (I) above.

Compound (a-12)

As the component (A) in the present invention, compound (a-12) represented by the following general formula (XII) can be used.

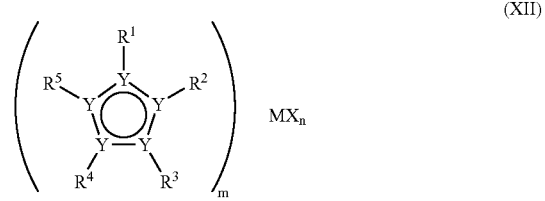 (XII)

In formula (XII), M represents a transition metal atom in the groups 3 to 11 in the periodic table, preferably a transition metal atom in the groups 3 to 6 in the periodic table, more preferably a transition metal atom in the group 4 in the periodic table. Specifically, M is scandium, yttrium, titanium, zirconium, hafnium, vanadium, niobium, tantalum, chromium, molybdenum or tungsten, more preferably titanium, zirconium or hafnium.

Ys may be the same or different and each represent an atom in the groups 13 to 15 in the periodic table, and specifically Y represents carbon, silicon, germanium, nitrogen, phosphorus, oxygen or sulfur. At least one of Ys is an atom other than carbon.

In formula (XII), m is an integer of 1 to 6, preferably 1 to 4, more preferably 1 to 3.

In formula (XII), $R^1$ to $R^5$ are present when their bound Ys are each an atom selected from the group 14 in the periodic table, and $R^1$ to $R^5$ may be the same or different and each represent a hydrogen atom, a halogen atom, a hydrocarbon group, a halogenated hydrocarbon group, an organic silyl group, or a hydrocarbon group substituted with a substituent group containing at least one atom selected from nitrogen, oxygen, phosphorus, sulfur and silicon, and two or more of these groups may be bound to each other to form a ring.

The hydrocarbon group and halogenated hydrocarbon group represented by $R^1$ to $R^5$ in formula (XII) include, for example, the hydrocarbon group and halogenated hydrocarbon group illustrated as $R^1$ to $R^7$ in the general formula (I) above; the organic silyl group represented by $R^1$ to $R^5$ includes, for example, the silicon-containing group illustrated as $R^1$ to $R^7$ in the general formula (I) above; and the substituent group having at least one atom selected from nitrogen, oxygen, phosphorus, sulfur and silicon represented by $R^1$ to $R^5$ includes, for example, the nitrogen-, oxygen-, phosphorus-, sulfur- or nitrogen-containing residue out of the nitrogen-containing group, oxygen-containing group, sulfur-containing group and heterocyclic compound residue illustrated as $R^1$ to $R^7$ in the general formula (I) above.

In formula (XII), n is a number satisfying the valence of M, and is specifically an integer of 1 to 5, preferably 1 to 4, more preferably 1 to 3.

In formula (XII), X represents a hydrogen atom, a halogen atom, an oxygen atom, a $C_{1-20}$ hydrocarbon group, a $C_{1-20}$ halogenated hydrocarbon group, an oxygen-containing group, a sulfur-containing group, a silicon-containing group or a nitrogen-containing group, and when n is 2 or more, a plurality of groups represented by Xs may be the same or different, and a plurality of groups represented by Xs may be bound to each other to form a ring.

The halogen atom, $C_{1-20}$ hydrocarbon group, $C_{1-20}$ halogenated hydrocarbon group, oxygen-containing group, sulfur-containing group, silicon-containing group and nitrogen-containing group represented by X in formula (XII) include, for example, the halogen atom, hydrocarbon group, halogenated hydrocarbon group, oxygen-containing group, sulfur-containing group, silicon-containing group and nitrogen-containing group illustrated as $R^1$ to $R^6$ in the general formula (I) above.

Examples of compounds represented by the general formula (XII) above are shown below.

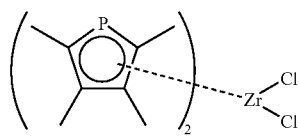

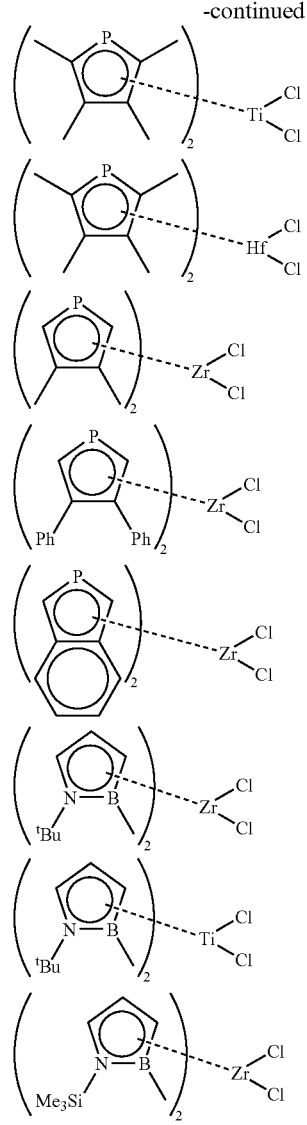

In the above-illustrated compounds, $^t$Bu indicates a tert-butyl group, and Me indicates a methyl group.

Compound (a-13)

As the component (A) in the present invention, compound (a-13) represented by the following general formula (XIII) can be used.

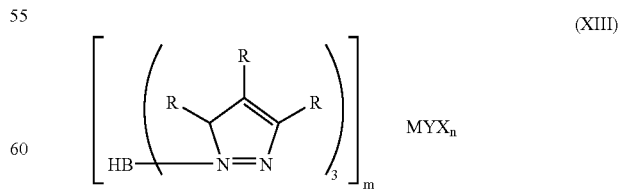

In formula (XIII), M is a transition metal compound in the groups 3 to 11 in the periodic table, preferably a transition metal atom in the groups 4 to 5. Specifically, M is titanium, zirconium, vanadium, niobium or tantalum.

In formula (XIII), m is an integer of 1 to 6, preferably 1 to 3.

In formula (XIII), Rs may be the same or different and each represent a hydrogen atom, a $C_{1-20}$ hydrocarbon group and a $C_{1-20}$ halogenated hydrocarbon group, and two or more of these groups may be bound to each other to form a ring.

In formula (XIII), n is a number satisfying the valence of M, and is specifically an integer of 1 to 5, preferably 1 to 4, more preferably 1 to 3.

In formula (XIII), when n is 1, X is an oxygen atom, and when n is 2 or more, at least one of Xs is an oxygen atom, and other Xs represent a hydrogen atom, a halogen atom, an oxygen atom, a $C_{1-20}$ hydrocarbon group, a $C_{1-20}$ halogenated hydrocarbon group, an oxygen-containing group, a sulfur-containing group, a silicon-containing group or a nitrogen-containing group. When there are a plurality of groups represented by Xs, a plurality of groups represented by Xs may be the same or different, and a plurality of groups represented by Xs may be bound to each other to form a ring.

The halogen atom, $C_{1-20}$ hydrocarbon group, $C_{1-20}$ halogenated hydrocarbon group, oxygen-containing group, sulfur-containing group, silicon-containing group and nitrogen-containing group represented by X in formula (XIII) include, for example, the halogen atom, hydrocarbon group, halogenated hydrocarbon group, oxygen-containing group, sulfur-containing group, silicon-containing group and nitrogen-containing group illustrated as $R^1$ to $R^7$ in the general formula (I) above.

In formula (XIII), Y may be present or absent, and when Y is present, it is the group 15 or 16 atom in the periodic table, specifically O, S, Se or NR.

The specific structures of these compounds include, but are not limited to, the followings:

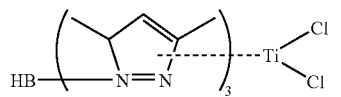

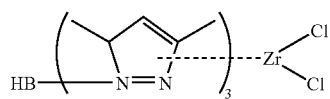

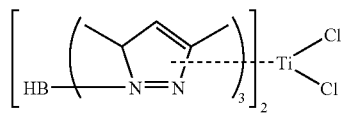

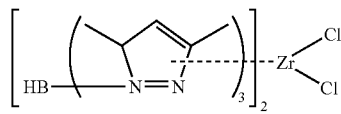

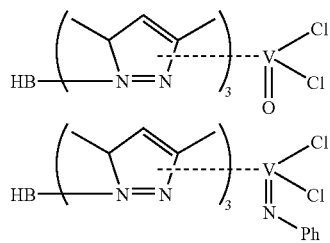

Compound (a-14)

As the component (A) in the present invention, compound (a-14) represented by the following general formula (XIVa) can be used.

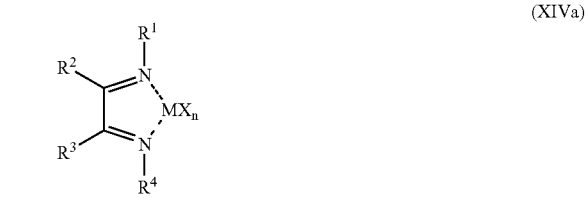

(XIVa)

In formula (XIVa), M is a transition metal atom selected from the groups 3 to 7 and 11 in the periodic table, preferably a transition metal atom selected from the groups 4 and 5.

In formula (XIVa), $R^1$ to $R^4$ may be the same or different and each represent a $C_{1-50}$ hydrocarbon group, a $C_{1-50}$ halogenated hydrocarbon group, an organic silyl group, or a hydrocarbon group substituted with a substituent group having at least one atom selected from nitrogen, oxygen, phosphorus, sulfur and silicon. Two or more groups out of the groups represented by $R^1$ to $R^4$, preferably adjacent groups, may be bound to each other to form a ring.

The $C_{1-50}$ hydrocarbon group and $C_{1-50}$ halogenated hydrocarbon group represented by $R^1$ to $R^4$ in formula (XIVa) include, for example, the hydrocarbon group and halogenated hydrocarbon group illustrated as $R^1$ to $R^7$ in the general formula (I) above; the organic silyl group represented by $R^1$ to $R^4$ includes, for example, the silicon-containing group illustrated as $R^1$ to $R^7$ in the general formula (I) above; and the substituent group having at least one atom selected from nitrogen, oxygen, phosphorus, sulfur and silicon represented by $R^1$ to $R^4$ includes, for example, the nitrogen-, oxygen-, phosphorus-, sulfur- or silicon-containing residue out of the nitrogen-containing group, oxygen-containing group, sulfur-containing group and heterocyclic compound residue illustrated as $R^1$ to $R^7$ in the general formula (I) above.

In formula (XIVa), n is a number satisfying the valence of M, and is specifically an integer of 0 to 4.

In formula (XIVa), X represents a hydrogen atom, a halogen atom, a $C_{1-20}$ hydrocarbon group, a $C_{1-20}$ halogenated hydrocarbon group, an oxygen-containing group, a sulfur-containing group, a silicon-containing group or a nitrogen-containing group, and when n is 2 or more, a plurality of groups represented by Xs may be the same or different.

The halogen atom, $C_{1-20}$ hydrocarbon group, $C_{1-20}$ halogenated hydrocarbon group, oxygen-containing group, sulfur-containing group, silicon-containing group and nitrogen-containing group represented by X in formula (XIVa) include, for example, the halogen atom, hydrocarbon group, halogenated hydrocarbon group, oxygen-containing group, sulfur-containing group, silicon-containing group and nitrogen-containing group illustrated as $R^1$ to $R^7$ in the general formula (I) above.

Compound (a-15)

As the component (A) in the present invention, compound (a-15) represented by the following general formula (XIVb) can be used.

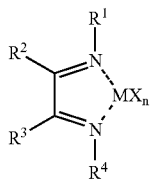
(XIVb)

In formula (XIVb), M is a transition metal atom selected from the groups 8 to 10 in the periodic table, preferably nickel, palladium or platinum.

In formula (XIVb)., $R^1$ to $R^4$ may be the same or different and each represent a $C_{1-50}$ hydrocarbon group, a $C_{1-50}$ halogenated hydrocarbon group, an organic silyl group, or a hydrocarbon group substituted with a substituent group having at least one atom selected from nitrogen, oxygen, phosphorus, sulfur and silicon. Two or more groups out of the groups represented by $R^1$ to $R^4$, preferably adjacent groups, may be bound to each other to form a ring.

The $C_{1-50}$ hydrocarbon group and $C_{1-50}$ halogenated hydrocarbon group represented by $R^1$ to $R^4$ in formula (XIVb) include, for example, the hydrocarbon group and halogenated hydrocarbon group illustrated as $R^1$ to $R^7$ in the general formula (I) above; the organic silyl group represented by $R^1$ to $R^4$ includes, for example, the silicon-containing group illustrated as $R^1$ to $R^7$ in the general formula (I) above; and the substituent group having at least one atom selected from nitrogen, oxygen, phosphorus, sulfur and silicon represented by $R^1$ to $R^4$ includes, for example, the nitrogen-, oxygen-, phosphorus-, sulfur- or silicon-containing residue out of the nitrogen-containing group, oxygen-containing group, sulfur-containing group and heterocyclic compound residue illustrated as $R^1$ to $R^7$ in the general formula (I) above.

In formula (XIVb), n is a number satisfying the valence of M, and is specifically an integer of 0 to 4.

In formula (XIVb), X represents a hydrogen atom, a halogen atom, a $C_{1-20}$ hydrocarbon group, a $C_{1-20}$ halogenated hydrocarbon group, an oxygen-containing group, a sulfur-containing group, a silicon-containing group or a nitrogen-containing group, and when n is 2 or more, a plurality of groups represented by Xs may be the same or different.

The halogen atom, $C_{1-20}$ hydrocarbon group, $C_{1-20}$ halogenated hydrocarbon group, oxygen-containing group, sulfur-containing group, silicon-containing group and nitrogen-containing group represented by X in formula (XIVb) include, for example, the halogen atom, hydrocarbon group, halogenated hydrocarbon group, oxygen-containing group, sulfur-containing group, silicon-containing group and nitrogen-containing group illustrated as $R^1$ to $R^7$ in the general formula (I) above. The specific structures of these compounds are shown below:

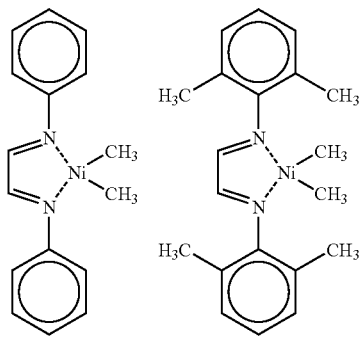

-continued

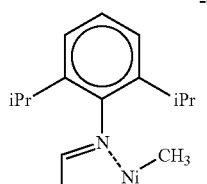
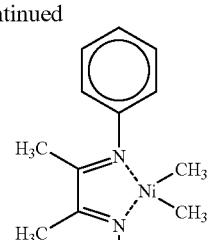
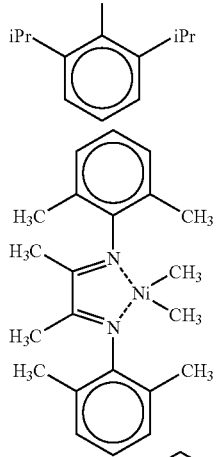
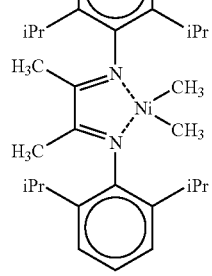
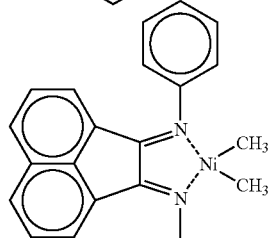
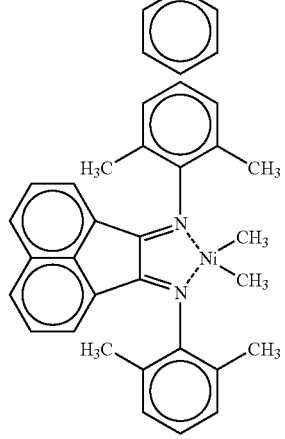
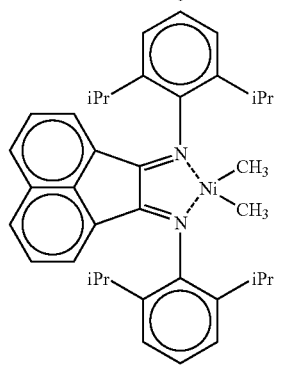

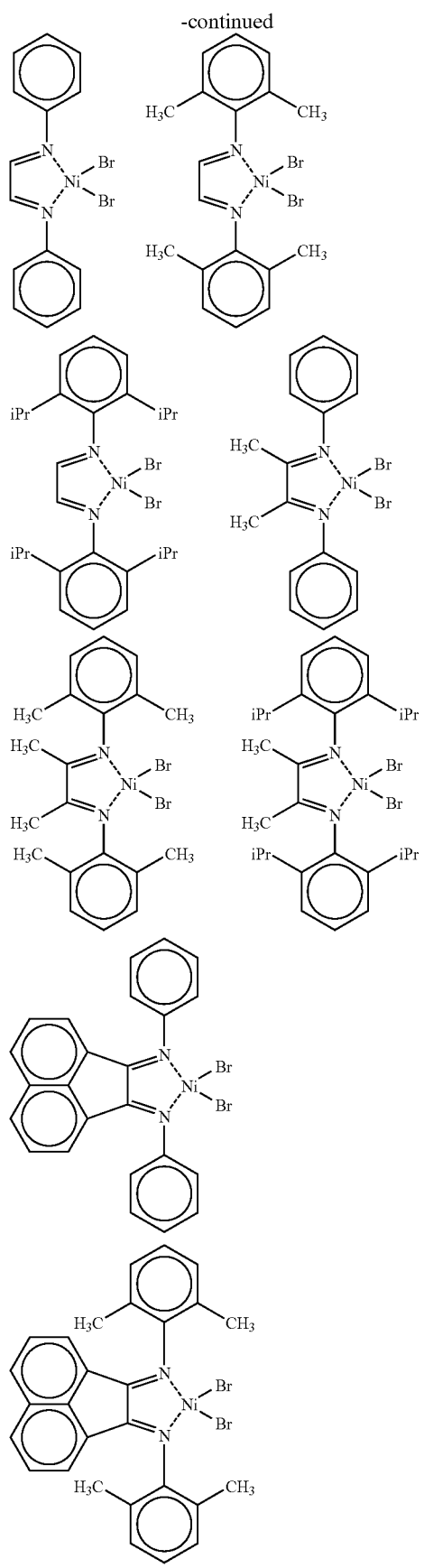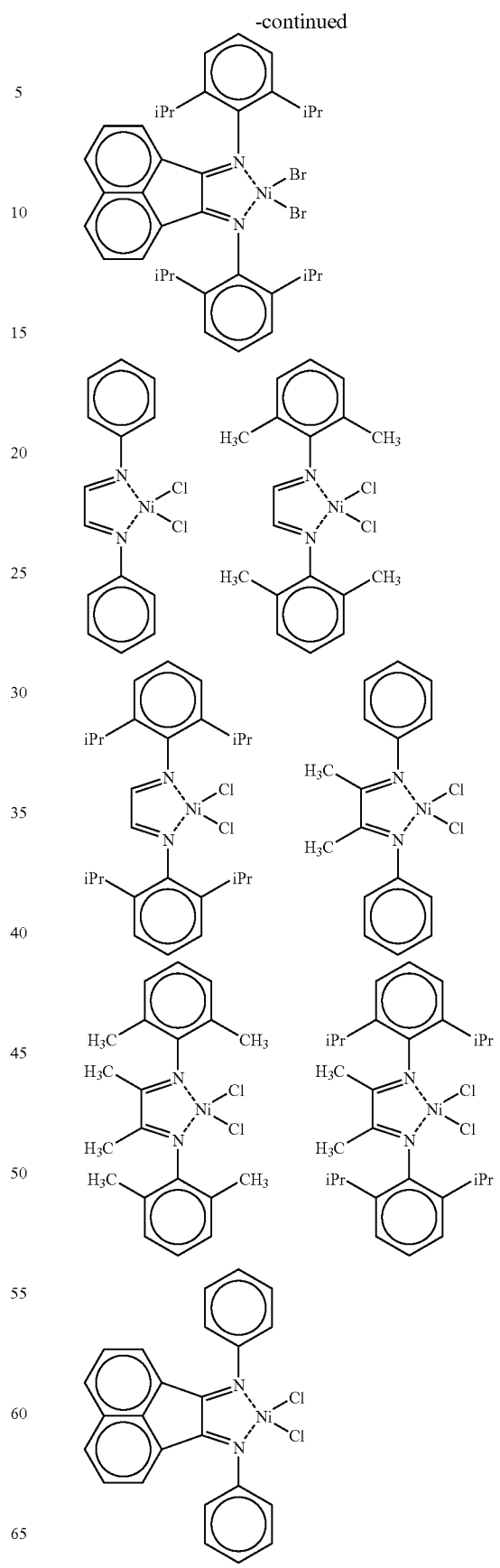

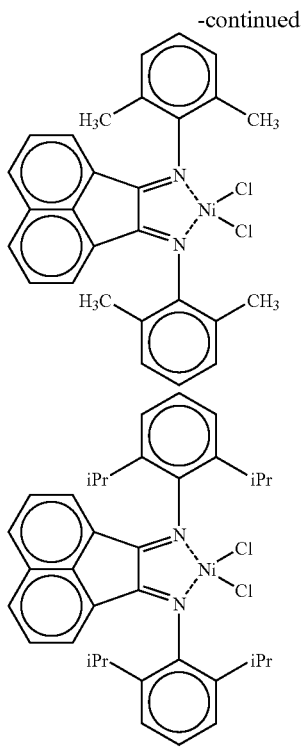

Compound (a-16)

As the component (A) in the present invention, compound (a-16) represented by the following general formula (XIVc) can be used.

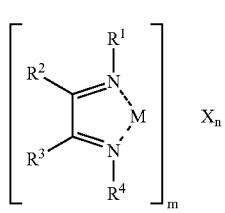

(XIVc)

In formula (XIVc), M is a transition metal atom selected from the groups 3 to 10 in the periodic table, preferably nickel, palladium or platinum.

In formula (XIVc), m is an integer of 1 to 6, preferably an integer of 1 to 4, more preferably an integer of 1 to 3, still more preferably an integer of 1 to 2.

In formula (XIVc), $R^1$ to $R^4$ may be the same or different and each represent a $C_{1-50}$ hydrocarbon group, a $C_{1-50}$ halogenated hydrocarbon group, an organic silyl group, or a hydrocarbon group substituted with a substituent group containing at least one atom selected from nitrogen, oxygen, phosphorus, sulfur and silicon. Two or more groups out of the groups represented by $R^1$ to $R^4$, preferably adjacent groups, may be bound to each other to form a ring.

The $C_{1-50}$ hydrocarbon group and $C_{1-50}$ halogenated hydrocarbon group represented by $R^1$ to $R^4$ in formula (XIVc) include, for example, the hydrocarbon group and halogenated hydrocarbon group illustrated as $R^1$ to $R^7$ in the general formula (I) above; the organic silyl group represented by $R^1$ to $R^4$ includes, for example, the silicon-containing group illustrated as $R^1$ to $R^7$ in the general formula (I) above; and the substituent group having at least one atom selected from nitrogen, oxygen, phosphorus, sulfur and silicon represented by $R^1$ to $R^4$ includes, for example, the nitrogen-, oxygen-, phosphorus-, sulfur- or silicon-containing residue out of the nitrogen-containing group, oxygen-containing group, sulfur-containing group and heterocyclic compound residue illustrated as $R^1$ to $R^7$ in the general formula (I) above.

In formula (XIVc), n is a number satisfying the valence of M, and is specifically an integer of 1 to 5, preferably 1 to 4, more preferably 1 to 3.

In formula (XIVc), when n is 1, X is an oxygen atom, and when n is 2 or more, at least one of Xs is an oxygen atom, and other Xs represent a hydrogen atom, a halogen atom, an oxygen atom, a $C_{1-20}$ hydrocarbon group, a $C_{1-20}$ halogenated hydrocarbon group, an oxygen-containing group, a sulfur-containing group, a silicon-containing group or a nitrogen-containing group, and when there are a plurality of groups represented by Xs, a plurality of groups represented by Xs may be the same or different.

The halogen atom, $C_{1-20}$ hydrocarbon group, $C_{1-20}$ halogenated hydrocarbon group, oxygen-containing group, sulfur-containing group, silicon-containing group and nitrogen-containing group represented by X in formula (XIVc) include, for example, the halogen atom, hydrocarbon group, halogenated hydrocarbon group, oxygen-containing group, sulfur-containing group, silicon-containing group and nitrogen-containing group illustrated as $R^1$ to $R^6$ in the general formula (IVa) above.

Compound (a-17)

As the component (A) in the present invention, compound (a-17) represented by the following general formula (XV) can be used.

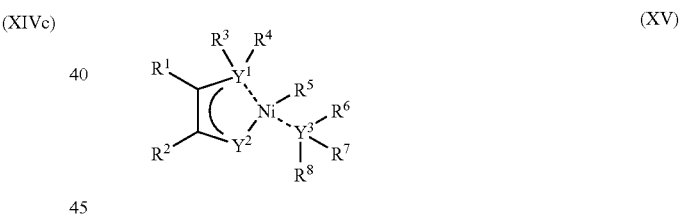

(XV)

In formula (XV), $Y^1$ and $Y^3$ may be the same or different and each represent an atom selected from the group 15 in the periodic table.

In formula (XV), $Y^2$ represents an atom selected from the group 16 in the periodic table.

In formula (XV), $R^1$ to $R^8$ may be the same or different and each represent a hydrogen atom, a halogen atom, a $C_{1-20}$ hydrocarbon group, a $C_{1-20}$ halogenated hydrocarbon group, an oxygen-containing group, a sulfur-containing group or a silicon-containing group, and two or more of these groups may be bound to each other to form a ring.

The $C_{1-20}$ hydrocarbon group and $C_{1-20}$ halogenated hydrocarbon group represented by $R^1$ to $R^8$ in formula (XV) include, for example, the hydrocarbon group and halogenated hydrocarbon group illustrated as $R^1$ to $R^7$ in the general formula (I) above, and the halogen atom, oxygen-containing group, sulfur-containing group and silicon-containing group represented by $R^1$ to $R^8$ include, for example, the halogen atom, oxygen-containing group, sulfur-containing group and silicon-containing group illustrated as $R^1$ to $R^7$ in the general formula (I) above.

Compound (a-18)

As the component (A) in the present invention, compound (a-18) represented by the following general formula (XVI) can be used.

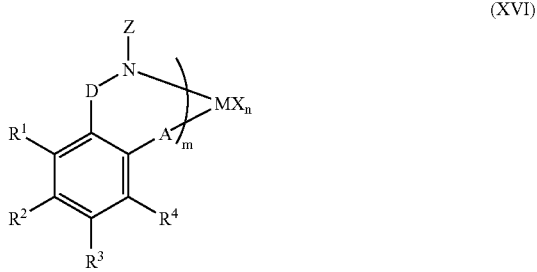

(XVI)

In formula (XVI), M represents a transition metal atom selected from the groups 3 to 11 in the periodic table, preferably a transition metal atom in the groups 3 to 6 and 8 to 10, more preferably a transition metal atom in the group 4, 5 or 6, still more preferably a metal atom in the group 4 or 5.

In formula (XVI), m is an integer of 1 to 6, preferably an integer of 1 to 4, more preferably an integer of 1 to 3, still more preferably an integer of 1 to 2.

In formula (XVI), A represents an oxygen atom, a sulfur atom or a substituent —$R^5$-containing nitrogen atom (—N($R^5$)—).

In formula (XVI), D represents —C($R^6$)($R^7$)—, Si($R^8$)($R^9$)—, —P(O)($R^{10}$)—, —P($R^{11}$)—, —SO— or —S—.

In formula (XVI), Z represents N-binding —$R^{12}$ and —$R^{13}$, =C($R^{14}$)$R^{15}$ or =N$R^{16}$.

In formula (XVI), $R^1$ to $R^{16}$ may be the same or different and each represent a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group or a tin-containing group, and two or more of these groups may be bound to one another to form a ring, and when m is 2 or more, two groups out of the groups represented by $R^1$ to $R^{16}$ may be bound to each other.

The halogen atom, hydrocarbon group, oxygen-containing group, nitrogen-containing group, boron-containing group, sulfur-containing group, phosphorus-containing group, heterocyclic compound residue, silicon-containing group, germanium-containing group and tin-containing group represented by $R^1$ to $R^{16}$ in formula (XVI) include, for example, the same atom or group illustrated as $R^1$ to $R^7$ in the general formula (I) above.

In formula (XVI), n is a number satisfying the valence of M, and is specifically an integer of 1 to 5, preferably 1 to 4, more preferably 1 to 3.

In formula (XVI), X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, a plurality of groups represented by Xs may be the same or different, and a plurality of groups represented by Xs may be bound to each other to form a ring.

The halogen atom, hydrocarbon group, oxygen-containing group, sulfur-containing group, nitrogen-containing group, boron-containing group, aluminum-containing group, phosphorus-containing group, halogen-containing group, heterocyclic compound residue, silicon-containing group, germanium-containing group and tin-containing group represented by X in formula (XVI) include, for example, the same atom or group illustrated as $X^1$ in the general formula (I) above.

Compound (a-19)

As the component (A) in the present invention, compound (a-19) represented by the following general formula (XVII) or (XVIII) can be used.

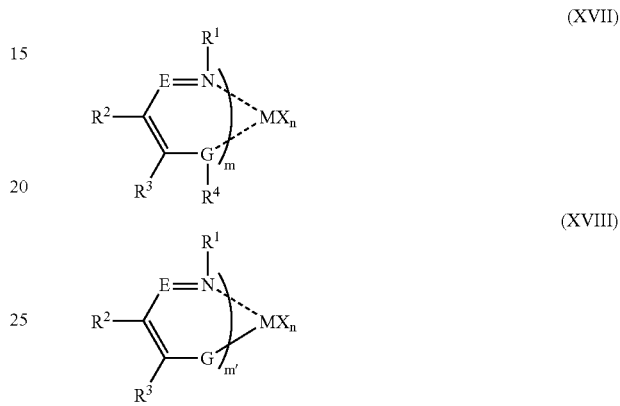

In formulae (XVII) and (XVIII), M represents a transition metal atom selected from the groups 3 to 11 in the periodic table, preferably a transition metal atom in the groups 3 to 6 and 8 to 10, more preferably a transition metal atom in the group 4, 5 or 6, still more preferably a metal atom in the group 4 or 5.

In formula (XVII), m is an integer of 1 to 3.

In formula (XVIII), m' is an integer of 1 to 6, preferably an integer of 1 to 4, more preferably an integer of 1 to 3, still more preferably an integer of 1 to 2.

In formulae (XVII) and (XVIII), E represents a nitrogen atom or a substituent —$R^5$-containing carbon atom (—C($R^5$)=)

In formulae (XVII) and (XVIII), G represents an oxygen atom, a sulfur atom or a substituent —$R^6$-containing nitrogen atom (—N($R^6$)—).

In formulae (XVII) and (XVIII), $R^1$ to $R^6$ may be the same or different and each represent a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group or a tin-containing group, and two or more of these groups may be bound to one another to form a ring, and when m in formula (XVII) is 2 or more, two groups out of the groups represented by $R^1$ to $R^6$ may be bound to each other, and when m in formula (XVIII) is 2 or more, two groups out of the groups represented by $R^1$ to $R^6$ may be bound to each other.

The halogen atom, hydrocarbon group, oxygen-containing group, nitrogen-containing group, boron-containing group, sulfur-containing group, phosphorus-containing group, heterocyclic compound residue, silicon-containing group, germanium-containing group and tin-containing group represented by $R^1$ to $R^6$ in formulae (XVII) and (XVIII) include, for example, the same atom or group illustrated as $R^1$ to $R^7$ in the general formula (I) above.

In formulae (XVII) and (XVIII), n is a number satisfying the valence of M, and is specifically an integer of 1 to 5, preferably 1 to 4, more preferably 1 to 3.

In formulae (XVII) and (XVIII), X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n in formulae (XVII) and (XVIII) is 2 or more, a plurality of groups represented by Xs may be the same or different, and a plurality of groups represented by Xs may be bound to each other to form a ring.

The halogen atom, hydrocarbon group, oxygen-containing group, sulfur-containing group, nitrogen-containing group, boron-containing group, aluminum-containing group, phosphorus-containing group, halogen-containing group, heterocyclic compound residue, silicon-containing group, germanium-containing group and tin-containing group represented by X in formulae (XVII) and (XVIII) include, for example, the same atom or group illustrated as $R^1$ to $R^7$ in the general formula (I) above.

Compound (a-20)

As the component (A) in the present invention, compound (a-20) represented by the following general formula (XIX) can be used.

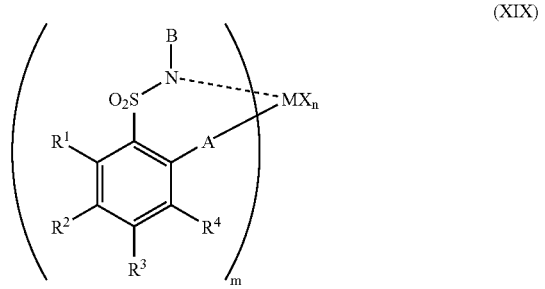

(XIX)

In formula (XIX), M represents a transition metal atom selected from the groups 3 to 11 in the periodic table, preferably a transition metal atom in the groups 3 to 6 and 8 to 10, more preferably a transition metal atom in the group 4, 5 or 6, still more preferably a metal atom in the group 4 or 5.

In formula (XIX), m is an integer of 1 to 6, preferably an integer of 1 to 4, more preferably an integer of 1 to 3, still more preferably an integer of 1 to 2.

In formula (XIX), A represents an oxygen atom, a sulfur atom or a substituent —$R^5$-containing nitrogen atom (—N($R^5$)—)

In formula (XIX), B represents N-binding —$R^6$ and —$R^7$, =$C(R^8)R^9$ or =$NR^{10}$.

In formula (XIX), $R^1$ to $R^{10}$ may be the same or different and each represent a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group or a tin-containing group, and two or more of these groups may be bound to each other to form a ring. When m is 2 or more, one group out of $R^1$ to $R^{10}$ contained in one ligand may be bound to one group out of $R^1$ to $R^{10}$ contained in another ligand, and $R^1$s, $R^2$s, $R^3$s, $R^4$s, $R^5$s, $R^6$s, $R^7$s, $R^8$s, $R^9$s or $R^{10}$s may be the same or different.

The halogen atom, hydrocarbon group, oxygen-containing group, nitrogen-containing group, boron-containing group, sulfur-containing group, phosphorus-containing group, heterocyclic compound residue, silicon-containing group, germanium-containing group and tin-containing group represented by $R^1$ to $R^{10}$ in formula (XIX) include, for example, the same atom or group illustrated as $R^1$ to $R^7$ in the general formula (I) above.

In formula (XIX), n is a number satisfying the valence of M, and is specifically an integer of 1 to 5, preferably 1 to 4, more preferably 1 to 3.

In formula (XIX), X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, a plurality of groups represented by Xs may be the same or different, and a plurality of groups represented by Xs may be bound to each other to form a ring.

The halogen atom, hydrocarbon group, halogenated hydrocarbon group, oxygen-containing group, sulfur-containing group, nitrogen-containing group, boron-containing group, aluminum-containing group, phosphorus-containing group, halogen-containing group, heterocyclic compound residue, silicon-containing group, germanium-containing group and tin-containing group represented by X in formula (XIX) include, for example, the same atom or group illustrated as $X^1$ in the general formula (I) above.

Compound (a-21)

As the component (A) in the present invention, compound (a-21) represented by the following general formula (XXa) or (XXIa) can be used.

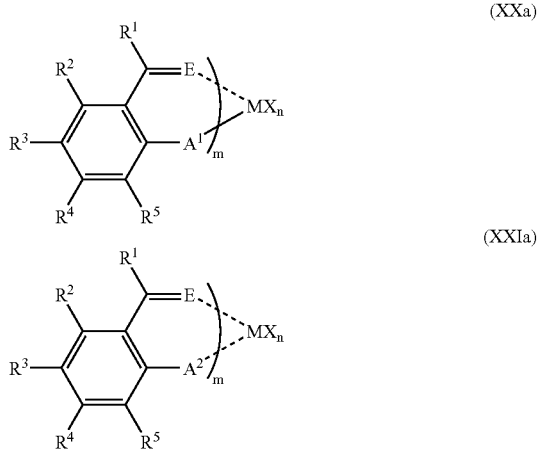

In formulae (XXa) and (XXIa), M represents a transition metal atom selected from the groups 3 and 4 in the periodic table.

In formulae (XXa) and (XXIa), $A^1$ represents an oxygen atom, a sulfur atom or a hydrocarbon-substituted nitrogen atom.

In formulae (XXa) and (XXIa), $A^2$ represents a hydrocarbon-substituted oxygen atom, a hydrocarbon-substituted sulfur atom or a hydrocarbon-substituted nitrogen atom.

In formulae (XXa) and (XXIa), E represents an oxygen atom or a sulfur atom.

In formulae (XXa) and (XXIa), m is an integer of 1 to 2.

In formulae (XXa) and (XXIa), $R^1$ to $R^5$ may be the same or different and each represent a hydrogen atom, a hydrocarbon group or a hydrocarbon-substituted silyl group.

In formulae (XXa) and (XXIa), n is a number satisfying the valence of M, and is specifically an integer of 0 to 5, preferably 0 to 4, more preferably 0 to 3.

In formulae (XXa) and (XXIa), X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, a plurality of groups represented by Xs may be the same or different, and a plurality of groups represented by Xs may be bound to each other to form a ring.

The halogen atom, hydrocarbon group, oxygen-containing group, sulfur-containing group, nitrogen-containing group, boron-containing group, aluminum-containing group, phosphorus-containing group, halogen-containing group, heterocyclic compound residue, silicon-containing group, germanium-containing group and tin-containing group represented by X in formulae (XXa) and (XXIa) include, for example, the same atom or group illustrated as $X^1$ in the general formula (I) above.

Compound (a-22)

As the component (A) in the present invention, compound (a-22) represented by the following general formula (XXb) or (XXIb) can be used.

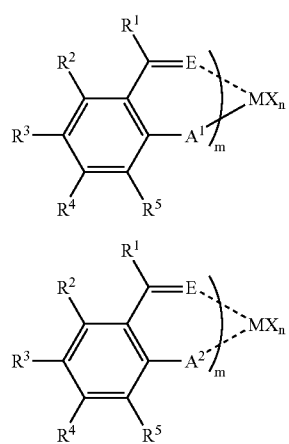

(XXb)

(XXIb)

In formulae (XXb) and (XXIb), M represents a transition metal atom selected from the groups 5 to 11 in the periodic table, preferably a transition metal atom in the groups 8 to 10 in the periodic table.

In formulae (XXb) and (XXIb), $A^1$ represents an oxygen atom, a sulfur atom or a hydrocarbon-substituted nitrogen atom.

In formulae (XXb) and (XXIb), $A^2$ represents a hydrocarbon-substituted oxygen atom, a hydrocarbon-substituted sulfur atom or a hydrocarbon-substituted nitrogen atom.

In formulae (XXb) and (XXIb), E represents an oxygen atom or a sulfur atom.

In formulae (XXb) and (XXIb), m is an integer of 1 to 2.

In formulae (XXb) and (XXIb), $R^1$ to $R^5$ may be the same or different and each represent a hydrogen atom, a hydrocarbon group or a hydrocarbon-substituted silyl group.

In formulae (XXb) and (XXIb), n is a number satisfying the valence of M, and is specifically an integer of 1 to 5, preferably 1 to 4, more preferably 1 to 3.

In formulae (XXb) and (XXIb), X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, a plurality of groups represented by Xs may be the same or different, and a plurality of groups represented by Xs may be bound to each other to form a ring.

The halogen atom, hydrocarbon group, oxygen-containing group, sulfur-containing group, nitrogen-containing group, boron-containing group, aluminum-containing group, phosphorus-containing group, halogen-containing group, heterocyclic compound residue, silicon-containing group, germanium-containing group and tin-containing group represented by X in formulae (XXb) and (XXIb) include, for example, the same atom or group illustrated as $X^1$ in the general formula (I) above.

Compound (a-23)

As the component (A) in the present invention, compound (a-23) represented by the following general formula (XXII), (XXIII), (XXIV) or (XXV) can be used.

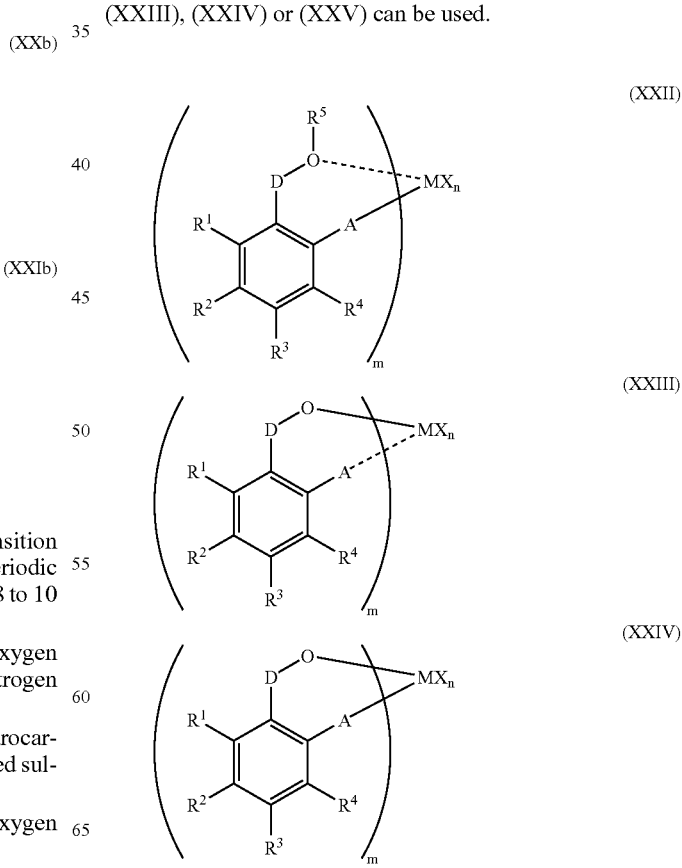

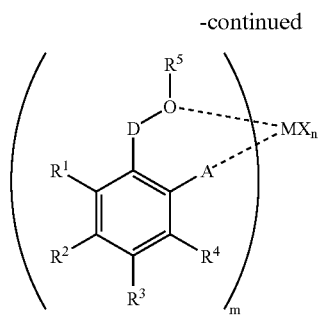

In formulae (XXII), (XXIII), (XXIV) and (XXV), M represents a transition metal atom selected from the groups 3 to 11 in the periodic table, preferably a transition metal atom in the groups 3 to 6 and 8 to 10, more preferably a transition metal atom in the group 4, 5 or 6, still more preferably a metal atom in the group 4 or 5.

In formulae (XXII), (XXIII), (XXIV) and (XXV), A represents an oxygen atom, a sulfur atom or a nitrogen atom. Depending on the mode of binding to the metal M, A can have a substituent group $R^6$.

In formulae (XXII), (XXIII), (XXIV) and (XXV), D represents —C($R^7$)($R^8$)—, —Si ($R^9$)($R^{10}$)—, —CO—, —SO$_2$—, —SO— or —P(O)(O$R^{11}$)—.

In formulae (XXII), (XXIII), (XXIV) and (XXV), m is an integer of 1 to 6, preferably an integer of 1 to 4, more preferably an integer of 1 to 3, still more preferably an integer of 1 to 2.

In formulae (XXII), (XXIII), (XXIV) and (XXV), $R^1$ to $R^{11}$ may be the same or different and each represent a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group or a tin-containing group, and two or more of these groups may be bound to each other to form a ring. When m is 2 or more, $R^1$s, $R^2$s, $R^3$s, $R^4$s, $R^5$s, $R^6$s, $R^7$s, $R^8$s, $R^9$s, $R^{10}$s or $R^{11}$s may be the same or different, and at least one of groups represented by $R^1$ to $R^{11}$ contained in one ligand may be bound to at least one of groups represented by $R^1$ to $R^{11}$ contained in another ligand.

The halogen atom, hydrocarbon group, oxygen-containing group, nitrogen-containing group, boron-containing group, sulfur-containing group, phosphorus-containing group, heterocyclic compound residue, silicon-containing group, germanium-containing group and tin-containing group represented by $R^1$ to $R^{11}$ in formulae (XXII), (XXIII), (XXIV) and (XXV) include, for example, the same atom or group illustrated as $R^1$ to $R^7$ in the general formula (I) above.

In formulae (XXII), (XXIII), (XXIV) and (XXV), n is a number satisfying the valence of M, and is specifically an integer of 1 to 5, preferably 1 to 4, more preferably 1 to 3.

In formulae (XXII), (XXIII), (XXIV) and (XXV), X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, a plurality of groups represented by Xs may be the same or different, and a plurality of groups represented by Xs may be bound to each other to form a ring.

The halogen atom, hydrocarbon group, oxygen-containing group, sulfur-containing group, nitrogen-containing group, boron-containing group, aluminum-containing group, phosphorus-containing group, halogen-containing group, heterocyclic compound residue, silicon-containing group, germanium-containing group and tin-containing group represented by X in formulae (XXII), (XXIII), (XXIV) and (XXV) include, for example, the same atom or group illustrated as $X^1$ in the general formula (I) above.

Compound (a-24)

As the component (A) in the present invention, compound (a-24) represented by the following general formula (XXVI), (XXVII), (XXVIII) or (XXIX) can be used.

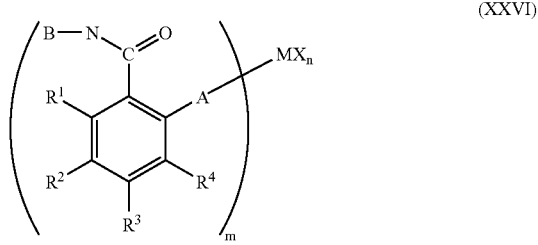

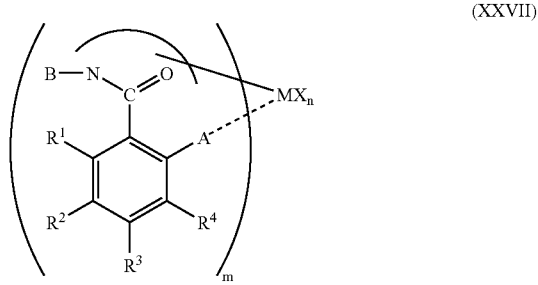

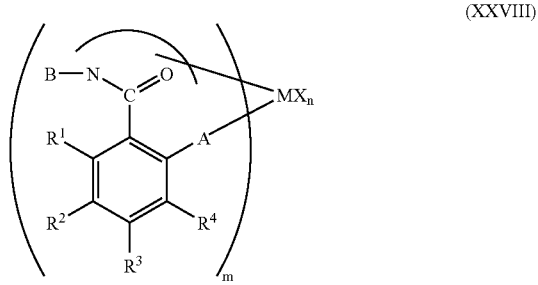

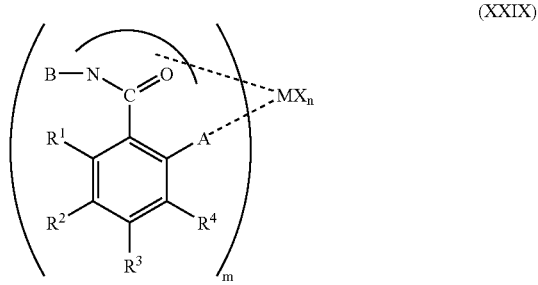

In formulae (XXVI), (XXVII), (XXVIII) and (XXIX), M represents a transition metal atom selected from the groups 3 to 11 in the periodic table, preferably a transition metal atom in the groups 3 to 6 and 8 to 10, more preferably a transition metal atom in the group 4, 5 or 6, still more preferably a metal atom in the group 4 or 5.

In formulae (XXVI), (XXVII), (XXVIII) and (XXIX), m is an integer of 1 to 6, preferably an integer of 1 to 4, more preferably an integer of 1 to 3, still more preferably an integer of 1 to 2.

In formulae (XXVI), (XXVII), (XXVIII) and (XXIX), A represents an oxygen atom, a sulfur atom or a nitrogen atom. Depending on the mode of binding to the metal M, A can have a substituent group $R^5$.

In formulae (XXVI), (XXVII), (XXVIII) and (XXIX), B represents N-binding groups —$R^6$ and —$R^7$, =$NR^8$ or =$CR^9R^{10}$.

In formulae (XXVI), (XXVII), (XXVIII) and (XXIX), $R^1$ to $R^{10}$ may be the same or different and each represent a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group or a tin-containing group, and two or more of these groups may be bound to each other to form a ring. When m is 2 or more, two groups out of the groups represented by $R^1$ to $R^{10}$ may be bound to one another to form a ring, and Rs may be the same or different.

The halogen atom, hydrocarbon group, oxygen-containing group, nitrogen-containing group, boron-containing group, sulfur-containing group, phosphorus-containing group, heterocyclic compound residue, silicon-containing group, germanium-containing group and tin-containing group represented by $R^1$ to $R^{10}$ in formulae (XXVI), (XXVII), (XXVIII) and (XXIX) include, for example, the same atom or group illustrated as $R^1$ to $R^7$ in the general formula (I) above.

In formulae (XXVI), (XXVII), (XXVIII) and (XXIX), n is a number satisfying the valence of M, and is specifically an integer of 1 to 5, preferably 1 to 4, more preferably 1 to 3.

In formulae (XXVI), (XXVII), (XXVIII) and (XXIX), X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, a plurality of groups represented by Xs may be the same or different, and a plurality of groups represented by Xs may be bound to each other to form a ring.

The halogen atom, hydrocarbon group, oxygen-containing group, sulfur-containing group, nitrogen-containing group, boron-containing group, aluminum-containing group, phosphorus-containing group, halogen-containing group, heterocyclic compound residue, silicon-containing group, germanium-containing group and tin-containing group represented by X in formulae (XXVI), (XXVII), (XXVIII) and (XXIX) include, for example, the same atom or group illustrated as $X^1$ in the general formula (I) above.

Compound (a-25)

As the component (A) in the present invention, compound (a-25) represented by the following general formula (XXX) can be used.

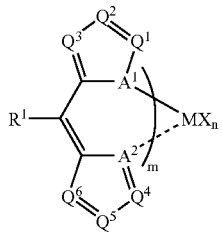

(XXX)

In formula (XXX), M represents a transition metal atom selected from the groups 3 to 11 in the periodic table, preferably a transition metal atom in the groups 3 to 6 and 8 to 10, more preferably a transition metal atom in the group 4, 5 or 6, still more preferably a metal atom in the group 4 or 5.

In formula (XXX), $A^1$ and $A^2$ may be the same or different and each represent a nitrogen atom or a phosphorus atom.

In formula (XXX), $Q^1$ to $Q^6$ may be the same or different and each represent a nitrogen atom, a phosphorus atom, or a substituent —$R^2$-containing carbon atom (—C($R^2$)=), and when a plurality of substituent-$R^2$-containing carbon atoms are present in $Q^1$ to $Q^6$, the $R^2$s may be the same or different.

In formula (XXX), $R^1$ and $R^2$ may be the same or different and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of these groups may be bound to each other to form a ring.

The halogen atom, hydrocarbon group, oxygen-containing group, nitrogen-containing group, boron-containing group, sulfur-containing group, phosphorus-containing group, heterocyclic compound residue, silicon-containing group, germanium-containing group and tin-containing group represented by $R^1$ and $R^2$ in formula (XXX) include, for example, the same atom or group illustrated as $R^1$ to $R^7$ in the general formula (I) above.

In formula (XXX), m is an integer of 1 to 6, preferably an integer of 1 to 4, more preferably an integer of 1 to 3, still more preferably an integer of 1 to 2. When m is 2 or more, $R^1$ or $R^{11}$ contained in one ligand may be bound to $R^1$ or $R^{11}$ contained in another ligand, and $R^1$s or $R^2$s may be the same or different.

In formula (XXX), n is a number satisfying the valence of M, and is specifically an integer of 1 to 5, preferably 1 to 4, more preferably 1 to 3.

In formula (XXX), X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, a plurality of groups represented by Xs may be the same or different, and a plurality of groups represented by Xs may be bound to each other to form a ring.

The halogen atom, hydrocarbon group, oxygen-containing group, sulfur-containing group, nitrogen-containing group, boron-containing group, aluminum-containing group, phosphorus-containing group, halogen-containing group, heterocyclic compound residue, silicon-containing group, germanium-containing group and tin-containing group represented by X in formula (XXX) include, for example, the same atom or group illustrated as $X^1$ in the general formula (I) above.

Compound (a-26)

As the component (A) in the present invention, compound (a-26) represented by the following general formula (XXXIa) or (XXXIIa) can be used.

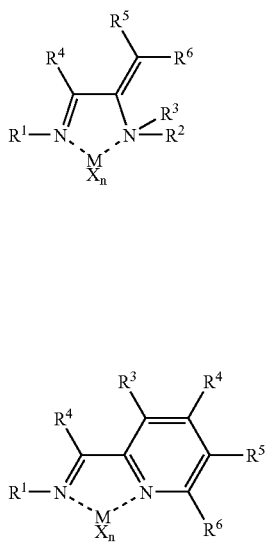

(XXXIa)

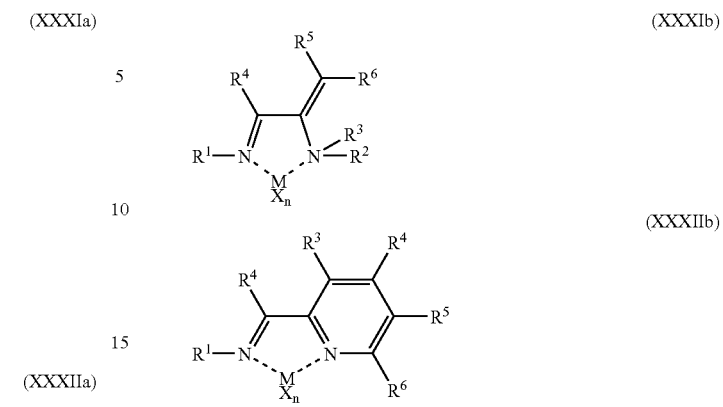

In formulae (XXXIa) and (XXXIIa), M represents a transition metal atom selected from the groups 3 to 6 in the periodic table, preferably a transition metal atom in the groups 4 and 5.

In formulae (XXXIa) and (XXXIIa), $R^1$ to $R^6$ may be the same or different and each represent a hydrogen atom, a hydrocarbon group, a $C_{1-20}$ halogenated hydrocarbon group, an oxygen-containing group, a sulfur-containing group, a silicon-containing group, a nitrogen-containing group or a phosphorus-containing group, and two or more of these groups may be bound to each other to form a ring.

The hydrocarbon group, $C_{1-20}$ halogenated hydrocarbon group, oxygen-containing group, sulfur-containing group, silicon-containing group, nitrogen-containing group and phosphorus-containing group represented by $R^1$ to $R^6$ in formulae (XXXIa) and (XXXIIa) include, for example, the hydrocarbon group, halogenated hydrocarbon group, oxygen-containing group, sulfur-containing group, silicon-containing group, nitrogen-containing group and phosphorus-containing group illustrated as $R^1$ to $R^7$ in the general formula (I) above.

In formulae (XXXIa) and (XXXIIa), n is a number satisfying the valence of M, and is specifically an integer of 1 to 5, preferably 1 to 4, more preferably 1 to 3.

In formulae (XXXIa) and (XXXIIa), Xs may be the same or different and each represent a hydrogen atom, a halogen atom, an oxygen atom, a $C_{1-20}$ hydrocarbon group, a $C_{1-20}$ halogenated hydrocarbon group, an oxygen-containing group or a sulfur-containing group.

The halogen atom, $C_{1-20}$ hydrocarbon group, $C_{1-20}$ halogenated hydrocarbon group, oxygen-containing group and sulfur-containing group represented by X in formulae (XXXIa) and (XXXIIa) include, for example, the halogen atom, hydrocarbon group, halogenated hydrocarbon group, oxygen-containing group and sulfur-containing group illustrated as $R^1$ to $R^7$ in the general formula (I) above.

Compound (a-27)

As the component (A) in the present invention, compound (a-27) represented by the following general formula (XXXIb) or (XXXIIb) can be used.

In formulae (XXXIb) and (XXXIIb), M represents a transition metal atom selected from the groups 8 to 11 in the periodic table, preferably a transition metal atom selected from the groups 8 and 9.

In formulae (XXXIb) and (XXXIIb), $R^1$ to $R^6$ may be the same or different and each represent a hydrogen atom, a hydrocarbon group, a $C_{1-20}$ halogenated hydrocarbon group, an oxygen-containing group, a sulfur-containing group, a silicon-containing group, a nitrogen-containing group or a phosphorus-containing group, and two or more of these groups may be bound to each other to form a ring.

The hydrocarbon group, $C_{1-20}$ halogenated hydrocarbon group, oxygen-containing group, sulfur-containing group, silicon-containing group, nitrogen-containing group and phosphorus-containing group represented by $R^1$ to $R^6$ in formulae (XXXIb) and (XXXIIb) include, for example, the hydrocarbon group, halogenated hydrocarbon group, oxygen-containing group, sulfur-containing group, silicon-containing group, nitrogen-containing group and phosphorus-containing group illustrated as $R^1$ to $R^7$ in the general formula (I) above.

In formulae (XXXIb) and (XXXIIb), n is a number satisfying the valence of M, and is specifically an integer of 1 to 5, preferably 1 to 4, more preferably 1 to 3.

In formulae (XXXIb) and (XXXIIb), Xs may be the same or different and each represent a hydrogen atom, a halogen atom, an oxygen atom, a $C_{1-20}$ hydrocarbon group, a $C_{1-20}$ halogenated hydrocarbon group, an oxygen-containing group or a sulfur-containing group.

The halogen atom, $C_{1-20}$ hydrocarbon group, $C_{1-20}$ halogenated hydrocarbon group, oxygen-containing group and sulfur-containing group represented by X in formula (XXXIb) and (XXXIIb) include, for example, the halogen atom, hydrocarbon group, halogenated hydrocarbon group, oxygen-containing group and sulfur-containing group illustrated as $R^1$ to $R^7$ in the general formula (I) above.

In the present invention, the transition metal compound (A) in the groups 3 to 11, having a ligand containing two or more atoms selected from a boron atom, a nitrogen atom, an oxygen atom and a sulfur atom may be carried on the carrier component (B). The transition metal compound (A) is carried on the carrier component (B) by mixing the transition metal compound (A) with the carrier component (B) under stirring in an inert solvent for a predetermined time and then collecting the mixture by filtration, during which a heating procedure may be carried out. The inert solvent includes aromatic hydrocarbons such as benzene, toluene and xylene, aliphatic saturated hydrocarbons such as hexane, heptane and decane, alicyclic hydrocarbons such as cyclohexane and methylcyclopentane, and halogenated hydrocarbons such as ethylene chloride, chlorobenzene and dichloromethane, or mixtures thereof. In heating, the temperature is varied depending on the solvent used, but is usually from a temperature higher the solidification point of the solvent to 200° C., preferably up to 150° C. The stirring mixing time is varied depending on temperature, but is usually 30 seconds to 24 hours, preferably 10 minutes to 10 hours. A filtration method used in usual organic synthesis chemistry can be used in collection by filtration. A cake component after collection by filtration may be washed as necessary with the above-mentioned aromatic hydrocarbon or aliphatic hydrocarbon. The carrier thus obtained also satisfies a feature of the carrier component of the present invention, that is, the molar ratio of magnesium atom to aluminum atom (Mg/Al) in the range of $1<Mg/Al \leqq 300.0$ and the molar ratio of alkoxy group to aluminum atom (OR/Al) in the range of $0.05<OR/Al<2.0$.

As the specific organometallic compound (C) (also referred to hereinafter as "organometallic compound") used if necessary in the present invention, the following organometallic compounds in the groups 1 and 2 and groups 12 and 13 in the periodic table can be arbitrarily used.

Organoaluminum compounds represented by:

(C-1a) The general formula: $R^a{}_m Al(OR^b)_n H_p X_q$ wherein $R^a$ and $R^b$ may be the same or different and each represent a $C_{1-20}$, preferably $C_{1-10}$, more preferably $C_{1-8}$, hydrocarbon group, X represents a halogen atom, m is a number of $0<m \leqq 3$, n is a number of $0 \leqq n<3$, p is a number of $0 \leqq p<3$, and q is a number of $0 \leqq q<3$, and simultaneously $m+n+p+q=3$. Examples of such compounds include trimethyl aluminum, triethyl aluminum, triisobutyl aluminum, trioctyl aluminum, and diisobutyl aluminum hydride.

Group 1 metal in the periodic table/aluminum alkylated complexes represented by:

(C-1b) The general formula: $M^a AlR^a{}_4$ wherein $M^a$ represents Li, Na or K, and $R^a$ represents a $C_{1-15}$, preferably $C_{1-4}$, hydrocarbon group. Examples of such compounds include $LiAl(C_2H_5)_4$, $LiAl(C_7H_{15})_4$ etc.

Dialkyl compounds of the group 2 or 12 metal in the periodic table represented by:

(C-1c) The general formula: $R^a R^b M^b$ wherein $R^a$ and $R^b$ may be the same or different and each represent a $C_{1-15}$, preferably $C_{1-4}$, hydrocarbon group, and $M^b$ is Mg, Zn or Cd. Among the specific organometallic compounds (C) described above, the organoaluminum compound is preferable, and especially the aluminum compound (C-1a) is preferable. The organometallic compounds (C-1) may be used alone or as a mixture of two or more thereof.

One feature of the present invention lies in that a conventionally used organoaluminum oxy compound or organoboron compound is not used in combination with a transition metal compound by using the carrier component of the present invention. Accordingly, at least one compound selected from (C-1a), (C-1b) and (C-1c) is satisfactory as an arbitrary component in the olefin polymerization catalyst, but the following organometallic compounds (C-2) and (C-3) may be contained as the organometallic compound (C) in the olefin polymerization catalyst of the present invention to further improve the olefin polymerization activity.

(C-2) Organoaluminum Oxy Compound

The organoaluminum oxy compound (C-2) used in the present invention may be aluminoxane known in the art or may be a benzene-insoluble organoaluminum oxy compound illustrated in JP-A 2-78687.

The aluminoxane known in the art can be produced for example by the following methods, and is obtained usually as a solution in a hydrocarbon solvent.

(1) A method in which an organoaluminum compound such as trialkyl aluminum is added to a hydrocarbon suspension of a compound containing adsorbed water or a salt containing water of crystallization, for example magnesium chloride hydrate, copper sulfate hydrate, aluminum sulfate hydrate, nickel sulfate hydrate or cerous chloride hydrate, and the adsorbed water or water of crystallization is reacted with the organoaluminum compound.

(2) A method in which water, ice or water vapor is allowed to act directly on an organoaluminum compound such as trialkyl aluminum in a medium such as benzene, toluene, ethyl ether or tetrahydrofuran.

(3) A method in which an organotin oxide such as dimethyltin oxide or dibutyltin oxide is reacted with an organoaluminum compound such as trialkyl aluminum in a medium such as decane, benzene or toluene.

The aluminoxane may contain a small amount of an organic metal component. From the recovered solution of aluminoxane, a solvent or unreacted organoaluminum compound is removed by distillation, and the aluminoxane may be re-dissolved in a solvent or suspended in a poor solvent for aluminoxane.

The examples of organoaluminum compound used in preparing the aluminoxane includes the same organoaluminum compound as illustrated for the organoaluminum compound belonging to the above-mentioned (B-1a).

Among these, trialkyl aluminum and tricycloalkyl aluminum are preferable, and trimethyl aluminum is particularly preferable.

The organoaluminum compounds described above are used alone or as a mixture of two or more thereof.

The benzene-insoluble organoaluminum oxy compound used in the present invention is preferably insoluble or sparingly soluble in benzene wherein the Al component dissolved in benzene at 60° C. is usually 10% or less, preferably 5% or less, particularly preferably 2% or less, in terms of Al atom. These organoaluminum oxy compounds (B-2) are used alone or as a mixture of two or more thereof.

(C-3) Compound which Reacts with a Transition Metal Compound to Form an Ion Pair Compound (C-3) which reacts with the transition metal compound (A) in the present invention to form an ion pair (hereinafter referred to as "ionized ionic compound") includes Lewis acid, ionic compounds, borane compounds and carborane compounds described in JP-A 1-501950, JP-A 1-502036, JP-A 3-179005, JP-A 3-179006, JP-A 3-207703, JP-A 3-207704 and U.S. Pat. No. 5,321,106. Further, heteropoly compounds and isopoly compounds can also be mentioned. These ionized ionic compounds (C-3) can be used alone or as a mixture of two or more thereof.

In the olefin polymerization catalyst of the present invention, inorganic carriers of $SiO_2$, $Al_2O_3$, MgO, ZrO, $TiO_2$, $B_2O_3$, CaO, ZnO, BaO and $ThO_2$ or organic carriers of granular or fine particle organic polymers having a particle diameter of 10 to 300 μm such as polyethylene, polypropylene, polybutene and polystyrene can be used in addition to the carrier component (B), the transition metal compound (A) and the specific organometallic compound (C).

Method of Polymerizing an Olefin, and Polyolefin Obtained by this Method

The polyolefin of the present invention is a polyolefin having a bulk density of 0.20 (g/cm$^3$) or more, which obtained in the presence of the olefin polymerization catalyst by homopolymerizing or copolymerizing olefins by the high activity of the catalyst.

The olefin subjected to the polymerization reaction in the present invention is at least one monomer selected from ethylene and α-olefin, and at least one monomer is ethylene or propylene. The α-olefin includes $C_{3-20}$, preferably $C_{3-10}$, linear or branched α-olefins, for example, propylene, 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicocene. In the polymerization method of the present invention, mention can be made of $C_{3-30}$, preferably $C_{3-20}$, cyclic olefins, for example cyclopentene, cycloheptene, norbornene, 5-methyl-2-norbornene, tetracyclododecene, 2-methyl-1,4,5,8-dimethano-1,2,3,4,4a,5,8,8a-octahydronaphthalene; polar monomers, for example allyl alcohol and α,β-unsaturated carboxylic acids such as acrylic acid, methacrylic acid, fumaric acid, maleic anhydride, itaconic acid, itaconic anhydride, bicyclo(2,2,1)-5-heptene-2,3-dicarboxylic anhydride, and metal salts thereof such as sodium salt, potassium salt, lithium salt, zinc salt, magnesium salt, calcium salt etc.; α,β-unsaturated carboxylates such as methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate, isobutyl methacrylate etc.; vinyl esters such as vinyl acetate, vinyl propionate, vinyl caproate, vinyl caprinate, vinyl laurate, vinyl stearate, vinyl trifluoroacetate etc.; and unsaturated glycidyl such as glycidyl acrylate, glycidyl methacrylate, monoglycidyl itaconate etc. Further, vinyl cyclohexane, diene or polyene; an aromatic vinyl compound, for example mono- or polyalkyl styrene such as styrene, o-methyl styrene, m-methyl styrene, p-methyl styrene, o,p-dimethyl styrene, o-ethyl styrene, m-ethyl styrene, p-ethyl styrene etc.; a functional group-containing styrene derivative such as methoxy styrene, ethoxy styrene, vinylbenzoic acid, methyl vinylbenzoate, vinylbenzyl acetate, hydroxy styrene, o-chlorostyrene, p-chlorostyrene., divinyl benzene etc.; and 3-phenylpropylene, 4-phenylpropylene, α-methylstyrene can be allowed to be present in the reaction system to allow the polymerization to proceed.

In the method of polymerizing olefins according to the present invention, olefins are polymerized or copolymerized in the presence of the olefin polymerization catalyst described above, to give an olefin polymer.

The polymerization in the present invention can be carried out by liquid-phase polymerization such as solution polymerization or suspension polymerization or by gaseous-phase polymerization. Examples of inert hydrocarbon solvents used in solution polymerization or suspension polymerization include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane, or mixtures thereof, and olefins themselves can also be used as the solvent.

When the olefin polymerization catalyst described above is used in polymerization of olefins, the component (A) is used usually in an amount of $10^{-8}$ to $10^{-2}$ mole, preferably $10^{-7}$ to $10^{-3}$ mole, per L of the reaction volume.

Component (B) is used in such an amount that the molar ratio of the magnesium atom to the total transition metal atom (M) in component (B) [Mg/M] is usually 1.0 to 1000, preferably 10 to 800. Component (C) is used in such an amount that the molar ratio of the metal atom (M') in component (C) to the total transition metal atom (M) in component (A) [M'/M] is usually 5 to 5000, preferably 100 to 3000.

The temperature of polymerization of an olefin by using the olefin polymerization catalyst is usually in the range of −50 to +200° C., preferably 0 to 170° C. The polymerization pressure is usually normal pressures to 10 MPa gauge pressure, preferably normal pressures to 5 MPa gauge pressure, and the polymerization reaction can be carried out in a batch, semi-continuous or continuous system. Further, polymerization can be carried out in two or more stages different in reaction conditions. The molecular weight of the obtained olefin polymer can be regulated by allowing hydrogen, an organosilane compound or another known molecular-weight regulator to be present in the polymerization system or by changing the polymerization temperature. Further, the molecular weight can be regulated by changing the amount of component (A) used.

The polymer obtained by the polymerization method of the present invention described above is characterized in that its bulk density is 0.20 (g/cm$^3$) or more, preferably 0.22 (g/cm$^3$) or more. In addition, the polymer is characterized in that the molecular-weight distribution (Mw/Mn) determined by GPC can be changed not only by a polymerization process such as multi-stage polymerization, but can also be regulated by selection of component (A) and can be changed in the Mw/Mn range of 1 to 150, and the polymer can be produced so as to adaptable for various uses.

Now, a major analytical method in the present invention, and methods of measuring the physical properties and properties of polymers obtained by polymerization of olefins are described.

[Analysis of the Composition of the Carrier Component]

The metal content in the carrier component was determined by plasma emission mass spectrometry. The halogen content was determined by potential difference titration, and the alkoxy group content by gas chromatography.

[Average Particle Diameter of the Carrier Component]

The number-average particle diameter was determined by an optical transmission sedimentation method using a known Stokes formula (Equation 1). The unit used was an automatic particle-size distribution measuring unit (CAPA-300, manufactured by HORIBA, Ltd.). The dispersant used was a mixed solution of decalin and triolein (decalin/triolein=1/4 (weight ratio)).

$$D = \left( \frac{18\,\eta_0 \ln(X_2/X_1)}{(\rho - \rho_0)\omega^2 t} \right)^{1/2}$$

D: Particle diameter of catalyst (cm)

$\eta_0$: Viscosity coefficient of dispersant (poise)

$\rho$: Sample density (g/cm$^3$)

$\rho_0$: Dispersant density (g/cm$^3$)

t: Sedimentation time (sec.)

$X_1$: Distance from rotation center to sedimentation surface (cm)

$X_2$: Distance from rotation center to measurement surface (cm)

ω: Rotation angular velocity (rad/sec.)

[Crystallite Size of the Carrier Component]

The crystallite size was determined by measuring the half band width value of a magnesium chloride (110) face with an X-ray diffraction unit (RU-300 manufactured by Rigaku Corporation.) and by applying a known Scherrer's equation (in the equation, 0.9 is attributable to the constant K). All samples used in measuring their crystallite size were handled in a nitrogen atmosphere. The method of measuring the crystallite size by using the Scherrer formula is described in detail in Essence of Cullity X-Ray Diffraction (in Japanese) (translated by Gentaro Matsumura) published by Agne Co., Ltd.

[Weight-Average Molecular Weight (Mw) and Number-Average Molecular Weight (Mn) of the Polymer]

Calculated from a molecular-weight distribution curve obtained by Waters model [Alliance GPC 2000] gel permeation chromatography (high-temperature size-extrusion chromatography). The operation conditions are as follows:

Mobilephase: o-Dichlorobenzene (Wako Pure Chemical Industries, Ltd.)

Flow rate of mobile phase: 1 ml/min.

Columns: Two columns of TSK-GEL® model GMH6-HT and two columns of TSK-GEL® model GMH6-HTL.

Temperature: 140° C.

Sample concentration: 30 mg/20 ml (0.15% (w/v))

Injection volume: 500 μL

Detection method: Detection by a reflectometer integrated in a chromatographic unit

[Intrinsic Viscosity [η] of the Polymer]

The intrinsic viscosity is a value measured at 135° C. in a decalin solvent. That is, about 20 g granulated pellets are dissolved in 15 ml decalin and measured for its specific viscosity $\eta_{sp}$ in an oil bath at 135° C. This decalin solution is diluted with additional 5 ml decalin solvent, and then measured for its specific viscosity $\eta_{sp}$ spin the same manner as above. This diluting procedure is repeated further twice, and the value of $\eta_{sp}/C$ upon extrapolation of concentration (C) to 0 is determined as the intrinsic viscosity.

$$[\eta]=\lim(\eta_{sp}/C)(C \to 0)$$

[Melt flow rate ($MFR_{2.16}$)]

A value determined at 190° C. under a loading of 2.16 kg by a standard method of ASTM D-1238.

[Polymer Bulk Density]

Determined from the weight of a sample in a container having an internal volume of 100 ml according to JIS K-6721.

EXAMPLES

Hereinafter, the present invention is described in more detail by reference to the Examples, but the present invention is not limited to the Examples. The structures of compounds obtained in the synthesis examples were determined by using 270 MHz $^1$H-NMR (JEOL GSH-270), FD-mass spectrometry (JEOL SX-102A) etc.

Example 1

Preparation of Component (b1)

95.2 g (1.0 mole) anhydrous magnesium chloride, 442 ml decane and 390.6 g (3.0 moles) 2-ethylhexyl alcohol were reacted at 130° C. for 2 hours to give a uniform solution (component (b1)).

Preparation of Component (b1-1)

A flask having an internal volume of 200 ml purged sufficiently with nitrogen was charged with 25 ml component (b1) (25 mmol in terms of magnesium atom) and 100 ml purified decane, and while the temperature of the solution was kept at 15° C. under stirring, 26 mmol triethyl aluminum diluted with purified decane was added dropwise thereto over 30 minutes. Thereafter, the temperature of the solution was increased to 80° C. over 120 minutes, and the mixture was reacted for additional 60 minutes. While the temperature was kept at 80° C., 49 mmol triethyl aluminum diluted with purified decane was again added dropwise thereto over 30 minutes, and the mixture was further reacted under heating for 60 minutes. After the reaction was finished, the solids were collected by filtration and washed sufficiently with toluene, and 100 ml toluene was added thereto to form a toluene slurry of component (b1-1). The average particle diameter of the resulting component (b1-1) was 20 μm.

A part of the component (b1-1) prepared by the above procedure was dried and examined for its composition, indicating 17.0 weight % magnesium, 2.9 weight % aluminum, 26.4 weight % 2-ethylhexoxy group and 49.0 weight % chlorine. Accordingly, the molar ratio of magnesium to aluminum (Mg/Al) was 6.5, and the molar ratio of 2-ethylhexoxy group to aluminum (OR/Al) was 1.9.

Preparation of Component (b1-1-a2-172)

A flask having an internal volume of 200 ml purged sufficiently with nitrogen was charged with purified toluene so as to adjust the total volume to 154.1 ml and with component (b1-1) in an amount of 10 mmol in term of magnesium atom. While the sample was kept at 25° C. under stirring, 45.9 ml toluene solution (0.001089 mmol/ml) of component (a2-172) below was added dropwise thereto over 20 minutes. After the mixture was stirred for 1 hour, the solids were collected by filtration and washed sufficiently with toluene, and 100 ml purified decane was added thereto to give a decane slurry of component (b1-1-a2-172).

A part of this slurry was collected to analyze its concentration, indicating 1.30 mg/mL magnesium and 20.8 μg/mL zirconium. Accordingly, the content of zirconium atom in 1 g of the component (b1-1-a2-172) was calculated to be 2.7 mg/g.

From the ICP-MASS spectrometry of a dry sample of the component (b1-1-a2-172), it was confirmed that 0.28 weight % zirconium atom was contained. The other components were 17.0 weight % magnesium, 2.8 weight % aluminum, 25.1 weight % 2-ethylhexyl group, and 51.0 weight % chlorine. Accordingly, the molar ratio of magnesium to aluminum (Mg/Al) was 6.7, and the molar ratio of 2-ethylhexoxy group to aluminum (OR/Al) was 1.9, and it was confirmed that the molar ratio was hardly changed from the corresponding molar ratio of component (b1-1).

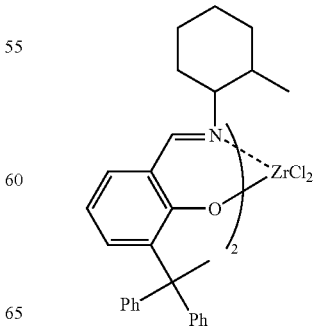

Component (a2-172)

Polymerization 500 ml purified heptane was introduced into an SUS autoclave having an internal volume of 1 liter purged sufficiently with nitrogen, and the liquid phase and gaseous phase were saturated with ethylene by blowing ethylene. Thereafter, the heptane was heated to 75° C., and the autoclave was charged in an ethylene atmosphere with 0.5 mmol triethyl aluminum and the above component (b1-1-a2-172) (0.0004 mmol in terms of zirconium atom) in this order. Polymerization was carried out for 60 minutes at an ethylene pressure of 0.8 MPa·G. During the polymerization, the system was kept at 80° C. and at an ethylene pressure of 0.8 MPa·G. After the polymerization was finished, the reaction product was washed with a large amount of hexane and collected by filtration with a glass filter. The resulting polymer was dried under vacuum for 10 hours to give 66.9 g polyethylene.

The polymerization activity was 167.2 kg/mmol-Zr·hr, and the polymerization activity per g of the component (b1-1-a2-172) was 5.1 kg/g-cat·hr, and this polyethylene had a [η] value of 16.3 dl/g and a bulk density of 0.24 g/cm$^3$. The Mw of this polyethylene as determined by GPC was $1.9 \times 10^6$, and the Mw/Mn ratio was 4.1.

Example 2

Preparation of Component (b1-1-a2-140)

A flask having an internal volume of 200 ml purged sufficiently with nitrogen was charged with purified toluene so as to adjust the total volume to 128.4 ml and with component (b1-1) in an amount of 10 mmol in term of magnesium atom. While the sample was kept at 25° C. under stirring, 71.6 ml toluene solution (0.000699 mmol/ml) of component (a2-140) below was added dropwise thereto over 20 minutes. After the mixture was stirred for 1 hour, the solids were collected by filtration and washed sufficiently with toluene, and 100 ml purified decane was added thereto to give a decane slurry of component (b1-1-a2-140).

A part of the component (b1-1-a2-140) prepared by the above procedure was dried and examined for its composition, indicating 16.0 weight % magnesium, 2.7 weight % aluminum, 24.0 weight % 2-ethylhexoxy group, 48.0 weight % chlorine and 0.30 weight % zirconium. Similarly to Example 1, the analytical content of zirconium agreed well with the theoretical content. The molar ratio of magnesium to aluminum (Mg/Al) was 6.3, and the molar ratio of 2-ethylhexoxy group to aluminum (OR/Al) was 1.8, and it was confirmed that similarly to Example 1, the molar ratio hardly changed from the corresponding molar ratio of the component (b1-1).

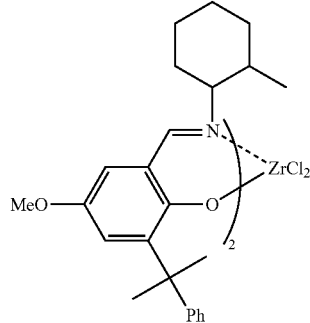

Component (a2-140)

Polymerization

Polymerization was carried out in the same manner as in Example 1 except that in the Polymerization in Example 1, the component (b1-1-a2-140) prepared above was used in place of the component (b1-1-a2-172). As a result, 50.9 g polyethylene was obtained.

The polymerization activity was 127.3 kg/mmol-Zr·hr, and the polymerization activity per g of the component (b1-1-a2-140) was 4.2 kg/g-cat·hr, and this polyethylene had a [η] value of 18.3 dl/g and a bulk density of 0.33 g/cm$^3$. The Mw of this polyethylene as determined by GPC was $2.4 \times 10^6$, and the Mw/Mn ratio was 5.9.

Example 3

Preparation of Component (b1-1-a2-204)

A flask having an internal volume of 200 ml purged sufficiently with nitrogen was charged with purified toluene so as to adjust the total volume to 125.5 ml and with component (b1-1) in an amount of 10 mmol in term of magnesium atom. While the sample was kept at 25° C. under stirring, 74.5 ml toluene solution (0.000671 mmol/ml) of component (a2-204) below was added dropwise thereto over 20 minutes. After the mixture was stirred for 1 hour, the solids were collected by filtration and washed sufficiently with toluene, and 100 ml purified decane was added thereto to give a decane slurry of component (b1-1-a2-204).

A part of the component (b1-1-a2-204) prepared by the above procedure was dried and examined for its composition, indicating 17.0 weight % magnesium, 2.7 weight % aluminum, 24.0 weight % 2-ethylhexoxy group, 50.0 weight % chlorine and 0.31 weight % zirconium. Accordingly, the molar ratio of magnesium to aluminum (Mg/Al) was 7.0, and the molar ratio of 2-ethylhexoxy group to aluminum (OR/Al) was 1.8.

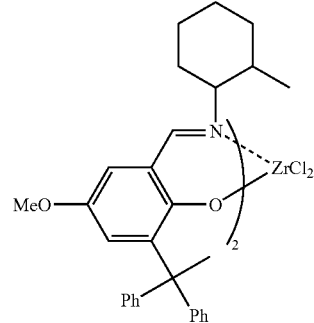

Component (a2-204)

Polymerization

Polymerization was carried out in the same manner as in Example 1 except that in the Polymerization in Example 1, the component (b1-1-a2-204) prepared above was used in place of the component (b1-1-a2-172). As a result, 40.3 g polyethylene was obtained.

The polymerization activity was 100.8 kg/mmol-Zr·hr, and the polymerization activity per g of the component (b1-1-a2-204) was 3.4 kg/g-cat·hr, and this polyethylene had a [η]

value of 18.1 dl/g and a bulk density of 0.28 g/cm³. The Mw of this polyethylene as determined by GPC was 2.2×10⁶, and the Mw/Mn ratio was 7.1.

Example 4

Preparation of Component (b1-1-a2-126)

A flask having an internal volume of 200 ml purged sufficiently with nitrogen was charged with purified toluene so as to adjust the total volume to 153.8 ml and with component (b1-1) in an amount of 10 mmol in term of magnesium atom. While the sample was kept at 25° C. under stirring, 46.2 ml toluene solution (0.001083 mmol/ml) of component (a2-126) below was added dropwise thereto over 20 minutes. After the mixture was stirred for 1 hour, the solids were collected by filtration and washed sufficiently with toluene, and 100 ml purified decane was added thereto to give a decane slurry of component (b1-1-a2-126).

A part of the component (b1-1-a2-126) prepared by the above procedure was dried and examined for its composition, indicating 17.0 weight % magnesium, 2.8 weight % aluminum, 25.8 weight % 2-ethylhexoxy group, 51.0 weight % chlorine and 0.31 weight % zirconium. Accordingly, the molar ratio of magnesium to aluminum (Mg/Al) was 6.7, and the molar ratio of 2-ethylhexoxy group to aluminum (OR/Al) was 1.9.

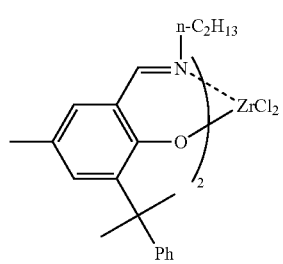

Component (a2-126)

Polymerization

Polymerization was carried out in the same manner as in Example 1 except that in the Polymerization in Example 1, the component (b1-1-a2-126) (0.001 mmol in terms of zirconium atom) prepared above was used in place of the component (b1-1-a2-172). As a result, 20.5 g polyethylene was obtained.

The polymerization activity was 20.5 kg/mmol-Zr·hr, and the polymerization activity per g of the component (b1-1-a2-126) was 0.7 kg/g-cat·hr, and this polyethylene had a [η] value of 0.5 dl/g and a bulk density of 0.20 g/cm³. The Mw of this polyethylene as determined by GPC was 1.1×10⁴, and the Mw/Mn ratio was 3.0.

Example 5

Preparation of Component (b1-1-a2-116)

A flask having an internal volume of 200 ml purged sufficiently with nitrogen was charged with purified toluene so as to adjust the total volume to 131.8 ml and with component (b1-1) in an amount of 10 mmol in term of magnesium atom. While the sample was kept at 25° C. under stirring, 68.2 ml toluene solution (0.000734 mmol/ml) of component (a2-116) below was added dropwise thereto over 20 minutes. After the mixture was stirred for 1 hour, the solids were collected by filtration and washed sufficiently with toluene, and 100 ml purified decane was added thereto to give a decane slurry of component (b1-1-a2-116).

A part of the component (b1-1-a2-116) prepared by the above procedure was dried and examined for its composition, indicating 17.0 weight % magnesium, 2.8 weight % aluminum, 26.6 weight % 2-ethylhexoxy group, 49.0 weight % chlorine and 0.30 weight % zirconium. Accordingly, the molar ratio of magnesium to aluminum (Mg/Al) was 6.7, and the molar ratio of 2-ethylhexoxy group to aluminum (OR/Al) was 2.0.

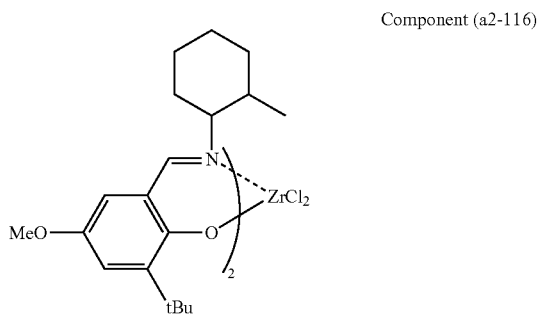

Component (a2-116)

Polymerization

Polymerization was carried out in the same manner as in Example 1 except that in the Polymerization in Example 1, the component (b1-1-a2-116) (0.001 mmol in terms of zirconium atom) prepared above was used in place of the component (b1-1-a2-172). As a result, 17.5 g polyethylene was obtained.

The polymerization activity was 17.5 kg/mmol-Zr·hr, and the polymerization activity per g of the component (b1-1-a2-116) was 0.6 kg/g-cat·hr, and this polyethylene had a [η] value of 20.0 dl/g and a bulk density of 0.31 g/cm³.

Example 6

Preparation of Component (b1-1-a2-228)

A flask having an internal volume of 200 ml purged sufficiently with nitrogen was charged with purified toluene so as to adjust the total volume to 150.0 ml and with component (b1-1) in an amount of 10 mmol in term of magnesium atom. While the sample was kept at 25° C. under stirring, 50.0 ml toluene solution (0.00100 mmol/ml) of component (a2-228) below was added dropwise thereto over 20 minutes. After the mixture was stirred for 1 hour, the solids were collected by filtration and washed sufficiently with toluene, and 100 ml purified decane was added thereto to give a decane slurry of component (b1-1-a2-228).

A part of the component (b1-1-a2-228) prepared by the above procedure was dried and examined for its composition, indicating 18.0 weight % magnesium, 2.6 weight % aluminum, 20.0 weight % 2-ethylhexoxy group, 54.0 weight % chlorine and 0.35 weight % zirconium. Accordingly, the molar ratio of magnesium to aluminum (Mg/Al) was 7.7, and the molar ratio of 2-ethylhexoxy group to aluminum (OR/Al) was 1.6.

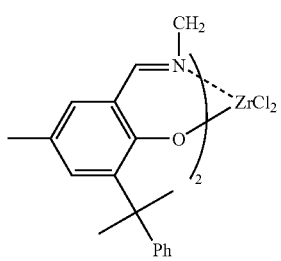

Component (a2-228)

Polymerization

Polymerization was carried out in the same manner as in Example 1 except that in the Polymerization in Example 1, the component (b1-1-a2-228) (0.001 mmol in terms of zirconium atom) prepared above was used in place of the component (b1-1-a2-172). As a result, 8.8 g polyethylene was obtained.

The polymerization activity was 8.8 kg/mmol-Zr·hr, and the polymerization activity per g of the component (b1-1-a2-228) was 1.2 kg/g-cat·hr, and the [η] value of this polyethylene was 0.24 dl/g. The Mw of this polyethylene as determined by GPC was $3.0 \times 10^3$, and the Mw/Mn ratio was 1.9.

Example 7

Preparation of Component (b1-1-a2-138)

A flask having an internal volume of 200 ml purged sufficiently with nitrogen was charged with purified toluene so as to adjust the total volume to 150.0 ml and with component (b1-1) in an amount of 10 mmol in term of magnesium atom. While the sample was kept at 25° C. under stirring, 50.0 ml toluene solution (0.00100 mmol/ml) of component (a2-138) below was added dropwise thereto over 20 minutes. After the mixture was stirred for 1 hour, the solids were collected by filtration and washed sufficiently with toluene, and 100 ml purified decane was added thereto to give a decane slurry of component (b1-1-a2-138).

A part of the component (b1-1-a2-138) prepared by the above procedure was dried and examined for its composition, indicating 18.0 weight % magnesium, 2.5 weight % aluminum, 20.5 weight % 2-ethylhexoxy group, 51.0 weight % chlorine and 0.32 weight % zirconium. Accordingly, the molar ratio of magnesium to aluminum (Mg/Al) was 8.0, and the molar ratio of 2-ethylhexoxy group to aluminum (OR/Al) was 1.7.

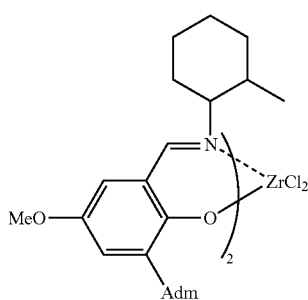

Component (a2-138)

Polymerization

Polymerization was carried out in the same manner as in Example 1 except that in the Polymerization in Example 1, the component (b1-1-a2-138) (0.001 mmol in terms of zirconium atom) prepared above was used in place of the component (b1-1-a2-172). As a result, 55.5 g polyethylene was obtained.

The polymerization activity was 55.5 kg/mmol-Zr·hr, and the polymerization activity per g of the component (b1-1-a2-138) was 2.0 kg/g-cat·hr, and this polyethylene had a [η] value of 13.7 dl/g and a bulk density of 0.21 g/cm³. The Mw of this polyethylene as determined by GPC was $166.8 \times 10^4$, and the Mw/Mn ratio was 12.3.

Example 8

Preparation of Component (b1-1-a2-241)

A flask having an internal volume of 200 ml purged sufficiently with nitrogen was charged with purified toluene so as to adjust the total volume to 150.0 ml and with component (b1-1) in an amount of 10 mmol in term of magnesium atom. While the sample was kept at 25° C. under stirring, 50.0 ml toluene solution (0.00100 mmol/ml) of component (a2-241) below was added dropwise thereto over 20 minutes. After the mixture was stirred for 1 hour, the solids were collected by filtration and washed sufficiently with toluene, and 100 ml purified decane was added thereto to give a decane slurry of component (b1-1-a2-241).

A part of the component (b1-1-a2-241) prepared by the above procedure was dried and examined for its composition, indicating 18.0 weight % magnesium, 2.5 weight % aluminum, 22.8 weight % 2-ethylhexoxy group, 52.0 weight % chlorine and 0.28 weight % zirconium. Accordingly, the molar ratio of magnesium to aluminum (Mg/Al) was 8.0, and the molar ratio of 2-ethylhexoxy group to aluminum (OR/Al) was 1.9.

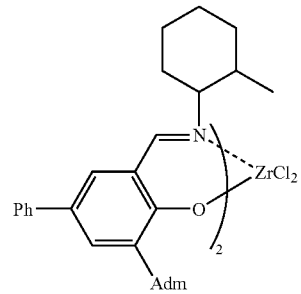

Component (a2-241)

in place of the component (b1-1-a2-172). As a result, 22.6

Polymerization

Polymerization was carried out in the same manner as in Example 1 except that in the Polymerization in Example 1, the component (b1-1-a2-241) (0.001 mmol in terms of zirconium atom) prepared above was used g polyethylene was obtained.

The polymerization activity was 22.6 kg/mmol-Zr·hr, and the polymerization activity per g of the component (b1-1-a2-241) was 0.7 kg/g-cat·hr, and this polyethylene had a [η]

value of 9.7 dl/g and a bulk density of 0.20 g/cm$^3$. The Mw of this polyethylene as determined by GPC was 104.4×10$^4$, and the Mw/Mn ratio was 23.8.

Example 9

Preparation of Component (b1-1-a2-134)

A flask having an internal volume of 200 ml purged sufficiently with nitrogen was charged with component (b1-1) in an amount of 4 mmol in term of magnesium atom and 100 ml purified toluene, and while the sample was kept at room temperature under stirring, 18.8 ml toluene solution (0.00106 mmol/ml) of component (a2-134) below was added dropwise thereto over 20 minutes. After the mixture was stirred for 1 hour, the solids were collected by filtration and washed sufficiently with toluene, and 50 ml purified decane was added thereto to give a decane slurry of component (b1-1-a2-134).

A part of this slurry was collected to analyze its concentration, indicating 1.59 mg/mL magnesium and 30.0 μg/mL zirconium. Accordingly, the content of zirconium atom in 1 g of the component (b1-2-a2-134) was calculated to be 3.2 mg/g.

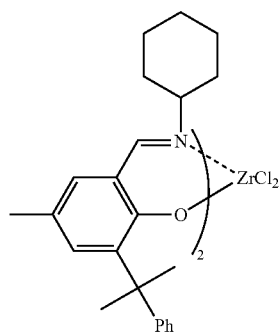

Component (a2-134)

Polymerization

Polymerization was carried out in the same manner as in Example 1 except that in the Polymerization in Example 1, the component (b1-1-a2-134) (0.001 mmol in terms of zirconium atom) prepared above was used in place of the component (b1-1-a2-172). As a result, 15.0 g polyethylene was obtained.

The polymerization activity was 15.0 kg/mmol-Zr·hr, and the polymerization activity per g of the component (b1-1-a2-241) was 0.5 kg/g-cat·hr, and this polyethylene had a [η] value of 2.8 dl/g and a bulk density of 0.23 g/cm$^3$.

Example 10

Preparation of Component (b1-1-a2-195)

A flask having an internal volume of 200 ml purged sufficiently with nitrogen was charged with component (b1-1) in an amount of 4 mmol in term of magnesium atom and purified toluene so as to adjust the total volume to 85.4 ml, and while the sample was kept at room temperature under stirring, 14.6 ml toluene solution (0.00103 mmol/ml) of component (a2-195) below was added dropwise thereto over 20 minutes. After the mixture was stirred for 1 hour, the solids were collected by filtration and washed sufficiently with toluene, and 50 ml purified decane was added thereto to give a decane slurry of component (b1-1-a2-195).

A part of this slurry was collected to analyze its concentration, indicating 1.22 mg/mL magnesium and 21.2 μg/mL zirconium. Accordingly, the content of zirconium atom in 1 g of the component (b1-2-a2-195) was calculated to be 3.0 mg/g.

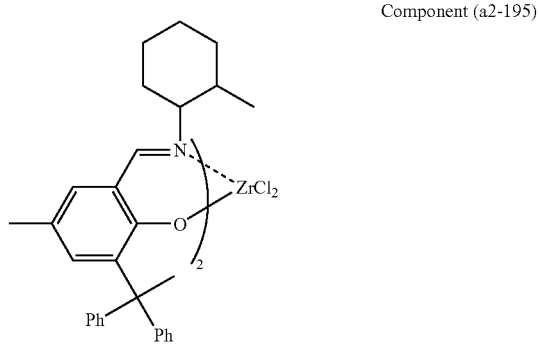

Component (a2-195)

Polymerization 500 ml purified heptane was introduced into an SUS autoclave having an internal volume of 1 liter purged sufficiently with nitrogen, and the liquid phase and gaseous phase were saturated with ethylene by blowing ethylene. Thereafter, the heptane was heated to 75° C., and the autoclave was charged in an ethylene atmosphere with 0.35 mmol triethyl aluminum and the above component (b1-1-a2-195) (0.00035 mmol in terms of zirconium atom) in this order. Polymerization was carried out for 60 minutes at an ethylene pressure of 0.8 MPa·G. During the polymerization, the system was kept at 80° C. and at an ethylene pressure of 0.8 MPa·G. After the polymerization was finished, the reaction product was washed with a large amount of hexane and collected by filtration with a glass filter. The resulting polymer was dried under vacuum for 10 hours to give 41.2 g polyethylene.

The polymerization activity was 160.6 kg/mmol-Zr·hr, and the polymerization activity per g of the component (b1-1-a2-195) was 3.9 kg/g-cat·hr, and this polyethylene had a [η] value of 17.2 dl/g and a bulk density of 0.28 g/cm$^3$. [Example 11]

Preparation of Component (b1-2)

A flask having an internal volume of 400 ml purged sufficiently with nitrogen was charged with 12.5 ml component (b1) (12.5 mmol in terms of magnesium atom) and 200 ml purified decane, and while the temperature of the solution was kept at 15° C. under stirring, 13 mmol triethyl aluminum diluted with purified decane was added dropwise thereto over 30 minutes. Thereafter, the temperature of the solution was increased to 80° C. over 120 minutes, and the mixture was reacted for additional 60 minutes. While the temperature was kept at 80° C., 24.5 mmol triethyl aluminum diluted with purified decane was again added dropwise thereto over 30 minutes, and the mixture was further reacted under heating for 60 minutes. After the reaction was finished, the solids were collected by filtration and washed sufficiently with toluene, and 50 ml toluene was added thereto to form a toluene slurry of component (b1-2). The average particle diameter of the resulting component (b1-2) was 20 μm.

A part of the component (b1-2) prepared by the above procedure was dried and examined for its composition, indicating 18.0 weight % magnesium, 26.0 weight % aluminum, 21.4 weight % 2-ethylhexoxy group and 52.0 weight % chlorine. Accordingly, the molar ratio of magnesium to aluminum (Mg/Al) was 7.7, and the molar ratio of 2-ethylhexoxy group to aluminum (OR/Al) was 1.7.

Preparation of Component (b1-2-a2-172)

A flask having an internal volume of 200 ml purged sufficiently with nitrogen was charged with component (b1-2) in an amount of 3 mmol in term of magnesium atom and purified toluene so as to adjust the total volume to 85.1 ml, and while the sample was kept at room temperature under stirring, 14.9 ml toluene solution (0.001005 mmol/ml) of component (a2-172) below was added dropwise thereto over 20 minutes. After the mixture was stirred for 1 hour, the solids were collected by filtration and washed sufficiently with toluene, and 50 ml purified decane was added thereto to give a decane slurry of component (b1-2-a2-172).

A part of this slurry was collected to analyze its concentration, indicating 1.07 mg/mL magnesium and 26.5 µg/mL zirconium. Accordingly, the content of zirconium atom in 1 g of the component (b1-2-a2-172) was calculated to be 4.5 mg/g.

Polymerization

Polymerization was carried out in the same manner as in Example 12 except that in the Polymerization in Example 12, the component (b1-2-a2-172) prepared above was used in place of the component (b1-1-a2-195). As a result, 57.2 g polyethylene was obtained.

The polymerization activity was 163.3 kg/mmol-Zr·hr, and the polymerization activity per g of the component (b2-1-a2-172) was 8.1 kg/g-cat·hr, and this polyethylene had a [η] value of 17.4 dl/g and a bulk density of 0.27 g/cm$^3$.

Example 12

Preparation of Component (b2)

95.2 g (1.0 mole) anhydrous magnesium chloride, 551 ml decane and 325.5 g (2.5 moles) 2-ethylhexyl alcohol were reacted at 130° C. for 2 hours to give a uniform solution (component (b2)).

Preparation of Component (b2-1)

A flask having an internal volume of 200 ml purged sufficiently with nitrogen was charged with 25 ml component (b2) (25 mmol in terms of magnesium atom) and 100 ml purified decane, and while the temperature of the solution was kept at 15° C. under stirring, 25 mmol triethyl aluminum diluted with purified decane was added dropwise thereto over 30 minutes. Thereafter, the temperature of the solution was increased to 80° C. over 120 minutes, and the mixture was reacted for additional 60 minutes. While the temperature was kept at 80° C., 37.5 mmol triethyl aluminum diluted with purified decane was again added dropwise thereto over 30 minutes, and the mixture was further reacted under heating for 60 minutes. After the reaction was finished, the solids were collected by filtration and washed sufficiently with toluene, and 100 ml toluene was added thereto to form a toluene slurry of component (b2-1). The average particle diameter of the resulting component (b2-1) was 9 µm.

A part of the component (b2-1) prepared by the above procedure was dried and examined for its composition, indicating 18.0 weight % magnesium, 2.3 weight % aluminum, 19.0 weight % 2-ethylhexoxy group and 54.0 weight % chlorine. Accordingly, the molar ratio of magnesium to aluminum (Mg/Al) was 8.7, and the molar ratio of 2-ethylhexoxy group to aluminum (OR/Al) was 1.6.

Preparation of Component (b2-1-a2-172)

A flask having an internal volume of 200 ml purged sufficiently with nitrogen was charged with component (b2-1) in an amount of 4 mmol in term of magnesium atom and purified toluene so as to adjust the total volume to 85.4 ml, and while the sample was kept at room temperature under stirring, 14.6 ml toluene solution (0.001029 mmol/ml) of component (a2-172) below was added dropwise thereto over 20 minutes. After the mixture was stirred for 1 hour, the solids were collected by filtration and washed sufficiently with toluene, and 50 ml purified decane was added thereto to give a decane slurry of component (b2-1-a2-172).

A part of this slurry was collected to analyze its concentration, indicating 1.26 mg/mL magnesium and 29.0 µg/mL zirconium. Accordingly, the content of zirconium atom in 1 g of the component (b2-1-a2-172) was calculated to be 4.1 mg/g.

Polymerization

Polymerization was carried out in the same manner as in Example 10 except that in the Polymerization in Example 10, the component (b2-1-a2-172) prepared above was used in place of the component (b1-1-a2-195). As a result, 55.9 g polyethylene was obtained.

The polymerization activity was 159.7 kg/mmol-Zr·hr, and the polymerization activity per g of the component (b2-1-a2-172) was 7.2 kg/g-cat·hr, and this polyethylene had a [η] value of 17.2 dl/g and a bulk density of 0.29 g/cm$^3$.

Example 13

Preparation of Component (b1-3)

A flask having an internal volume of 200 mL purged sufficiently with nitrogen was charged with 25 mL component (b1) (25 mmol in terms of magnesium atom) and 100 mL purified toluene, and while the temperature of the solution was kept at −20° C. under stirring, 26 mmol triethyl aluminum diluted with toluene was added dropwise thereto over 30 minutes. Thereafter, the temperature of the solution was increased to 80° C. over 130 minutes, and the mixture was reacted for 1 hour. While the temperature was kept at 80° C., 250 mmol triethyl aluminum diluted with toluene was again added dropwise thereto over 30 minutes, and the mixture was further reacted under heating for 1 hour. After the reaction was finished, the solids were collected by filtration and washed sufficiently with toluene, and 100 mL toluene was added thereto to form a toluene slurry of component (b1-3). The average particle diameter of the resulting component (b1-3) was 11 µm.

A part of the component (b1-3) prepared by the above procedure was dried and examined for its composition, indicating 25.0 weight % magnesium, 0.6 weight % aluminum, 2.6 weight % 2-ethylhexoxy group and 71.0 weight % chlorine. Accordingly, the molar ratio of magnesium to aluminum (Mg/Al) was 46.3, and the molar ratio of 2-ethylhexoxy group to aluminum (OR/Al) was 0.9.

Preparation of Component (b1-3-a2-172)

A flask having an internal volume of 200 ml purged sufficiently with nitrogen was charged with purified toluene so as to adjust the total volume to 85.3 mL and with component (b1-3) in an amount of 3 mmol in term of magnesium atom. While the sample was kept at 25° C. under stirring, 14.7 mL toluene solution (0.001021 mmol/ml) of component (a2-172) above was added dropwise thereto over 20 minutes. After the mixture was stirred for 1 hour, the solids were collected by filtration and washed sufficiently with toluene, and decane was added thereto to give a decane slurry of component (b1-3-a2-172).

A part of this slurry was collected to analyze its concentration, indicating 1.05 mg/mL magnesium and 24.0 μg/mL zirconium. Accordingly, the content of zirconium atom in 1 g of the component (b1-3-a2-172) was calculated to be 5.72 mg/g.

Polymerization

Polymerization was carried out in the same manner as in Example 10 except that in the Polymerization in Example 10, the component (b1-3-a2-172) prepared above was used in place of the component (b1-1-a2-195). As a result, 37.8 g polyethylene was obtained.

The polymerization activity was 108.1 kg/mmol-Zr·hr, and the polymerization activity per g of the component (b1-3-a2-172) was 6.8 kg/g-cat·hr, and this polyethylene had a [η] value of 16.6 dl/g and a bulk density of 0.40 g/cm$^3$.

Example 14

Preparation of Component (b1-4)

A flask having an internal volume of 200 mL purged sufficiently with nitrogen was charged with 25 mL component (b1) (25 mmol in terms of magnesium atom) prepared in Example 1 and with 100 mL anhydrous 1,2-dichlorobenzene, and while the temperature of the solution was kept at 0° C. under stirring, 26 mmol triethyl aluminum diluted with anhydrous 1,2-dichlorobenzene was added dropwise thereto over 30 minutes. Thereafter, the temperature of the solution was increased to 80° C. over 150 minutes, and the mixture was reacted for 1 hour. While the temperature was kept at 80° C., 175 mmol triethyl aluminum diluted with anhydrous 1,2-dichlorobenzene was again added dropwise thereto over 30 minutes, and the mixture was further reacted under heating for 1 hour. After the reaction was finished, the solids were collected by filtration and washed sufficiently with toluene, and 100 mL toluene was added thereto to form a toluene slurry of component (b1-4). The average particle diameter of the resulting component (b1-4) was 8 μm.

A part of the component (b1-4) prepared by the above procedure was dried and examined for its composition, indicating 24.0 weight % magnesium, 0.6 weight % aluminum, 4.8 weight % 2-ethylhexoxy group and 68.0 weight % chlorine. Accordingly, the molar ratio of magnesium to aluminum (Mg/Al) was 44.4, and the molar ratio of 2-ethylhexoxy group to aluminum (OR/Al) was 1.66.

Preparation of Component (b1-4-a2-172)

A flask having an internal volume of 200 ml purged sufficiently with nitrogen was charged with purified toluene and component (b1-4) in an amount of 3 mmol in term of magnesium atom, so as to adjust the total volume to 85.2 mL. While the sample was kept at 25° C. under stirring, 14.8 mL toluene solution (0.001014 mmol/mL) of the component (a2-172) used in Example 1 was added dropwise thereto over 20 minutes. After the mixture was stirred for 1 hour, the solids were collected by filtration and washed sufficiently with toluene, and decane was added thereto to give a decane slurry of component (b1-4-a2-172).

A part of this slurry was collected to analyze its concentration, indicating 1.21 mg/mL magnesium and 30.2 μg/mL zirconium. Accordingly, the content of zirconium atom in 1 g of the component (b1-4-a2-172) was calculated to be 6.01 mg/g.

Polymerization

Polymerization was carried out in the same manner as in Example 10 except that in the Polymerization in Example 10, the component (b1-4-a2-172) prepared above was used in place of the component (b1-1-a2-195). As a result, 70.3 g polyethylene was obtained.

Accordingly, the polymerization activity was 200.8 kg/mmol-Zr·hr, and the polymerization activity per g of the component (b1-4-a2-172) was 13.2 kg/g-cat·hr, and this polyethylene had a [η] value of 16.2 dl/g and a bulk density of 0.34 g/cm$^3$.

Example 15

Preparation of Component (b1-5)

A flask having an internal volume of 400 mL purged sufficiently with nitrogen was charged with 25 mL component (b1) (25 mmol in terms of magnesium atom) prepared in Example 1 and 100 mL purified toluene, and while the temperature of the solution was kept at 0° C. under stirring, 13 mmol triethyl aluminum diluted with toluene was added dropwise thereto over 15 minutes. Thereafter, the temperature of the solution was increased to 105° C. over 110 minutes, and the mixture was reacted for 2 hours. Then, this reaction solution was cooled to –20° C., and while the temperature of the solution was kept at –20° C. under cooling, 13 mmol triethyl aluminum diluted with toluene was again added dropwise thereto over 15 minutes. Thereafter, the temperature of the solution was increased to 105° C. over 200 minutes, and the mixture was reacted for 1 hour. Thereafter, the reaction mixture was cooled again to –20° C., and charged with 13 mmol triethyl aluminum in the same manner as in the above procedure, and the temperature of the mixture was increased to 105° C. After the mixture was reacted at 105° C. for 1 hour, 162 mmol triethyl aluminum diluted with toluene was added dropwise thereto over 30 minutes, and the mixture was reacted for additional 1 hour under heating. After the reaction was finished, the solids were collected by filtration and washed sufficiently with toluene, and 100 mL toluene was added thereto to form a toluene slurry of component (b1-5). The average particle diameter of the resulting component (b1-5) was 16 μm.

A part of the component (b1-5) prepared by the above procedure was dried and examined for its composition, indicating 26.0 weight % magnesium, 0.4 weight % aluminum, 0.6 weight % 2-ethylhexoxy group and 72.0 weight % chlorine. Accordingly, the molar ratio of magnesium to aluminum (Mg/Al) was 72.2, and the molar ratio of 2-ethylhexoxy group to aluminum (OR/Al) was 0.31.

Preparation of Component (b1-5-a2-172)

A flask having an internal volume of 200 mL purged sufficiently with nitrogen was charged with purified toluene and component (b1-5) in an amount of 3 mmol in term of magnesium atom, so as to adjust the total volume to 85.5 mL. While the sample was kept at 25° C. under stirring, 14.5 mL toluene solution (0.001032 mmol/ml) of the component (a2-172) used in Example 1 was added dropwise thereto over 20 minutes. After the mixture was stirred for 1 hour, the solids were collected by filtration and washed sufficiently with toluene, and decane was added thereto to give a decane slurry of component (b1-5-a2-172).

A part of this slurry was collected to analyze its concentration, indicating 1.30 mg/mL magnesium and 28.4 μg/mL zirconium. Accordingly, the content of zirconium atom in 1 g of the component (b1-5-a2-172) was calculated to be 5.67 mg/g.

Polymerization

Polymerization was carried out in the same manner as in Example 10 except that in the Polymerization in Example 10, the component (b1-5-a2-172) prepared above was used in place of the component (b1-1-a2-195). As a result, 53.1 g polyethylene was obtained.

Accordingly, the polymerization activity was 151.6 kg/mmol-Zr·hr, and the polymerization activity per g of the component (b1-5-a2-172) was 9.4 kg/g-cat·hr, and this polyethylene had a [η] value of 16.4 dl/g and a bulk density of 0.37 g/cm³.

Example 16

Preparation of Component (b1-6)

A flask having an internal volume of 200 ml purged sufficiently with nitrogen was charged with 25 ml component (b1) (25 mmol in terms of magnesium atom) and 100 ml anhydrous 1,2-dichlorobenzene, and while the temperature of the solution was kept at 15° C. under stirring, 26 mmol triethyl aluminum diluted with purified decane was added dropwise thereto over 30 minutes. Thereafter, the temperature of the solution was increased to 80° C. over 120 minutes, and the mixture was reacted for additional 60 minutes. While the temperature was kept at 80° C., 49 mmol triethyl aluminum diluted with purified decane was again added dropwise thereto over 30 minutes, and the mixture was further reacted under heating for 60 minutes. After the reaction was finished, the solids were collected by filtration and washed sufficiently with toluene, and 50 ml toluene was added thereto to form a toluene slurry of component (b1-6). The average particle diameter of the resulting component (b1-6) was 7 μm.

A part of the component (b1-6) prepared by the above procedure was dried and examined for its composition, indicating 19.0 weight % magnesium, 2.5 weight % aluminum, 19.1 weight % 2-ethylhexoxy group and 54.0 weight % chlorine. Accordingly, the molar ratio of magnesium to aluminum (Mg/Al) was 8.4, and the molar ratio of 2-ethylhexoxy group to aluminum (OR/Al) was 1.6.

Preparation of Component (b1-6-a2-172)

A flask having an internal volume of 200 mL purged sufficiently with nitrogen was charged with purified toluene and component (b1-6) in an amount of 3 mmol in term of magnesium atom, so as to adjust the total volume to 85.3 mL. While the sample was kept at 25° C. under stirring, 14.7 mL toluene solution (0.001018 mmol/mL) of the component (a2-172) used in Example 1 was added dropwise thereto over 20 minutes. After the mixture was stirred for 1 hour, the solids were collected by filtration and washed sufficiently with toluene, and decane was added thereto to give a decane slurry of component (b1-6-a2-172).

A part of this slurry was collected to analyze its concentration, indicating 1.30 mg/mL magnesium and 28.4 μg/mL zirconium. Accordingly, the content of zirconium atom in 1 g of the component (b1-6-a2-172) was calculated to be 5.67 mg/g.

Polymerization

Polymerization was carried out in the same manner as in Example 10 except that in the Polymerization in Example 10, the component (b1-6-a2-172) prepared above was used in place of the component (b1-1-a2-195). As a result, 60.5 g polyethylene was obtained.

Accordingly, the polymerization activity was 173.0 kg/mmol-Zr·hr, and the polymerization activity per g of the component (b1-6-a2-172) was 9.8 kg/g-cat·hr, and this polyethylene had a [η] value of 17.2 dl/g and a bulk density of 0.22 g/cm³.

Example 17

Preparation of Component (b1-7)

Component (b1-7) was prepared in the same manner as in Example 16 except that in the Preparation of component (b1-6) in Example 16, chlorobenzene was used in place of anhydrous 1,2-dichlorobenzene.

The average particle diameter of the prepared component (b1-7) was 5 μm, and a part thereof was dried and examined for its composition, indicating 18.0 weight % magnesium, 2.6 weight % aluminum, 20.4 weight % 2-ethylhexoxy group and 52.0 weight % chlorine. Accordingly, the molar ratio of magnesium to aluminum (Mg/Al) was 7.7, and the molar ratio of 2-ethylhexoxy group to aluminum (OR/Al) was 1.6.

Preparation of Component (b1-7-a2-172)

A flask having an internal volume of 200 mL purged sufficiently with nitrogen was charged with purified toluene and component (b1-7) in an amount of 3 mmol in term of magnesium atom, so as to adjust the total volume to 85.7 mL. While the sample was kept at 25° C. under stirring, 14.3 ml toluene solution (0.001047 mmol/mL) of the component (a2-172) used in Example 1 was added dropwise thereto over 20 minutes. After the mixture was stirred for 1 hour, the solids were collected by filtration 1 and washed sufficiently with toluene, and decane was added thereto to give a decane slurry of component (b1-7-a2-172).

A part of this slurry was collected to analyze its concentration, indicating 1.30 mg/mL magnesium and 28.4 μg/mL zirconium. Accordingly, the content of zirconium atom in 1 g of the component (b1-7-a2-172) was calculated to be 5.67 mg/g.

Polymerization

Polymerization was carried out in the same manner as in Example 10 except that in the Polymerization in Example 10, the component (b1-7-a2-172) prepared above was used in place of the component (b1-1-a2-195). As a result, 58.6 g polyethylene was obtained.

Accordingly, the polymerization activity was 167.5 kg/mmol-Zr·hr, and the polymerization activity per g of the component (b1-7-a2-172) was 8.4 kg/g-cat·hr, and this polyethylene had a [η] value of 18.1 dl/g and a bulk density of 0.23 g/cm³.

Example 18

Preparation of Component (b3)

95.2 g (1.0 mole) anhydrous magnesium chloride, 582 ml anhydrous 1,2-dichlorobenzene and 306.0 g (2.35 moles) 2-ethylhexyl alcohol were reacted at 130° C. for 2 hours to give a uniform solution (component (b3)).

Preparation of Component (b3-1)

A flask having an internal volume of 200 mL purged sufficiently with nitrogen was charged with 25 mL component (b3) (25 mmol in terms of magnesium atom) and 100 mL anhydrous 1,2-dichlorobenzene, and while the temperature of the solution was kept at 0° C. under stirring, 26 mmol triethyl aluminum diluted with anhydrous 1,2-dichlorobenzene was added dropwise thereto over 30 minutes. Thereafter, the temperature of the solution was increased to 100° C. over 200 minutes, and the mixture was reacted for 1 hour. While the temperature was kept at 100° C., 175 mmol triethyl aluminum diluted with anhydrous 1,2-dichlorobenzene was again added dropwise thereto over 30 minutes, and the mixture was further reacted under heating for 1 hour. After the reaction was finished, the solids were collected by filtration and washed sufficiently with toluene, and 100 mL toluene was added thereto to form a toluene slurry of component (b3-1). The average particle diameter of the resulting component (b3-1) was 4 µm.

A part of the component (b3-1) prepared by the above procedure was dried and examined for its composition, indicating 26.0 weight % magnesium, 0.4 weight % aluminum, 4.8 weight % 2-ethylhexoxy group and 68.0 weight % chlorine. Accordingly, the molar ratio of magnesium to aluminum (Mg/Al) was 72.2, and the molar ratio of 2-ethylhexoxy group to aluminum (OR/Al) was 0.3.

Preparation of Component (b3-1-a2-172)

A flask having an internal volume of 200 mL purged sufficiently with nitrogen was charged with purified toluene and component (b3-1) in an amount of 3 mmol in term of magnesium atom, so as to adjust the total volume to 85.4 ml. While the sample was kept at 25° C. under stirring, 14.5 mL toluene solution (0.001022 mmol/mL) of the component (a2-172) used in Example 1 was added dropwise thereto over 20 minutes. After the mixture was stirred for 1 hour, the solids were collected by filtration and washed sufficiently with toluene, and 50 mL decane was added thereto to give a decane slurry of component (b3-1-a2-172).

A part of this slurry was collected to analyze its concentration, indicating 1.29 mg/mL magnesium and 30.9 µg/mL zirconium. Accordingly, the content of zirconium atom in 1 g of the component (b3-1-a2-172) was calculated to be 6.23 mg/g.

Polymerization

Polymerization was carried out in the same manner as in Example 10 except that in the Polymerization in Example 10, the component (b3-1-a2-172) prepared above was used in place of the component (b1-1-a2-195). As a result, 108.0 g polyethylene was obtained.

Accordingly, the polymerization activity was 308.4 kg/mmol-Zr·hr, and the polymerization activity per g of the component (b3-1-a2-172) was 21.0 kg/g-cat·hr, and this polyethylene had a [η] value of 17.9 dl/g and a bulk density of 0.22 g/cm$^3$.

Example 19

Preparation of Component (b3-2)

A flask having an internal volume of 200 mL purged sufficiently with nitrogen was charged with 25 mL component (b3) (25 mmol in terms of magnesium atom) and 100 mL toluene, and while the temperature of the solution was kept at −20° C. under stirring, 26 mmol triethyl aluminum diluted with toluene was added dropwise thereto over 30 minutes. Thereafter, the temperature of the solution was increased to 100° C. over 320 minutes, and the mixture was reacted for 1 hour. While the temperature was kept at 100° C., 175 mmol triethyl aluminum diluted with toluene was again added dropwise thereto over 30 minutes, and the mixture was further reacted under heating for 1 hour. After the reaction was finished, the solids were collected by filtration and washed sufficiently with toluene, and 100 mL toluene was added thereto to form a toluene slurry of component (b3-2). The average particle diameter of the resulting component (b3-2) was 6 µm.

A part of the component (b3-2) prepared by the above procedure was dried and examined for its composition, indicating 26.0 weight % magnesium, 0.4 weight % aluminum, 0.7 weight % 2-ethylhexoxy group and 19.0 weight % chlorine. Accordingly, the molar ratio of magnesium to aluminum (Mg/Al) was 72.2, and the molar ratio of 2-ethylhexoxy group to aluminum (OR/Al) was 0.4.

Preparation of Component (b3-2-a2-172)

A flask having an internal volume of 200 mL purged sufficiently with nitrogen was charged with purified toluene and component (b3-2) in an amount of 3 mmol in term of magnesium atom, so as to adjust the total volume to 85.2 mL. While the sample was kept at 25° C. under stirring, 14.8 mL toluene solution (0.001011 mmol/mL) of the component (a2-172) used in Example 1 was added dropwise thereto over 20 minutes. After the mixture was stirred for 1 hour, the solids were collected by filtration and washed sufficiently with toluene, and decane was added thereto to give a decane slurry of component (b3-2-a2-172).

A part of this slurry was collected to analyze its concentration, indicating 1.05 mg/mL magnesium and 24.7 µg/mL zirconium. Accordingly, the content of zirconium atom in 1 g of the component (b3-2-a2-172) was calculated to be 6.12 mg/g.

Polymerization

Polymerization was carried out in the same manner as in Example 10 except that in the Polymerization in Example 10, the component (b3-2-a2-172) prepared above was used in place of the component (b1-1-a2-195). As a result, 82.9 g polyethylene was obtained.

Accordingly, the polymerization activity was 236.7 kg/mmol-Zr·hr, and the polymerization activity per g of the component (b3-2-a2-172) was 15.8 kg/g-cat·hr, and this polyethylene had a [η] value of 17.4 dl/g and a bulk density of 0.23 g/cm$^3$.

Example 20

Preparation of Component (b3-3)

A flask having an internal volume of 400 mL purged sufficiently with nitrogen was charged with 12.5 mL component (b3) (25 mmol in terms of magnesium atom) and 250 mL toluene, and while the temperature of the solution was kept at −20° C. under stirring, 10.2 mmol triethyl aluminum diluted with toluene was added dropwise thereto over 30 minutes. Thereafter, the temperature of the solution was increased to 100° C. over 1160 minutes, and the mixture was reacted for 1 hour. While the temperature was kept at 100° C., 87.5 mmol triethyl aluminum diluted with toluene was again added dropwise thereto over 30 minutes, and the mixture was further reacted under heating for 1 hour. After the reaction was finished, the solids were collected by filtration and washed sufficiently with toluene, and 100 mL toluene was added thereto to form a toluene slurry of component (b3-3). The average particle diameter of the resulting component (b3-3) was 5 µm.

A part of the component (b3-3) prepared by the above procedure was dried and examined for its composition, indicating 24.0 weight % magnesium, 0.4 weight % aluminum, 0.8 weight % 2-ethylhexoxy group and 69.0 weight % chlorine. Accordingly, the molar ratio of magnesium to aluminum (Mg/Al) was 66.6, and the molar ratio of 2-ethylhexoxy group to aluminum (OR/Al) was 0.4.

Preparation of Component (b3-3-a2-172)

A flask having an internal volume of 200 mL purged sufficiently with nitrogen was charged with purified toluene and component (b3-3) in an amount of 3 mmol in term of magnesium atom, so as to adjust the total volume to 85.7 mL. While the sample was kept at 25° C. under stirring, 14.3 mL toluene solution (0.001052 mmol/mL) of the component (a2-172) used in Example 1 was added dropwise thereto over 20 minutes. After the mixture was stirred for 1 hour, the solids were collected by filtration and washed sufficiently with toluene, and decane was added thereto to give a decane slurry of component (b3-3-a2-172).

A part of this slurry was collected to analyze its concentration, indicating 1.26 mg/mL magnesium and 28.3 µg/mL zirconium. Accordingly, the content of zirconium atom in 1 g of the component (b3-3-a2-172) was calculated to be 5.39 mg/g.

Polymerization

Polymerization was carried out in the same manner as in Example 10 except that in the Polymerization in Example 10, the component (b3-3-a2-172) prepared above was used in place of the component (b1-1-a2-195). As a result, 99.5 g polyethylene was obtained.

Accordingly, the polymerization activity was 284.3 kg/mmol-Zr·hr, and the polymerization activity per g of the component (b3-3-a2-172) was 16.8 kg/g-cat·hr, and this polyethylene had a [η] value of 22.0 dl/g and a bulk density of 0.22 g/cm$^3$.

Comparative Example 1

Preparation of Component (b1-8)

A flask having an internal volume of 200 ml purged sufficiently with nitrogen was charged with 25 ml component (B1) (25 mmol in terms of magnesium atom) and 100 ml purified decane, and while the temperature of the solution was kept at 15° C. under stirring, 26 mmol triethyl aluminum diluted with purified decane was added dropwise thereto over 30 minutes. Thereafter, the temperature of the solution was increased to 80° C. over 2 hours, and the mixture was reacted for 1 hour. After the reaction was finished, the solids were collected by filtration and washed sufficiently with toluene, and 100 ml toluene was added thereto to form a toluene slurry of component (b1-8). The average particle diameter of the resulting component (b1-8) was 20 µm.

A part of the component (component (b1-8)) prepared by the above procedure was dried and examined for its composition, indicating 6.5 weight % magnesium, 3.5 weight % aluminum, 78.0 weight % 2-ethylhexoxy group and 18.0 weight % chlorine, and the molar ratio of magnesium to aluminum (Mg/Al) was 2.0, and the molar ratio of 2-ethylhexoxy group to aluminum (OR/Al) was 4.6.

Preparation of Component (b1-8-a2-1)

A flask having an internal volume of 200 ml purged sufficiently with nitrogen was charged with component (b1-8) in an amount of 10 mmol in terms of magnesium atom and 100 ml purified toluene, and while the temperature of the solution was kept at room temperature under stirring, 50 ml toluene solution (0.001 mmol/ml) of component (a2-1) below was added dropwise thereto over 20 minutes. After the mixture was stirred for 1 hour, the solids were collected by filtration (component (b1-8-a2-1)). A part of the component (b1-8-a2-1) prepared by the above procedure was dried and examined for its composition, revealing that the component (a2-1) was hardly contained (0.004 weight %).

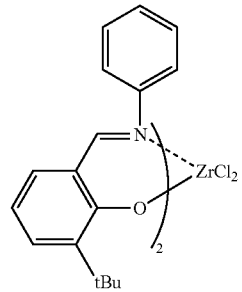

Component (a2-1)

Comparative Example 2

500 ml purified toluene was introduced into an SUS autoclave having an internal volume of 1 liter purged sufficiently with nitrogen, and the liquid phase and gaseous phase were saturated with ethylene by blowing ethylene. Thereafter, the toluene was heated to 75° C., and the autoclave was charged in an ethylene stream with 1.9 mmol triisobutyl aluminum and 0.5 ml component (b1) (0.5 mmol in terms of magnesium atom) prepared in the same manner as in Example 1, and the mixture was reacted for 15 minutes, to prepare a magnesium-containing carrier component (B) in the system. Then, the autoclave was charged with component (a2-116), 0.384 mg (0.0005 mmol in terms of zirconium atom), and polymerization was carried out for 15 minutes at an ethylene pressure of 0.8 MPa·G. During the polymerization, the system was kept at 75° C. and at an ethylene pressure of 0.8 MPa·G. After the polymerization was finished, the reaction product was introduced into a large amount of methanol to precipitate the whole polymer, and after hydrochloric acid was added, the polymer was collected with a glass filter. The resulting polymer was dried under vacuum for 10 hours to give 33.25 g polyethylene. The [η] value of this polyethylene was 15.8 dl/g.

The polymerization activity per molecule of the component (a2-116) was as high as 266,000 g/mmol-Zr·hr, but the activity of 1 g starting material used in preparation of the carrier component (B) was as very low as 0.2 kg/g-cat·hr, and the bulk density was also as low as 0.09 g/cm$^3$.

The calculated molar ratio of magnesium to aluminum (Mg/Al) in the system was 0.26, and the calculated molar ratio of 2-ethylhexoxy group to aluminum (OR/Al) was 0.79. Separately, the carrier component (B) was prepared in the same method as described above, and its measured particle diameter was 1 µm or less.

INDUSTRIAL APPLICABILITY

The present invention is industrially useful because an olefin polymer excellent in powdery properties can be obtained by an extremely high polymerization activity even without combination with an expensive organoaluminum oxy compound or organoboron compound.

What is claimed is:

1. An olefin polymerization catalyst comprising a carrier component suitable as an olefin polymerization catalyst, which is insoluble in a hydrocarbon solvent, is in the form of a solid fine particles having an average particle diameter of 3 to 80 µm, and contains a magnesium atom, an aluminum atom and a $C_{1-20}$ alkoxy group simultaneously, wherein the molar ratio of magnesium atom to aluminum atom (Mg/Al) is in the range of 40 to 150, and the molar ratio of alkoxy group to aluminum atom (alkoxy group/Al) is in the range of 0.2 to 2.0.

2. An olefin polymerization catalyst comprising:

(A) a transition metal compound from any one of groups 3 to 11 in the periodic table, having a ligand containing two or more atoms selected from a boron atom, a nitrogen atom, an oxygen atom, a phosphorous atom and a sulfur atom, (B) a carrier component suitable as an olefin polymerization catalyst, which is insoluble in a hydrocarbon solvent, is in the form of a solid fine particles having an average particle diameter of 3 to 80 μm, and contains a magnesium atom, an aluminum atom and a $C_{1-20}$ alkoxy group simultaneously, wherein the molar ratio of magnesium atom to aluminum atom (Mg/Al) is in the range of 1.0 to 300, and the molar ratio of alkoxy group to aluminum atom (alkoxy group/Al) is in the range of 0.05 to 2.0, and (C) a specific organometallic compound, if necessary.

3. The olefin polymerization catalyst according to claim 2, wherein the transition metal compound (A) is carried on the carrier component (B).

4. The olefin polymerization catalyst according to claim 2, wherein the molar ratio of magnesium atom to aluminum atom (Mg/Al) is in the range of 40 to 150, and the molar ratio of alkoxy group to aluminum atom (alkoxy group/Al) is in the range of 0.2 to 2.0.

5. The olefin polymerization catalyst according to claim 2, which is obtained by contacting a magnesium halide with a $C_{1-20}$ alcohol and then contacting the product with an organoaluminum compound represented by the general formula (Z)

$$AlR_nX_{3-n} \quad (Z)$$

wherein R represents a $C_{1-20}$ hydrocarbon group, X represents a halogen atom or a hydrogen atom, n is an integer of 1 to 3, and when there are a plurality of Rs, Rs may be the same or different, and when there are a plurality of Xs, Xs may be the same or different.

* * * * *